US011272231B2

(12) United States Patent
Lee et al.

(10) Patent No.: US 11,272,231 B2
(45) Date of Patent: *Mar. 8, 2022

(54) BROADCAST SIGNAL TRANSMITTING APPARATUS AND BROADCAST SIGNAL TRANSMITTING METHOD

(71) Applicant: LG ELECTRONICS INC., Seoul (KR)

(72) Inventors: Jangwon Lee, Seoul (KR); Sejin Oh, Seoul (KR); Woosuk Ko, Seoul (KR); Kyoungsoo Moon, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/152,438

(22) Filed: Jan. 19, 2021

(65) Prior Publication Data

US 2021/0144415 A1   May 13, 2021

Related U.S. Application Data

(63) Continuation of application No. 15/110,885, filed as application No. PCT/KR2015/003515 on Apr. 8, 2015, now Pat. No. 10,897,636.

(Continued)

(51) Int. Cl.
*H04N 7/173* (2011.01)
*H04N 21/2381* (2011.01)
(Continued)

(52) U.S. Cl.
CPC ....... *H04N 21/2381* (2013.01); *H04B 7/0413* (2013.01); *H04H 20/423* (2013.01);
(Continued)

(58) Field of Classification Search
CPC .......... H04N 21/6131; H04N 21/2385; H04N 21/6118; H04N 21/434
(Continued)

(56) References Cited

U.S. PATENT DOCUMENTS

2005/0160184 A1   7/2005   Walsh et al.
2006/0023652 A1   2/2006   Vedantham et al.
(Continued)

FOREIGN PATENT DOCUMENTS

CN   103155584 A   6/2013
EP       2541920 A2   1/2013
(Continued)

OTHER PUBLICATIONS

Le Feuvre et al., "On Hybrid Delivery," International Organisation for Standardisation Organisation Internationale de Normalisation, ISO/IEC JTC1/SC29/WG11, Coding of Moving Pictures and Audio, MPEG2012/M28136, Geneva, Switzerland, XP030056689, Jan. 2013, 4 pages.

(Continued)

*Primary Examiner* — Jivka A Rabovianski
(74) *Attorney, Agent, or Firm* — Birch, Stewart, Kolasch & Birch, LLP

(57) ABSTRACT

Provided is a method for transmitting a broadcast signal. The method for transmitting a broadcast signal, according to the present invention, can be a broadcast content transmitting method, comprising the steps of: generating, by a first module, a first media stream for broadcast content wherein the first media stream includes a plurality of packets, and at least one of the packets includes time information; generating, by a second module, a second media stream for the broadcast content; transmitting, by a third module, the first media stream through a broadcast network; receiving, by a fourth module, a request for the second media stream from (Continued)

a receiver; and transmitting, by the fourth module, the second media stream to the receiver through the Internet network.

18 Claims, 103 Drawing Sheets

Related U.S. Application Data

(60) Provisional application No. 61/981,208, filed on Apr. 18, 2014, provisional application No. 61/982,875, filed on Apr. 23, 2014.

(51) Int. Cl.

| | |
|---|---|
| *H04N 21/8547* | (2011.01) |
| *H04L 1/00* | (2006.01) |
| *H04N 21/63* | (2011.01) |
| *H04B 7/0413* | (2017.01) |
| *H04N 21/462* | (2011.01) |
| *H04N 21/2383* | (2011.01) |
| *H04H 20/42* | (2008.01) |
| *H04H 60/82* | (2008.01) |
| *H04H 60/40* | (2008.01) |
| *H04N 21/236* | (2011.01) |
| *H04N 21/233* | (2011.01) |
| *H04N 21/234* | (2011.01) |
| *H04N 21/242* | (2011.01) |

(52) U.S. Cl.
CPC ............ *H04H 60/40* (2013.01); *H04H 60/82* (2013.01); *H04L 1/004* (2013.01); *H04L 1/0041* (2013.01); *H04L 1/0057* (2013.01); *H04L 1/0071* (2013.01); *H04L 1/0075* (2013.01); *H04N 21/233* (2013.01); *H04N 21/234* (2013.01); *H04N 21/236* (2013.01); *H04N 21/2383* (2013.01); *H04N 21/242* (2013.01); *H04N 21/4622* (2013.01); *H04N 21/631* (2013.01); *H04N 21/8547* (2013.01); *H04H 2201/37* (2013.01); *H04L 2001/0093* (2013.01)

(58) Field of Classification Search
USPC .......................................................... 725/116
See application file for complete search history.

(56) References Cited

U.S. PATENT DOCUMENTS

| | | |
|---|---|---|
| 2006/0184790 A1 | 8/2006 | Oliveira et al. |
| 2006/0253544 A1 | 11/2006 | Luoma et al. |
| 2007/0074264 A1 | 3/2007 | Vesma et al. |
| 2009/0217318 A1 | 8/2009 | Versteeg et al. |
| 2011/0231566 A1 | 9/2011 | Gelter et al. |
| 2013/0028271 A1 | 1/2013 | Limberg |
| 2013/0038792 A1 | 2/2013 | Quigley et al. |
| 2013/0074141 A1 | 3/2013 | Hwang et al. |
| 2013/0107786 A1 | 5/2013 | Lotfallah et al. |
| 2013/0335629 A1 | 12/2013 | Laurent et al. |
| 2014/0245371 A1 | 8/2014 | Lee et al. |

FOREIGN PATENT DOCUMENTS

| | | |
|---|---|---|
| EP | 2667595 A2 | 11/2013 |
| EP | 2744214 A2 | 6/2014 |
| JP | 2002-27429 A | 1/2002 |
| JP | 2007-60524 A | 3/2007 |
| JP | 2010-171697 A | 8/2010 |
| JP | 2012-205075 A | 10/2012 |
| JP | 2014-509111 A | 4/2014 |
| KR | 10-2006-0015603 A | 2/2006 |
| KR | 10-2010-0036511 A | 4/2010 |
| KR | 10-2013-0008436 A | 1/2013 |
| KR | 10-2013-0038792 A | 4/2013 |
| WO | WO 2011/105786 A2 | 9/2011 |
| WO | WO 2013/025035 A2 | 2/2013 |
| WO | WO 2013/190787 A1 | 12/2013 |
| WO | WO 2015/105400 A1 | 7/2015 |

OTHER PUBLICATIONS

Le Feuvre et al., "Text of ISO/IEC 13818-1:2013/PDAM 6 . . . ," International Organisation for Standardisation Organisation Internationale de Normalisation, ISO/IEC JTC1/SC29/WG11, Coding of Moving Pictures and Audio, MPEG2013/N13952, Geneva, Switzerland, XP030020694, Nov. 2013, 12 pages.

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 12

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 13

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for-1: NUM_AUX | |
|         AUX_STREAM_TYPE | 4 |
|         AUX_PRIVATE_CONF | 28 |
|     end | |
| end | |

| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1:NUM_DP | | |
| | DP_ID | 6 |
| | DP_START | 15 (or 13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |

FIG. 18
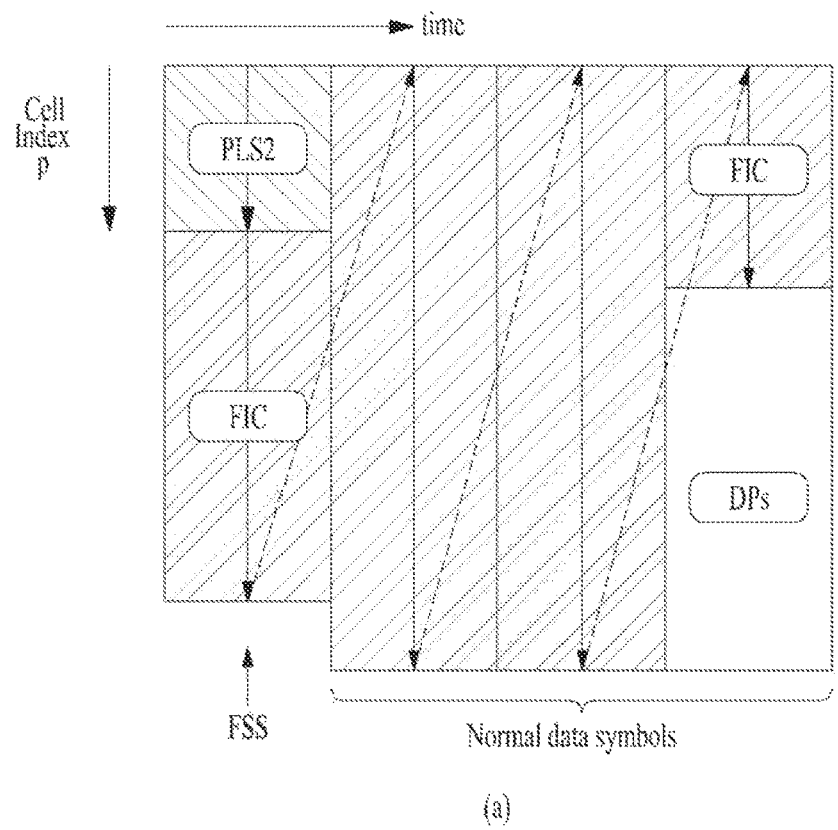
(a)
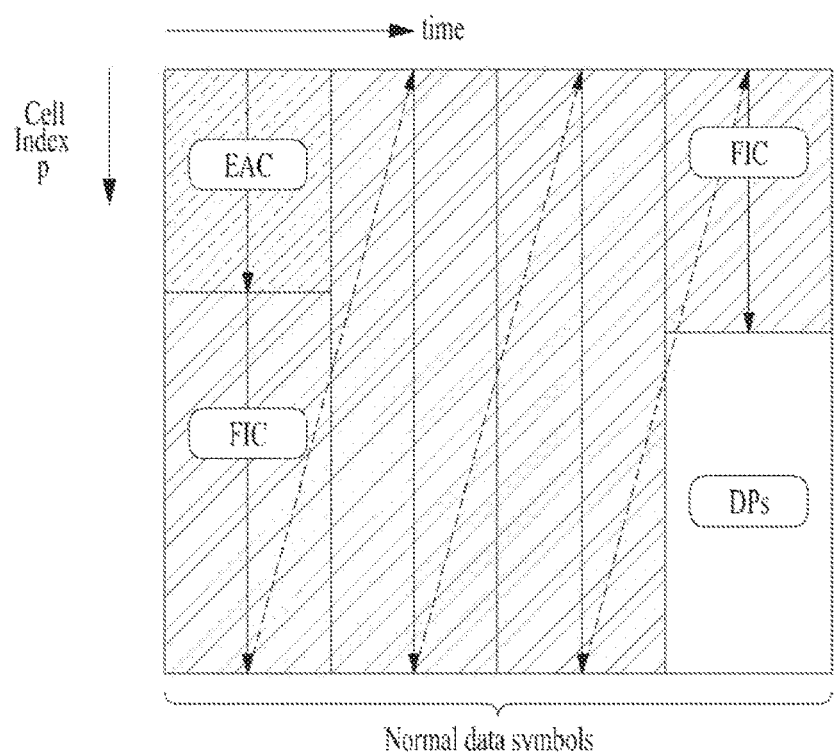
(b)

| 0 | | 7 | | | | 15 | | | 23 | | 31 |
|---|---|---|---|---|---|---|---|---|---|---|---|
| V | C | R | S | O | H|T|R|A|B | HDR_LEN | | Codepoint (CP) | |
| Congestion Control Information (CCI) ||||||||||||
| Transport Session Identifier (TSI) ||||||||||||
| Transport Object Identifier (TOI) ||||||||||||
| HET | | S|FI|FC | | Padding Bytes (PB) ||| reserved |||
| Header Extensions (EXT_FTI, EXT_TIME etc.) ||||||||||||
| FEC Payload ID ||||||||||||
| Encoding symbol (s) ||||||||||||

FIG. 31

| 0 | | 7 | | | | 15 | | | 23 | | 31 |
|---|---|---|---|---|---|---|---|---|---|---|---|
| V | C | R | S | O | H|T|R|A|B | HDR_LEN | | Codepoint (CP) | |
| Congestion Control Information (CCI) ||||||||||||
| Transport Session Identifier (TSI) ||||||||||||
| Transport Object Identifier (TOI) ||||||||||||
| HET | | S|FI | FHL | | Padding Bytes (PB) ||||
| Header Extensions (EXT_FTI, EXT_TIME etc.) ||||||||||||
| FEC Payload ID ||||||||||||
| Encoding symbol (s) ||||||||||||

FIG. 32

| Element of Attribute name | type | Use |
|---|---|---|
| FDT | | |
| @ Expires | string | M |
| @ Complete | boolen | O |
| @ Content-Type | string | O |
| @ Content-Encoding | string | O |
| @ FEC-OTI-FEC-Encoding-ID | unsignedLong | O |
| @ FEC-OTI-FEC-Instance-ID | unsignedLong | O |
| @ FEC-OTI-Maximum-Source-Block-Length | unsignedLong | O |
| @ FEC-OTI-Encoding-Symbol-Length | unsignedLong | O |
| @ FEC-OTI-Max-Number-of-Encoding-Symbols | unsignedLong | O |
| @ FEC-OTI-Scheme-Specific-Info | unsignedLong | O |
| @ Real-Time-Support | boolen | O |
| File | | 0..N |
| @ Content-Location | string | M |
| @ TOI | positiveInteger | M |
| @ Complete | boolen | O |
| @ Content-Type | string | O |
| @ Content-Encoding | string | O |
| @ FEC-OTI-FEC-Encoding-ID | unsignedByte | O |
| @ FEC-OTI-FEC-Instance-ID | unsignedLong | O |
| @ FEC-OTI-Maximum-Source-Block-Length | unsignedLong | O |
| @ FEC-OTI-Encoding-Symbol-Length | unsignedLong | O |
| @ FEC-OTI-Max-Number-of-Encoding-Symbols | unsignedLong | O |
| @ FEC-OTI-Scheme-Specific-Info | base64Binary | O |
| @ Real-Time-Support | boolen | O |

FIG. 42

| 0 | | 7 | | | | 15 | | | | 23 | 31 |
|---|---|---|---|---|---|---|---|---|---|---|---|
| V | C | PSI | S | O | H | Type | A | B | HDR_LEN | | Codepoint (CP) |
| Congestion Control Information (CCI) ||||||||||||
| Transport Session Identifier (TSI) ||||||||||||
| Transport Object Identifier (TOI) ||||||||||||
| Header Extensions (EXT_FTI, EXT_TIME etc.) ||||||||||||
| FEC Payload ID ||||||||||||
| Encoding symbol (s) ||||||||||||

FIG. 43

| 0 | | 7 | | | | 15 | | | | 23 | 31 |
|---|---|---|---|---|---|---|---|---|---|---|---|
| V | C | PSI | S | O | H | Res | A | B | HDR_LEN | | Codepoint (CP) |
| Congestion Control Information (CCI) ||||||||||||
| Transport Session Identifier (TSI) ||||||||||||
| Transport Object Identifier (TOI) ||||||||||||
| HET | | | | Type | | | | Reserved | | | |
| Header Extensions (EXT_FTI, EXT_TIME etc.) ||||||||||||
| FEC Payload ID ||||||||||||
| Encoding symbol (s) ||||||||||||

FIG. 46

| 0 | 7 | 15 | 23 | 31 |
|---|---|---|---|---|

| V | C | PSI | S | O | H | Res | A | B | HDR_LEN | Codepoint (CP) |
|---|---|---|---|---|---|---|---|---|---|---|
| Congestion Control Information (CCI) ||||||||||||
| Transport Session Identifier (TSI) ||||||||||||
| Transport Object Identifier (TOI) ||||||||||||
| HET || Internal Structure Type ||||| Reserved ||||
| Header Extensions (EXT_FTI, EXT_TIME etc.) ||||||||||||
| FEC Payload ID ||||||||||||
| Encoding symbol (s) ||||||||||||

FIG. 47

| 0 | 7 | 15 | 23 | 31 |
|---|---|---|---|---|

| V | C | PSI | S | O | H | Res | A | B | HDR_LEN | Codepoint (CP) |
|---|---|---|---|---|---|---|---|---|---|---|
| Congestion Control Information (CCI) ||||||||||||
| Transport Session Identifier (TSI) ||||||||||||
| Transport Object Identifier (TOI) ||||||||||||
| HET || SF | Reserved |||| Offset ||||
| Header Extensions (EXT_FTI, EXT_TIME etc.) ||||||||||||
| FEC Payload ID ||||||||||||
| Encoding symbol (s) ||||||||||||

FIG. 48

| 0 | | 7 | | | 15 | | | | 23 | | 31 |
|---|---|---|---|---|---|---|---|---|---|---|---|
| V | C | PSI | S | O | H | Res | A | B | HDR_LEN | | Codepoint (CP) |
| Congestion Control Information (CCI) ||||||||||||
| Transport Session Identifier (TSI) ||||||||||||
| Transport Object Identifier (TOI) ||||||||||||
| HET | | | HEL | | | | | URL | | | |
| Header Extensions (EXT_FTI, EXT_TIME etc.) ||||||||||||
| FEC Payload ID ||||||||||||
| Encoding symbol (s) ||||||||||||

FIG. 49

| 0 | | 7 | | | 15 | | | | 23 | | 31 |
|---|---|---|---|---|---|---|---|---|---|---|---|
| V | C | PSI | S | O | H | Res | A | B | HDR_LEN | | Codepoint (CP) |
| Congestion Control Information (CCI) ||||||||||||
| Session Group Identifier (SGI) |||||| Divided Transport Session Identifier (DTSI) ||||||
| Object Group Identifier (OGI) |||||| Divided Transport Object Identifier (DTOI) ||||||
| Header Extensions (EXT_FTI, EXT_TIME etc.) ||||||||||||
| FEC Payload ID ||||||||||||
| Encoding symbol (s) ||||||||||||

| 0 | | 7 | | | | 15 | | | 23 | | 31 |
|---|---|---|---|---|---|---|---|---|---|---|---|
| V | C | PSI | S | O | H | Priority | A | B | HDR_LEN | | Codepoint (CP) |
| Congestion Control Information (CCI) ||||||||||||
| Transport Session Identifier (TSI) ||||||||||||
| Transport Object Identifier (TOI) ||||||||||||
| Header Extensions (EXT_FTI, EXT_TIME etc.) ||||||||||||
| FEC Payload ID ||||||||||||
| Encoding Symbol (s) ||||||||||||

FIG. 57

| 0 | | 7 | | | | | 15 | | | 23 | 31 |
|---|---|---|---|---|---|---|---|---|---|---|---|
| V | C | PSI | S | O | H | Res | A | B | HDR_LEN | | Codepoint (CP) |
| Congestion Control Information (CCI) ||||||||||||
| Transport Session Identifier (TSI) ||||||||||||
| Transport Object Identifier (TOI) ||||||||||||
| HET ||| Priority |||| Reserved |||||
| Header Extensions (EXT_FTI, EXT_TIME etc.) ||||||||||||
| FEC Payload ID ||||||||||||
| Encoding Symbol (s) ||||||||||||

FIG. 58

| 0 | | 7 | | | | | 15 | | | 23 | 31 |
|---|---|---|---|---|---|---|---|---|---|---|---|
| V | C | PSI | S | O | H | Res | A | B | HDR_LEN | | Codepoint (CP) |
| Congestion Control Information (CCI) ||||||||||||
| Transport Session Identifier (TSI) ||||||||||||
| Transport Object Identifier (TOI) ||||||||||||
| HET ||| HEL ||| Start Offset ||||||
| Header Extensions (EXT_FTI, EXT_TIME etc.) ||||||||||||
| FEC Payload ID ||||||||||||
| Encoding Symbol (s) ||||||||||||

FIG. 59

| 0 | | 7 | | | 15 | | | 23 | | 31 |
|---|---|---|---|---|---|---|---|---|---|---|
| V | C | PSI | S | O | H|R|P|A|B | HDR_LEN | | Codepoint (CP) |
| Congestion Control Information (CCI) ||||||||||| 
| Transport Session Identifier (TSI) |||||||||||
| Transport Object Identifier (TOI) |||||||||||
| Header Extensions (EXT_FTI, EXT_TIME etc.) |||||||||||
| FEC Payload ID |||||||||||
| Encoding Symbol (s) |||||||||||

FIG. 60

| 0 | | 7 | | | 15 | | | 23 | | 31 |
|---|---|---|---|---|---|---|---|---|---|---|
| V | C | X|P|S | O | H | R | A|B | HDR_LEN | | Codepoint (CP) |
| Congestion Control Information (CCI) |||||||||||
| Transport Session Identifier (TSI) |||||||||||
| Transport Object Identifier (TOI) |||||||||||
| Header Extensions (EXT_FTI, EXT_TIME etc.) |||||||||||
| FEC Payload ID |||||||||||
| Encoding Symbol (s) |||||||||||

| 0 | 7 | 15 | 23 | 31 |
|---|---|---|---|---|
| V | C | PSI | S | O | H | Type | A | B | HDR_LEN | Codepoint (CP) |
| Congestion Control Information (CCI) ||||
| Transport Session Identifier (TSI) ||||
| T | Transport Object Identifier (TOI) ||||
| Header Extensions (EXT_FTI, EXT_TIME etc.) ||||
| FEC Payload ID ||||
| Encoding Symbol (s) ||||

FIG. 68

| Syntax | Nb bits |
|---|---|
| Timeline_Component_AU { | |
|   identifier | 8 |
|   version | 8 |
|   AU_length | 32 |
|   location_flag | 1 |
|   PTS_flag | 1 |
|   DTS_flag | 1 |
|   media_time_flag | 1 |
|   NTP_time_flag | 1 |
|   PTP_time_flag | 1 |
|   timecode_flag | 1 |
|   PCR_time_flag | 1 |
|   if(location_flag) { | |
|     location_length | 8 |
|     location | variable |
|   } | |
|   if(media_time_flag) { | |
|     timescale | 32 |
|     if(PTS_flag) { | |
|       if(version == 1) { | |
|         media_time_PTS | 64 |
|       } | |
|       else { | |
|         media_time_PTS | 32 |
|       } | |
|     } | |
|     if(DTS_flag) { | |
|       if(version == 1) { | |
|         media_time_DTS | 64 |
|       } | |
|       else { | |
|         media_time_DTS | 32 |
|       } | |
|     } | |
|   } | |
|   if(NTP_time_flag) { | |
|     if(PTS_flag) { | |
|       if(version == 1) { | |
|         NTP_time_PTS | 64 |
|       } | |
|       else { | |
|         NTP_time_PTS | 32 |
|       } | |
|     } | |

| Syntax | Nb bits |
|---|---|
|     if(DTS_flag) { | |
|       if(version == 1) { | |
|         NTP_time_DTS | 64 |
|       } | |
|       else { | |
|         NTP_time_DTS | 32 |
|       } | |
|     } | |
|   } | |
|   if(PTP_time_flag) { | |
|     if(PTS_flag) { | |
|       if(version == 1) { | |
|         PTP_time_PTS | 64 |
|       } | |
|       else { | |
|         PTP_time_PTS | 32 |
|       } | |
|     } | |
|     if(DTS_flag) { | |
|       if(version == 1) { | |
|         PTP_time_DTS | 64 |
|       } | |
|       else { | |
|         PTP_time_DTS | 32 |
|       } | |
|     } | |
|   } | |
|   if(PCR_time_flag) { | |
|     if(PTS_flag) { | |
|       reserved | 7 |
|       PCR_time_PTS | 33 |
|     } | |
|     if(DTS_flag) { | |
|       reserved | 7 |
|       PCR_time_DTS | 33 |
|     } | |
|   } | |
| } | |

FIG. 69

| Syntax | No. Bits | Format |
|---|---|---|
| Timeline_component_AU{ | | |
| identifier | 8 | TBD |
| AU_length | 32 | uimsbf |
| location_flag | 1 | bslbf |
| PTS_flag | 1 | bslbf |
| DTS_flag | 1 | bslbf |
| timestamp_version_flag | 1 | bslbf |
| timsteamp_type | 4 | uimsbf |
| if(location_flag){ | | |
| location_length | 8 | uimsbf |
| location | variable | |
| } | | |
| if(timestamp_type==0x00) { | | |
| timescale | 32 | |
| if(PTS_flag) | | |
| media_time_PTS | 32 or 64 | uimsbf |
| if(DTS_flag) { | | |
| media_time_DTS | 32 or 64 | uimsbf |
| } | | |
| if(timestamp_type==0x01 \|\| | | |
| timestamp_type==0x02 \|\| | | |
| timestamp_type==0x03) { | | |
| if(PTS_flag) | | |
| timestamp_type_PTS | 32 or 64 | uimsbf |
| if(DTS_flag) | | |
| timestamp_to_DTS | 32 or 64 | uimsbf |
| } | | |
| } | | |

FIG. 71

| Syntax | Nb bits |
|---|---|
| Timeline_Component_AU { | |
| identifier | 8 |
| version | 8 |
| AU_length | 32 |
| origin_PTS_flag | 1 |
| origin_DTS_flag | 1 |
| reserved | 6 |
| if(origin_PTS_flag) { | |
|   if(version==1) { | |
|     origin_PTS | 64 |
|   } | |
|   else { | |
|     origin_PTS | 32 |
|   } | |
| } | |
| if(origin_DTS_flag) { | |
|   if(version==1) { | |
|     origin_DTS | 64 |
|   } | |
|   else { | |
|     origin_DTS | 32 |
|   } | |
| } | |
| location_length | 1 |
| PTS_flag | 1 |
| DTS_flag | 1 |
| media_time_flag | 1 |
| NTP_time_flag | 1 |
| PTP_time_flag | 1 |
| timecode_flag | 1 |
| PCR_time_flag | 1 |
| if(location_flag) { | |
|   location_URL_length | 8 |
|   location_URL | variable |
| } | |
| if(media_time_flag) { | |
|   timescale | 32 |
|   if(PTS_flag) { | |
|     if(version==1) { | |
|       media_time_PTS | 64 |
|     } | |
|     else { | |
|       media_time_PTS | 32 |
|     } | |
|   } | |
|   if(DTS_flag) { | |
|     if(version==1) { | |
|       media_time_DTS | 64 |
|     } | |
|     else { | |
|       media_time_DTS | 32 |
|     } | |
|   } | |
| } | |

| Syntax | Nb bits |
|---|---|
| if(NTP_time_flag) { | |
|   if(PTS_flag) { | |
|     if(version==1) { | |
|       NTP_time_PTS | 64 |
|     } | |
|     else { | |
|       NTP_time_PTS | 32 |
|     } | |
|   } | |
|   if(DTS_flag) { | |
|     if(version==1) { | |
|       NTP_time_DTS | 64 |
|     } | |
|     else { | |
|       NTP_time_DTS | 32 |
|     } | |
|   } | |
| } | |
| if(PTP_time_flag) { | |
|   if(PTS_flag) { | |
|     if(version==1) { | |
|       PTP_time_PTS | 64 |
|     } | |
|     else { | |
|       PTP_time_PTS | 32 |
|     } | |
|   } | |
|   if(DTS_flag) { | |
|     if(version==1) { | |
|       PTP_time_DTS | 64 |
|     } | |
|     else { | |
|       PTP_time_DTS | 32 |
|     } | |
|   } | |
| } | |
| if(PCR_time_flag) { | |
|   if(PTS_flag) { | |
|     reserved | 7 |
|     PCR_time_PTS | 33 |
|   } | |
|   if(DTS_flag) { | |
|     reserved | 7 |
|     PCR_time_DTS | 33 |
|   } | |
| } | |
| } | |

FIG. 72

| Syntax | No. Bits | Format |
|---|---|---|
| timeline_component_AU{ | | |
| identifier | 8 | TBD |
| AU_length | 32 | uimsbf |
| location_flag | 1 | bslbf |
| origin_timestamp_flag | 1 | bslbf |
| timestamp_version | 1 | bslbf |
| timestamp_type | 1 | bslbf |
| timestamp_format | 4 | bslbf |
| if(location_flag){ | | |
| location_length /*M*/ | 8 | uimsbf |
| location | 8*M | |
| } | | |
| if(origin_timestamp_flag){ | | |
| origin_timestamp_version | 1 | bslbf |
| origin_timestamp_type | 1 | uimsbf |
| origin_timestamp_format | 4 | uimsbf |
| origin_location_flag | 1 | bslbf |
| reserved | 1 | '1' |
| if(origin_location_flag){ | | |
| origin_location_length /*L*/ | 8 | uimsbf |
| origin_location | 8*L | |
| } | | |
| if(origin_timestamp_format ==0x00){ | | |
| origin_timescale | 32 | uimsbf |
| origin_media_time | 32 or 64 | uimsbf |
| } else if (origin_timestamp_format==0x01 \|\| | | |
| origin_timestamp_format==0x02 \|\| | | |
| origin_timestamp_format==0x03) { | | |
| origin_timestamp | 32 or 64 | uimsbf |
| } else { | | |
| private_data_length /*LEN*/ | 16 | uimsbf |
| private_data_bytes() | 8*LEN | |
| } | | |
| } | | |
| if(timestamp_format ==0x00){ | | |
| timescale | 32 | uimsbf |
| media_time | 32 or 64 | uimsbf |
| } else if (timestamp_format==0x01 \|\| | | |
| timestamp_format==0x02 \|\| | | |
| timestamp_format==0x03) { | | |
| timestamp | 32 or 64 | uimsbf |
| } else { | | |
| data_bytes() | variable | |
| } | | |
| } | | |

FIG. 74

| Syntax | No. Bits | Format |
|---|---|---|
| timeline_reference_information_AU { | | |
|    AU_identifier | 8 | TBD |
|    AU_length | 32 | uimsbf |
|    external_media_URL_flag | 1 | bslbf |
|    internal_timeline_reference_flag | 1 | bslbf |
|    external_timeline_reference_flag | 1 | bslbf |
|    reserved | 5 | bslbf |
|    if(external_media_URL_flag) { | | |
|       external_media_URL_length/*L1*/ | 8 | uimsbf |
|       external_media_URL | 8*L1 | |
|    } | | |
|    if(internal_timeline_reference_flag) { | | |
|       internal_timeline_reference_format | 8 | uimsbf |
|       internal_timeline_reference_timescale_flag | 1 | bslbf |
|       internal_timeline_reference_length/*L2*/ | 7 | uimsbf |
|       if(internal_timeline_reference_timescale_flag) { | | |
|          internal_timeline_reference_timescale | 32 | uimsbf |
|       } | | |
|       internal_timeline_reference | 8*L2 | uimsbf |
|    } | | |
|    if(internal_timeline_reference_flag) { | | |
|       external_timeline_reference_format | 8 | uimsbf |
|       external_timeline_reference_timescale_flag | 1 | bslbf |
|       external_timeline_reference_length/*L3*/ | 7 | uimsbf |
|       if(internal_timeline_reference_timescale_flag) { | | |
|          external_timeline_reference_timescale | 32 | uimsbf |
|       } | | |
|       external_timeline_reference | 8*L3 | uimsbf |
|    } | | |
| } | | |

FIG. 75

| Syntax | No. Bits | Format |
|---|---|---|
| timeline_reference_information_AU { | | |
|     AU_identifier | 8 | TBD |
|     AU_length | 32 | uimsbf |
|     external_media_location_flag | 1 | bslbf |
|     nb_of_timeline_reference | 7 | uimsbf |
|     if(external_media_URL_flag) { | | |
|         external_media_URL_length/*L1*/ | 8 | uimsbf |
|         external_media_URL | 8*L1 | |
|     } | | |
|     for(i=0; i<=nb_of_timeline_reference; i++) { | | |
|         timeline_reference_type | 1 | bslbf |
|         timeline_reference_identifier | 7 | uimsbf |
|         timeline_reference_format | 8 | uimsbf |
|         timeline_reference_timescale_flag | 1 | bslbf |
|         timeline_reference_length/*L2*/ | 7 | uimsbf |
|         if(timeline_reference_timescale_flag) { | | |
|             timeline_reference_timescale | 32 | uimsbf |
|         } | | |
|         timeline_reference | 8*L2 | uimsbf |
|     } | | |
| } | | |

FIG. 79

```
aligned(8) abstract class SampleEntry (unsigned int(32) format)
extends Box(format) {
  const unsigned int(8)[6] reserved = 0;
  unsigned int(16) data_reference_index;
}
class MetaDataSampleEntry(codingname) extends SampleEntry (codingname) {
}
aligned(8) class TimelineComponentMetaDataSampleEntry extends MetaDataSampleEntry('metc') {
}
aligned(8) class SampleDescriptionBox (unsigned int(32) handler_type)extends FullBox('stsd', 0, 0) {
  int i;
  unsigned int(32) entry_count;
  for (i = 1 ; i <= entry_count ; i++) {
    switch (handler_type) {
      case 'soun': // for audio tracks
        AudioSampleEntry();
        break;
      case 'vide': // for video tracks
        VisualSampleEntry();
        break;
      case 'hint': // Hint track
        HintSampleEntry();
        break;
      case 'meta': // Metadata track
        MetadataSampleEntry();
        break;
    }
  }
}
```

FIG. 80

```
aligned(8) class TrackReferenceBox extends Box('tref') {
}
aligned(8) class TrackReferenceTypeBox ('metl') extends Box(reference_type) {
    unsigned int(32) track_IDs[];
}
```

| network_protocol Value | Meaning |
|---|---|
| 000 | IPv4 (conforming to RFC STD05 [5]) |
| 001-110 | ATSC reserved |
| 111 | framed_packet_type, as defined in Table 6.3 |

FIG. 89

| Syntax | No. of Bits | Format |
|---|---|---|
| service_map_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         SMT_protocol_version | 8 | uimsbf |
|         reserved | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_services | 8 | uimsbf |
|     for (i=0; i<num_services; i++) | | |
|     { | | |
|         service_id | 16 | uimsbf |
|         reserved | 2 | '11' |
|         service_status | 2 | uimsbf |
|         SP_indicator | 1 | bslbf |
|         short_service_name_length /* m */ | 3 | uimsbf |
|         short_service_name | 16*m | bslbf |
|         reserved | 2 | '11' |
|         service_category | 6 | uimsbf |
|         reserved | 3 | '111' |
|         num_components | 5 | uimsbf |
|         for (j=0; j<num_components; j++) | | |
|         { | | |
|             essential_component_indicator | 1 | bslbf |
|             reserved | 3 | '111' |
|             num_component_level_descriptors | 4 | uimsbf |
|             for (k=0; k<num_component_level_descriptors; k++) | | |
|             { | | |
|                 component_level_descriptor() | var | |
|             } | | |
|         } | | |
|         reserved | 4 | '1111' |
|         num_service_level_descriptors | 4 | uimsbf |
|         for (m=0; m<num_service_level_descriptors; m++) | | |
|         { | | |
|             service_level_descriptor() | var | |
|         } | | |
|     } | | |
| } | | |

FIG. 90

| service_category | Meaning |
|---|---|
| 0x00 | The service category is not specified |
| 0x01 | Basic TV |
| 0x02 | Basic Radio |
| 0x03 | RI service – Rights Issuer service |
| 0x04 | Not specified by the current version of this standard. |
| 0x05 | Not specified by the current version of this standard. |
| 0x06 | Not specified by the current version of this standard. |
| 0x07 | Data Service |
| 0x08 | Service Guide – Service Guide (Announcement) |
| 0x09 | Emergency Alerting |
| 0x0A | Not specified by the current version of this standard. |
| 0x0B ~ 0xFF | Reserved for future use. |

FIG. 91

| Syntax | No. of Bits | Format |
|---|---|---|
| service_map_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension | | |
|         SMT_protocol_version | 8 | uimsbf |
|         reserved | 8 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_services | 8 | uimsbf |
|     for(i=0;i<num_services; i++) | | |
|     { | | |
|         service_id | 16 | uimsbf |
|         reserved | 2 | '11' |
|         service_status | 2 | uimsbf |
|         SP_indicator | 1 | bslbf |
|         short_service_name_length/* m */ | 3 | uimsbf |
|         short_service_name | 16*m | bslbf |
|         reserved | 2 | '11' |
|         service_category | 6 | uimsbf |
|         reserved | 3 | '111' |
|         num_components | 5 | uimsbf |
|         for (j=0; j<num_components; j++) | | |
|         { | | |
|             essential_component_indicator | 1 | bslbf |
|             reserved | 3 | '111' |
|             num_component_level_descriptors | 4 | uimsbf |
|             for (k=0; k<num_component_level_descriptors; k++) | | |
|             { | | |
|                 component_level_descriptor() | var | |
|             } | | |
|         } | | |
|         reserved | 4 | '1111' |
|         num_service_level_descriptors | 4 | uimsbf |
|         for (m=0;m<num_service_level_descriptors; m++) | | |
|         { | | |
|             service_level_descriptor() | var | |
|         } | | |
|     } | | |
|     reserved | 4 | '1111' |
|     num_ensemble_level_descriptors | 4 | uimsbf |
|     for (n=0; n<num_ensemble_level_descriptors; n++) { | | |
|         ensemble_level_descriptor() | var | |
|     } | | |
| } | | |

| Syntax | No. of Bits | Format |
|---|---|---|
| targeting_descriptor(){ | | |
|     descriptor_tag | 8 | uimsbf |
|     descriptor_length | 8 | uimsbf |
|     target_device | 8 | uimsbf |
| } | | |

FIG. 110

| Syntax | No. Bits | Format |
|---|---|---|
| timeline_component_AU{ | | |
|    identifier | 8 | TBD |
|    AU_length | 32 | uimsbf |
|    location_flag | 1 | bslbf |
|    origin_timestamp_flag | 1 | bslbf |
|    timestamp_version | 1 | bslbf |
|    timestamp_type | 1 | bslbf |
|    timestamp_format | 4 | bslbf |
|    if(location_flag){ | | |
|       location_length /*M*/ | 8 | uimsbf |
|       location | 8*M | |
|    } | | |
|    if(origin_timestamp_flag){ | | |
|       origin_timestamp_version | 1 | bslbf |
|       origin_timestamp_type | 1 | uimsbf |
|       origin_timestamp_format | 4 | uimsbf |
|       origin_location_flag | 1 | bslbf |
|       reserved | 1 | '1' |
|       if(origin_timestamp_flag){ | | |
|          origin_location_length /*L*/ | 8 | uimsbf |
|          origin_location | 8*L | |
|       } | | |
|       if(origin_timestamp_format==0x00){ | | |
|          origin_timescale | 32 | uimsbf |
|          origin_media_time | 32 or 64 | uimsbf |
|       } else if(origin_timestamp_format==0x01 \|\| origin_timestamp_format==0x02 \|\| origin_timestamp_format==0x03) { | | |
|          origin_timestamp | 32 or 64 | uimsbf |
|       } else { | | |
|          private_data_length /*LEN*/ | 16 | uimsbf |
|          private_data_bytes() | 8*LEN | |
|       } | | |
|    } | | |
|    if(timestamp_format==0x00){ | | |
|       timescale | 32 | uimsbf |
|       media_time | 32 or 64 | uimsbf |
|    } else if(origin_timestamp_format==0x01 \|\| origin_timestamp_format==0x02 \|\| origin_timestamp_format==0x03) { | | |
|       timestamp | 32 or 64 | uimsbf |
|    } else { | | |
|       data_bytes() | variable | |
|    } | | |
| } | | |

FIG. 134

| Syntax | (No. Bits) | (Format) |
|---|---|---|
| timeline_reference_information_AU { | | |
|     AU_identifier | 8 | TBD |
|     AU_length | 32 | uimsbf |
|     external_media_URL_flag | 1 | bslbf |
|     internal_timeline_reference_flag | 1 | bslbf |
|     external_timeline_reference_flag | 1 | bslbf |
|     suggested_presentation_delay_flag | 1 | bslbf |
|     reserved | 4 | bslbf |
|     if(external_media_URL_flag) { | | |
|         external_media_URL_length /*L1*/ | 8 | uimsbf |
|         external_media_URL | 8*L1 | |
|     } | | |
|     if(internal_timeline_reference_flag) { | | |
|         internal_timeline_reference_format | 8 | uimsbf |
|         internal_timeline_reference_timescale_flag | 1 | bslbf |
|         internal_timeline_reference_length /*L2*/ | 7 | uimsbf |
|         if(internal_timeline_reference_timescale_flag) { | | |
|             internal_timeline_reference_timescale | 32 | uimsbf |
|         } | | |
|         internal_timeline_reference | 8*L2 | uimsbf |
|     } | | |
|     if(external_timeline_reference_flag) { | | |
|         external_timeline_reference_format | 8 | uimsbf |
|         external_timeline_reference_timescale_flag | 1 | bslbf |
|         external_timeline_reference_length /*L3*/ | 7 | uimsbf |
|         if(external_timeline_reference_timescale_flag) { | | |
|             external_timeline_reference_timescale | 32 | uimsbf |
|         } | | |
|         external_timeline_reference | 8*L3 | uimsbf |
|     } | | |
|     if(suggested_presentation_delay_flag) { | | |
|         suggested_presentation_delay_timescale_flag | 1 | bslbf |
|         suggested_presentation_delay_length /*L4*/ | 7 | uimsbf |
|         if(suggested_presentation_delay_timescale_flag) { | | |
|             suggested_presentation_delay_timescale | 32 | uimsbf |
|         } | | |
|         suggested_presentation_delay | 8*L4 | uimsbf |
|     } | | |
| } | | |

FIG. 135

| Syntax | (No. Bits) | (Format) |
|---|---|---|
| timeline_reference_information_AU { | | |
|     AU_identifier | 8 | TBD |
|     AU_length | 32 | uimsbf |
|     external_media_location_flag | 1 | bslbf |
|     suggested_presentation_delay_flag | 1 | bslbf |
|     nb_of_timeline_reference | 6 | uimsbf |
|     if( external_media_URL_flag ) { | | |
|         external_media_URL_length /*L1*/ | 8 | uimsbf |
|         external_media_URL | 8*L1 | |
|     } | | |
|     for( i=0; i<=nb_of_timeline_reference ; i++) { | | |
|         timeline_reference_type | 1 | bslbf |
|         timeline_reference_identifier | 7 | uimsbf |
|         timeline_reference_format | 8 | uimsbf |
|         timeline_reference_timescale_flag | 1 | bslbf |
|         timeline_reference_length /*L2*/ | 7 | uimsbf |
|         if( timeline_reference_timescale_flag ) { | | |
|             timeline_reference_timescale | 32 | uimsbf |
|         } | | |
|         timeline_reference | 8*L2 | uimsbf |
|     } | | |
|     if( suggested_presentation_delay_flag ) { | | |
|         suggested_presentation_delay_timescale_flag | 1 | bslbf |
|         suggested_presentation_delay_length /*L3*/ | 7 | uimsbf |
|         if( suggested_presentation_delay_timescale_flag ) { | | |
|             suggested_presentation_delay_timescale | 32 | uimsbf |
|         } | | |
|         suggested_presentation_delay | 8*L3 | uimsbf |
|     } | | |
| } | | |

FIG. 138

| EXT_TIME ||||||||||||
|---|---|---|---|---|---|---|---|---|---|---|---|
| HET | HEL | SCT Hi | SCT Low | ERT flag | SLC flag | Res.by LCT | TS format | TS version | SPD flag | SPDT flag ||
| Sender Current Time ||||||||||||
| Expected Residual Time ||||||||||||
| Session Last Changed Time ||||||||||||
| Timestamp ||||||||||||
| Suggested Presentation Delay ||||||||||||
| Suggested Presentation Delay Timescale ||||||||||||

FIG. 139

| EXT_OBJ_INFO |||||||
|---|---|---|---|---|---|---|
| HET | HEL | Object Type | M | SPD flag | SPDT flag | Reserved |
| Timestamp ||||||||
| Suggested Presentation Delay ||||||||
| Suggested Presentation Delay Timescale ||||||||

# BROADCAST SIGNAL TRANSMITTING APPARATUS AND BROADCAST SIGNAL TRANSMITTING METHOD

CROSS REFERENCE TO RELATED APPLICATIONS

This application is a Continuation of U.S. application Ser. No. 15/110,885 filed on Jul. 11, 2016 (now U.S. Pat. No. 10,897,636 issued on Jan. 19, 2021), which is a National Phase of PCT International Application No. PCT/KR2015/003515, filed on Apr. 8, 2015, which claims priority under 35 U.S.C. 119(e) to U.S. Provisional Application No. 61/981,208, filed on Apr. 18, 2014 and 61/982,875, filed on Apr. 23, 2014, all of which are hereby expressly incorporated by reference into the present application.

TECHNICAL FIELD

The present invention relates to a method and apparatus for transmitting and receiving broadcast signals.

BACKGROUND ART

As analog broadcast signal transmission comes to an end, various technologies for transmitting/receiving digital broadcast signals are being developed. A digital broadcast signal may include a larger amount of video/audio data than an analog broadcast signal and may further include various types of additional data.

DISCLOSURE

Technical Problem

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

Technical Solution

The object of the present invention can be achieved by providing a method for transmitting broadcast content, the method including generating a first media stream of broadcast content by a first module, the first media stream including a plurality of packets and at least one of the packets including time information, generating a second media stream of the broadcast content by a second module, transmitting the first media stream through a broadcast network by a third module, receiving a request for the second media stream from a receiver by a fourth module, and transmitting the second media stream to a receiver through the Internet by the fourth module.

The at least one packet may include an extension header including the time information, and the time information may include timestamp information indicating presentation time of the first media stream.

The extension header may include only a portion of the timestamp.

The extension header may further include timestamp information indicating presentation time of the second media stream.

The extension header may further include information on suggested presentation delay up to consumption time from generating time of the first media stream.

The timestamp indicating presentation time of the first media stream may indicate a presentation time value of the first media stream to which the suggested presentation delay is applied.

A payload of the at least one packet may include first timeline reference information for configuring a timeline of the first media stream and second timeline reference information for configuring a timeline of the second media stream.

The payload of the at least one packet may further include information on suggested presentation delay up to consumption time of generating time of the first media stream and the second media stream.

The first timeline reference information and the second timeline reference information may have a value to which the suggested presentation delay is applied.

The first media stream may be a video stream of the broadcast content, and the second media stream may be an audio stream of the broadcast content.

In another aspect of the present invention, provided herein is an apparatus for transmitting broadcast content, the apparatus including a first module configured to generate a first media stream of broadcast content, the first media stream including a plurality of packets and at least one of the packets including time information, a second module configured to generate a second media stream of the broadcast content, a third module configured to transmit the first media stream through a broadcast network, and a fourth module configured to receive a request for the second media stream from a receiver and to transmit the second media stream to a receiver through the Internet.

The at least one packet may include an extension header including the time information, and the time information may include timestamp information indicating presentation time of the first media stream.

The extension header may include only a portion of the timestamp.

The extension header may further include timestamp information indicating presentation time of the second media stream.

The extension header may further include information on suggested presentation delay up to consumption time from generating time of the first media stream.

The timestamp indicating presentation time of the first media stream may indicate a presentation time value of the first media stream to which the suggested presentation delay is applied.

A payload of the at least one packet may include first timeline reference information for configuring a timeline of the first media stream and second timeline reference information for configuring a timeline of the second media stream.

The payload of the at least one packet may further include information on suggested presentation delay up to consumption time of generating time of the first media stream and the second media stream.

The first timeline reference information and the second timeline reference information may have a value to which the suggested presentation delay is applied.

The first media stream may be a video stream of the broadcast content, and the second media stream may be an audio stream of the broadcast content.

Advantageous Effects

An embodiment of the present invention provides a broadcast service by controlling QoS (Quality of Service) of each service or service component and by processing data according to features of each service.

An embodiment of the present invention provides a transmission flexibility by transmitting various broadcast services through the same RF (radio frequency) signal bandwidth.

An embodiment of the present invention enhances Robustness of a broadcast signal and an efficiency of a data transmission by using MIMO (Multiple Input Multiple Output) system.

An embodiment of the present invention provides a broadcast transmission apparatus, an operation method of the broadcast transmission apparatus, a broadcast reception apparatus, and an operation method of the broadcast reception apparatus that are capable of acquiring digital broadcast signals without errors although we are using mobile receiving apparatus or we are in door.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 illustrates PLS1 data according to an embodiment of the present invention.

FIG. 13 illustrates PLS2 data according to an embodiment of the present invention.

FIG. 18 illustrates FIC mapping according to an embodiment of the present invention.

FIG. 22 illustrates an operation of a twisted row-column block interleaver according to another embodiment of the present invention.

FIG. 30 illustrates a Layered Coding Transport (LCT) packet structure for file transmission according to an embodiment of the present invention.

FIG. 31 illustrates a structure of an LCT packet according to another embodiment of the present invention.

FIG. 32 illustrates real-time broadcast support information signaling based on FDT according to an embodiment of the present invention.

FIG. 42 is a diagram illustrating a structure of a packet including object type information according to another embodiment of the present invention.

FIG. 43 is a diagram illustrating a structure of a packet including object type information according to another embodiment of the present invention.

FIG. 46 is a diagram illustrating a structure of a packet including type information according to another embodiment of the present invention.

FIG. 47 is a diagram illustrating a structure of a packet including boundary information according to another embodiment of the present invention.

FIG. 48 is a diagram illustrating a structure of a packet including mapping information according to another embodiment of the present invention.

FIG. 49 is a diagram illustrating a structure of an LCT packet including grouping information according to another embodiment of the present invention.

FIG. 57 is a diagram showing the structure of a packet including priority information according to another embodiment of the present invention.

FIG. 58 is a diagram showing the structure of a packet including offset information according to another embodiment of the present invention.

FIG. 59 is a diagram showing the structure of a packet including random access point (RAP) information according to another embodiment of the present invention.

FIG. 60 is a diagram showing the structure of a packet including random access point (RAP) information according to another embodiment of the present invention.

FIG. 68 illustrates syntax of the timeline component AU according to an embodiment of the present invention.

FIG. 69 illustrates syntax of the timeline component AU according to another embodiment of the present invention.

FIG. 71 illustrates syntax of the timeline component AU according to another embodiment of the present invention.

FIG. 72 illustrates syntax of the timeline component AU according to another embodiment of the present invention.

FIG. 74 illustrates a syntax of a timeline reference information AU according to another embodiment of the present invention.

FIG. 75 illustrates a syntax of a timeline reference information AU according to another embodiment of the present invention.

FIG. 79 illustrates the sample entry for identifying a timeline component in the ISO BMFF according to an embodiment of the present invention.

FIG. 80 illustrates a track reference type box for expressing a dependency relation between a timeline component track and another track in the ISO BMFF according to an embodiment of the present invention.

FIG. 89 is a view illustrating a broadcast service signaling table according to an embodiment of the present invention.

FIG. 90 is a view illustrating a value of a service_category field included in a broadcast service signaling table according to an embodiment of the present invention.

FIG. 91 shows a broadcast service signaling table according to an embodiment of the present invention.

FIG. 110 is a view illustrating a timeline signaling table of metadata according to an embodiment of the present invention.

FIG. 128 is a view illustrating a method of operating a broadcast transmission device according to an embodiment of the present invention.

FIG. 129 is a view illustrating a method of operating a broadcast reception device according to an embodiment of the present invention.

FIG. 130 is a view illustrating a structure of a packet header including information on a configuration of a transport packet.

FIG. 131 is a view illustrating a configuration of the transport packet described with reference to FIG. 130.

FIG. 132 is a view illustrating a method of operating a broadcast transmission device according to an embodiment of the present invention.

FIG. 133 is a view illustrating a method of operating a broadcast reception device according to an embodiment of the present invention.

FIG. 134 is a view illustrating timeline reference information AU including suggested presentation delay (SPD) according to an embodiment of the present invention.

FIG. 135 is a view illustrating timeline reference information AU including suggested presentation delay (SPD) according to another embodiment of the present invention.

FIG. 136 is a view illustrating an LCT packet structure including suggested presentation delay (SPD) according to an embodiment of the present invention.

FIG. 137 is a view illustrating an LCT packet structure including suggested presentation delay (SPD) according to another embodiment of the present invention.

FIG. 138 is a view illustrating an LCT packet structure including suggested presentation delay (SPD) according to another embodiment of the present invention.

FIG. 139 is a diagram illustrating an extension part of an LCT packet structure including Suggested Presentation Delay (SPD) according to another embodiment of the present invention.

Figure 140:
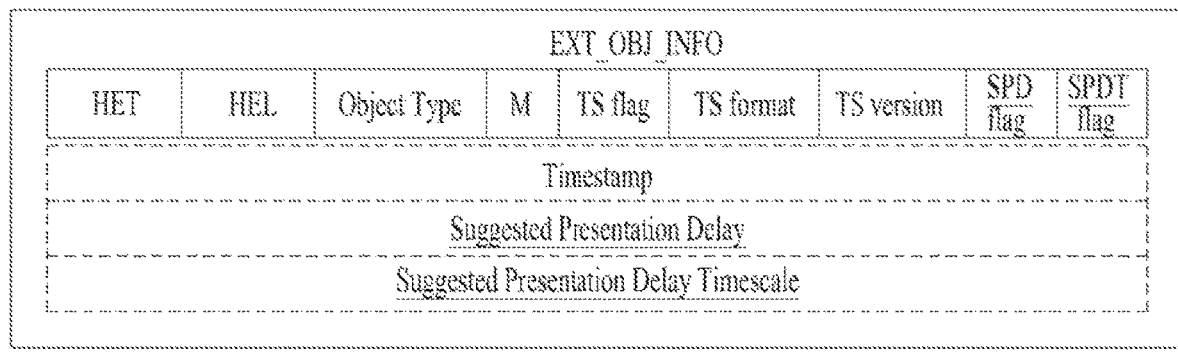

FIG. 140 is a diagram illustrating an extension part of an LCT packet structure including Suggested Presentation Delay (SPD) according to another embodiment of the present invention.

Figure 141:
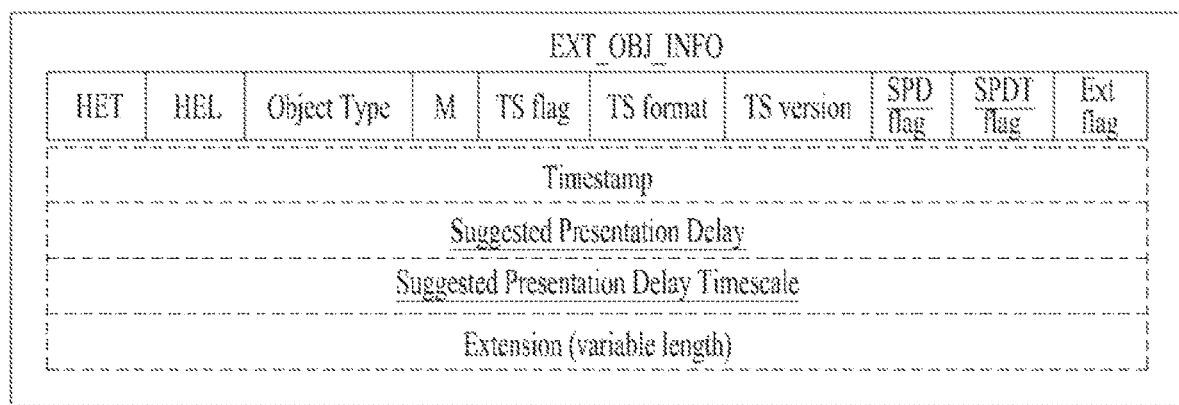

FIG. 141 is a diagram illustrating an extension part of an LCT packet structure including Suggested Presentation Delay (SPD) according to another embodiment of the present invention.

Figure 142:
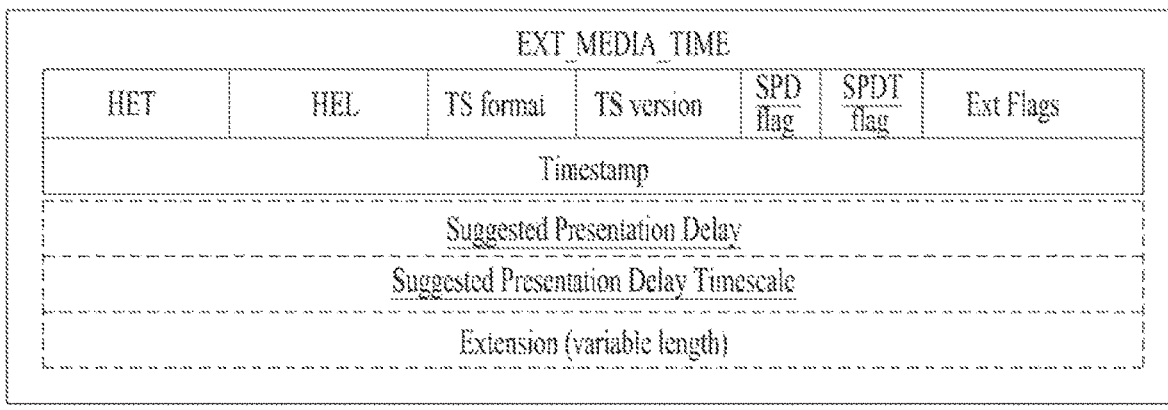

FIG. 142 is a diagram illustrating an extension part of an LCT packet structure including Suggested Presentation Delay (SPD) according to another embodiment of the present invention.

Figure 143:
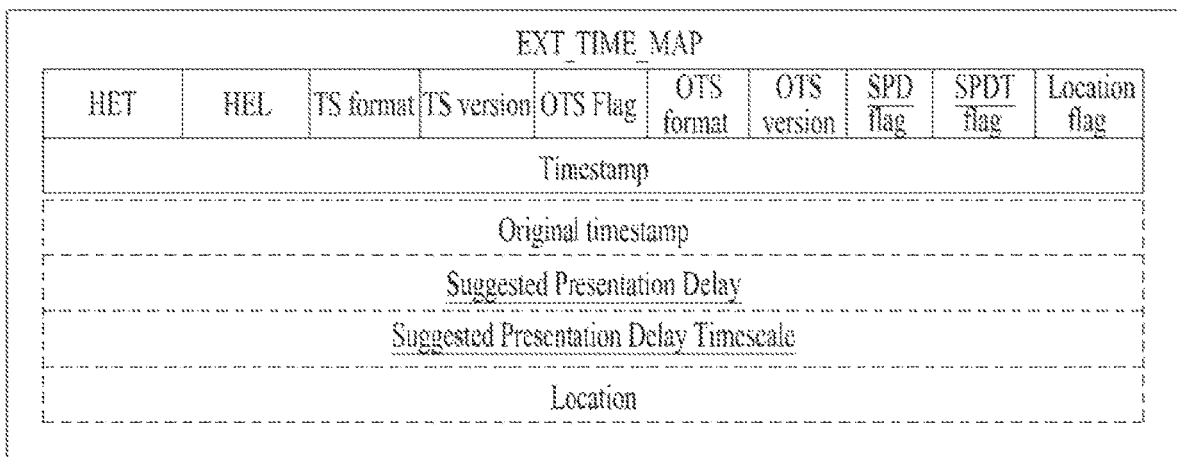

FIG. 143 is a diagram illustrating an extension part of an LCT packet structure including Suggested Presentation Delay (SPD) according to another embodiment of the present invention.

Figure 144:
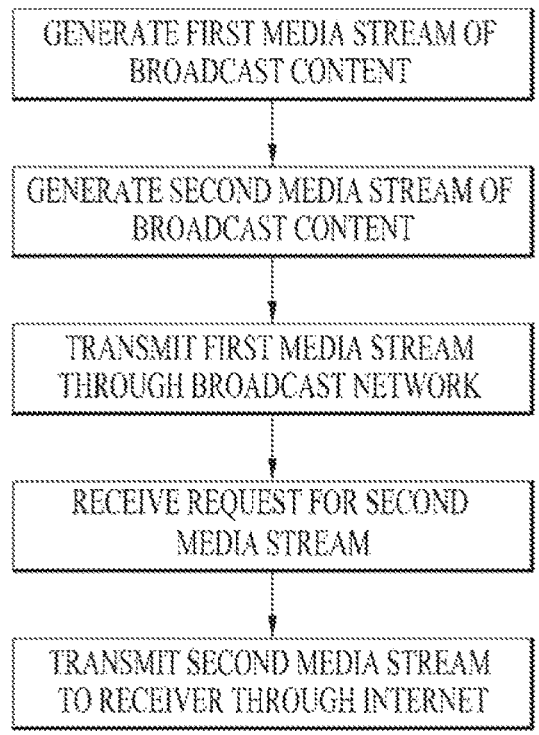

FIG. 144 is a diagram illustrating a method of transmitting broadcast content according to an embodiment of the present invention.

Figure 145:
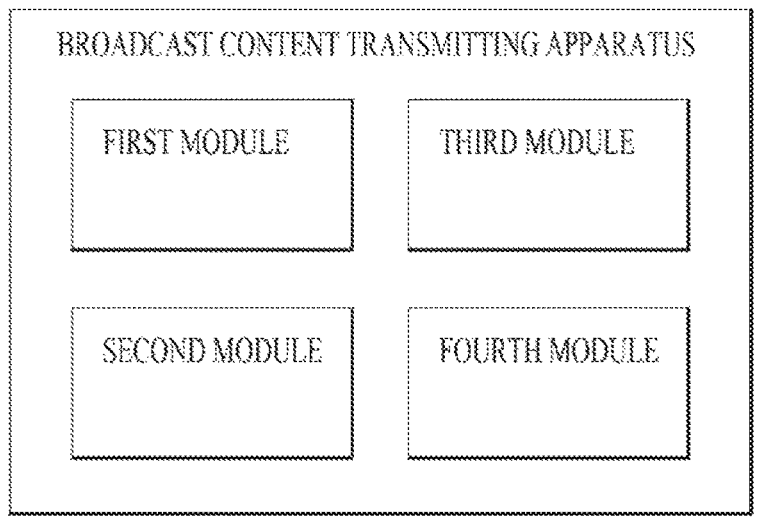

FIG. 145 is a diagram illustrating an apparatus for transmitting broadcast content according to an embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas. The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤219 data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤218 data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤219 data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

Figure 1:
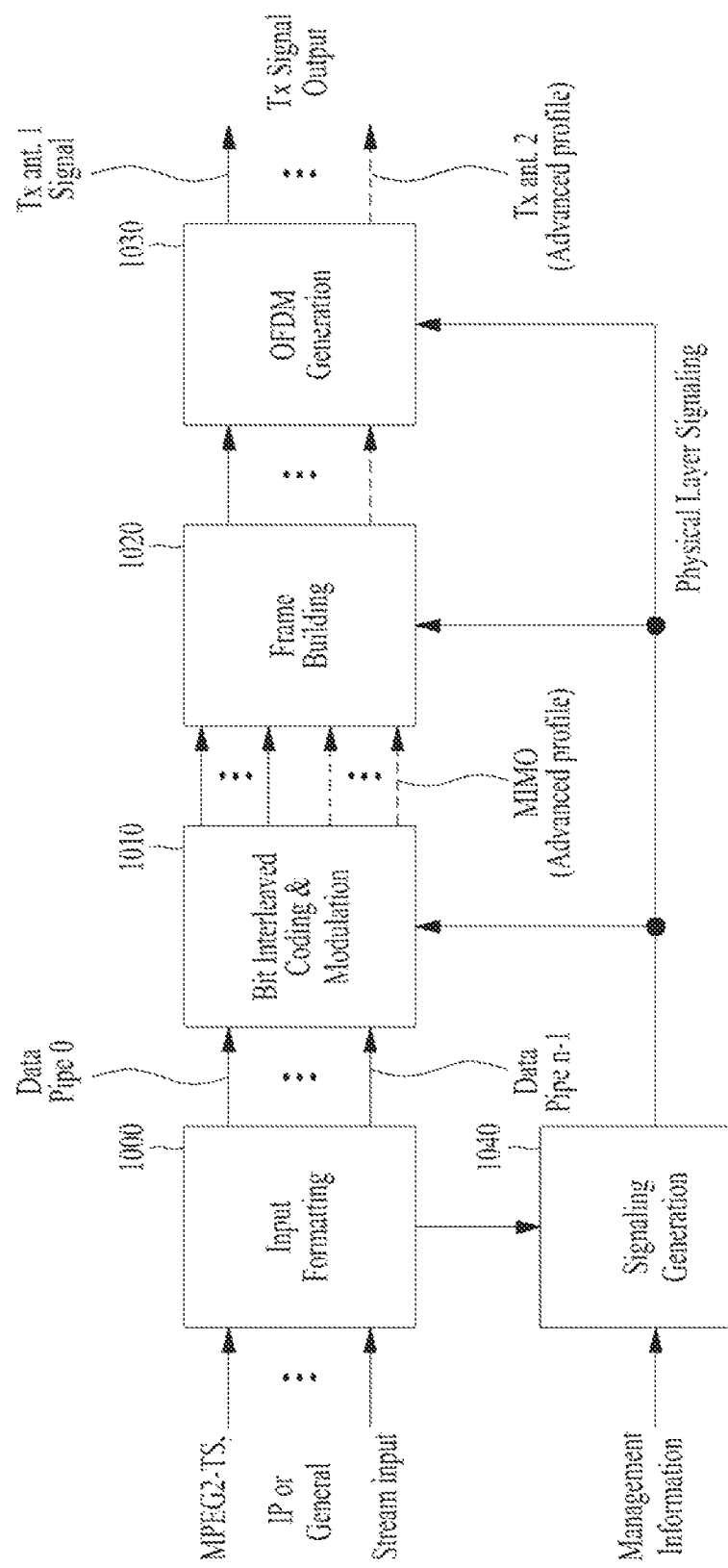
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
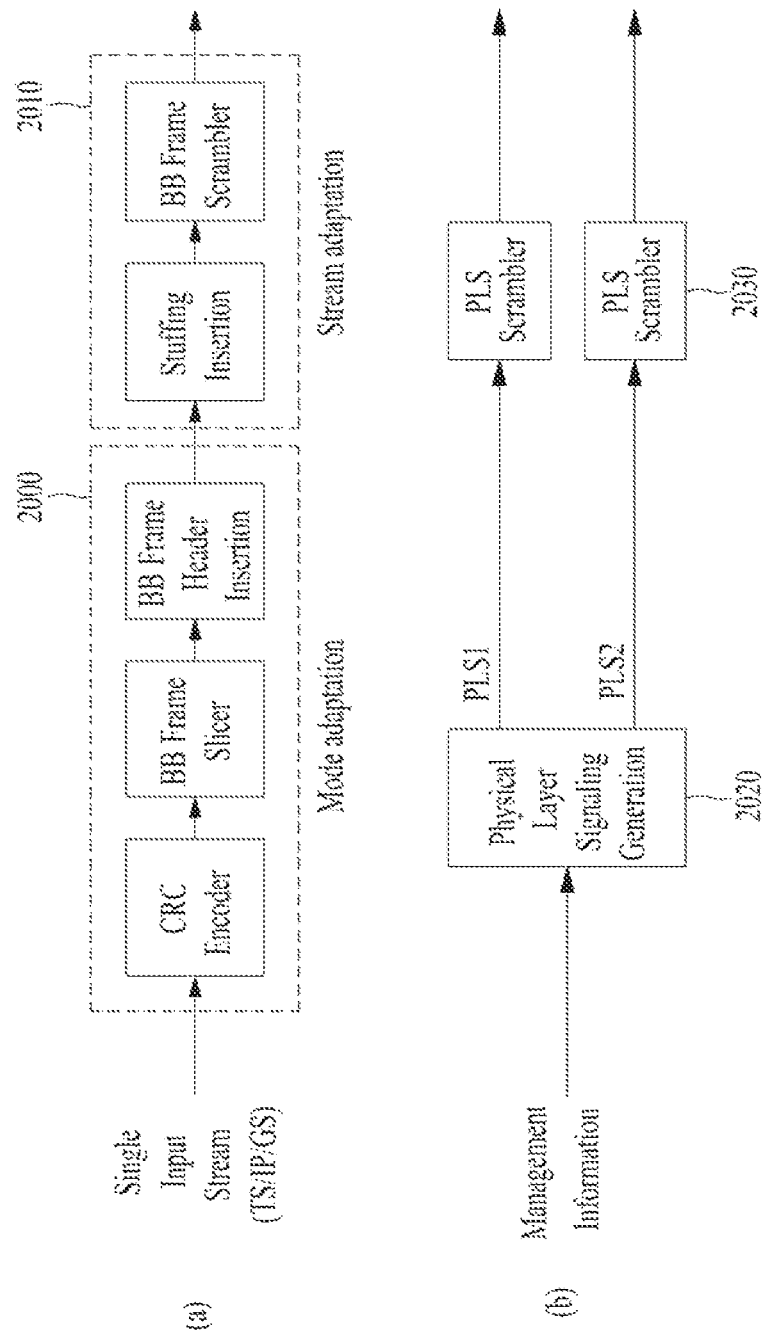
FIG. 2 illustrates an input formatting block according to one embodiment of the present invention.
Figure 3:
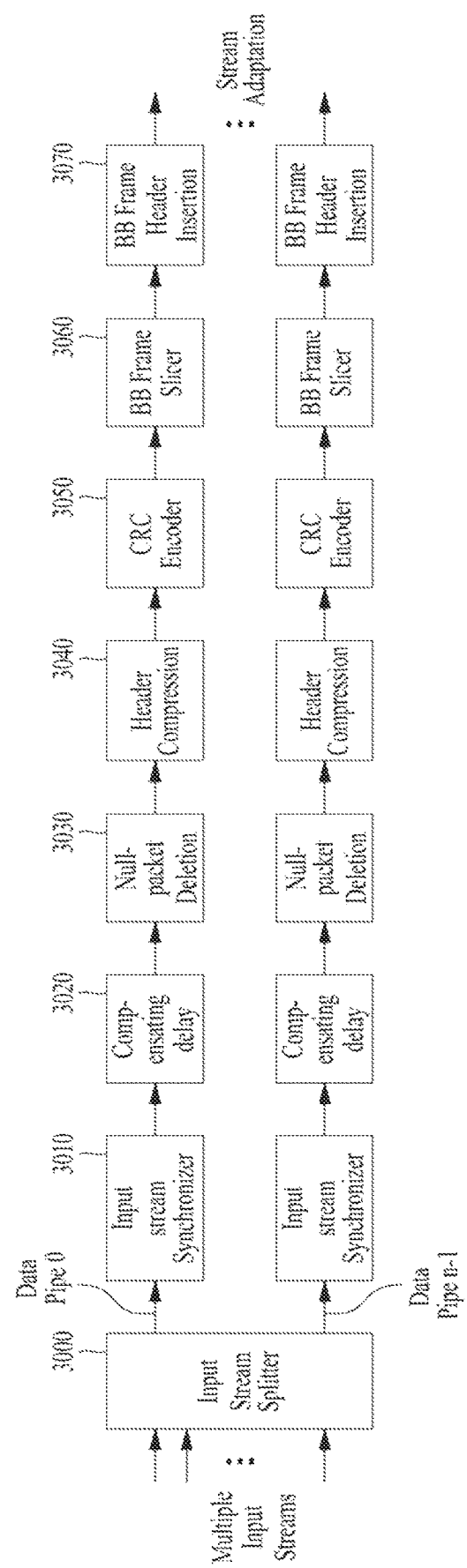
FIG. 3 illustrates an input formatting block according to another embodiment of the present invention.
Figure 4:
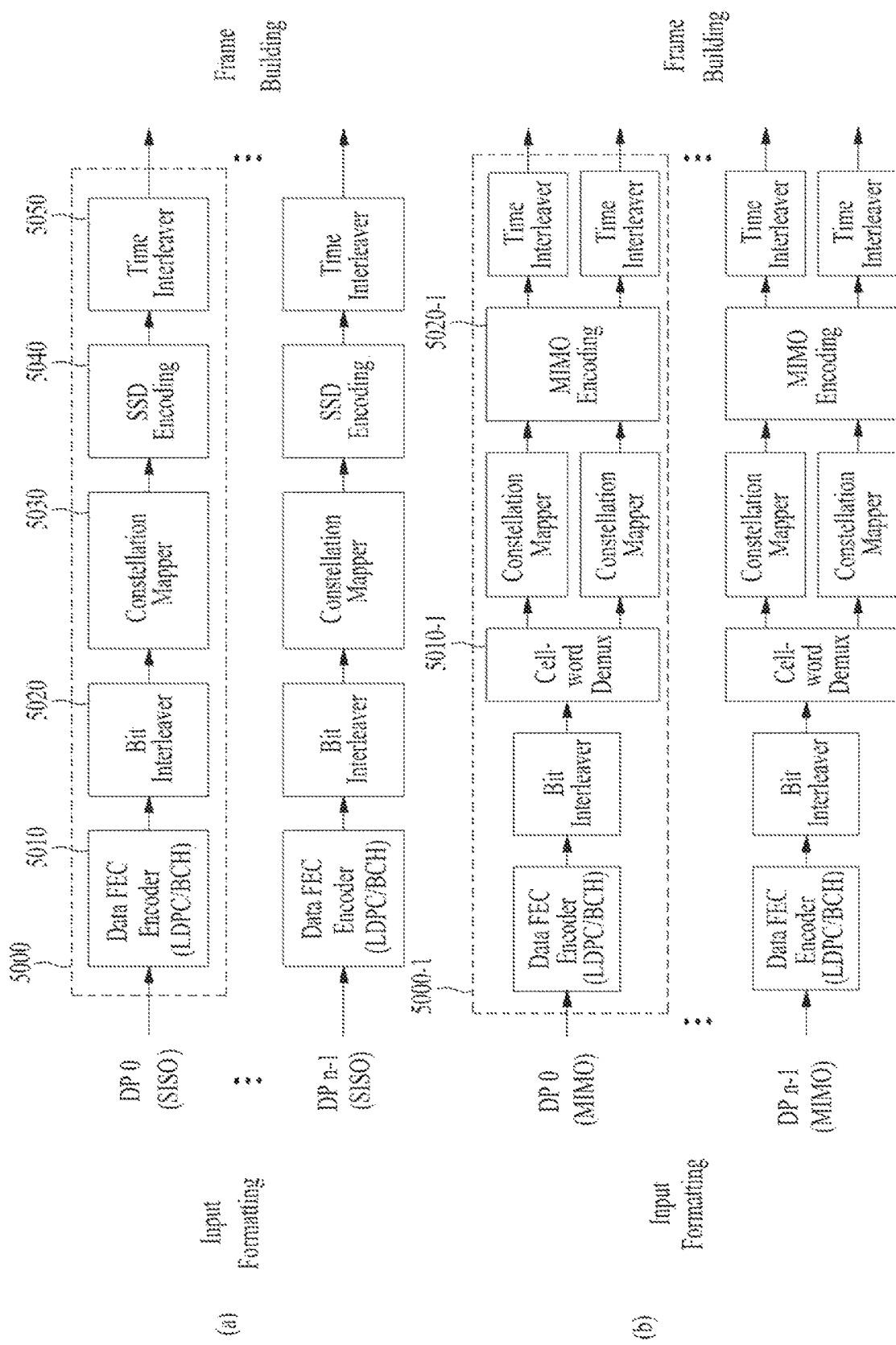
FIG. 4 illustrates a BICM block according to an embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler. The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream. The above-described blocks may be omitted or replaced by blocks having similar or identical functions.

FIG. 4 illustrates a BICM block according to an embodiment of the present invention.

The BICM block illustrated in FIG. 4 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver.

However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 5:
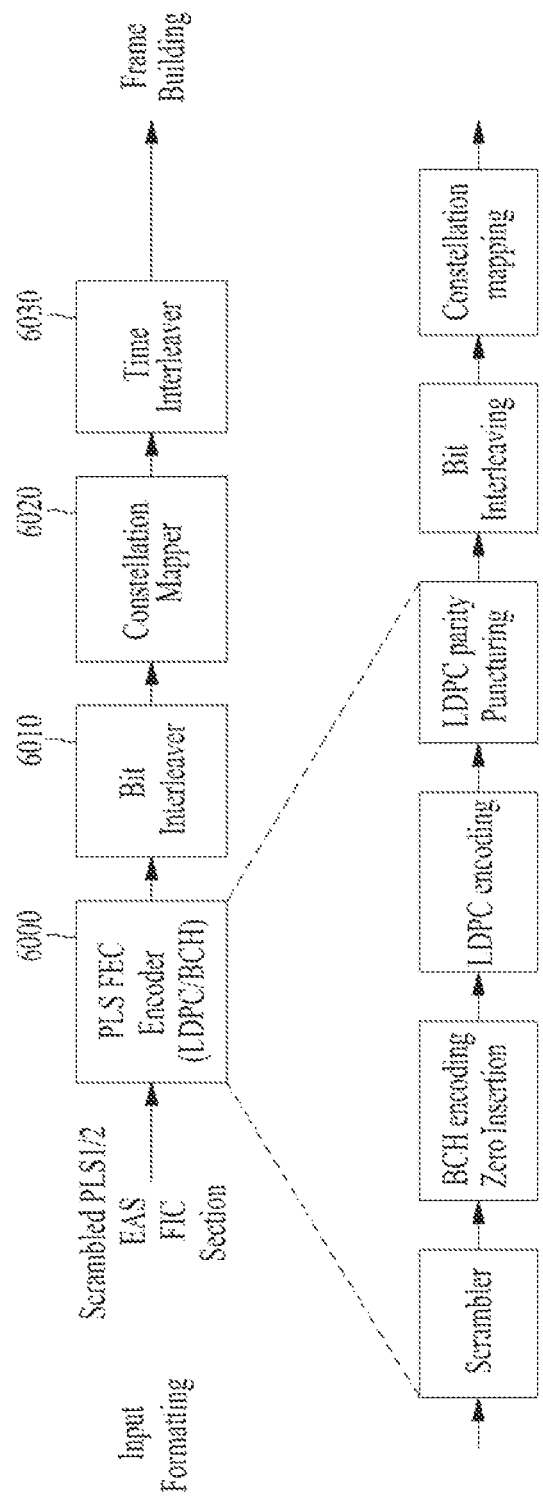
FIG. 5 illustrates a BICM block according to another embodiment of the present invention.

FIG. 5 illustrates a BICM block according to another embodiment of the present invention.

The BICM block illustrated in FIG. 6 corresponds to an embodiment of the BICM block 1010 described with reference to FIG. 1.

FIG. 5 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Figure 6:
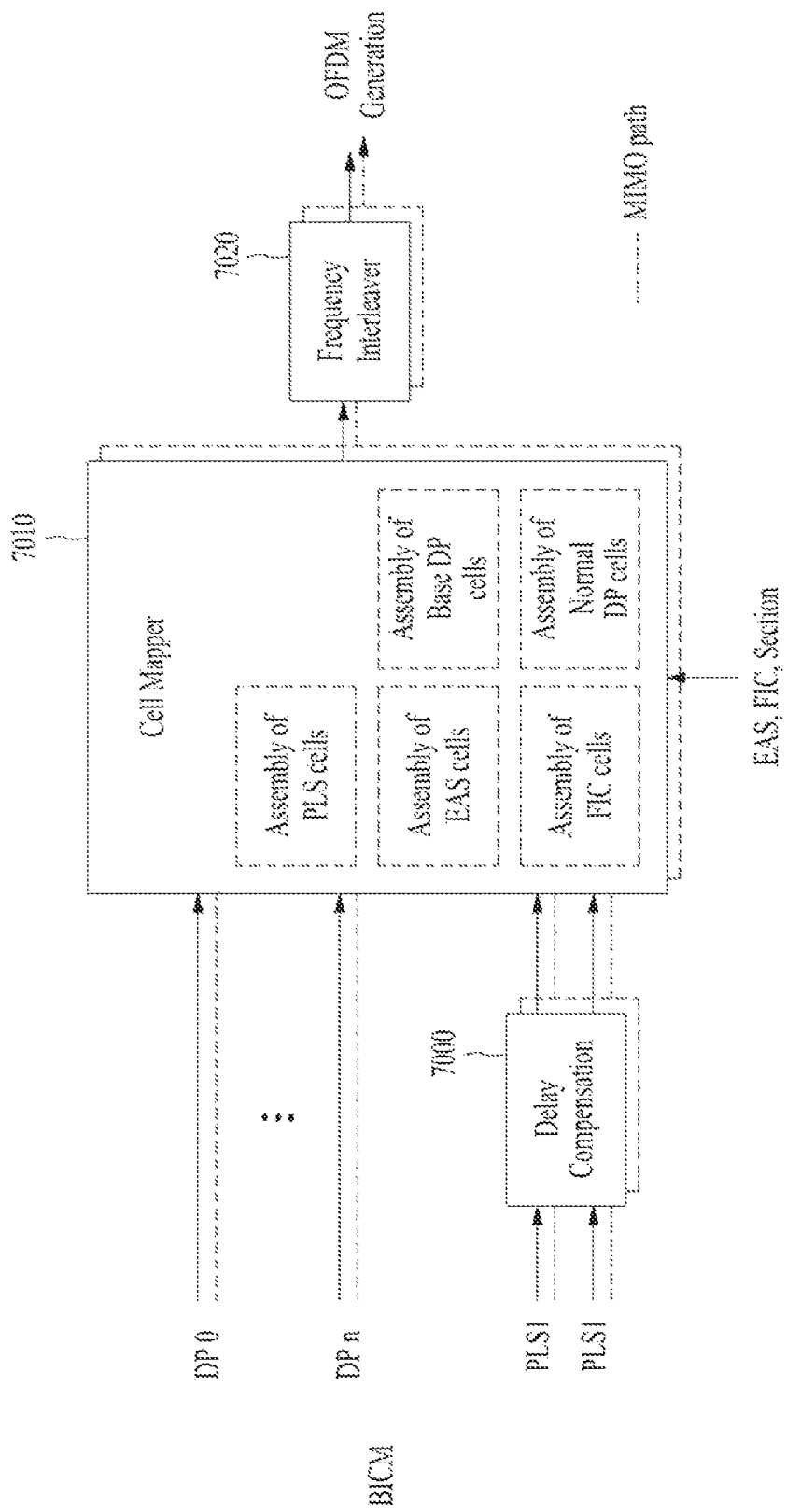
FIG. 6 illustrates a frame building block according to one embodiment of the present invention.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS ½ data, EAC and FIC section.

The scrambler can scramble PLS1 data and PLS2 data before BCH encoding and shortened and punctured LDPC encoding.

The BCH encoding/zero insertion block can perform outer encoding on the scrambled PLS ½ data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots i_{K_{ldpc}-1}, p_0, p_1, \ldots p_{N_{ldpc}-K_{ldpc}-1}]$$ [Equation 1]

The LDPC code parameters for PLS1 and PLS2 are as following table 4.

TABLE 4

| Signaling Type | Ksig | Kbch | Nbch_parity | Kldpc (=Nbch) | Nldpc | Nldpc_parity | code rate | Qldpc |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC panty puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit ineterlaeved PLS1 data and PLS2 data onto constellations.

The above-described blocks may be omitted or replaced by blocks having similar or identical functions.

FIG. 6 illustrates a frame building block according to one embodiment of the present invention.

The frame building block illustrated in FIG. 6 corresponds to an embodiment of the frame building block 1020 described with reference to FIG. 1.

Referring to FIG. 6, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 7:
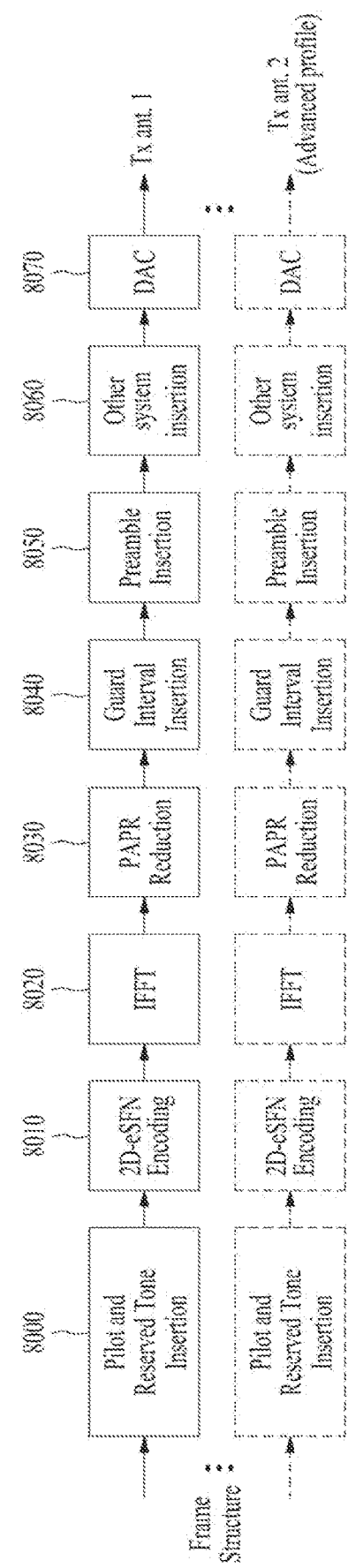
FIG. 7 illustrates an OFDM generation block according to an embodiment of the present invention.

FIG. 7 illustrates an OFDM generation block according to an embodiment of the present invention.

The OFDM generation block illustrated in FIG. 7 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 7, the OFDM generation block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

Figure 8:
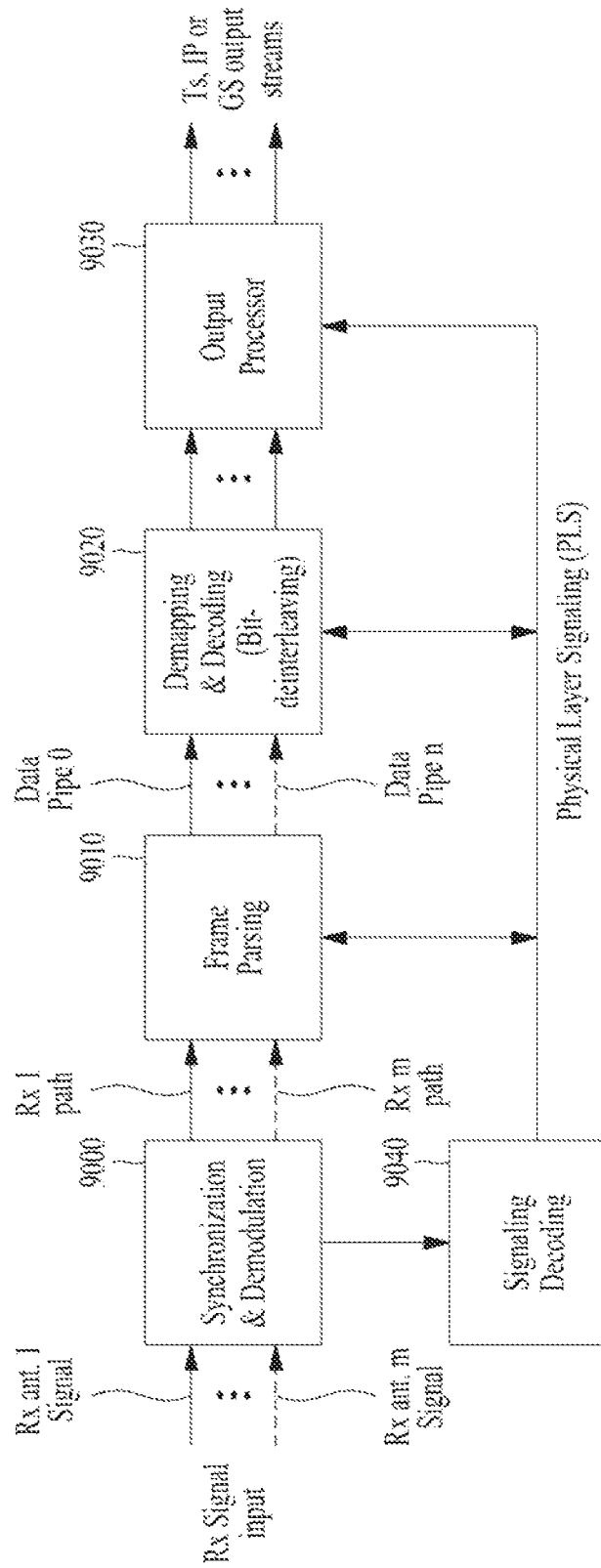
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

Figure 9:
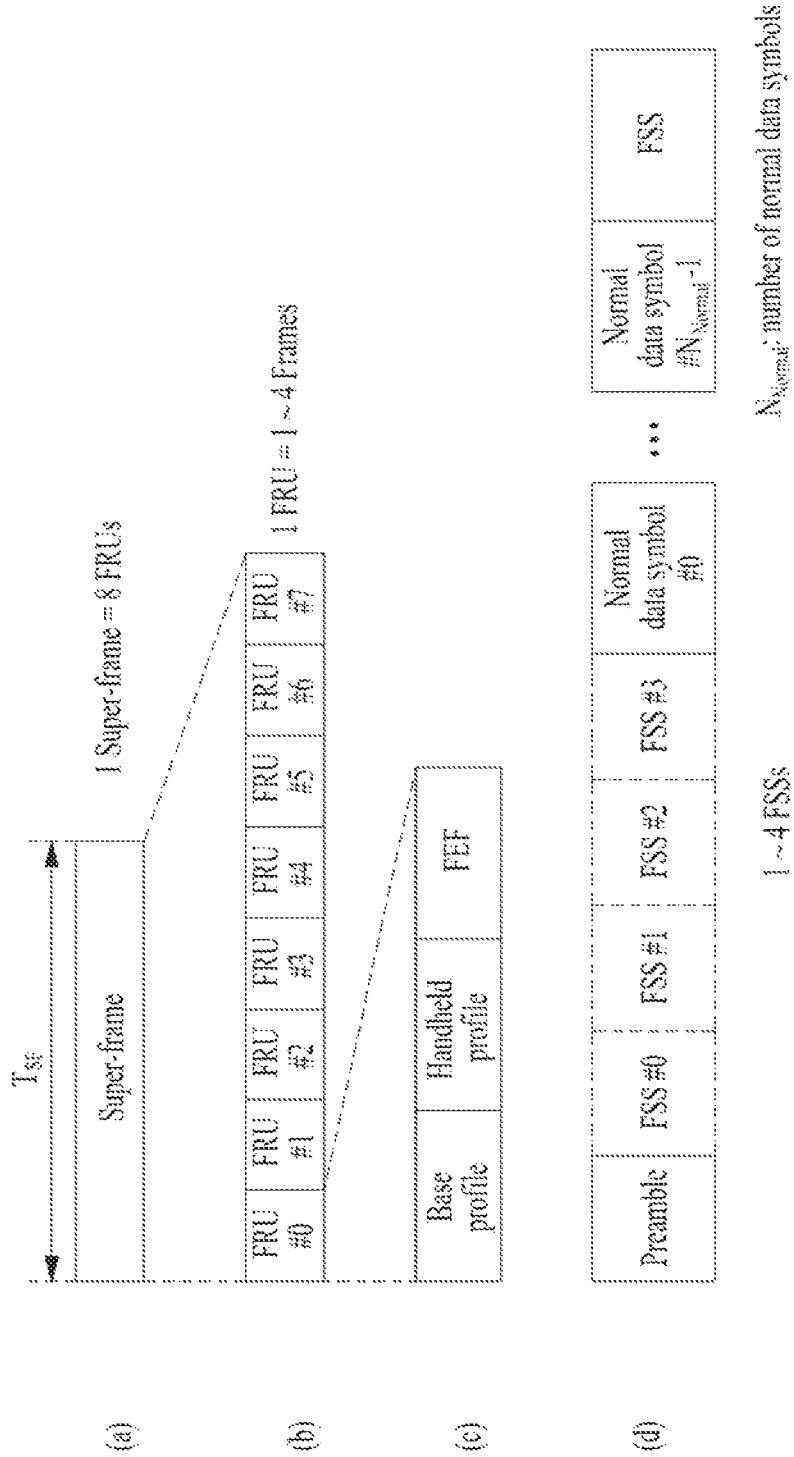
FIG. 9 illustrates a frame structure according to an embodiment of the present invention.

FIG. 9 illustrates a frame structure according to an embodiment of the present invention.

FIG. 9 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figures 10, 11:
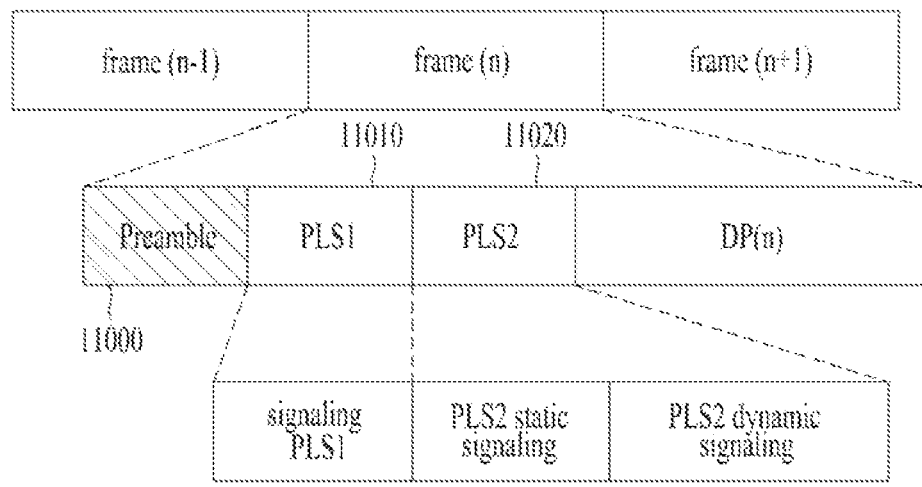
FIG. 10 illustrates a signaling hierarchy structure of the frame according to an embodiment of the present invention.
FIG. 11 illustrates preamble signaling data according to an embodiment of the present invention.

FIG. 10 illustrates a signaling hierarchy structure of the frame according to an embodiment of the present invention.

FIG. 10 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 11 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 12 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2.

The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2 NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2 NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 13 illustrates PLS2 data according to an embodiment of the present invention.

FIG. 13 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | PI | NTI |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to F. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DPNUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAY-LOAD_TYPE Is TS | If DP_PAY-LOAD_TYPE Is IP | If DP_PAY-LOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 14, 15:
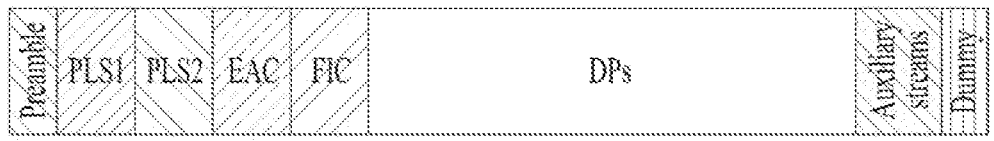
FIG. 14 illustrates PLS2 data according to another embodiment of the present invention.
FIG. 15 illustrates a logical structure of a frame according to an embodiment of the present invention.

FIG. 14 illustrates PLS2 data according to another embodiment of the present invention.

FIG. 14 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| PHY profile | DP_START field size | |
|---|---|---|
| | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 15 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 16:
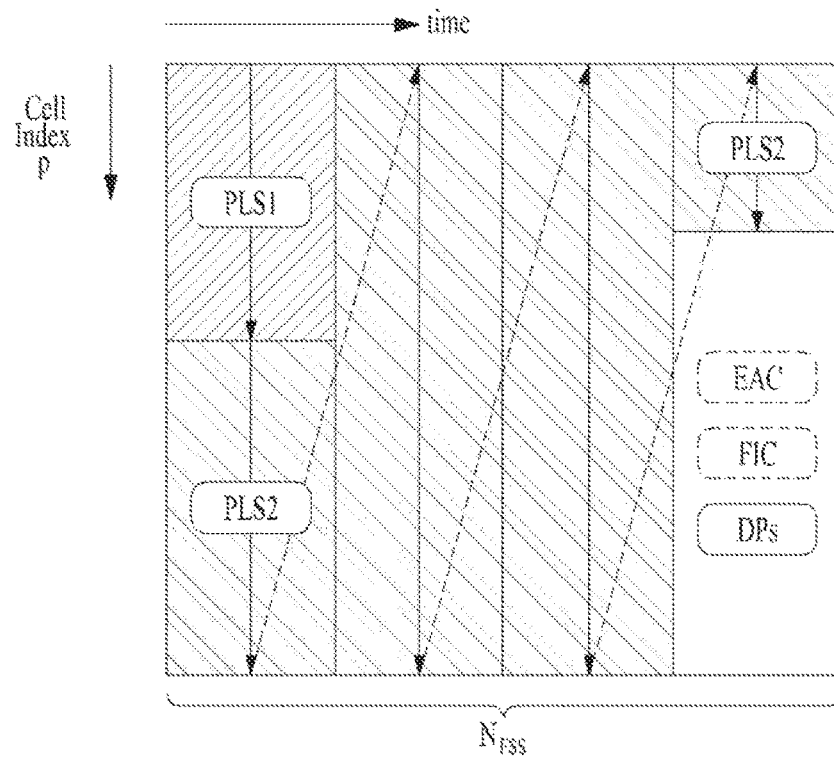
FIG. 16 illustrates PLS mapping according to an embodiment of the present invention.

FIG. 16 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 16. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 17:
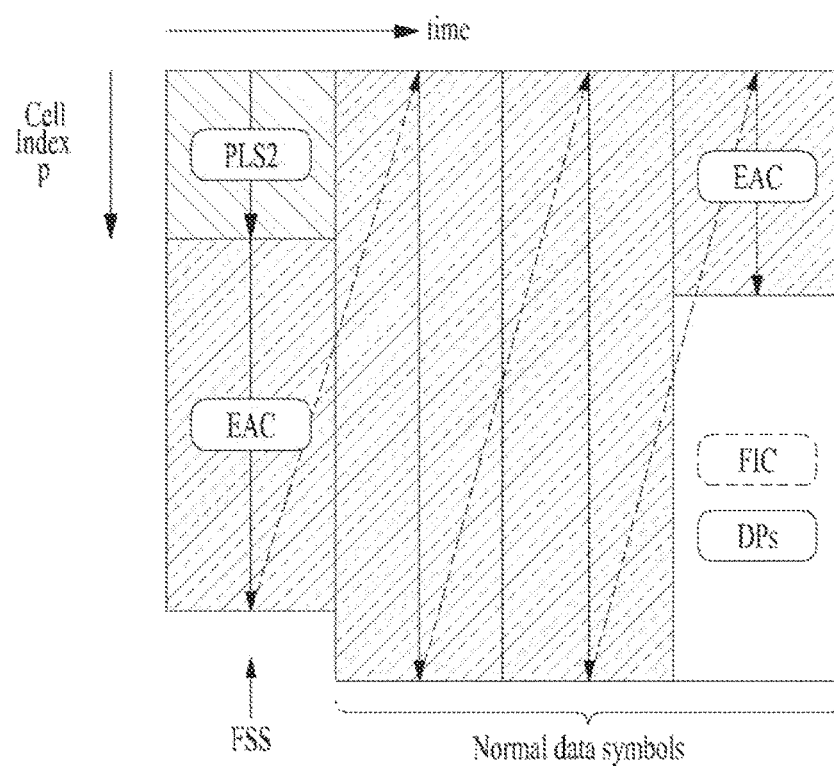
FIG. 17 illustrates EAC mapping according to an embodiment of the present invention.

FIG. 17 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 17. Depending on the EAS message size, EAC cells may occupy a few symbols, as shown in FIG. 17.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 18 illustrates FIC mapping according to an embodiment of the present invention.

shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 19:
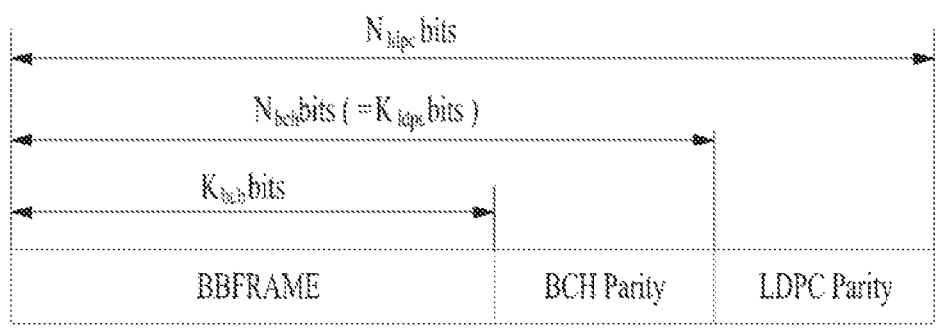
FIG. 19 illustrates an FEC structure according to an embodiment of the present invention.

FIG. 19 illustrates an FEC structure according to an embodiment of the present invention.

FIG. 19 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

Figure 22:
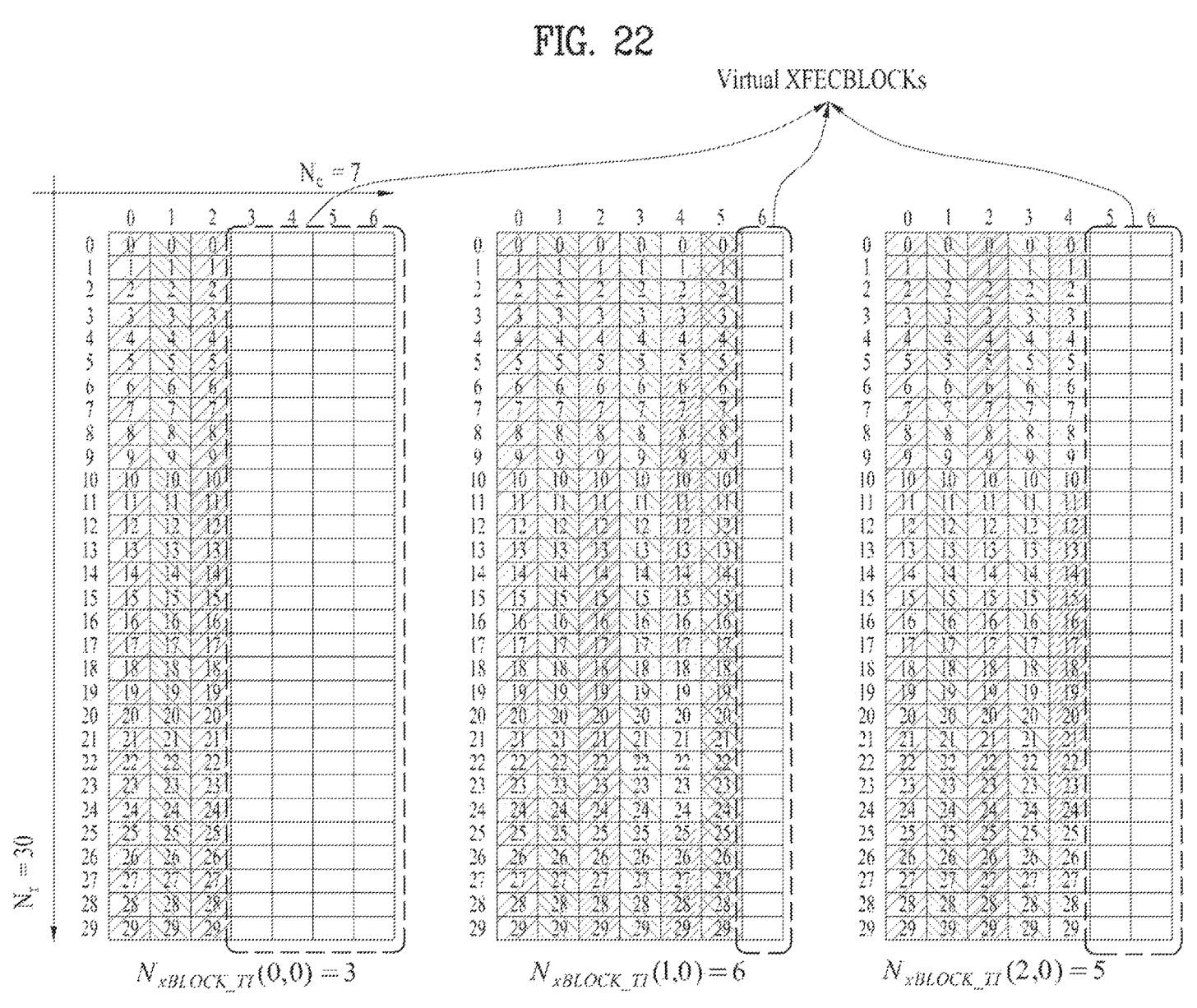

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | Nldpc | Kldpc | Kbch | BCH error correction capability | Nbch − Kbch |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | Nldpc | Kldpc | Kbch | BCH error correction capability | Nbch − Kbch |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow equation.

$$B_{ldpc}=[I_{ldpc}P_{ldpc}]=[i_0,i_1,\ldots i_{K_{ldpc}-1},p_0,p_1,\ldots p_{N_{ldpc}-K_{ldpc}-1}] \quad \text{[Equation 2]}$$

The parameters for long FECBLOCK and short FECBLOCK are given in the above table 28 and 29, respectively.

The detailed procedure to calculate Nldpc−Kldpc parity bits for long FECBLOCK, is as follows:

1) Initialize the parity bits, $$p_0=p_1=p_2=\ldots=p_{N_{ldpc}-K_{ldpc}-1}=0 \quad \text{[Equation 3]}$$

2) Accumulate the first information bit—i0, at parity bit addresses specified in the first row of an addresses of parity check matrix. The details of addresses of parity check matrix will be described later. For example, for rate 13/15:

$$p_{983} = p_{983} \oplus i_0 \quad \text{[Equation 4]}$$
$$p_{2815} = p_{2815} \oplus i_0$$
$$p_{4837} = p_{4837} \oplus i_0$$
$$p_{4989} = p_{4989} \oplus i_0$$
$$p_{6138} = p_{6138} \oplus i_0$$
$$p_{6458} = p_{6458} \oplus i_0$$
$$p_{6921} = p_{6921} \oplus i_0$$
$$p_{6974} = p_{6974} \oplus i_0$$
$$p_{7572} = p_{7572} \oplus i_0$$
$$p_{8260} = p_{8260} \oplus i_0$$
$$p_{8496} = p_{8496} \oplus i_0$$

3) For the next 359 information bits, is, s=1, 2, . . . , 359 accumulate is at parity bit addresses using following equation.

$$\{x+(s \bmod 360) \times Q_{ldpc}\} \bmod (N_{ldpc}-K_{ldpc}) \quad \text{[Equation 5]}$$

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1 \quad \text{[Equation 6]}$$
$$p_{2839} = p_{2839} \oplus i_1$$
$$p_{4861} = p_{4861} \oplus i_1$$
$$p_{5013} = p_{5013} \oplus i_1$$
$$p_{6162} = p_{6162} \oplus i_1$$
$$p_{6482} = p_{6482} \oplus i_1$$

-continued $$p_{6945} = p_{6945} \oplus i_1$$
$$p_{6998} = p_{6998} \oplus i_1$$
$$p_{7596} = p_{7596} \oplus i_1$$
$$p_{8284} = p_{8284} \oplus i_1$$
$$p_{8520} = p_{8520} \oplus i_1$$

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the equation 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, i=1,2, \ldots, N_{ldpc} - K_{ldpc} - 1 \quad \text{[Equation 7]}$$

where final content of pi, i=0, 1, . . . Nldpc−Kldpc−1 is equal to the parity bit pi.

TABLE 30

| Code Rate | Qldpc |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with the LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | Qldpc |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 20:
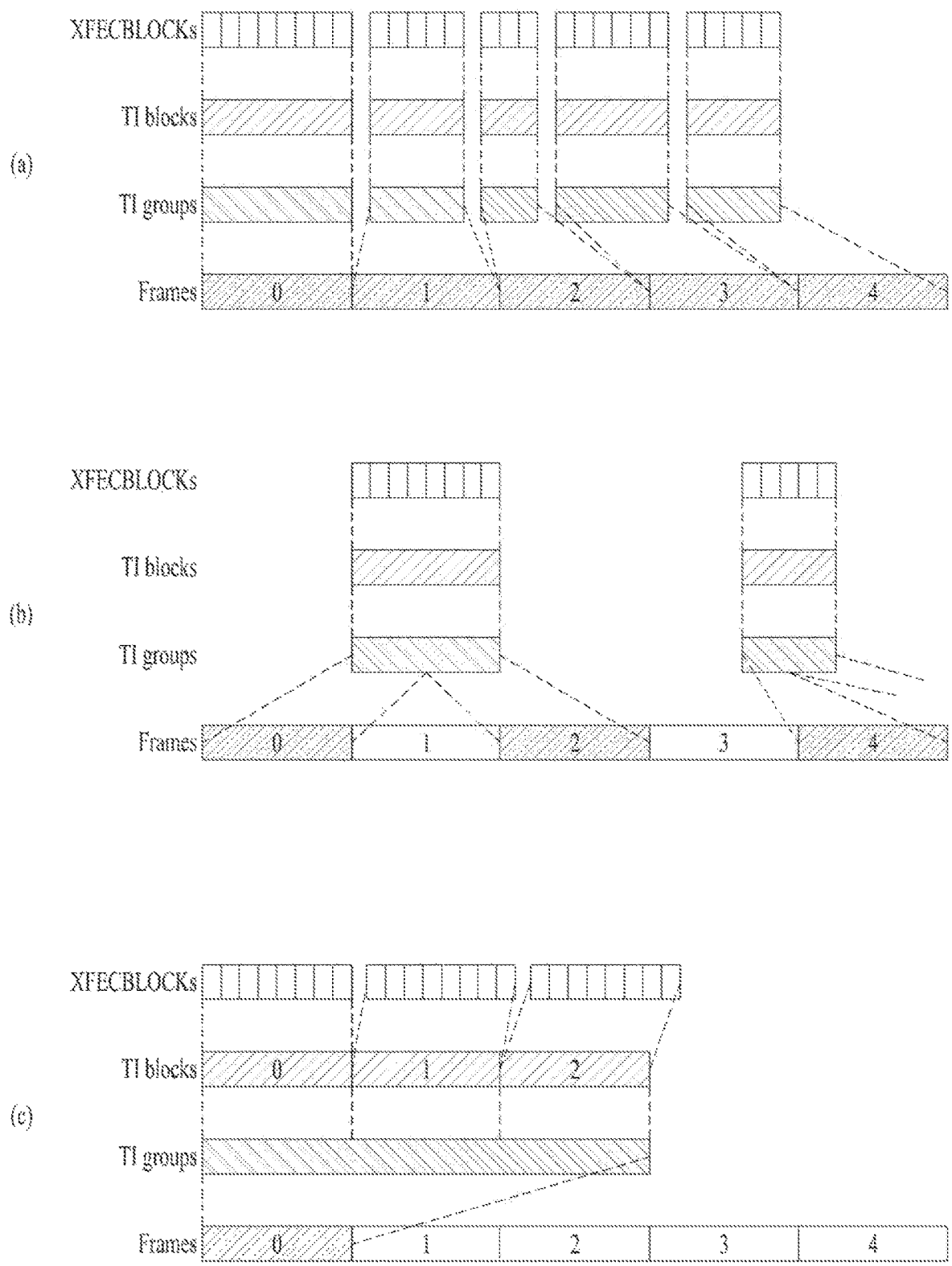
FIG. 20 illustrates a time interleaving according to an embodiment of the present invention.

FIG. 20 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 32.

TABLE 32

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1' (NTI = 1). |
| Option-2 | Each TI group contains one TI block and is mapped to more than one frame. (b) shows an example, where one TI group is mapped to two frames, i.e., DP_TI_LENGTH = '2' (PI = 2) and DP_FRAME_INTERVAL (IJUMP = 2). This provides greater time diversity for low data-rate services. |

TABLE 32-continued

| Modes | Descriptions |
|---|---|
| Option-3 | This option is signaled in the PLS2-STAT by DP_TI_TYPE = '1'.<br>Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while PI = 1. |

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

Figure 21:
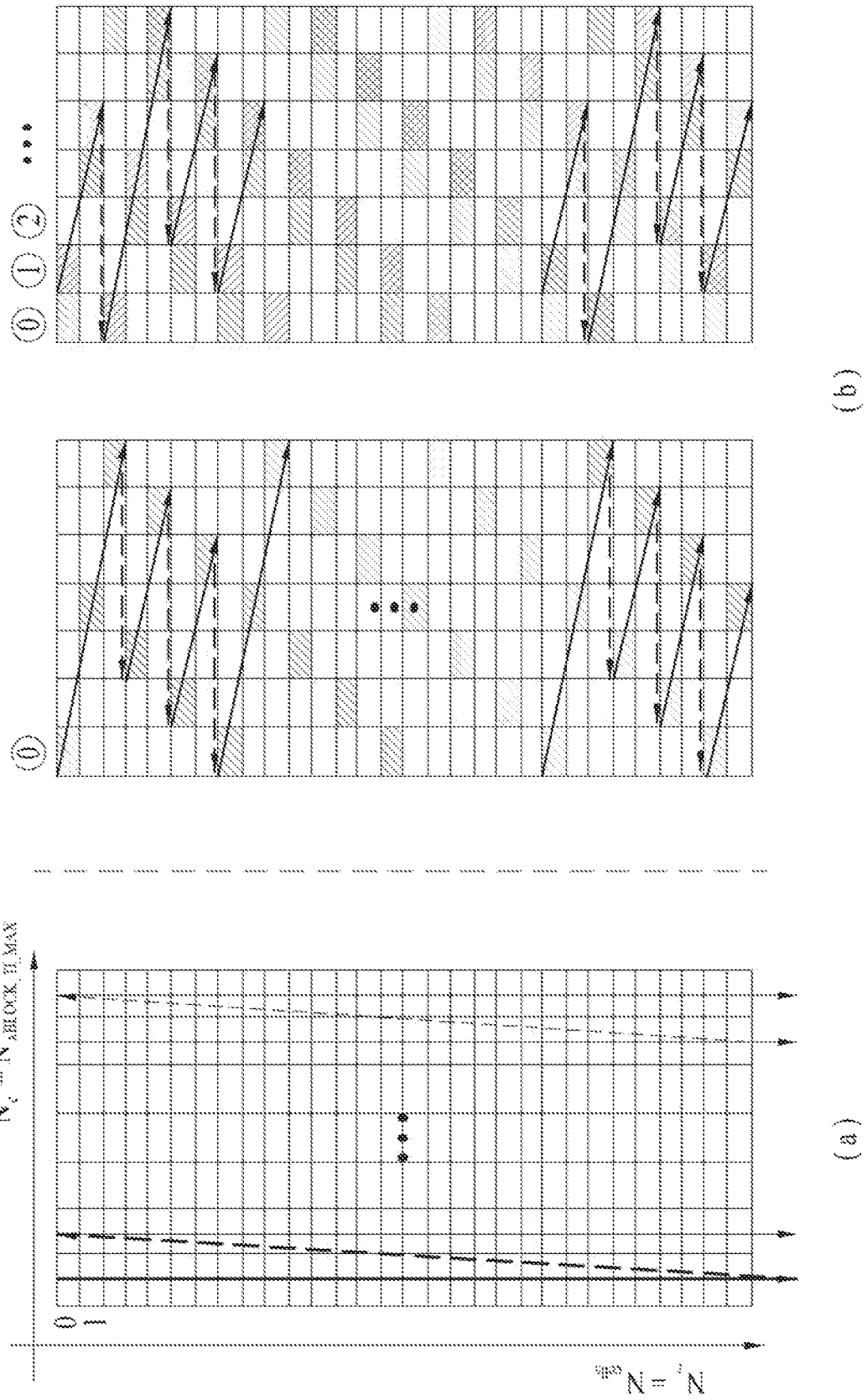
FIG. 21 illustrates the basic operation of a twisted row-column block interleaver according to an embodiment of the present invention.

FIG. 21 illustrates the basic operation of a twisted row-column block interleaver according to an embodiment of the present invention.

FIG. 21 (a) shows a writing operation in the time interleaver and FIG. 21(b) shows a reading operation in the time interleaver. The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ ($i=0, \ldots, N_r N_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows equation.

$$\text{GENERATE}(R_{n,s,i}, C_{n,s,i}) = \quad [\text{Equation 8}]$$
$$\{$$
$$R_{n,s,i} = \text{mod}(i, N_r),$$
$$T_{n,s,i} = \text{mod}(S_{shift} \times R_{n,s,i}, N_c),$$
$$C_{n,s,i} = \text{mod}\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows equation.

$$\text{for} \quad [\text{Equation 9}]$$
$$\begin{cases} N'_{xBLOCK\_TI\_MAX} = \\ \quad N_{xBLOCK\_TI\_MAX} + 1, & \text{if } N_{xBLOCK\_TI\_MAX}\,\text{mod2} = 0 \\ N'_{xBLOCK\_TI\_MAX} = \\ \quad N_{xBLOCK\_TI\_MAX}, & \text{if } N_{xBLOCK\_TI\_MAX}\,\text{mod2} = 1 \end{cases}$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

FIG. 22 illustrates an operation of a twisted row-column block interleaver according to another embodiment of the present invention.

More specifically, FIG. 22 illustrates the interleaving array in the TI memory for each TI group, including virtual XFECBLOCKs when $N_{xBLOCK\_TI}$ (0,0)=3, $N_{xBLOCK\_TI}$ (1,0)= 6, $N_{xBLOCK\_TI}$ (2,0)=5.

The variable number $N_{xBLOCK\_TI}(n,s) = N_r$ will be less than or equal to $N_{xBLOCK\_TI\_MAX}'$. Thus, in order to achieve a single-memory deinterleaving at the receiver side, regardless of $N_{xBLCOK\_TI}(n,s)$, the interleaving array for use in a twisted row-column block interleaver is set to the size of $N_r \times N_c = N_{cells} \times N_{xBLOCK\_TI\_MAX}'$ by inserting the virtual XFECBLOCKs into the TI memory and the reading process is accomplished as follow equation.

$$p = 0; \quad [\text{Equation 10}]$$
$$\text{for } i = 0; i < N_{cells} N'_{xBLOCK\_TI\_MAX}; i = i + 1$$
$$\{\text{GENERATE}(R_{n,s,i}, C_{n,s,i});$$
$$V_i = N_r C_{n,s,i} + R_{n,s,i}$$
$$\text{if } V_i < N_{cells} N_{xBLOCK\_TI}(n, s)$$
$$\{$$
$$Z_{n,s,p} = V_i; p = p + 1;$$
$$\}$$
$$\}$$

The number of TI groups is set to 3. The option of time interleaver is signaled in the PLS2-STAT data by DP_TI_TYPE-='0', DP_FRAME_INTERVAL='1', and DP_TI_LENGTH='1'. i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

Figure 23:
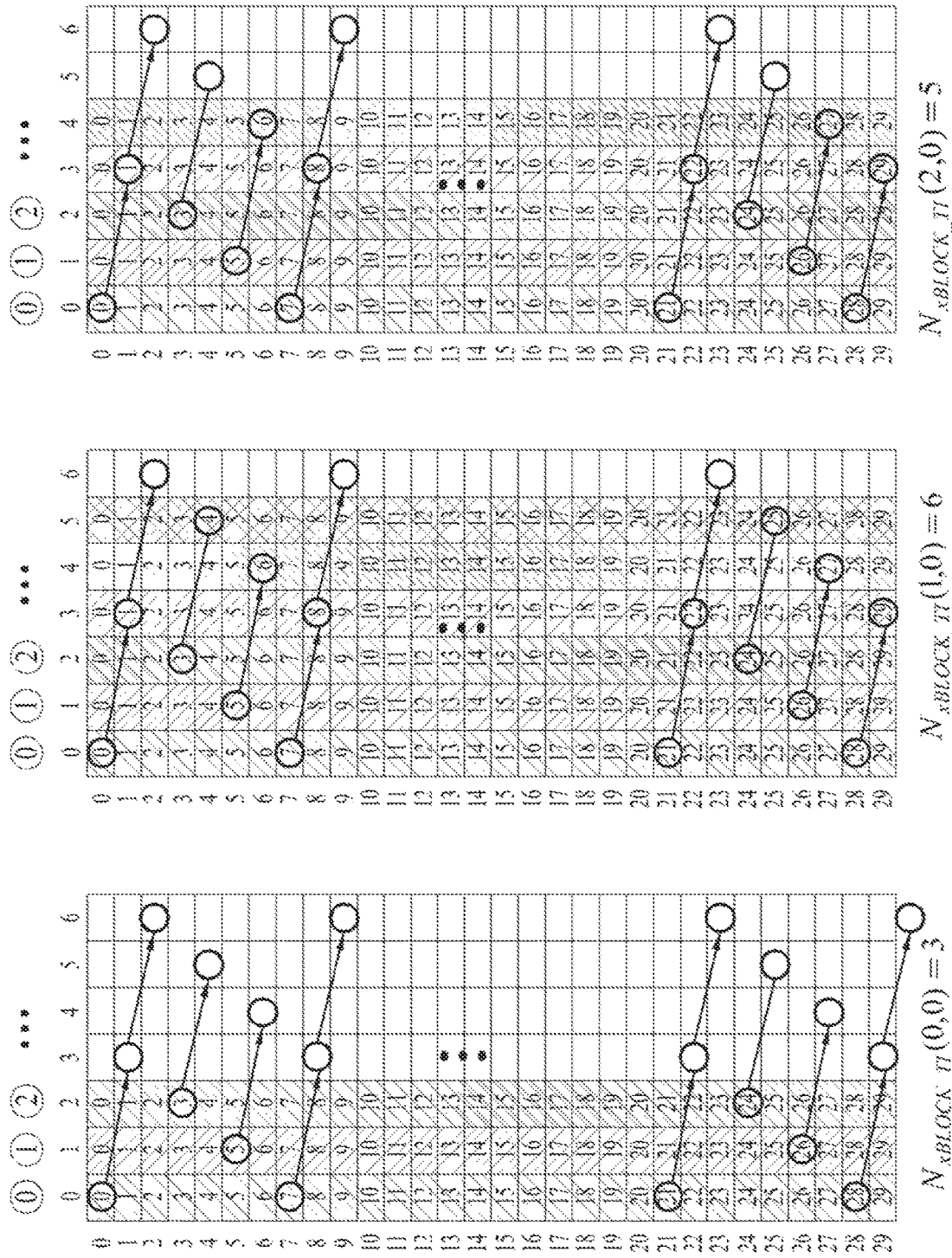
FIG. 23 illustrates a diagonal-wise reading pattern of a twisted row-column block interleaver according to an embodiment of the present invention.

FIG. 23 illustrates a diagonal-wise reading pattern of a twisted row-column block interleaver according to an embodiment of the present invention.

More specifically FIG. 23 shows a diagonal-wise reading pattern from each interleaving array with parameters of $N_{xBLOCK\_TI\_MAX}'=7$ and Sshift=(7−1)/2=3. Note that in the reading process shown as pseudocode above, if $V_i \geq N_{cells} N_{xBLOCK\_TI}(n,s)$, the value of Vi is skipped and the next calculated value of Vi is used.

Figure 24:
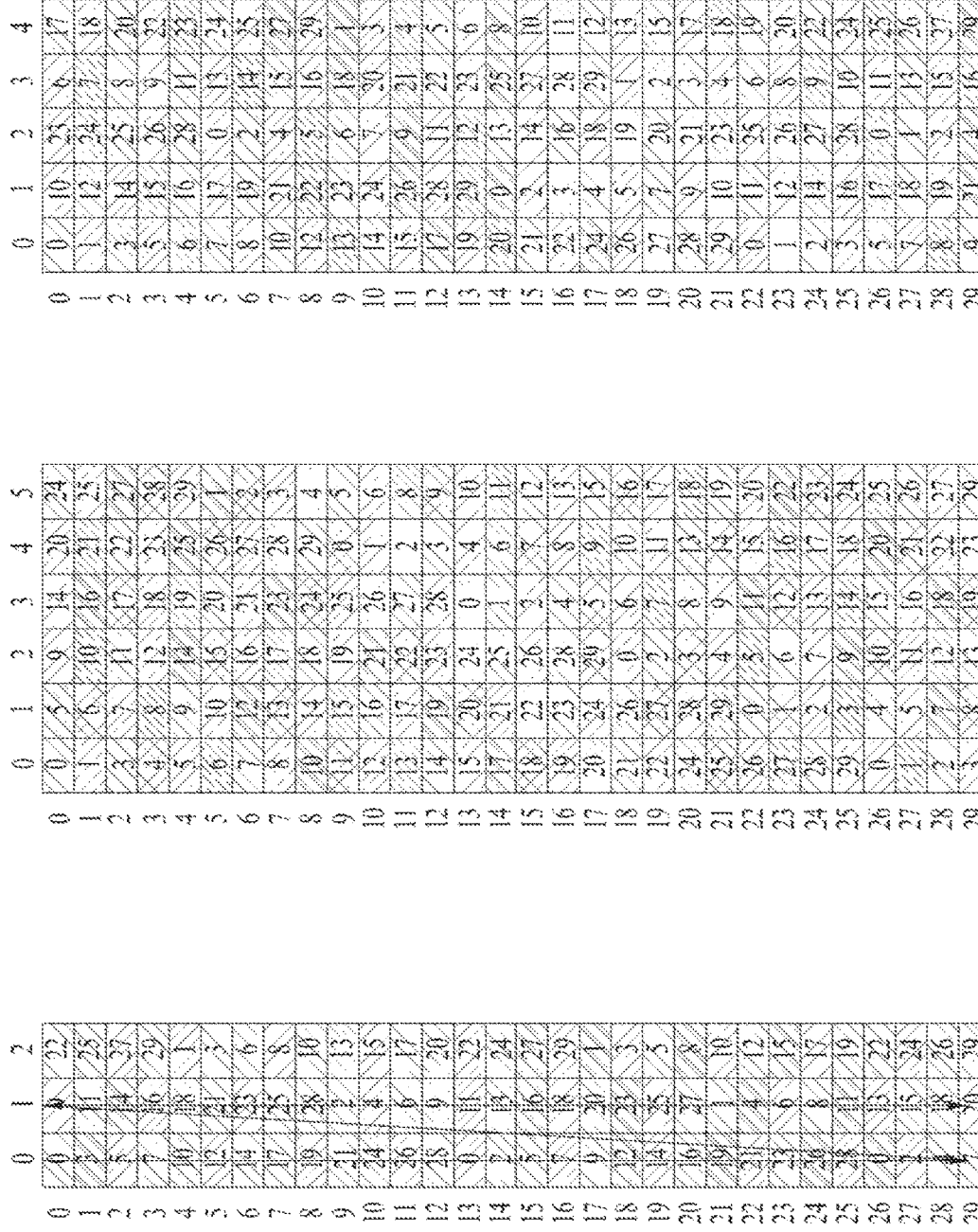
FIG. 24 illustrates interlaved XFECBLOCKs from each interleaving array according to an embodiment of the present invention.

FIG. 24 illustrates interlaved XFECBLOCKs from each interleaving array according to an embodiment of the present invention.

FIG. 24 illustrates the interleaved XFECBLOCKs from each interleaving array with parameters of $N_{xBLOCK\_TI\_MAX}=7$ and Sshift=3.

A method for segmenting a file configured to transmit file-based multimedia content in a real-time broadcast environment, and consuming the file segments according to the embodiments of the present invention will hereinafter be described in detail.

In more detail, the embodiment provides a data structure for transmitting the filebased multimedia content in the real-time broadcast environment. In addition, the embodiment provides a method for identifying not only segmentation generation information of a file needed for transmitting file-based multimedia content but also consumption information in a real-time broadcast environment. In addition, the embodiment provides a method for segmenting/generating a file needed for transmitting the file-based multimedia content in a real-time broadcast environment. The embodiment provides a method for segmenting and consuming the file needed for consuming the file-based multimedia content.

Figure 25:
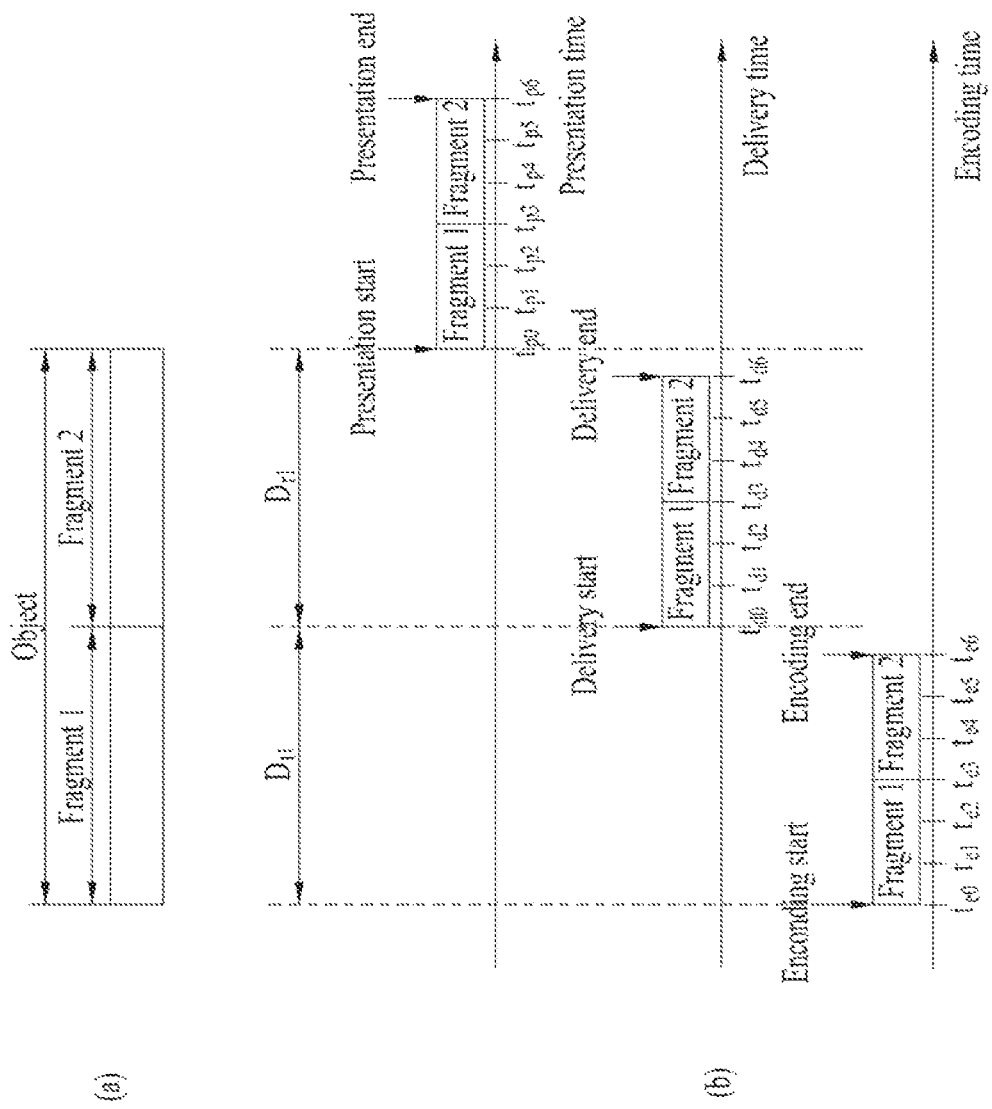
FIG. 25 illustrates a data processing time when a File Delivery over Unidirectional Transport (FLUTE) protocol is used.

FIG. 25 illustrates a data processing time when a File Delivery over Unidirectional Transport (FLUTE) protocol is used.

Recently, hybrid broadcast services in which a broadcast network and the Internet network are combined have been widely used. The hybrid broadcast service may transmit A/V content to the legacy broadcast network, and may transmit additional data related to A/V content over the Internet. In addition, a service for transmitting some parts of the A/V content may be transmitted over the Internet has recently been provided.

Since the A/V content is transmitted over a heterogeneous network, a method for closely combining A/V content data pieces transmitted over a heterogeneous network and a simple cooperation method are needed. For this purpose, a communication transmission method capable of being simultaneously applied to the broadcast network and the Internet is needed.

A representative one of the A/V content transmission methods capable of being commonly applied to the broadcast network and the Internet is to use the file-based multimedia content. The file-based multimedia content has superior extensibility, is not dependent upon a transmission (Tx) protocol, and has been widely used using a download scheme based on the legacy Internet.

A File Delivery over Unidirectional Transport protocol (FLUTE) is a protocol that is appropriate not only for the interaction between the broadcast network and the Internet but also for transmission of the file-based multimedia content of a large-capacity file.

FLUTE is an application for unidirectional file transmission based on ALC, and is a protocol in which information regarding files needed for file transmission or information needed for transmission are defined. According to FLUTE, information needed for file transmission and information regarding various attributes of a file to be transmitted have been transmitted through transmission of FDT (File Delivery Table) instance, and the corresponding file is then transmitted.

ALC (Asynchronous Layered Coding) is a protocol in which it is possible to control reliability and congestion during a file transmission time in which a single transmitter transmits the file to several receivers. ALC is a combination of an FEC Building Block for error control, a WEBRC Building Block for congestion control, a Layered Coding Transport (LCT) Building Block for session and channel management, and may construct a building block according to the service and necessity. ALC is used as a content transmission protocol such that it can very efficiently transmit data to many receivers. In addition, ALC has unidirectional characteristics, is transmitted in a limited manner as necessary, does not require specific channel and resources for feedback, and can be used not only in the wireless environmental broadcasting but also in the satellite environmental broadcasting. Since ALC has no feedback, the FEC code scheme can be entirely or partially applied for reliability, resulting in implementation of reliable services. In addition, an object to be sent is FEC-encoded according to the FEC scheme, constructs Tx blocks and additional symbols formed by the FEC scheme, and is then transmitted. ALC session may be composed of one or more channels, and several receivers select a channel of the session according to the network state and receive a desired object over the selected channel. The receivers can be devoted to receive its own content, and are little affected by a state of other receivers or pass loss. Therefore, ALC has high stability or can provide a stable content download service using multilayered transmission.

LCT may support transmission (Tx) levels for a reliable content transmission (e.g., FLUTE) protocol and a stream transmission protocol. LCT may provide content and characteristics of the basic information to be transmitted to the receiver. For example, LCT may include a Treansport Session Identifier (TSI) field, a Transport Object ID (TOI) field, and a Congestion Control Information (CCI) field.

TSI field may include information for identifying the ALC/LCT session. For example, a channel contained in the session may be identified using a transmitter IP address and a UDP port. TOI field may include information for identifying each file object. CCI field may include information regarding a used or unused state and information regarding a Congestion Control Block. In addition, LCT may provide additional information and FEC-associated information through an extended header.

As described above, the object (e.g., file) is packetized according to the FLUTE protocol, and is then packetized according to the ALC/LCT scheme. The packetized ALC/LCT data is re-packetized according to the UDP scheme, and the packetized ALC/LCT/UDP data is packeetized according to the IP scheme, resulting in formation of ALC/LCT/UDP/IP data.

The file-based multimedia content may be transmitted not only to the Internet but also to the broadcast network through the content transmission protocol such as LCT. In this case, multimedia content composed of at least one object or file may be transmitted and consumed in units of an object or a file through the LCT. A detailed description thereof will hereinafter be described in detail.

FIG. 25(*a*) shows a data structure based on the FLUTE protocol. For example, the multimedia content may include at least one object. One object may include at least one fragment (Fragment 1 or Fragment 2).

A data processing time needed for the FLUTE protocol is shown in FIG. 25(*b*). In FIG. 25(*b*), the lowest drawing shows the encoding start and end times at which the broadcast signal transmission apparatus starts or stops encoding of one object, and the highest drawing shows the reproduction start and end times at which the broadcast signal reception apparatus starts or stops reproduction of one object.

The broadcast signal transmission apparatus may start transmission of the object upon after completion of generation of the object including at least one fragment. Therefore, there occurs a transmission standby time (Dt1) between a start time at which the broadcast signal transmission apparatus starts to generate the object and another time at which the broadcast signal transmission apparatus starts to transmit the object.

In addition, the broadcast signal reception apparatus stops reception of the object including at least one object, and then starts reproduction of the object. Therefore, there occurs a reproduction standby time (Dr1) between a start time at which the broadcast signal reception apparatus starts reception of the object and another time at which the broadcast signal reception apparatus starts to reproduce the object.

Therefore, a predetermined time corresponding to the sum of a transmission standby time and a reproduction standby time is needed before one object is transmitted from the broadcast signal transmission apparatus and is then reproduced by the broadcast signal reception apparatus. This means that the broadcast signal reception apparatus requires a relatively long initial access time to access the corresponding object.

As described above, since the FLUTE protocol is used, the broadcast signal transmission apparatus transmits data on an object basis, the broadcast signal reception apparatus must receive data of one object and must consume the corresponding object. Therefore, object transmission based on the FLUTE protocol is inappropriate for the real-time broadcast environment.

Figure 26:
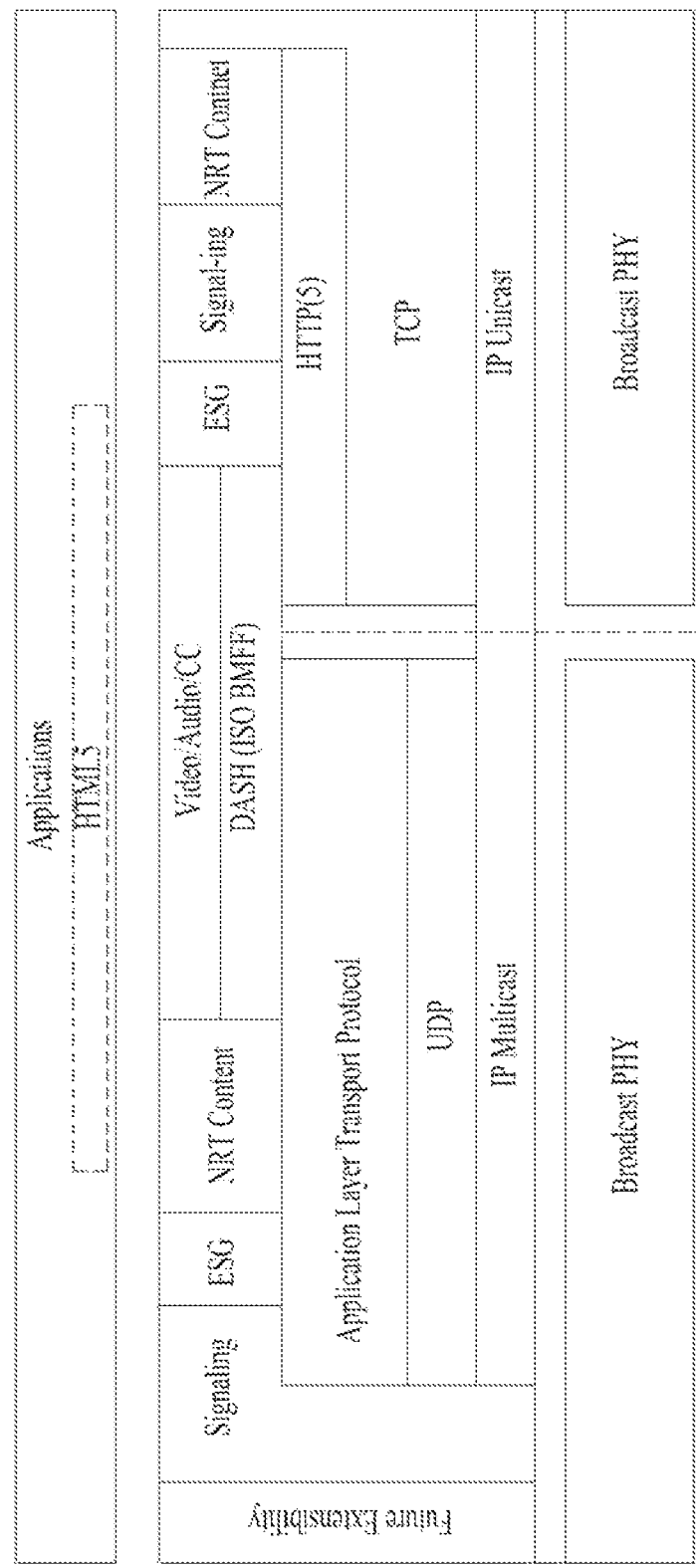
FIG. 26 illustrates a Real-Time Object Delivery over Unidirectional Transport (ROUTE) protocol stack according to an embodiment of the present invention.

FIG. 26 illustrates a Real-Time Object Delivery over Unidirectional Transport (ROUTE) protocol stack according to an embodiment of the present invention.

The next-generation broadcast system supporting the IP-based hybrid broadcasting may include video data, audio data, subtitle data, signaling data, Electronic Service Guide (ESG) data, and/or NRT content data.

Video data, audio data, subtitle data, etc. may be encapsulated in the form of ISO Base Media File (hereinafter referred to as ISO BMFF). For example, data encapsulated in the form of ISO BMFF may have a of MPEG (Moving Picture Expert Group)-DASH (Dynamic Adaptive Streaming over HTTP) segment or a format of Media Processing Unit (MPU). Then, data encapsulated in the form of BMFF may be equally transmitted over the broadcast network or the Internet or may be differently transmitted according to attributes of respective transmission networks.

In the case of the broadcast network, Signaling data, ESG data, NRT Content data, and/or data encapsulated in the form of ISO BMFF may be encapsulated in the form of an application layer transport protocol packet supporting real-time object transmission. For example, data encapsulated in the form of ISO BMFF may be encapsulated in the form of ROUTE (Real-Time Object Delivery over Unidirectional Transport) and MMT transport packet.

Real-Time Object Delivery over Unidirectional Transport (ROUTE) is a protocol for the delivery of files over IP multicast networks. ROUTE protocol utilizes Asynchronous Layered Coding (ALC), the base protocol designed for massively scalable multicast distribution, Layered Coding Transport (LCT), and other well-known Internet standards.

ROUTE is an enhancement of and functional replacement for FLUTE with additional features. ROUTE protocol is the reliable delivery of delivery objects and associated metadata using LCT packets. The ROUTE protocol may be used for real-time delivery.

ROUTE functions to deliver signaling messages, Electronic Service Guide (ESG) messages, and NRT content. It is particularly well suited to the delivery of streaming media for example MPEG-DASH Media Segment files. ROUTE offers lower end to-end latency through the delivery chain as compared to FLUTE.

The ROUTE protocol is a generic transport application, providing for the delivery of any kind of object. It supports rich presentation including scene descriptions, media objects, and DRM-related information. ROUTE is particularly well suited to the delivery of real-time media content and offers many features.

For example, ROUTE offers individual delivery and access to different media components, e.g. language tracks, subtitles, alternative video views. And, ROUTE offers support of layered coding by enabling the delivery on different transport sessions or even ROUTE sessions. And, ROUTE offers support for flexible FEC protection, including multi-stage. And, ROUTE offers easy combination with MPEG-DASH enabling synergy between broadcast and broadband delivery modes of DASH.

And, ROUTE offers fast access to media when joining a ROUTE and/or transport session. And, ROUTE offers highly extensible by focusing on the delivery concept. And, ROUTE offers compatibility with existing IETF protocols and use of IETF endorsed extension mechanisms.

The ROUTE protocol is split in two major components. First component is a source protocol for delivery of objects or flows/collection of objects. Second component is a repair protocol for flexibly protecting delivery objects or bundles of delivery objects that are delivered through the source protocol.

The source protocol is independent of the repair protocol, i.e. the source protocol may be deployed without the ROUTE repair protocol. Repair may be added only for certain deployment scenarios, for example only for mobile reception, only in certain geographical areas, only for certain service, etc.

The source protocol is aligned with FLUTE as defined in RFC 6726 as well as the extensions defined in 3GPP TS 26.346, but also makes use of some principles of FCAST as defined in RFC 6968, for example, that the object metadata and the object content may be sent together in a compound object.

In addition to basic FLUTE protocol, certain optimizations and restrictions are added that enable optimized support for real-time delivery of media data; hence, the name of the protocol. Among others, the source ROUTE protocol provides a real-time delivery of object-based media data. And, the source ROUTE protocol provides a flexible packetization, including enabling media-aware packetization as well as transport aware packetization of delivery objects. And, the source ROUTE protocol provides an independence of files and delivery objects, i.e. a delivery object may be a part of a file or may be a group of files.

Delivery objects are the key component of this protocol as the receiver recovers delivery objects and passes those to the application. A delivery object is self-contained for the application, typically associated with certain properties, metadata and timing related information that are of relevance for the application. In some cases the properties are provided in-band along with the object, in other cases the data needs to be delivered out-of-band in a static or dynamic fashion.

Delivery object may comprise complete or partial files described and accompanied by "FDT Instance". And, Delivery object may comprise HTTP Entities (HTTP Entity Header and HTTP Entity Body) and/or packages of delivery objects.

Delivery object may be a full file or a byte ranges of a file along with FDT Instance. Delivery object may be delivered in real time or in non-real time (timed or non-timed delivery). If timed, certain real-time and buffer restrictions apply and specific extension headers may be used. Dynamic and static metadata may be used to describe delivery object properties. Delivery object may be delivered in specific data structures, especially ISO BMFF structures. In this case a media-aware packetization or a general packetization may be applied. The delivery format specifies which of the formats are used in order to provide information to the applications. ROUTE repair protocol is FEC based and enabled as an additional layer between the transport layer (e.g., UDP) and the object delivery layer protocol. The FEC reuses concepts of FEC Framework defined in RFC 6363, but in contrast to the FEC Framework in RFC 6363 the ROUTE repair protocol does not protect packets, but instead it protects delivery objects as delivered in the source protocol. Each FEC source block may consist of parts of a delivery object, as a single delivery object (similar to FLUTE) or by multiple delivery objects that are bundled prior to FEC protection. ROUTE FEC makes use of FEC schemes in a similar sense to that defined in RFC 5052, and uses the terminology of that document. The FEC scheme defines the FEC encoding and decoding, and it defines the protocol fields and procedures used to identify packet payload data in the context of the FEC scheme.

In ROUTE all packets are LCT packets as defined in RFC 5651. Source and repair packets may be distinguished by at least one of a ROUTE session, a LCT transport session, and/or a PSI bit. Different ROUTE sessions are carried on different IP/UDP port combinations. Different LCT transport sessions use different TSI values in the LCT header. And, if source and repair packets are carried in the same LCT transport session, they may be distinguished by the PSI bit in the LCT. This mode of operation is mostly suitable for FLUTE compatible deployments.

ROUTE defines the source protocol including packet formats, sending behavior and receiving behavior. And, ROUTE defines the repair protocol. And, ROUTE defines a metadata for transport session establishment and a metadata for object flow delivery. And ROUTE defines recommendations for MPEG DASH configuration and mapping to ROUTE to enable rich and high-quality linear TV broadcast services.

The scope of the ROUTE protocol is the reliable delivery of delivery objects and associated metadata using LCT packets. The objects are made available to the application through a Delivery Object Cache. The implementation of this cache is application dependent.

The ROUTE protocol focuses on the format of the LCT packets to deliver the delivery objects and the reliable delivery of the delivery object using a repair protocol based on FEC. And, the ROUTE protocol focuses on the definition and delivery of object metadata along with the delivery objects to enable the interface between the delivery object cache and the application. And, the ROUTE protocol focuses on the ROUTE and LCT session description to establish the reception of objects along with their metadata. And, the ROUTE protocol focuses on the normative aspects (formats, semantics) of auxiliary information to be delivered along with the packets to optimize the performance for specific applications, e.g., real-time delivery.

In addition, the ROUTE protocol provides recommended mappings of specific DASH Media Presentation formats to ROUTE delivery as well as suitable DASH formats to be used for the delivery. The key issue is that by using ROUTE, the DASH media formats may be used as is. This architectural design enables converged unicast/broadcast services.

In sender operation of the ROUTE protocol, a ROUTE session is established that delivers LCT packets. These packets may carry source objects or FEC repair data. A source protocol consists of one or more LCT sessions, each carrying associated objects along with their metadata. The metadata may be statically delivered in the LCT Session Instance Description (LSID) or may be dynamically delivered, either as a compound object in the Entity Mode or as LCT extension headers in packet headers. The packets are carried in ALC using a specific FEC scheme that permits flexible fragmentation of the object at arbitrary byte boundaries. In addition, delivery objects may be FEC protected, either individually or in bundles. In either case, the bundled object is encoded and only the repair packets are delivered. In combination with the source packets, this permits the recovery delivery object bundles. Note that one or multiple repair flows may be generated, each with different characteristics, for example to supported different latency requirements, different protection requirements, etc.

A DMD (Dynamic MetaData) is metadata to generate FDT equivalent descriptions dynamically at the client. It is carried in the entity-header in the Entity Mode and is carried in the LCT header in other modes of delivery.

The ROUTE protocol supports different protection and delivery schemes of the source data. It also supports all existing use cases for NRT delivery, as it can be deployed in a backward-compatible mode.

The ROUTE session is associated to an IP address/port combination. Typically, by joining such a session, all packets of the session can be received and the application protocol may apply further processing. Each ROUTE session constitutes of one or multiple LCT transport sessions. LCT transport sessions are a subset of a ROUTE session. For media delivery, an LCT transport session typically would carry a media component, for example a DASH Representation. From the perspective of broadcast DASH, the ROUTE session can be considered as the multiplex of LCT transport sessions that carry constituent media components of one or more DASH Media Presentations. Within each LCT transport session, one or multiple objects are carried, typically objects that are related, e.g. DASH Segments associated to one Representation. Along with each object, metadata properties are delivered such that the objects can be used in applications. Applications include, but are not limited to, DASH Media Presentations, HTML-5 Presentations, or any other object-consuming application.

The ROUTE sessions may be bounded or unbounded from the temporal perspective.

The ROUTE session contains one or multiple LCT transport sessions. Each transport session is uniquely identified by a unique Transport Session Identifier (TSI) value in the LCT header.

Before a receiver can join a ROUTE session, the receiver needs to obtain a ROUTE Session Description. The ROUTE Session Description contains at least one of the sender IP address, the address and port number used for the session, the indication that the session is a ROUTE session and that all packets are LCT packets, and/or other information that is essential to join and consume the session on an IP/UDP level.

The Session Description could also include, but is not limited to, the data rates used for the ROUTE session and any information on the duration of the ROUTE session. The Session Description could be in a form such as the Session Description Protocol (SDP) as defined in RFC 4566 or XML metadata as defined in RFC 3023. It might be carried in any session announcement protocol using a proprietary session control protocol, located on a web page with scheduling information, or conveyed via email or other out-of-band methods.

Transport sessions are not described in the ROUTE session description, but in the LCT Session Instance Description (LSID). Transport sessions (i.e., LCT transport sessions or simply LCT sessions) may contain either or both of Source Flows and Repair Flows. The Source Flows carry source data. And, the Repair Flows carry repair data.

The LCT transport sessions contained in a ROUTE session are described by the LCT Session Instance description (LSID). Specifically, it defines what is carried in each constituent LCT transport session of the ROUTE session. Each transport session is uniquely identified by a Transport Session Identifier (TSI) in the LCT header.

The LSID describes all transport sessions that are carried on this ROUTE session. The LSID may be delivered in the same ROUTE session containing the LCT transport sessions or it may be delivered by means outside the ROUTE session, e.g. through unicast or through a different ROUTE session. In the former case, the LSID shall be delivered on a dedicated LCT transport session with TSI=0, and furthermore, it shall be a delivery object identified by TOI=0. For any object delivered on TSI=0, the Entity Mode should be used. If those objects are not delivered in the Entity Mode, then the LSID must be recovered prior to obtaining the extended FDT for the received object.

The Internet Media Type of the LSID is application/xml+route+lsid.

The LSID may reference other data fragments. Any object that is referenced in the LSID may also be delivered on TSI=0, but with a different value of TOI than the LSID itself, or it may be delivered on a separate LCT session with dedicated TSI≠0.

The LSID element may contain version attribute, validity attribute, and/or expiration attribute. The LSID element may be updated accordingly using version attribute as well as validity attribute and expiration attribute. For example certain transport sessions may be terminated after some time and new session may start.

The version attribute indicates a version of this LSID element. The version is increased by one when the descriptor is updated. The received LSID element with highest version number is the currently valid version.

The validity attribute indicates date and/or time from which the LSID element is valid. The validity attribute may or may not be present. If not present, the receiver should assume the LSID element version is valid immediately.

The expiration attribute indicates date and time when the LSID element expires. The expiration attribute may or may not be present. If not present the receiver should assume the LSID element is valid for all time, or until it receives a newer LSID element with an associated expiration value.

The LSID element may contain at least one TransportSession element. TransportSession element provides information about LCT transport sessions. Each TransportSession element may contain tsi attribute, SourceFlow element, and/or RepairFlow element.

tsi attribute specifies the transport session identifier. The session identifiers must not be 0. SourceFlow element provides information of a source flow carried on the transport session. RepairFlow element provides information of a repair flow carried on the transport session.

Thereafter, data encapsulated in the form of the application layer transport protocol packet may be packetized according to the IP/UDP scheme. The data packetized by the IP/UDP scheme may be referred to as the IP/UDP datagram, and the IP/UDP datagram may be loaded on the broadcast signal and then transmitted.

In the case of the Internet, data encapsulated in the form of ISO BMFF may be transferred to the receiver according to the streaming scheme. For example, the streaming scheme may include MPEG-DASH.

The signaling data may be transmitted using the following methods.

In the case of the broadcast network, signaling data may be transmitted through a specific data pipe (hereinafter referred to as DP) of a transport frame (or frame) applied to a physical layer of the next-generation broadcast transmission system and broadcast network according to attributes of the signaling data. For example, the signaling format may be encapsulated in the form of a bitstream or IP/UDP datagram.

In the case of the Internet, the signaling data may be transmitted as a response to a request of the receiver.

ESG data and NRT content data may be transmitted using the following methods.

In the case of the broadcast network, ESG data and NRT content data may be encapsulated in the form of an application layer transport protocol packet. Thereafter, data encapsulated in the form of the application layer transport protocol packet may be transmitted in the same manner as described above.

In the case of the Internet, ESG data and NRT content data may be transmitted as a response to the request of the receiver.

The physical layers (Broadcast PHY and broadband PHY) of the broadcast signal transmission apparatus according to the embodiment may be shown in FIG. 1. In addition, the physical layers of the broadcast signal reception apparatus may be shown in FIG. 9.

The signaling data and the IP/UDP datagram may be transmitted through a specific data pipe (hereinafter referred to as DP) of a transport frame (or frame). For example, the input formatting block 1000 may receive the signaling data and the IP/UDP datagram, each of the signaling data and the IP/UDP datagram may be demultiplexed into at least one DP. The output processor 9300 may perform the operations opposite to those of the input formatting block 1000.

The following description relates to an exemplary case in which data encapsulated in the form of ISO BMFF is encapsulated in the form of ROUTE transport packet, and a detailed description of the exemplary case will hereinafter be described in detail.

<Data Structure for Real-Time File Generation and Consumption>

FIG. 32 illustrates a data structure of file-based multimedia content according to an embodiment of the present invention.

The data structure of the file-based multimedia content according to the embodiment is shown in FIG. 32. The term "file-based multimedia content" may indicate multimedia content composed of at least one file.

The multimedia content such as a broadcast program may be composed of one presentation. The presentation may include at least one object. For example, the object may be a file. In addition, the object may include at least one fragment.

In accordance with the embodiment, the fragment may be a data unit capable of being independently decoded and reproduced without depending on the preceding data. For example, the fragment including video data may begin from an IDR picture, and header data for parsing media data does not depend on the preceding fragment. The fragment according to the embodiment may be divided and transmitted in units of at least one transfer block (TB).

In accordance with the embodiment, the transfer block (TB) may be a minimum data unit capable of being independently and transmitted without depending on the preceding data. In addition, the TB may be a significant data unit configured in the form of a variable-sized GOP or chunk. For example, the TB may include at least one chunk composed of the same media data as in GOP of video data. The term "chunk" may indicate a segment of the content. In addition, the TB may include at least one source block.

GOP is a basic unit for performing coding used in video coding and is a data unit with a variable size indicating a set of frames including at least one I-frame. According to an embodiment of the present invention, media data is transmitted in an object internal structure unit as an independently meaningful data unit, and thus GOP may include Open GOP and Closed GOP.

In Open GOP, B-frame in one GOP may refer to I-frame or P-frame of an adjacent GOP. Thus, Open GOP can seriously enhance coding efficiency. In Closed GOP, Bframe or P-frame may refer to only a frame in the corresponding GOP and may not refer to frames in GOPs except for the corresponding GOP.

The TB may include at least one data, and respective data pieces may have the same or different media types. For example, the media type may include an audio type and a video type. That is, the TB may also include one or more data pieces having different media types in the same manner as in the audio and video data.

The fragment according to the embodiment may include a fragment header and a fragment payload.

The fragment header may include timing information and indexing information to parse the above-mentioned chunks. The fragment header may be comprised of at least one TB. For example, the fragment header may be contained in one TB. In addition, at least one chunk data constructing the fragment payload may be contained in at least one TB. As described above, the fragment header and the fragment payload may be contained in at least one TB.

The TB may be divided into one or more symbols. At least one symbol may be packetized. For example, the broadcast signal transmission apparatus according to the embodiment may packetize at least one symbol into the LCT packet.

The broadcast signal transmission apparatus according to the embodiment may transmit the packetized data to the broadcast signal reception apparatus.

Figure 27:
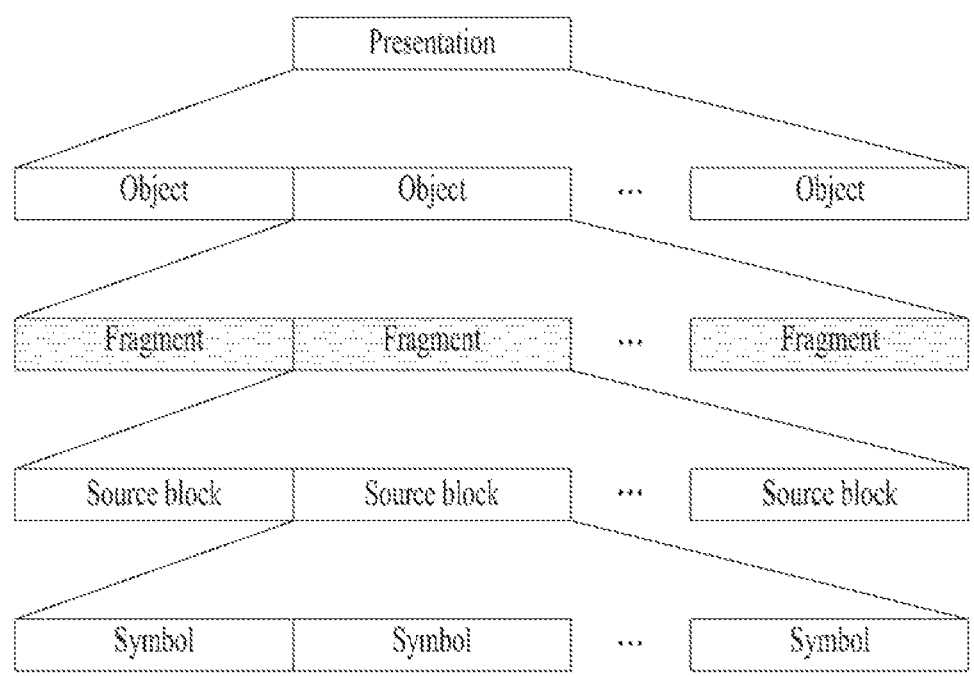
FIG. 27 illustrates a data structure of file-based multimedia content according to an embodiment of the present invention.
Figure 28:
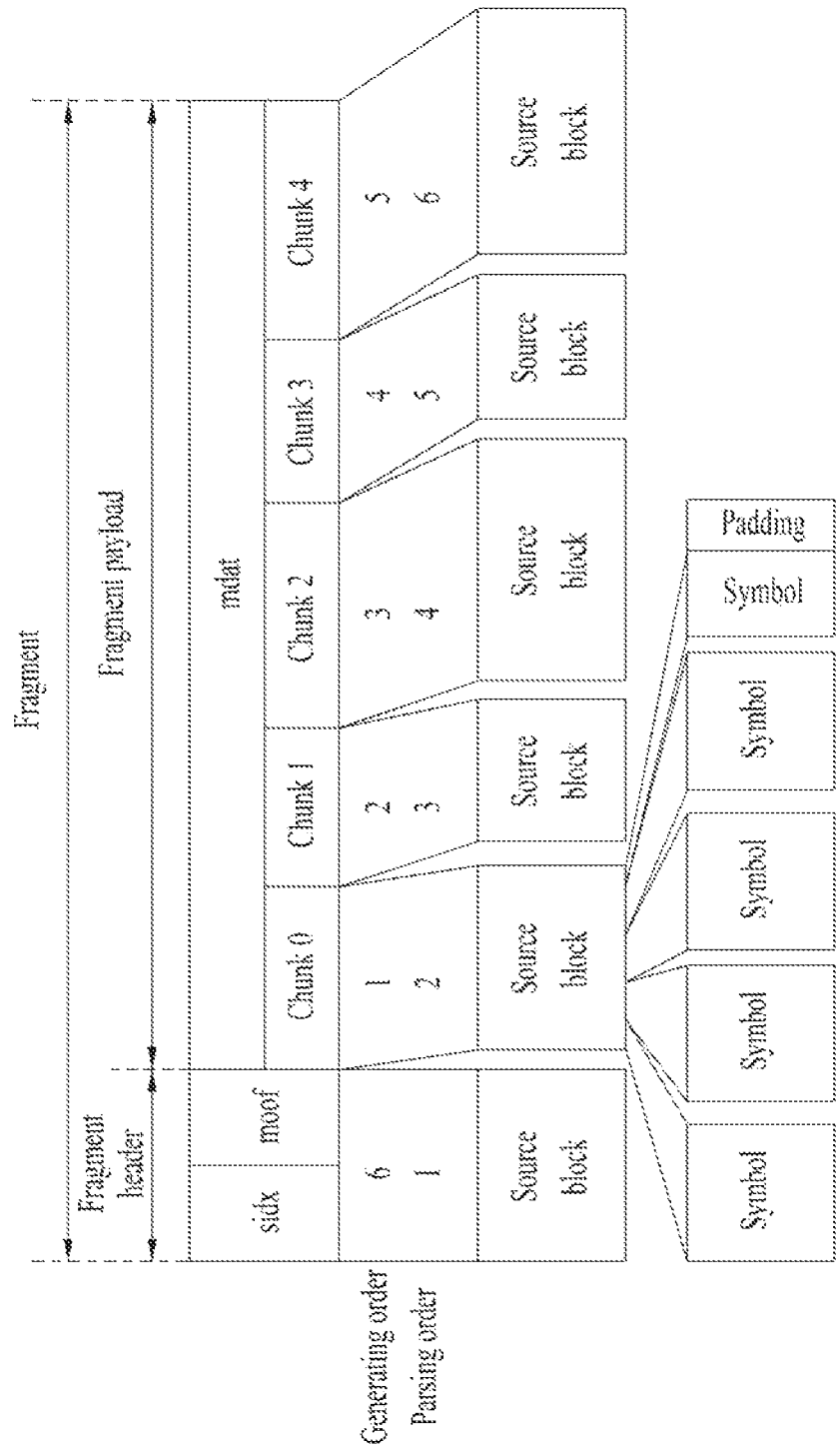
FIG. 28 illustrates a media segment structure of MPEG-DASH to which the data structure is applied.

FIG. 27 illustrates a media segment structure of MPEG-DASH to which the data structure is applied.

Referring to FIG. 27, the data structure according to the embodiment is applied to a media segment of MPEG-DASH.

The broadcast signal transmission apparatus according to the embodiment include multimedia contents having a plurality of qualities in the server, provides the multimedia contents appropriate for the user broadcast environment and the environment of the broadcast signal reception apparatus, such that it can provide the seamless real-time streaming service. For example, the broadcast signal transmission apparatus may provide the real-time streaming service using MPEG-DASH.

The broadcast signal transmission apparatus can dynamically transmit XML-type MPD (Media Presentation Description) and a segment of binary-format transmit (Tx) multimedia content to the broadcast signal reception apparatus using the ROUTE protocol according to the broadcast environment and the environment of the broadcast signal reception apparatus.

MPD is comprised of a hierarchical structure, and may include a structural function of each layer and roles of each layer.

The segment may include a media segment. The media segment may be a data unit having a media-related object format being separated per quality or per time to be transmitted to the broadcast signal reception apparatus so as to support the streaming service. The media segment may include information regarding a media stream, at least one access unit, and information regarding a method for accessing Media Presentation contained in the corresponding segment such as a presentation time or index. In addition, the media segment may be divided into at least one subsegment by the segment index.

MPEG-DASH content may include at least one media segment. The media segment may include at least one fragment. For example, the fragment may be the abovementioned subsegment. As described above, the fragment may include a fragment header and a fragment payload.

The fragment header may include a segment index box (sidx) and a movie fragment box (moof). The segment index box may provide an initial presentation time of media data present in the corresponding fragment, a data offset, and SAP (Stream Access Points) information. The movie fragment box may include metadata regarding a media data box (mdat). For example, the movie fragment box may include timing, indexing, and decoding information of a media data sample contained in the fragment.

The fragment payload may include the media data box (mdat). The media data box (mdat) may include actual media data regarding the corresponding media constituent elements (video and audio data, etc.).

The encoded media data configured on a chunk basis may be contained in the media data box (mdat) corresponding to the fragment payload. As described above, samples corresponding to the same track may be contained in one chunk.

The broadcast signal transmission apparatus may generate at least one TB through fragment segmentation. In addition, the broadcast signal transmission apparatus may include the fragment header and the payload data in different TBs so as to discriminate between the fragment header and the payload data.

In addition, the broadcast signal transmission apparatus may transmit a transfer block (TB) divided on a chunk basis so as to segment/transmit data contained in the fragment payload. That is, the broadcast signal transmission apparatus according to the embodiment may generate a TB in a manner that a border of the chunk is identical to a border of the TB.

Thereafter, the broadcast signal transmission apparatus segments at least one TB such that it can generate at least one symbol. All symbols contained in the object may be identical to each other. In addition, the last symbol of TB may include a plurality of padding bytes such that all symbols contained in the object have the same length.

The broadcast signal transmission apparatus may packetize at least one symbol. For example, the broadcast signal transmission apparatus may generate the LCT packet on the basis of at least one symbol.

Thereafter, the broadcast signal transmission apparatus may transmit the generated LCT packet.

In accordance with the embodiment, the broadcast signal transmission apparatus first generates the fragment payload, and generates the fragment header so as to generate the fragment. In this case, the broadcast signal transmission apparatus may generate a TB corresponding to media data contained in the fragment payload. For example, at least TB corresponding to media data contained in the media data box (mdat) may be sequentially generated on a chunk basis. Thereafter, the broadcast signal transmission apparatus may generate the TB corresponding to the fragment header.

The broadcast signal transmission apparatus may transmit the generated TB according to the generation order so as to broadcast the media content in real time. In contrast, the broadcast signal reception apparatus according to the embodiment first parses the fragment header, and then parses the fragment payload.

The broadcast signal transmission apparatus may transmit data according to the parsing order when media data is pre-encoded or TB is pre-generated.

Figure 29:
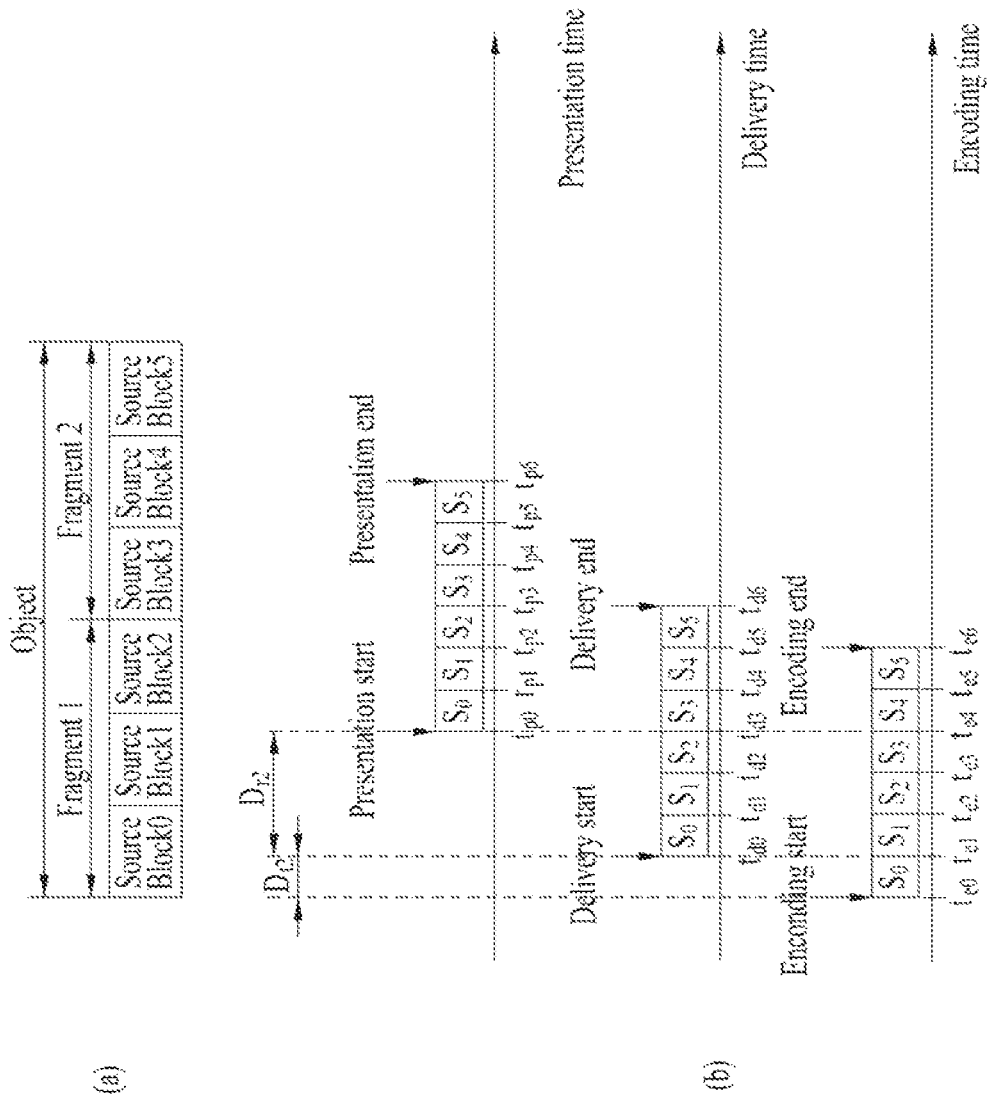
FIG. 29 illustrates a data processing time using a ROUTE protocol according to an embodiment of the present invention.

FIG. 29 illustrates a data processing time using a ROUTE protocol according to an embodiment of the present invention.

FIG. 29(a) shows the data structure according to the embodiment. The multimedia data may include at least one object. Each object may include at least one fragment. For example, one object may include two fragments (Fragment1 and Fragment 2).

The broadcast signal transmission apparatus may segment the fragment into one or more TBs. The TB may be a source block, and the following description will hereinafter be given on the basis of the source block.

For example, the broadcast signal transmission apparatus may segment the fragment 1 into three source blocks (Source Block 0, Source Block 1, and Source Block 2), and may segment the fragment 2 into three source blocks (Source Block 3, Source Block 4, Source Block 5).

The broadcast signal transmission apparatus may independently transmit each segmented source block. The broadcast signal transmission apparatus may start transmission of each source block generated when or just after each source block is generated.

For example, the broadcast signal transmission apparatus can transmit the source block 0 (S0) after the source block 0 (S0) has been generated for a predetermined time (te0~te1). The transmission start time (td0) of the source block 0 (S0) may be identical to the generation completion time (td0) or may be located just after the generation completion time (td0). Likewise, the broadcast signal transmission apparatus may generate the source blocks 1 to 5 (Source Block 1(S1) to Source Block 5 (S5)), and may transmit the generated source blocks 1 to 5.

Therefore, the broadcast signal transmission apparatus according to the embodiment may generate a transmission standby time (Dt2) between a start time of generating one source block and another start time of transmitting the source block. The transmission standby time (Dt2) generated by the broadcast signal transmission apparatus is relatively shorter than the transmission standby time (Dt1) generated by the conventional broadcast signal transmission apparatus. Therefore, the broadcast signal transmission apparatus according to the embodiment can greatly reduce a transmission standby time as compared to the conventional broadcast signal transmission apparatus.

The broadcast signal reception apparatus according to the embodiment receives each segmented source block, and combines the received source blocks, such that it can generate at least one fragment. For example, the broadcast signal reception apparatus may receive the source block 0 (S0), the source block 1 (S1), and the source block 2 (S2), and combine the received three source blocks (S0, S1, S2) so as to generate the fragment 1. In addition, the broadcast signal reception apparatus receives the source block 3 (S3), the source block 4 (S4), and the source block 5 (S5), and combines the received three source blocks (S3, S4, S5) so as to generate the fragment 2.

The broadcast signal reception apparatus may separately generate each fragment. The broadcast signal reception apparatus may reproduce each fragment when or just after each fragment is generated. Alternatively, the broadcast signal reception apparatus may reproduce each fragment when or just after the source block corresponding to each fragment is transmitted.

For example, the broadcast signal reception apparatus may generate the fragment 1 after receiving the source blocks 0 to 2 (S0~S2) during a predetermined time (td0~td3). For example, after the broadcast signal reception apparatus receives the source blocks 0 to 2 (S0~S2) during a predetermined time (td0~td3), it can generate the fragment 1. Thereafter, the broadcast signal reception apparatus may reproduce the generated fragment 1. The reproduction start time (tp0) of the fragment 1 may be identical to the generation time of the fragment 1 or may be located after the generation time of the fragment 1. In addition, a reproduction start time (tp0) of the fragment 1 may be identical to a reception completion time of the source block 2 (S2) or may be located just after the reception completion time of the source block 2 (S2).

In the same manner, after the broadcast signal reception apparatus according to the embodiment receives the source blocks 3 to 5 (S3~S5) during a predetermined time (td3~td6), it may generate the fragment 2. Thereafter, the broadcast signal reception apparatus may reproduce the fragment 2.

However, the scope or spirit of the present invention is not limited thereto, and the broadcast signal reception apparatus according to the embodiment may receive the source block and may reproduce data in units of a received source block as necessary.

Therefore, the broadcast signal reception apparatus according to the embodiment may generate a reproduction standby time (Dr2) between a reception start time of one fragment and a reproduction start time of the fragment. The reproduction standby time (Dr2) generated by the broadcast signal reception apparatus is relatively shorter than the reproduction standby time (Dr2) generated by the broadcast signal reception apparatus. Therefore, the broadcast signal reception apparatus according to the embodiment can reduce a reproduction standby time as compared to the conventional broadcast signal reception apparatus.

As described above, a predetermined time corresponding to the sum of a transmission standby time and a reproduction standby time may be considerably reduced. Here, the predetermined time may be needed when one TB is transmitted from the broadcast signal transmission apparatus and is then reproduced by the broadcast signal reception apparatus. This means that an initial access time during which the broadcast signal reception apparatus initially approaches the corresponding object is considerably reduced.

In case of using the ROUTE protocol, the broadcast signal transmission apparatus may transmit data in units of a TB, and the broadcast signal reception apparatus may reproduce the received data in units of a TB or a fragment. As a result, a total time from an acquisition time of multimedia content to a content display time for a user can be reduced, and an initial access time required when the user approaches the broadcast channel can also be reduced.

Therefore, TB transmission based on the ROUTE protocol is appropriate for the realtime broadcast environment.

<Method for Identifying File Segmentation Generation and Consumption Information>

FIG. 30 illustrates a Layered Coding Transport (LCT) packet structure for file transmission according to an embodiment of the present invention.

An application layer transport session may be composed of an IP address and a port number. If the application layer transport session is the ROUTE protocol, the ROUTE session may be composed of one or more LCT (Layered Coding Transport) sessions. For example, if one media component is transmitted through one LCT transport session, at least one media component may be multiplexed and transmitted through one application layer transport session. In addition, at least one transport object may be transmitted through one LCT transport session.

Referring to FIG. 30, if the application layer transmission protocol is based on the LCT, each field of the LCT packet may indicate the following information.

The LCT packet may include an LCT version number field (V), a congestion control flag field (C), a reserved field (R), a transport session identifier flag field (S), a transport object identifier flag field (O), a half-word flag field (H), a sender current time present flag field (T), an expected residual time present flag field (R), a close session flag field (A), a close object flag field (B), an LCT header length field (HDR_LEN), a codepoint field (CP), a congestion control information field (CCI), a transport session identifier field (TSI), a transport object identifier field (TOI), a header extensions field, an FEC payload ID field, and/or an encoding symbol(s) field.

LCT version number field(V) indicates the protocol version number. For example, this field indicates the LCT version number. The version number field of the LCT header MUST be interpreted as the ROUTE version number field. This version of ROUTE implicitly makes use of version '1' of the LCT building block. For example, the version number is '0001b'.

Congestion control flag field(C) indicates the length of Congestion Control Information field. C=0 indicates the Congestion Control Information (CCI) field is 32-bits in length. C=1 indicates the CCI field is 64-bits in length. C=2 indicates the CCI field is 96-bits in length. C=3 indicates the CCI field is 128-bits in length.

Reserved field(R) reserved for future use. For example, Reserved field(R) may be Protocol-Specific Indication field (PSI). Protocol-Specific Indication field (PSI) may be used as an indicator for a specific purpose in the LCT higher protocol. PSI field indicates whether the current packet is a source packet or an FEC repair packet. As the ROUTE source protocol only delivers source packets, this field shall be set to '10b'.

Transport Session Identifier flag field(S) indicates the length of Transport Session Identifier field.

Transport Object Identifier flag field(0) indicates the length of Transport Object Identifier field. For example, the object may indicate one file, and the TOI may indicate ID information of each object, and a file having TOI=0 may be referred to as FDT.

Half-word flag field (H) may indicate whether half-word (16 bits) will be added to the length of TSI or TOI field.

Sender Current Time present flag field(T) indicates whether the Sender Current Time (SCT) field is present or not. T=0 indicates that the Sender Current Time (SCT) field is not present. T=1 indicates that the SCT field is present. The SCT is inserted by senders to indicate to receivers how long the session has been in progress.

Expected Residual Time present flag field(R) indicates whether the Expected Residual Time (ERT) field is present or not. R=0 indicates that the Expected Residual Time (ERT) field is not present. R=1 indicates that the ERT field is present. The ERT is inserted by senders to indicate to receivers how much longer the session/object transmission will continue.

Close Session flag field (A) may indicate whether session completion or an impending state of the session completion.

Close Object flag field (B) may indicate completion or impending completion of a transmitting object.

LCT header length field (HDR_LEN): indicates total length of the LCT header in units of 32-bit words.

Codepoint field (CP) indicates the type of the payload that is carried by this packet. Depending on the type of the payload, additional payload header may be added to prefix the payload data.

Congestion Control Information field (CCI) may be used to transmit congestion control information (e.g., layer numbers, logical channel numbers, sequence numbers, etc.). The Congestion Control Information field in the LCT header contains the required Congestion Control Information.

Transport Session Identifier field (TSI) is a unique ID of a session. The TSI uniquely identifies a session among all sessions from a particular sender. This field identifies the Transport Session in ROUTE. The context of the Transport Session is provided by the LSID (LCT Session Instance description).

LSID defines what is carried in each constituent LCT transport session of the ROUTE session. Each transport session is uniquely identified by a Transport Session Identifier (TSI) in the LCT header. LSID may be transmitted through the same ROUTE session including LCT transport sessions, and may also be transmitted through Web. LSID may be transmitted through the same ROUTE session including LCT transmission sessions and may also be transmitted through a communication network, a broadcast network, the Internet, a cable network, and/or a satellite network. The scope or spirit of a transmission unit of LSID is not limited thereto. For example, LSID may be transmitted through a specific LCT transport session having TSI=0. LSID may include signaling information regarding all transport sessions applied to the ROUTE session. LSID may include LSID version information and LSID validity information. In addition, LSID may include a transport session through which the LCT transport session information is transmitted. The transport session information may include TSI information for identifying the transport session, source flow information that is transmitted to the corresponding TSI and provides information regarding a source flow needed for source data transmission, repair flow information that is transmitted to the corresponding TSI and provides information regarding a repair flow needed for transmission of repair data, and transport session property information including additional characteristic information of the corresponding transport session.

Transport Object Identifier field (TOI) is a unique ID of the object. The TOI indicates which object within the session this packet pertains to. This field indicates to which object within this session the payload of the current packet belongs to. The mapping of the TOI field to the object is provided by the Extended FDT.

Extended FDT specifies the details of the file delivery data. This is the extended FDT instance. The extended FDT together with the LCT packet header may be used to generate the FDT-equivalent descriptions for the delivery object. The Extended FDT may either be embedded or may be provided as a reference. If provided as a reference the Extended FDT may be updated independently of the LSID. If referenced, it shall be delivered as in-band object on TOI=0 of the included source flow.

Header Extensions field may be used as an LCT header extension part for transmission of additional information. The Header Extensions are used in LCT to accommodate optional header fields that are not always used or have variable size.

For example, EXT TIME extension is used to carry several types of timing information. It includes general purpose timing information, namely the Sender Current Time (SCT), Expected Residual Time (ERT), and Sender Last Change (SLC) time extensions described in the present document. It can also be used for timing information with narrower applicability (e.g., defined for a single protocol instantiation); in this case, it will be described in a separate document.

FEC Payload ID field may include ID information of Transmission Block or Encoding Symbol. FEC Payload ID may indicate an ID to be used when the above file is FEC-encoded. For example, if the FLUTE protocol file is FEC-encoded, FEC Payload ID may be allocated for a broadcast station or broadcast server configured to identify the FEC-encoded FLUTE protocol file.

Encoding Symbol(s) field may include Transmission Block or Encoding symbol data.

The packet payload contains bytes generated from an object. If more than one object is carried in the session, then the Transmission Object ID (TOI) within the LCT header MUST be used to identify from which object the packet payload data is generated.

The LCT packet according to the embodiment may include Real Time Support Extension field (EXT_RTS) corresponding to an extension format of a Header Extensions field. EXT_RTS may include segmentation generation and consumption information of the file, and will hereinafter be referred to as fragment information. The LCT packet according to the embodiment includes EXT_RTS corresponding to an extension format of the Header Extensions field, and may support real-time file transmission and consumption information using a method compatible with the legacy LCT.

The fragment information (EXT_RTS) according to the embodiment may include Header Extension Type field (HET), Fragment Start Indicator field (SI), Fragment Header flag field (FH), and Fragment Header Complete Indicator field (FC).

Header Extension Type field (HET) may indicate the corresponding Header Extension type. The HET field may be an integer of 8 bits. Basically, if HET for use in LCT is in the range of 0 to 127, a variable-length header extension in units of a 32-bit word is present, and the length of HET is written in the Header Extension Length field (HEL) subsequent to HET. If HET is in the range of 128 to 255, Header Extension may have a fixed length of 32 bits.

The fragment information (EXT_RTS) according to the embodiment has a fixed length of 32 bits, such that the corresponding Header Extension type may be identified using one unique value from among the values of 128 to 255, and may identify the corresponding Header Extension type.

SI field may indicate that the corresponding ICT packet includes a start part of the fragment. If a user in the broadcast environment approaches a random access of a file through which the corresponding file-based multimedia content is transmitted, packets having "SI field=0" from among the initial reception packets are discarded, the packets starting from a packet having "SI field=1" starts parsing, so that the packet processing efficiency and the initial delay time can be reduced.

FH field may indicate that the corresponding LCT packet includes the fragment header part. As described above, the fragment header is characterized in that a generation order and a consumption order of the fragment header are different from those of the fragment payload. The broadcast signal reception apparatus according to the embodiment may rearrange transmission blocks sequentially received on the basis of the FH field according to the consumption order, so that it can regenerate the fragment.

FC field may indicate that the corresponding packet includes the last data of the fragment. For example, if the fragment header is transmitted after the fragment payload is first transmitted, the FC field may indicate inclusion of the last data of the fragment header. If the fragment header is first transmitted and the fragment payload is then transmitted, the FC field may indicate inclusion of the last data of the fragment payload. The following description will hereinafter disclose an exemplary case in which the fragment payload is first transmitted and the fragment is then transmitted.

If the broadcast signal reception apparatus receives the packet having "FC field=1", the broadcast signal reception apparatus may recognize reception completion of the fragment header, and may perform fragment recovery by combining the fragment header and the fragment payload.

Padding Bytes field (PB) may indicate the number of padding bytes contained in the corresponding LCT packet. In the legacy LCT, all LCT packets corresponding to one object must be identical to each other. However, when a transmission block (TB) is divided according to the data construction method, the last symbol of each TB may have a different length. Therefore, the broadcast signal transmission apparatus according to the embodiment fills a residual part of the packet with padding bytes, such that it can support the real-time file transmission using a fixed-length packet according to the method compatible with the legacy LCT.

Reserved field reserved for future use.

FIG. 31 illustrates a structure of an LCT packet according to another embodiment of the present invention.

Some parts of FIG. 31 are substantially identical to those of FIG. 30, and as such a detailed description thereof will herein be omitted, such that FIG. 31 will hereinafter be described centering on a difference between FIG. 30 and FIG. 31.

Referring to FIG. 31, fragment information (EXT_RTS) according to another embodiment may include a Fragment Header Length field (FHL) instead of the FC field shown in FIG. 30.

FHL field indicates the number of constituent symbols of the fragment, so that it can provide specific information as to whether reception of the fragment is completed. The FHL field may indicate a total number of symbols corresponding to respective fragments including the fragment header and the fragment payload. In addition, the FHL field may indicate a total number of symbols to be transmitted later from among the fragment header and the fragment payload.

For example, if the fragment payload is first transmitted and the fragment header is then transmitted, the FHL field may indicate a total number of symbols corresponding to the fragment header. In this case, the FHL field may indicate the length of the fragment header.

If the fragment header is first transmitted and the fragment payload is then transmitted, the FHL field may indicate a total number of symbols corresponding to the fragment payload. In this case, the FHL field may indicate the length of the fragment payload.

The following description will hereinafter disclose an exemplary case in which the fragment payload is first transmitted and the fragment header is then transmitted.

The broadcast signal reception apparatus according to another embodiment may receive the LCT packet including the fragment header corresponding to the number of symbols displayed on the FHL field. The broadcast signal reception apparatus checks the number of reception times of the LCT packet including the fragment header, so that it can identify reception completion of the fragment header. Alternatively, the broadcast signal reception apparatus checks the number of TBs corresponding to the fragment header, so that it can identify reception completion of the fragment header.

<Method for Identifying Segmentation Generation and Segmentation Consumption Information of File>

FIG. 32 illustrates real-time broadcast support information signaling based on FDT according to an embodiment of the present invention.

Referring to FIG. 32, the present invention relates to a method for identifying segmentation generation and segmentation consumption information of file-based multimedia content in a real-time broadcast environment. The segmentation generation and segmentation consumption information of the file-based multimedia content may include the above-mentioned data structure and LCT packet information.

The broadcast signal transmission apparatus may further transmit additional signalling information so as to identify segmentation generation information and segmentation consumption information of the file. For example, the signalling information may include metadata ad out-of-band signaling information.

A method for transmitting signaling information regarding the real-time broadcast support information according to the embodiment is shown in FIG. 32.

The broadcast signal transmission apparatus according to the embodiment may transmit signaling information either through a File Delivery Table (FDT) level or through a file-level Real-Time-Support attribute. If Real-Time-Support is set to 1, objects written in the corresponding FDT level or File level may include the abovementioned data structure and packet information, such that file segmentation generation and consumption in the real-time broadcast environment can be indicated.

Figure 33:
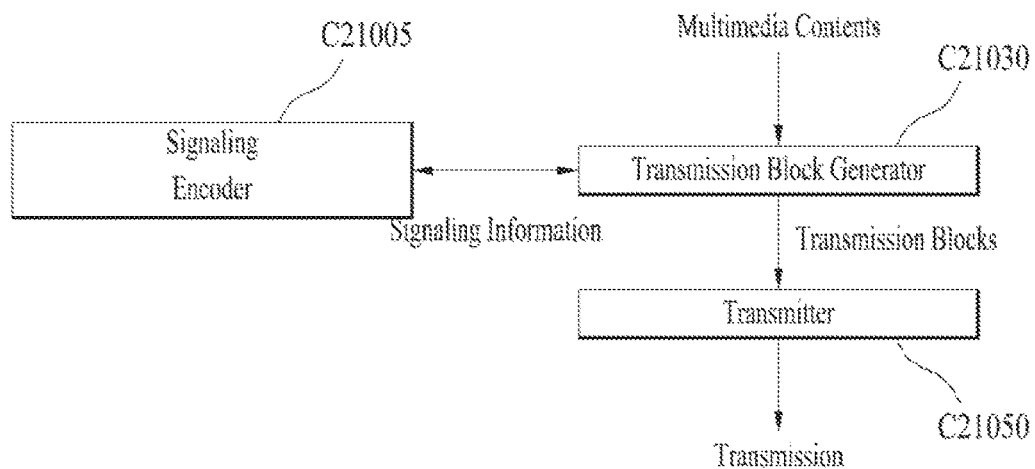
FIG. 33 is a block diagram illustrating a broadcast signal transmission apparatus according to an embodiment of the present invention.

FIG. 33 is a block diagram illustrating a broadcast signal transmission apparatus according to an embodiment of the present invention.

Referring to FIG. 33, the broadcast signal transmission apparatus for transmitting broadcast signals including multimedia content using the broadcast network may include a signaling encoder C21005, a Transmission Block Generator C21030, and/or a Transmitter C21050.

The signaling encoder C21005 may generate signaling information. The signaling information may indicate whether multimedia content will be transmitted in real time. The signaling information may indicate that the above-mentioned multimedia content is transmitted from among at least one of the file level and the FDT level in real time. When the signaling information indicates that multimedia content is transmitted at a power level in real time, all data belonging to the corresponding file can be transmitted in real time. When the signaling information indicates that multimedia content is transmitted at an FDT level in real time, all files or data belonging to the corresponding FDT can be transmitted in real time.

If the signaling information indicates real-time transmission of the multimedia content, the Transmission Block Generator C21030 may divide the file contained in the multimedia content into one or more TBs corresponding to data that is independently encoded and transmitted.

The transmitter C21050 may transmit the transmission block (TB).

A detailed description thereof will hereinafter be described with reference to FIG. 34.

Figure 34:
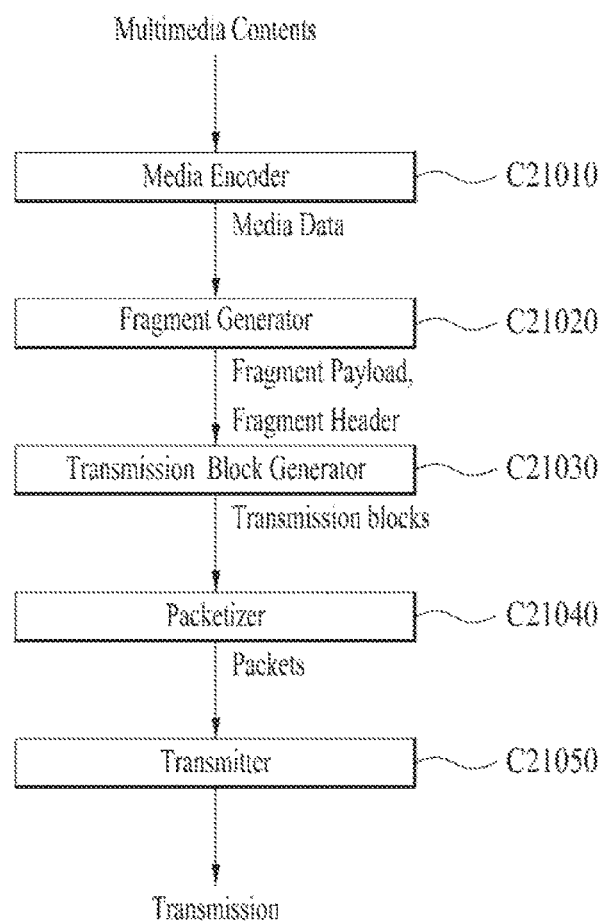
FIG. 34 is a block diagram illustrating a broadcast signal transmission apparatus according to an embodiment of the present invention.

FIG. 34 is a block diagram illustrating a broadcast signal transmission apparatus according to an embodiment of the present invention.

Referring to FIG. 34, the broadcast signal transmission apparatus for transmitting broadcast signals including multimedia content using the broadcast network according to the embodiment may include a signaling encoder (not shown), a Media Encoder C21010, a Fragment Generator C21020, a Transmission Block Generator C21030, a Packetizer C21040, and/or a Transmitter C21050.

The signaling encoder (not shown) may generate signaling information. The signaling information may indicate whether multimedia content will be transmitted in real time.

Media Encoder C21010 may encode multimedia content so that it can generate media data using the encoded multimedia content. Hereinafter, the term "media data" will be referred to as data.

Fragment Generator C21020 may segment each file constructing the multimedia content, so that it can generate at least one fragment indicating a data unit that is independently encoded and reproduced.

Fragment Generator C21020 may generate the fragment payload constructing each fragment and then generate the fragment header.

Fragment Generator C21020 may buffer media data corresponding to the fragment payload. Thereafter, the Fragment Generator C21020 may generate a chunk corresponding to the fragment payload on the basis of the buffered media data. For example, the chunk may be a variable-sized data unit composed of the same media data as in GOP of video data.

If generation of the chunk corresponding to the fragment payload is not completed, the Fragment Generator C21020 continuously buffers the media data, and completes generation of the chunk corresponding to the fragment payload.

Fragment Generator C21020 may determine whether data corresponding to the fragment payload is generated as a chunk whenever the chunk is generated.

If the chunk corresponding to the fragment payload is completed generated, Fragment Generator C21020 may generate the fragment header corresponding to the fragment payload.

Transmission Block Generator C21030 may generate at least one TB indicating a data unit that is encoded and transmitted through fragment segmentation.

The transmission block (TB) according to the embodiment may indicate a minimum data unit that is independently encoded and transmitted without depending on the preceding data. For example, the TB may include one or more chunks composed of the same media data as in GOP of video data.

Transmission Block Generator C21030 may first transmit the TB corresponding to the fragment payload, and may generate the TB corresponding to the fragment header.

Transmission Block Generator C21030 may generate as a single TB. However, the scope or spirit of the present invention is not limited thereto, and the Transmission Block Generator C21030 may generate the fragment header as one or more TBs.

For example, if Fragment Generator C21020 generates the fragment payload constructing each fragment and then generates the fragment header, the Transmission Block Generator C21030 generates the transmission block (TB) corresponding to the fragment payload and then generates the TB corresponding to the fragment header.

However, the scope or spirit of the present invention is not limited thereto. If the fragment header and the fragment payload for the multimedia content are generated, the TB corresponding to the fragment header may be first generated and the TB corresponding to the fragment payload may be generated.

Transmission Block Generator C21030 may generate a transmission block (TB) corresponding to the fragment payload and a TB corresponding to the fragment header as different TBs.

Packetizer C21040 may divide the TB into one or more equal-sized symbols, so that the one or more symbols may be packetized into at least one packet. However, the scope or spirit of the present invention is not limited thereto, and the symbols may also be generated by other devices. In accordance with the embodiment, the symbols may have the same length. However, the last symbol of each TB may be less in length than other symbols.

Thereafter, Packetizer C21040 may packetize at least one symbol into one or more packets. For example, the packet may be an LCT packet. The packet may include a packet header and a packet payload.

The packet header may include fragment information having specific information regarding file segmentation generation and segmentation consumption. The file segmentation generation may indicate that data is divided into at least one chunk or at least one TB capable of independently encoding/transmitting the file constructing the multimedia content. The file segmentation consumption may indicate that at least one fragment capable of performing independent decoding/reproducing by combination of at least one TB is recovered and is reproduced on a fragment basis. In addition, segmentation consumption of the file may include data that is reproduced on a TB basis.

For example, the fragment information may include at least one of an SI field indicating that a packet includes initial data of the fragment, an FH field indicating that a packet includes header data, fragment completion information indicating that generation of a TB corresponding to each fragment is completed, and a PB field indicating the number of padding bytes contained in a packet.

The fragment information may further include a Header Extension Type (HET) field indicating the type of a Header Extension of the corresponding packet.

The fragment completion information may include at least one of the FC field indicating that a packet includes the last data of the fragment header and the FHL field indicating a total number of symbols corresponding to the fragment header.

The fragment information may be generated by Packetizer C21040, and may be generated by a separate device. The following description will hereinafter described on the basis of an exemplary case in which the packetizer C21040 generates the fragment information.

Packetizer C21040 may identify whether the generated symbol includes first data of the fragment.

For example, the packetizer C21040 may identify whether the generated symbol has first data of the fragment payload. If the generated symbol has first data of the fragment payload, the SI field may be set to 1. If the generated symbol does not have first data of the fragment payload, the SI field may be set to zero '0'.

Packetizer C21040 may identify whether the generated symbol has data of the fragment payload or data of the fragment header.

For example, if the generated symbol has data of the fragment payload, the FH field may be set to 1. If the generated symbol does not have data of the fragment payload, the FH field may be set to zero '0'.

Packetizer C21040 may identify whether generation of a TB corresponding to each fragment is completed. If fragment completion information indicating generation completion of a TB corresponding to each fragment may include the FC field indicating inclusion of the last data of the fragment header.

For example, if the generated symbol has data of the fragment header and is the last symbol of the corresponding TB, the FC field may be set to 1. If the generated symbol does not have data of the fragment header is not identical to the last symbol of the corresponding TB, the FC field may be set to zero '0'.

Packetizer C21040 may identify whether the generated symbol is the last symbol of the corresponding TB and has a length different from that of another symbol. For example, another symbol may be a symbol having a predetermined length, and the symbol having a different length from other symbols may be shorter in length than other symbols.

For example, if the generated symbol is the last symbol of the corresponding TB and has a different length from other symbols, the packetizer C21040 may insert the padding bytes into a packet corresponding to the last symbol of each TB. The packetizer C21040 may calculate the number of padding bytes.

In addition, the PB field may indicate the number of padding bytes. The padding byte is added to each symbol having a shorter length than other symbols in such a manner that all symbols may have the same length. Alternatively, the padding bytes may be the remaining parts other than symbols of the packet.

If the generated symbol is not identical to the last symbol of the corresponding TB or has a different length from other symbols, the PB field may be set to zero '0'.

The packet payload may include at least one symbol. The following description will hereinafter disclose an exemplary case in which one packet includes one symbol.

The packet having the last symbol of each TB may include at least one padding byte.

Transmitter C21050 may transmit one or more packet in the order of TB generation.

For example, the transmitter C21050 may first transmit the TB corresponding to the fragment payload, and then transmit the TB corresponding to the fragment header.

However, the scope or spirit of the present invention is not limited thereto. If the fragment header and the fragment payload are pre-generated for multimedia content, the transmitter C21050 according to the embodiment may first transmit the TB corresponding to the fragment header, and then transmit the TB corresponding to the fragment payload.

Figure 35:
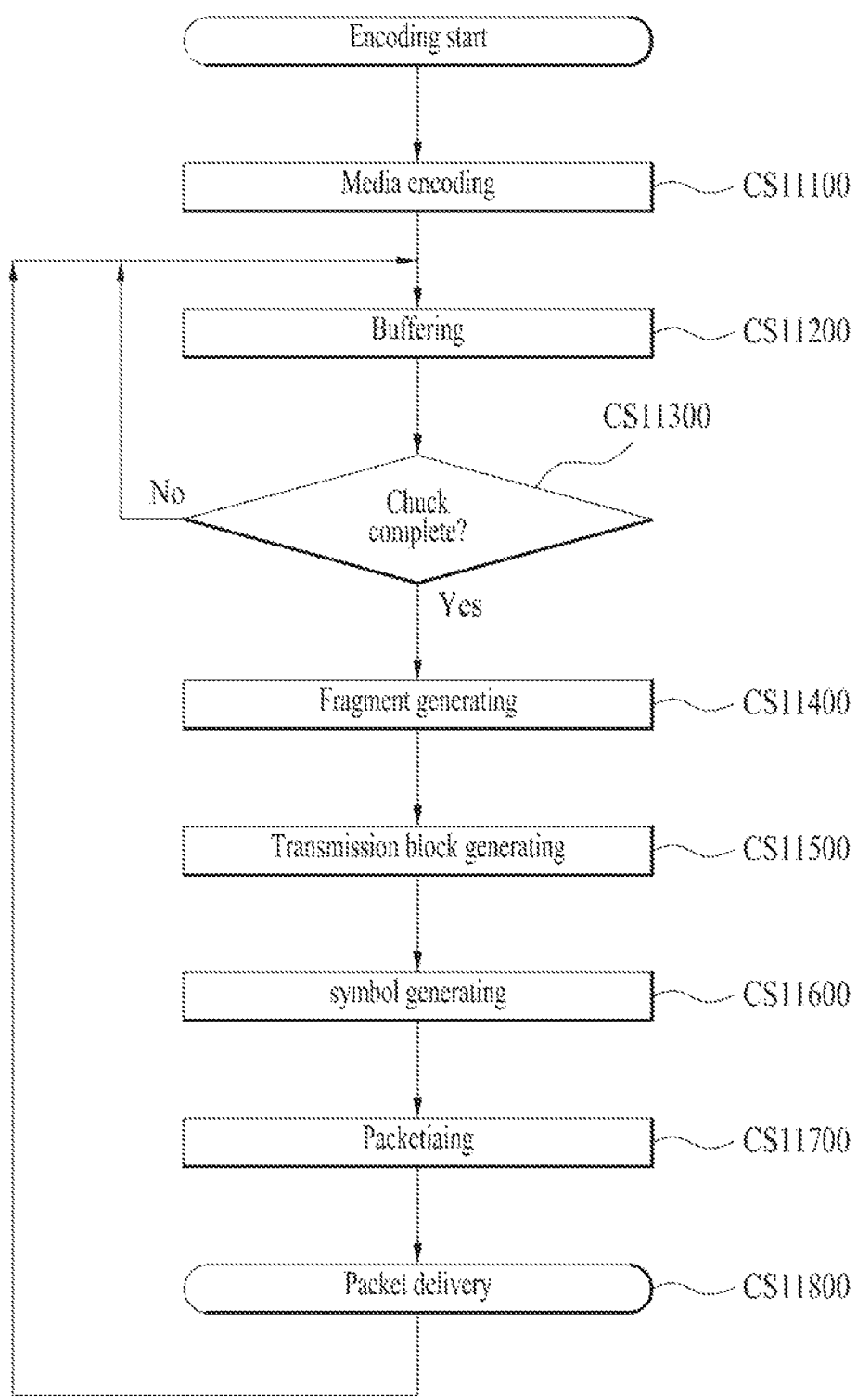
FIG. 35 is a flowchart illustrating a process for generating and transmitting in real time the file-based multimedia content according to an embodiment of the present invention.

FIG. 35 is a flowchart illustrating a process for generating and transmitting in real time the file-based multimedia content according to an embodiment of the present invention.

FIG. 35 is a flowchart illustrating a method for transmitting broadcast signals using the above-mentioned broadcast signal transmission apparatus shown in FIG. 34.

Referring to FIG. 35, the broadcast signal transmission apparatus according to the embodiment may encode multimedia content using the Media Encoder C21010 in step CS11100. The broadcast signal transmission apparatus may encode multimedia content and then generate media data.

Thereafter, the broadcast signal transmission apparatus may perform buffering of media data corresponding to the fragment payload in step CS11200. The broadcast signal transmission apparatus may generate a chunk corresponding to the fragment payload on the basis of the buffered media data.

If generation of the chunk corresponding to the fragment payload is not completed, the broadcast signal transmission apparatus continuously perform buffering of media data, and then completes generation of the chunk corresponding to the fragment payload in step CS11300.

Thereafter, the broadcast signal transmission apparatus may divide each file constructing the multimedia content using the fragment generator C21020, such that it may generate at least one fragment indicating a data unit that is independently decoded and reproduced in step CS11400.

The broadcast signal transmission apparatus may generate the fragment payload constructing each fragment, and then generate the fragment header.

The broadcast signal transmission apparatus may determine whether all data corresponding to the fragment payload is generated as a chunk whenever the chunk is generated.

If generation of the chunk corresponding to the fragment payload is completed, the broadcast signal transmission apparatus may generate the fragment header corresponding to the fragment payload.

The broadcast signal transmission apparatus divides the fragment using the transmission block generator C21030, so that it can generate at least one TB indicating a data unit that is independently encoded and transmitted in step CS11500.

For example, when the fragment header is generated after the fragment payload constructing each fragment has been generated, the broadcast signal transmission apparatus may generate the TB corresponding to the fragment payload and then generate the TB corresponding to the fragment header.

The broadcast signal transmission apparatus may generate a TB corresponding to the fragment payload and a TB corresponding to the fragment header as different TBs.

Thereafter, the broadcast signal transmission apparatus may divide the TB into one or more equal-sized symbols using the packetizer C21040, and may packetize at least one symbol into at least one packet in steps CS11600 and CS11700.

A method for generating a packet using the broadcast signal transmission apparatus has already been disclosed in FIG. 35, and as such a detailed description thereof will herein be omitted for convenience of description.

Thereafter, the broadcast signal transmission apparatus may control the transmitter C21050 to transmit one or more packets in the order of TB generation.

Figure 36:
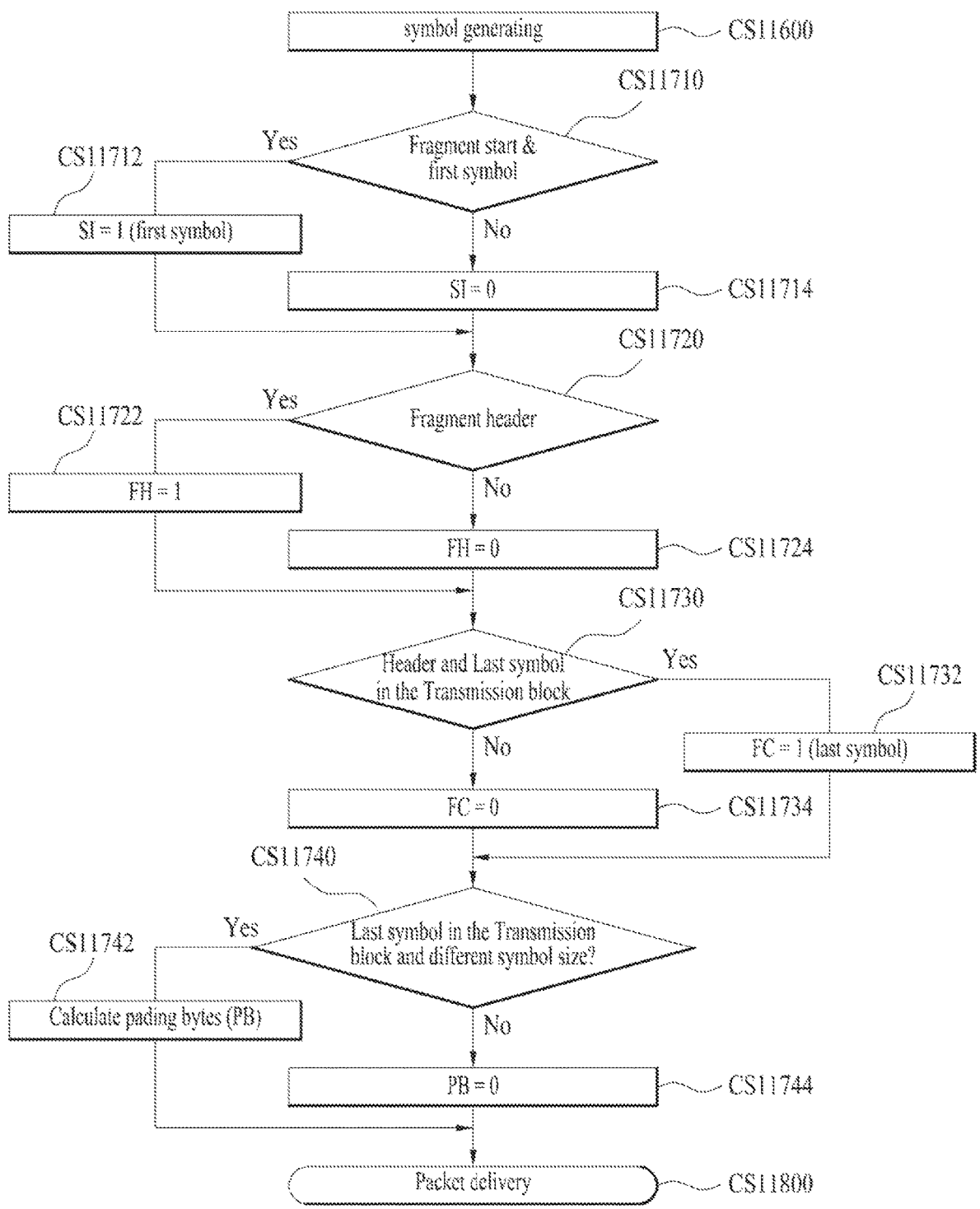
FIG. 36 is a flowchart illustrating a process for allowing the broadcast signal transmission apparatus to generate packets using a packetizer according to an embodiment of the present invention.

FIG. 36 is a flowchart illustrating a process for allowing the broadcast signal transmission apparatus to generate packets using a packetizer according to an embodiment of the present invention.

Referring to FIG. 36, the broadcast signal transmission apparatus may identify whether the generated symbol has first data of the fragment in step CS11710.

For example, if the generated symbol has first data of the fragment payload, the SI field may be set to 1 in step CS11712. If the generated symbol does not include first data of the fragment payload, the SI field may be set to zero '0' in step CS11714.

Thereafter, the broadcast signal transmission apparatus may identify whether the generated symbol has data of the fragment payload or data of the fragment header in step CS11720.

For example, if the generated symbol has data of the fragment payload, the FH field may be set to 1 in step CS11722. If the generated symbol does not have data of the fragment payload, the FH field may be set to zero '0' in step CS11724.

The broadcast signal transmission apparatus may identify whether generation of the TB corresponding to each fragment is completed in step CS11730.

For example, if the generated symbol has data of the fragment header and is the last symbol of the corresponding TB, the FC field may be set to 1 in step CS11732. If the generated symbol does not have data of the fragment header or is not identical to the last symbol of the corresponding TB, the FC field may be set to zero '0' in step CS11734.

Thereafter, the broadcast signal transmission apparatus may identify whether the generated symbol is the last symbol of the corresponding TB and has a different length from other symbols in step CS11740.

For example, if the generated symbol is the last symbol of the corresponding TB and has a different length from other symbols, the broadcast signal transmission apparatus may insert the padding bytes into a packet corresponding to the last symbol of each TB. The broadcast signal transmission apparatus may calculate the number of padding bytes in step CS11742. The PB field may indicate the number of padding bytes.

If the generated symbol is not identical to the last symbol of the corresponding TB or has a different length from other symbols, the PB field may be set to zero '0' in step CS11744.

The packet payload may include at least one symbol.

Figure 37:
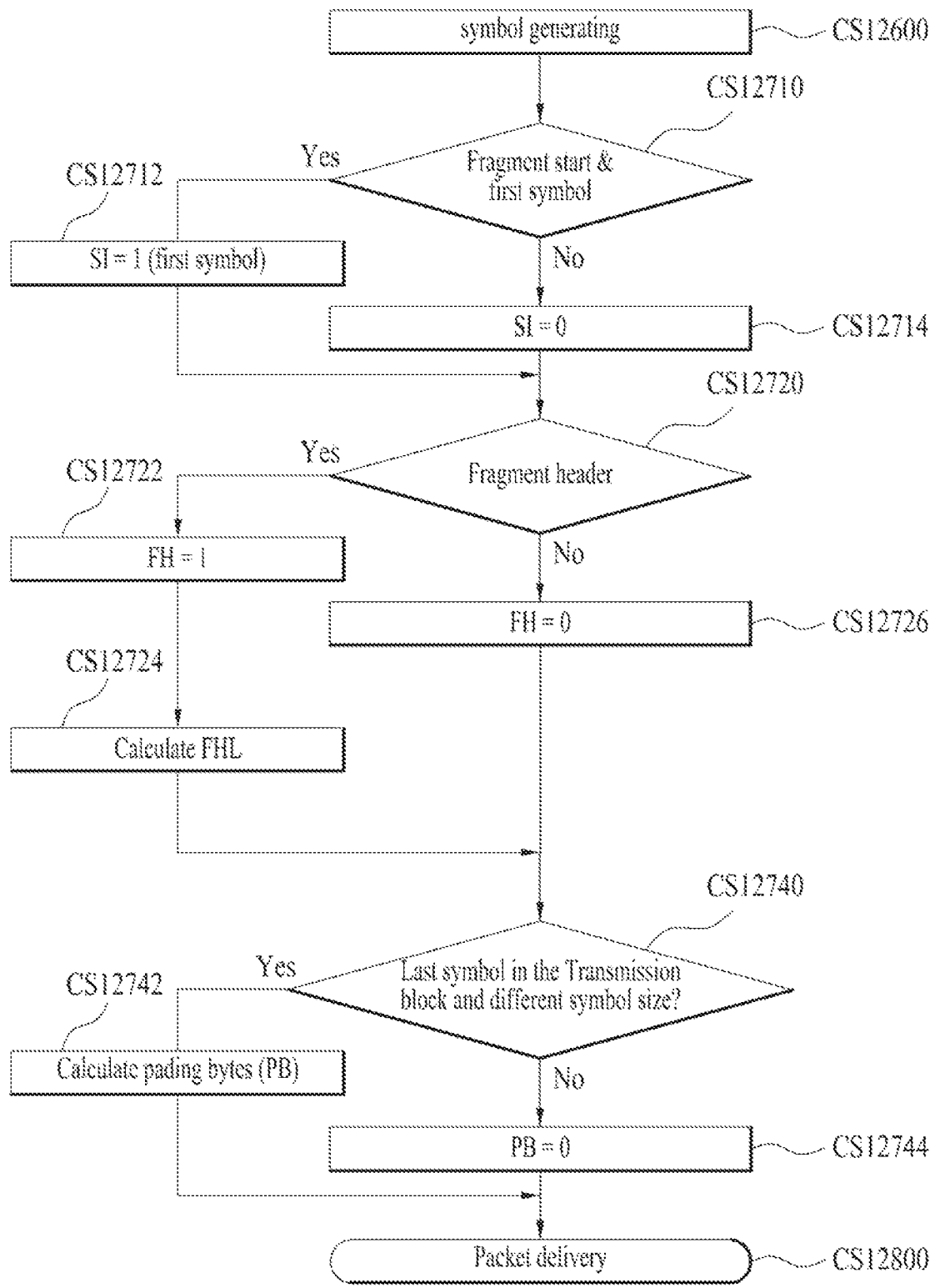
FIG. 37 is a flowchart illustrating a process for generating/transmitting in real time the file-based multimedia content according to another embodiment of the present invention.

FIG. 37 is a flowchart illustrating a process for generating/transmitting in real time the file-based multimedia content according to another embodiment of the present invention.

Referring to FIG. 37, contents shown in FIGS. 35 and 36 from among all contents of FIG. 37 are substantially identical to each other, and as such a detailed description thereof will herein be omitted for convenience of description.

In accordance with another embodiment, the broadcast signal transmission apparatus may use the FHL field instead of the FC field. For example, the above-mentioned fragment information may include fragment completion information indicating generation completion of a TB corresponding to each fragment. The fragment completion information may include the FHL field indicating a total number of symbols corresponding to the fragment header.

The broadcast signal transmission apparatus according to the embodiment may calculate the number of symbols corresponding to the TB including data of the fragment header, and may record the calculated result in the FHL field in step CS12724.

The FHL field may indicate the length of a fragment header as a total number of symbols corresponding to the fragment header. The FHL field may be contained in the fragment information instead of the above-mentioned FC field in such a manner that the broadcast signal reception apparatus can identify reception completion of the fragment header.

The broadcast signal reception apparatus according to the embodiment checks the number of transmission times of a packet including as many fragment headers as the number of data pieces recorded in the FHL field, so that it can identify whether or not the fragment header is received.

Figure 38:
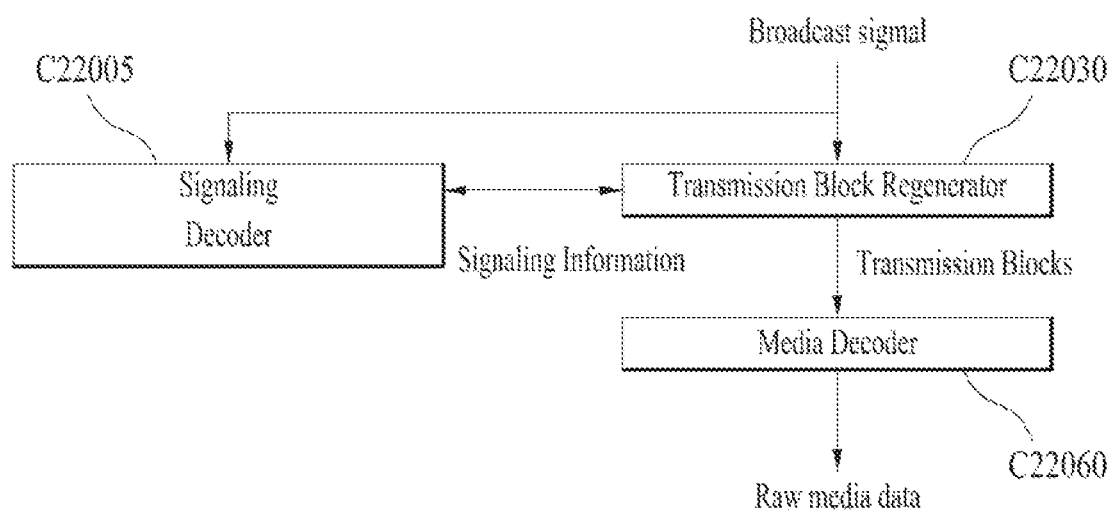
FIG. 38 is a block diagram illustrating a file-based multimedia content receiver according to an embodiment of the present invention.

FIG. 38 is a block diagram illustrating a file-based multimedia content receiver according to an embodiment of the present invention.

Referring to FIG. 38, the broadcast signal reception apparatus for transmitting a broadcast signal including multimedia content using the broadcast network may include a receiver (not shown), a signaling decoder 22005, a Transmission Block Regenerator C22030, and/or a Media Decoder C22060.

The signaling decoder C22005 may decode signaling information. The signaling information may indicate whether the multimedia content will be transmitted in real time.

If the signaling information indicates real-time transmission of the multimedia content, Transmission Block Regenerator C22030 combines broadcast signals, so that it can recover at least one TB indicating a data unit that is independently encoded and transmitted.

Media Decoder C22060 may decode the TB.

A detailed description thereof will hereinafter be described with reference to FIG. 39.

Figure 39:
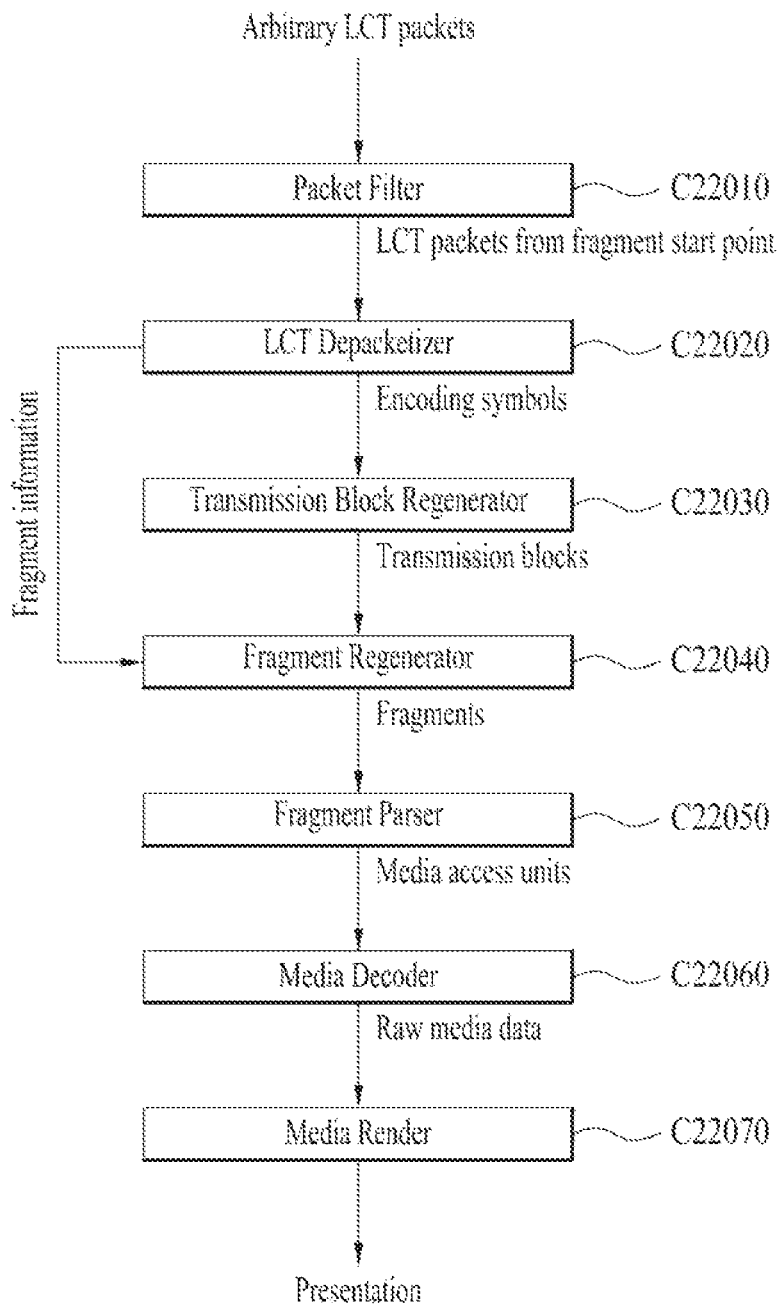
FIG. 39 is a block diagram illustrating a file-based multimedia content receiver according to an embodiment of the present invention.

FIG. 39 is a block diagram illustrating a file-based multimedia content receiver according to an embodiment of the present invention.

Referring to FIG. 39, the broadcast signal reception apparatus according to the embodiment may include a receiver (not shown), a signaling decoder (not shown), a Packet Filter C22010, a Packet Depacketizer C22020, a Transmission Block Regenerator C22030, a Fragment Regenerator C22040, a Fragment Parser C22050, a Media Decoder C22060, and/or a Media Renderer C22070.

The receiver (not shown) may receive a broadcast signal. The broadcast signal may include at least one packet. Each packet may include a packet header including fragment information and a packet payload including at least one symbol.

The signaling decoder C22005 may decode signaling information. The signaling information may indicate whether the multimedia content will be transmitted in real time. Packet Filter C22010 may identify a fragment start time starting from at least one packet received at an arbitrary time, and may start packet processing from the fragment start time.

Packet Filter C22010 may identify the fragment start time on the basis of the SI field of fragment information contained in the packet.

If Packet Filter C22010 indicates that the corresponding packet includes a start part of the fragment, the previous packets of the corresponding packet are discarded and some packets starting from the corresponding packet may be transmitted to the packet depacketizer C22020.

For example, the packet filter C22010 discards the previous packets, each of which is set to 1, and some packet starting from the corresponding packet that is set to 1 may be filtered.

The packet depacketizer C22020 may depacketize at least one packet, and may extract fragment information contained in the fragment header and at least one symbol contained in the packet payload.

Transmission Block Regenerator C22030 may combine packets so that it can recover at least one TB indicating a data unit that is independently encoded and transmitted. The recovered TB may include data corresponding to the fragment header, and may include data corresponding to the fragment payload.

Fragment Regenerator C22040 combines at least one TB, completes recovery of the fragment header and the fragment payload, and combines the fragment header and the fragment payload, so that the fragment regenerator C22040 may recover the fragment indicating a data unit that is independently decoded and reproduced.

Fragment Regenerator C22040 combines the TB on the basis of fragment information, so that the fragment regenerator C22040 may recover the fragment payload and the fragment header.

Fragment Regenerator C22040 may first recover the fragment payload in the order of reception packets, and may recover the fragment header. If the FH field indicates that the packet has data of the fragment header, the fragment regenerator C22040 may combine at least one TB corresponding to the fragment header so that it recovers the fragment header according to the combined result.

If the FH field indicates that the packet does not include data of the fragment header, the Fragment Regenerator C22040 may recover the fragment payload by combining at least one TB.

For example, if the FH field is set to zero '0', the Fragment Regenerator C22040 may determine fragment payload so that it can recover the fragment payload. If the FH field is set to 1, the fragment regenerator C22040 determines the fragment header so that it can recover the fragment header.

Thereafter, if Fragment Regenerator C22040 completes recovery of the fragment payload and the fragment header corresponding to each fragment, the recovered fragment payload and the recovered fragment header are combined so that the fragment is recovered.

There are two methods for allowing the fragment regenerator C22040 to determine whether recovery of the fragment payload and the fragment header corresponding to each fragment has been completed.

The first method is to use the FC field contained in the fragment information.

The fragment completion information may include the FC field indicating that the packet has the last data of the fragment header. If the FC field indicates that the packet has the last data of the fragment header, the Fragment Regenerator C22040 determines that the fragment header constructing each fragment and the fragment payload have been received, and can recover the fragment header and the fragment payload.

For example, if the fragment payload constructing each fragment is first received and the fragment header is then received, the FC field may indicate that the corresponding packet includes the last data of the fragment header.

Therefore, if the FC field indicates that the corresponding packet has the last data of the fragment header, the Fragment Regenerator C22040 may recognize reception completion of the fragment header and may recover the fragment header. Thereafter, the Fragment Regenerator C22040 may combine the fragment header and the fragment payload so as to recover the fragment.

If the FC field indicates that the corresponding packet has the last data of the fragment header, the broadcast signal reception apparatus may repeat a process for recovering the transmission block (TB).

For example, if the FC field is not set to 1, the broadcast signal reception apparatus may repeat the recovery process of the TB. If the FC field is set to 1, the Fragment Regenerator C22040 may recover the fragment by combination of the fragment header and the fragment payload.

The second method can determine whether recovery of the fragment payload constructing each fragment and the fragment header has been completed on the basis of the FHL field contained in the fragment information.

The Fragment Regenerator C22040 may count the number of packets including data of the fragment header.

The fragment completion information may further include the FHL field indicating a total number of symbols corresponding to the fragment header. If the value recorded in the FHL field is identical to the number of packets having data of the fragment header, the Fragment Regenerator C22040 may recover the fragment header and the fragment payload.

A detailed description of a method for allowing the fragment regenerator C22040 to use the FHL field is shown in FIG. 39.

Fragment Parser C22050 may parse the recovered fragment. Since the fragment header is located at the front of the recovered fragment and the fragment payload is located at the rear of the recovered fragment, the Fragment Parser C22050 may first parse the fragment header and then parse the fragment payload.

Fragment Parser C22050 may parse the recovered fragment so that it can generate at least one media access unit. For example, the media access unit may include at least one media data. The media access unit may have a unit of media data having a predetermined size.

Media Decoder C22060 may decode the fragment. Media Decoder C22060 may decode at least one media access unit so as to generate media data.

Media Renderer C22070 may render the decoded media data so as to perform presentation.

Figure 40:
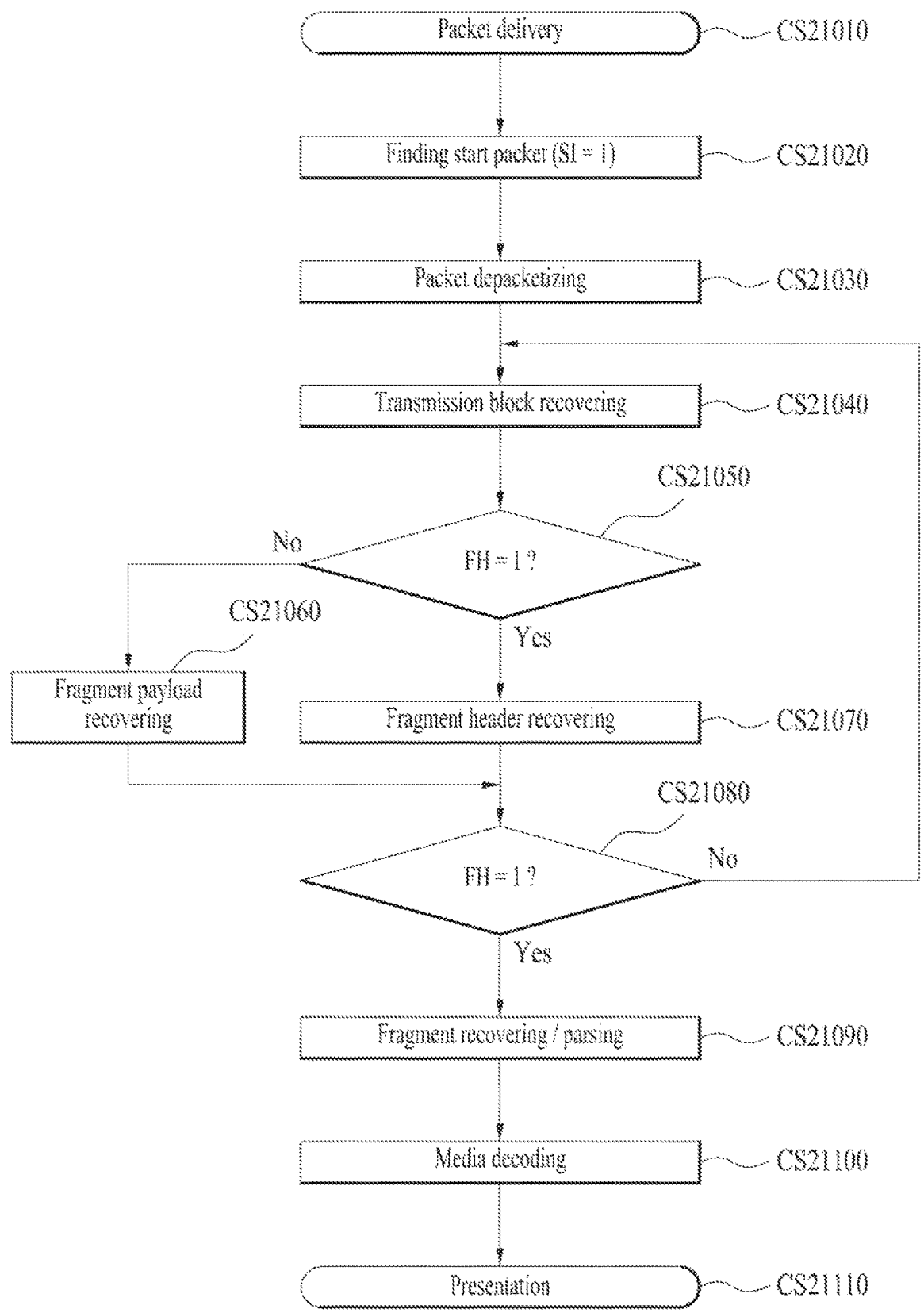
FIG. 40 is a flowchart illustrating a process for receiving/consuming a file-based multimedia content according to an embodiment of the present invention.

FIG. 40 is a flowchart illustrating a process for receiving/consuming a file-based multimedia content according to an embodiment of the present invention.

Contents shown in FIG. 39 can be equally applied to the broadcast signal reception method according to the embodiment.

Referring to FIG. 40, a broadcast signal reception method for receiving multimedia content including at least one file includes: receiving the multimedia content divided into at least one packet; recovering at least one TB indicating a data unit that is independently encoded and transmitted by packet combination; and completing recovery of the fragment header and the fragment payload by combination of one or more TBs, recovering a fragment indicating a data unit that is independently encoded and reproduced by combination of the fragment header and the fragment payload, and/or performing fragment decoding.

The broadcast signal reception apparatus according to the embodiment may receive a broadcast signal using the receiver (not shown) in step S21010. The broadcast signal may include at least one packet.

Thereafter, the broadcast signal reception apparatus according to the embodiment may control the packet filter C22010 to identify a fragment start time from at least one packet received at an arbitrary time in step CS21020.

Thereafter, the broadcast signal reception apparatus according to the embodiment may depacketize at least one packet using the packet depacketizer C22020, so that it can extract at least one symbol contained in the fragment information and packet payload contained in the packet header in step CS21030.

Thereafter, the broadcast signal reception apparatus combines packets using the transmission block regenerator C22030, so that it can recover at least one TB indicating a data unit that is independently encoded and transmitted in step CS21040. The reproduced TB may include data corresponding to the fragment header, and may include data corresponding to the fragment payload.

The broadcast signal reception apparatus according to the embodiment may control the fragment regenerator C22040 to identify whether the TB reproduced on the basis of fragment information is a TB corresponding to the fragment header and a TB corresponding to the fragment payload in step CS21050.

Thereafter, the broadcast signal reception apparatus may combine the recovered TB so that it can recover the fragment payload and the fragment header.

If the FH field indicates that the packet does not include data of the fragment header, the broadcast signal reception apparatus combines at least one TB corresponding to the fragment payload so that it can recover the fragment payload in step CS21060.

If the FH field indicates that the packet has data of the fragment header, the broadcast signal reception apparatus may recover the fragment header by combination of at least one TB corresponding to the fragment header in step CS21070.

The broadcast signal reception apparatus may determine whether the fragment payload constructing each fragment and the fragment header on the basis of the FC field contained in fragment information have been completely recovered in step CS21080.

If the FC field indicates that the corresponding packet does not have the last data of the fragment header, the broadcast signal reception apparatus may repeat the TB recovery process.

If the FC field indicates that the corresponding packet has the last data of the fragment, the broadcast signal reception apparatus may determine reception completion of each fragment.

For example, if the fragment header is received after the fragment payload constructing each fragment is first received, the FC field may indicate that the corresponding packet has the last data of the fragment header.

Therefore, if the FC field indicates that the packet has the last data of the fragment header, the broadcast signal reception apparatus determines that the fragment header constructing each fragment and the fragment payload have been completely received, so that it can recover the fragment header and the fragment payload.

If the FC field indicates that the corresponding packet does not have the last data of the fragment header, the broadcast signal reception apparatus may repeat the TB recovery process.

Thereafter, the broadcast signal reception apparatus may combine at least one TB using the Fragment Regenerator C22040 to complete recovery of the fragment header and the fragment payload, and may combine the fragment header and the fragment payload to recover the fragment indicating a data unit that is independently decoded and reproduced in step C S21090.

The broadcast signal reception apparatus according to the embodiment may parse the recovered fragment using the fragment parser C22050 in step CS21090. The broadcast signal reception apparatus parses the recovered fragment so that it can generate at least one media access unit. However, the scope or spirit of the present invention is not limited thereto, and the broadcast signal reception apparatus parses the TB so that it can generate at least one media access unit.

Thereafter, the broadcast signal reception apparatus according to the embodiment may decode at least one media access unit using the media decoder C22060, so that it can generate media data in step CS21100.

The broadcast signal reception apparatus according to the embodiment may perform rendering of the decoded media data using the media renderer C22070 so as to perform presentation in step CS21110.

Figure 41:
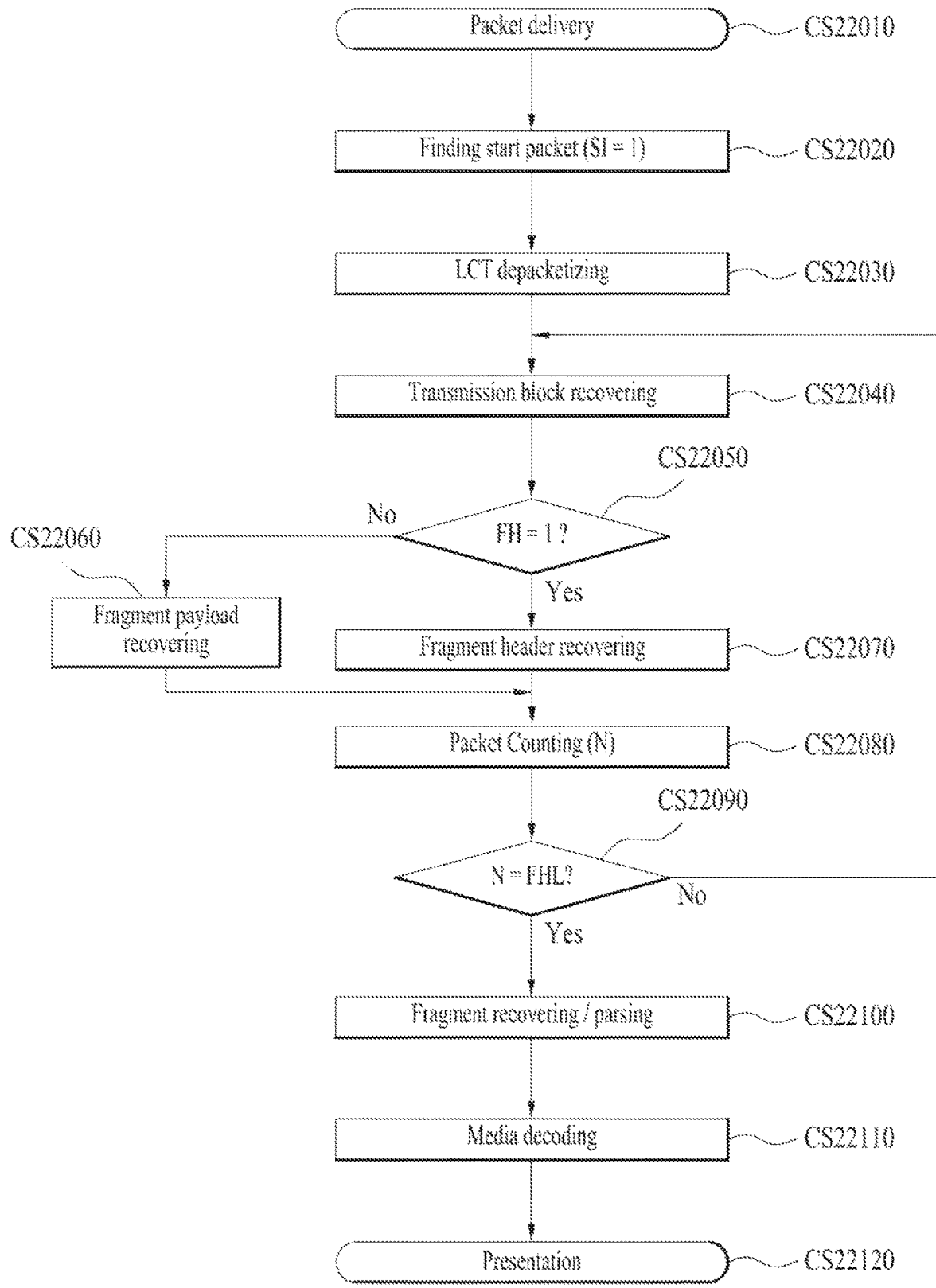
FIG. 41 is a flowchart illustrating a process for receiving/consuming in real time a file-based multimedia content according to another embodiment of the present invention.

FIG. 41 is a flowchart illustrating a process for receiving/consuming in real time a file-based multimedia content according to another embodiment of the present invention.

Referring to FIG. 41, some parts of FIG. 41 are substantially identical to those of FIG. 40, and as such a detailed description thereof will herein be omitted.

The broadcast signal reception apparatus according to the embodiment may determine whether the fragment header and the fragment payload constructing each fragment have been completely received on the basis of the FHL field.

The broadcast signal reception apparatus according to the embodiment may allow the fragment regenerator C22040 to identify whether the TB recovered on the basis of fragment information is a TB corresponding to the fragment header or a TB corresponding to the fragment payload in step CS22050.

Thereafter, the broadcast signal reception apparatus combines the recovered TBs so that it can recover each of the fragment payload and the fragment header.

If the FH field indicates that the corresponding packet has data corresponding to the fragment payload, the broadcast signal reception apparatus may combine at least one TB so that it can recover the fragment payload in step CS22060.

If the FH field indicates that the corresponding packet has data corresponding to the fragment header, the Fragment Regenerator C22040 may recover the fragment header by combination of at least one TB in step CS22070.

Thereafter, if the broadcast signal reception apparatus completes recovery of the fragment payload constructing each fragment and the fragment header, the fragment signal reception apparatus may recover the fragment by combination of the recovered fragment payload and the fragment header.

The broadcast signal reception apparatus may determine whether the fragment payload constructing each fragment and the fragment header have been completely reproduced on the basis of the FHL field contained in fragment information.

The broadcast signal reception apparatus may count the number (N) of packets constructing each fragment in step CS22080. For example, the broadcast signal reception apparatus may count the number of packets each having data of the fragment header. One packet may include at least one symbol, and the following description will hereinafter describe an exemplary case in which one packet includes one symbol.

The FHL field may indicate the number of symbols constructing the fragment. If as many packets as the number of symbols recorded in the FHL field are not received, the broadcast signal reception apparatus may repeat the TB recovery process. For example, if reception of the fragment payload constructing each fragment and the fragment header is not completed, the broadcast signal reception apparatus may repeat the TB recovery process.

Fragment completion information may further include the FHL field indicating a total number of symbols corresponding to the fragment header.

If the value recorded in the FHL field is identical to the number of packets, the broadcast signal reception apparatus determines that the fragment payload constructing each fragment and the fragment header have been completely received, and then recovers the fragment header and the fragment payload in step CS22090.

For example, the FHL field may indicate a total number of symbols corresponding to each fragment including both the fragment header and the fragment payload. In this case, if as many packets as the number of symbols recorded in the FHL field are received, the broadcast signal reception apparatus can determine that the fragment payload constructing each fragment and the fragment header have been completely received.

For example, the FHL field may indicate a total number of symbols to be transmitted later from among the fragment header and the fragment payload.

If the fragment payload constructing each fragment is first received and the fragment header is then received, the FHL field may indicate a total number of symbols corresponding to the fragment header. In this case, the number of symbols recorded in the FHL field is identical to the number of packets corresponding to the received fragment header, the broadcast signal reception apparatus may determine that the fragment payload constructing each fragment and the fragment header have been completely received.

In addition, if the fragment header constructing each fragment is first received and the fragment payload is then received, the FHL field may indicate a total number of symbols corresponding to the fragment payload. In this case, if the number of symbols recorded in the FHL field is identical to the number of packets corresponding to the received fragment payload, the broadcast signal reception apparatus may determine that the fragment payload constructing each fragment and the fragment header have been completely received.

Thereafter, if the fragment payload constructing each fragment and the fragment header have been completely received, the broadcast signal reception apparatus combines the fragment header and the fragment payload so as to recover the fragment in step CS22100.

Thus far, an embodiment of the present invention in which multimedia content is transmitted and received through a broadcast network in a transport block unit in real time using a transport block as a data unit with a variable size has been described.

Hereinafter, another embodiment of the present invention in which multimedia content is transmitted and received through a broadcast network in an object internal structure unit with a variable size in real time using boundary information and type information of the object internal structure will be described.

However, the same terms of another embodiment of the present invention as in an embodiment of the present invention may include the above description, and thus a detailed description thereof will be omitted herein. In addition, the descriptions related to FIGS. 1 to 41 can also be applied to FIGS. 42 to 55.

<Identifying Method of Transport Object Type-1>

FIG. 42 is a diagram illustrating a structure of a packet including object type information according to another embodiment of the present invention.

According to another embodiment of the present invention, a packet may be an LCT packet and the LCT packet may include an LCT version number field (V), a congestion control flag field (C), a protocol-specific indication field (PSI), a transport session identifier flag field (S), a transport object identifier flag field (O), a half-word flag field (H), a sender current time present flag field (T), an expected residual time present flag field (R), a close session flag field (A), a close object flag field (B), an LCT header length field (HDR_LEN), a codepoint field (CP), a congestion control information field (CCI), a transport session identifier field (TSI), a transport object identifier field (TOI), a header extensions field, an FEC Payload ID field, and/or an encoding symbol(s) field.

According to another embodiment of the present invention, a packet may include packet information including metadata. The packet information may include object type information indicating a type of an object that is transmitted by the current packet during transmission of MPEG-DASH content. The object type information may indicate a type of an object that is transmitted in a current packet or packets to which the same TOI is applied.

For example, the object type information may identify an object type using two reserved bits positioned at a 12th bit from a start point of an LCT packet.

When MPEG-DASH content is transmitted in an LCT packet, the object type may include a regular file, initialization segment, media segment, and/or self-initializing segment.

For example, when a value of the object type information is "00", the object type may indicate "regular file", when a value of the object type information is "01", the object type may indicate "initialization segment", when a value of the object type information is "10", the object type may indicate "media segment", and a value of the object type information is "11", the object type may indicate "self-initializing segment".

An object type indicated by object type information may be varied according to transmitted file content and a scheme for defining a value of object type information may be transmitted in the form of signaling information separately from a session for current transmission or out-of-band.

The regular file refers to a data unit of the object form such as a regular file constituting multimedia content.

The initialization segment refers to a data unit of the object form including initialization information for access to representation. Initialization Segment may include a file type box (ftyp) and a movie box (moov). The file type box (ftyp) may include a file type, a file version, and compatibility information. The movie box (moov) may include metadata for describing media content.

The media segment refers to a data unit of the object form associated with media divided according to quality and time, which is to be transmitted to a broadcast signal receiving apparatus in order to support a streaming service. The media segment may include a segment type box (styp), a segment index box (sidx), a movie fragment box (moof), and a media data box (mdat). The segment type box (styp) may include segment type information. The segment index box (sidx) may provide stream access oints (SAP) information, data offset, initial presentation time of media data present in the corresponding media segment, etc. The movie fragment box (moof) may include metadata about media data box (mdat). The media data box (mdat) may include actual media data about a component media component (video, audio, etc.).

The self-initializing segment refers to a data unit of the object form including both information of initialization segment and information of media segment.

<Identifying Method of Transport Object Type-2>

FIG. 43 is a diagram illustrating a structure of a packet including object type information according to another embodiment of the present invention.

In addition to the aforementioned method, the object type information can identify a type of an object that is transmitted in a current packet using LCT header extension. The object type information using LCT header extension can be applied to a packet, etc. for a transport protocol such as a realtime protocol (RTP), etc.

The object type information may include a header extension type (HET) field, a type field, and/or a reserved field.

The HET field may be an 8-bit integer and may indicate a type of the corresponding header extension. For example, the HET field may be one characteristic value among values of 128 to 255 and may identify a type of the corresponding header extension. In this case, the header extension may have a fixed length of 32 bits.

The type field may indicate a type of an object that is transmitted in a current LCT packet or packets to which the same TOI is applied. Hereinafter, the type field may be represented by object type information. When MPEG-DASH content is transmitted in the LCT packet, the object type may include the regular file, initialization segment, media segment, and self-initializing segment according to a value of the object type information.

For example, when a value of the object type information is "0x00", the object type may indicate "regular file", when a value of the object type information is "0x01", the object type may indicate "initialization segment", when a value of the object type information is "0x10", the object type may indicate "media segment", and when a value of the object type information is "0x11", the object type may indicate "self-initializing segment".

The reserved field is reserved for future use.

Hereinafter, a detailed description for FIG. 43 is the same as in the above detailed description, and thus will be omitted herein.

Figure 44:
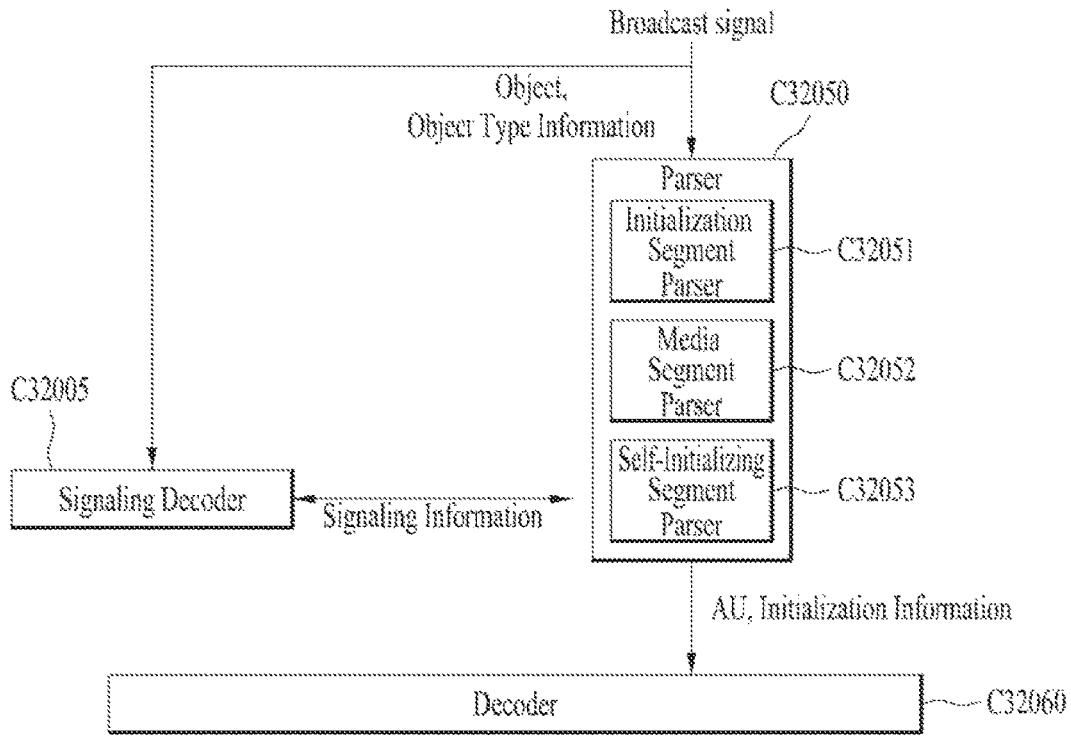
FIG. 44 is a diagram illustrating a structure of a broadcast signal receiving apparatus using object type information according to another embodiment of the present invention.

FIG. 44 is a diagram illustrating a structure of a broadcast signal receiving apparatus using object type information according to another embodiment of the present invention.

The broadcast signal receiving apparatus may different procedures based on the object type information according to an object type. That is, upon specifying and transmitting object type information in an LCT packet, the broadcast signal receiving apparatus may identify an object received based on the object type information and perform an appropriate operation according to an object type.

A broadcast signal receiving apparatus according to another embodiment of the present invention may include a signaling decoder C32005, a parser C32050, and/or a decoder C32060. However, components of the broadcast signal receiving apparatus are not limited thereto and the aforementioned components may be further included.

The signaling decoder C32005 may decode signaling information. The signaling information indicates whether a broadcast signal including multimedia content is transmitted using a broadcast network in real time.

The parser C32050 may parse at least one object based on the object type information and generate initialization information for access to Representation and at least one access unit. To this end, the parser C32050 may include an initialization segment parser C32051, a media segment parser C32052, and/or a self-initializing segment parser C32053. The initialization segment parser C32051, the media segment parser C32052, and the self-initializing segment parser C32053 will be described in detail in the next diagrams.

The decoder C32060 may initialize the corresponding decoder C32060 based on the initialization information. In addition, the decoder C32060 may decode at least one object. In this case, the decoder C32060 may receive information about an object in the form of at least one access unit and decode at least one access unit to generate media data.

Figure 45:
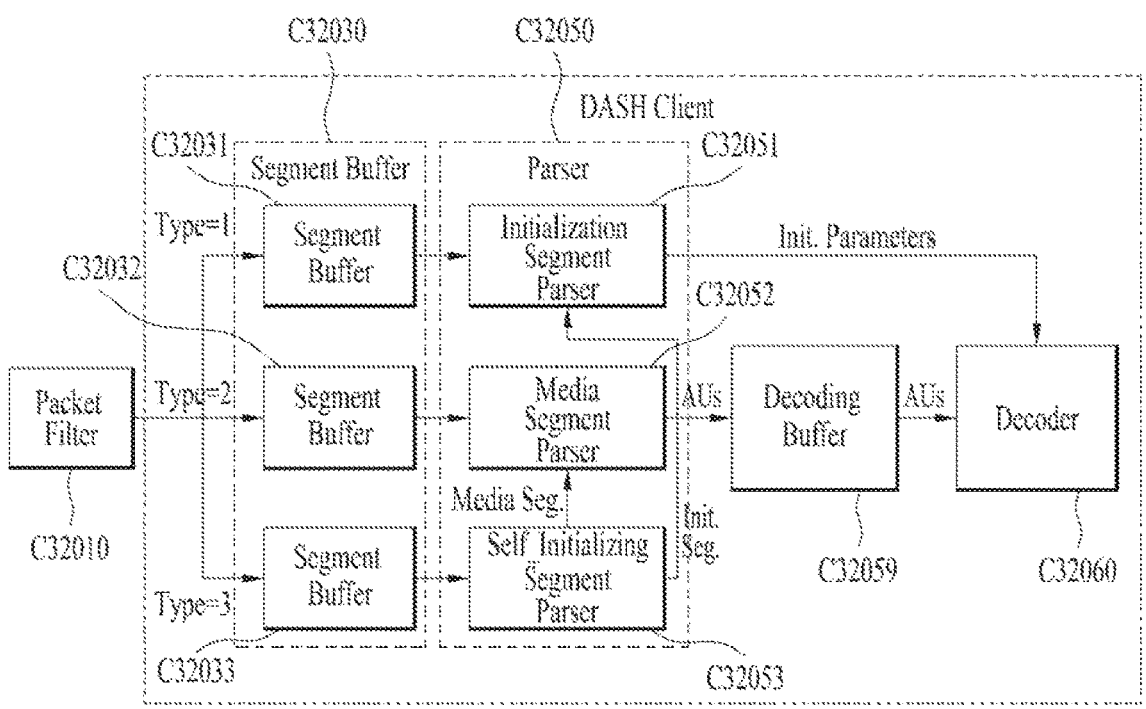
FIG. 45 is a diagram illustrating a structure of a broadcast signal receiving apparatus using object type information according to another embodiment of the present invention.

FIG. 45 is a diagram illustrating a structure of a broadcast signal receiving apparatus using object type information according to another embodiment of the present invention.

The broadcast signal receiving apparatus may include a packet filter C32010, a segment buffer C32030, the parser C32050, a decoding buffer C32059, and/or the decoder C32060.

The packet filter C32010 may identify the object type information from at least one received packet and classify the object type information so as to perform a procedure corresponding to each object type based on the object type information.

For example, when the object type information is "1", the packet filter C32010 may transmit data of an LCT packet to the initialization segment parser C32051 through a segment buffer C32031, when the object type information is "2", the packet filter C32010 may transmit data of an LCT packet to the media segment parser C32052 through a segment buffer C32032, when the object type information is "3", the packet filter C32010 may transmit data of an LCT packet to the self-initializing segment parser C32053 through a segment buffer C32033.

The segment buffer C32030 may receive data of an LCT packet from a packet filter and store the data for a predetermined period of time. The segment buffer C32030 may be present as one component or a plurality of segment buffers C32031, C32032, and C32033.

The parser C32050 may parse at least one object based on the object type information and generate initialization information for access to representation and at least one access unit. To this end, the parser C32050 may include the initialization segment parser C32051, the media segment parser C32052, and/or the self-initializing segment parser C32053.

The initialization segment parser C32051 may parse initialization segment stored in the segment buffer C32031 and generate initialization information for access to representation.

In addition, the initialization segment parser C32051 may receive initialization segment from the self-initializing segment parser C32053 and generate initialization information for access to representation. The media segment parser C32052 may parse media segment stored in the segment buffer C32032 and generate information about media stream, at least one access unit, and information about a method for access to media presentation in the corresponding segment, such as presentation time or Index. In addition, the media segment parser C32052 may receive media segment from the self-initializing segment parser c32053 and generate information of media stream, at least one access unit, and information about a method for access to media presentation in the corresponding segment, such as presentation time or index.

The self-initializing segment parser C32053 may parse self-initializing segment stored in the segment buffer c32033 and generate initialization segment and media segment.

The decoding buffer C32059 may receive at least one access unit from the parser C32050 or the media segment parser C32052 and store the access unit for a predetermined period of time.

The decoder C32060 may initialize the corresponding decoder C32060 based on the initialization information. In addition, the decoder C32060 may decode at least one object. In this case, the decoder C32060 may receive information about an object in the form of at least one access unit and may decode at least one access unit to generate media data.

As described above, upon transmitting MPEG-DASH content, a broadcast signal transmitting apparatus according to another embodiment of the present invention may transmit object type information indicating a type of an object that is transmitted in a current packet. In addition, the broadcast signal transmitting apparatus may identify a type of an object in a packet received based on the object type information and perform an appropriate process on each object.

<Type of Object Internal Structure>

FIG. 46 is a diagram illustrating a structure of a packet including type information according to another embodiment of the present invention.

Upon transmitting data in an object internal structure unit as an independently meaningful unit, a broadcast signal transmitting apparatus may transmit data with a variable size. Thus, upon receiving and identifying an object internal structure even prior to receiving one entire object, a broadcast signal receiving apparatus may perform reproduction in an object internal structure unit. As a result, multimedia content may be transmitted and reproduced through a broadcast network in real time. According to another embodiment of the present invention, in order to identify an object internal structure, Type information and Boundary Information may be used.

Hereinafter, type information for identification of an object internal structure will be described in detail.

During transmission of MPEG-DASH content, packet information may include type information using LCT header extension. The type information may indicate a type of an object internal structure that is transmitted in a current packet. The type information may be referred to as internal structure type information for differentiation from object type information. The type information can be applied to a packet, etc. for a transport protocol such as realtime protocol (RTP), etc.

The type information may include a header extension type field (HET), an internal unit type field, and/or a reserved field.

The HET field is the same as in the above description and thus a detailed description thereof is omitted herein.

The internal structure type field may indicate a type of an object internal structure transmitted in an LCT packet.

An object may correspond to a segment of MPEG-DASH and an object internal structure may correspond to a lower component included in the object. For example, a type of the object internal structure may include fragment, chunk or GOP, an access unit, and a NAL unit. The type of the object internal structure may not be limited thereto and may further include meaningful units.

The fragment refers to a data unit that can be independently decoded and reproduced without dependence upon preceding data. Alternatively, the fragment may refer to a data unit including one pair of movie fragment box (moot) and media data container box (mdat). For example, the fragment may correspond to subsegment of MPEGDASH or correspond to a fragment of MMT. The fragment may include at least one chunk or at least one GOP.

The chunk is a set of adjacent samples with the same media type and is a data unit with a variable size.

GOP is a basic unit for performing coding used in video coding and is a data unit with a variable size indicating a set of frames including at least one I-frame. According to another embodiment of the present invention, media data is transmitted in an object internal structure unit as an independently meaningful data unit, and thus GOP may include Open GOP and Closed GOP.

In Open GOP, B-frame in one GOP may refer to I-frame or P-frame of an adjacent GOP. Thus, Open GOP can seriously enhance coding efficiency. In Closed GOP, Bframe or P-frame may refer to only a frame in the corresponding GOP and may not refer to frames in GOPs except for the corresponding GOP.

The access unit may refer a basic data unit of encoded video or audio and include one image frame or audio frame.

The NAL unit is an encapsulated and compressed video stream including summary information, etc. about a slice compressed in consideration of communication with a network device. For example, the NAL unit is a data unit obtained by packetizing data such as a NAL unit slice, a parameter set, SEI, etc. in a byte unit.

The reserved field may be reserved for future use.

Hereinafter, for convenience of description, the internal structure type field may be represented by type information.

<Boundary of Object Internal Structure>

FIG. 47 is a diagram illustrating a structure of a packet including boundary information according to another embodiment of the present invention.

Hereinafter, boundary information for identification of an object internal structure will be described in detail.

During transmission of MPEG-DASH content, packet information may include boundary information using LCT header extension. The boundary information may indicate a boundary of an object internal structure that is transmitted in a current packet. The boundary information can be applied to a packet, etc. for a transport protocol such as a realtime protocol (RTP), etc.

The boundary information may include a header extension type field (HET), a start flag field (SF), a reserved field, and/or an offset field.

The HET field is the same as in the above description and thus is not described in detail.

The start flag field (SF) may indicate that an LCT packet includes a start point of an object internal structure.

The reserved field may be reserved for future use.

The offset field may include position information indicating a start point of the object internal structure in an LCT packet. The position information may include a byte distance to the start point of the object internal structure from a payload start point of the LCT packet.

As described above, a broadcast signal transmitting apparatus may not transmit data in object units based on type information and boundary information and may transmit data in an object internal structure unit with a variable length.

A broadcast signal receiving apparatus may not receive and reproduce data in object units and may receive and reproduce data in an object internal structure unit with a variable length. Thus, the broadcast signal receiving apparatus may identify the object internal structure based on type information and boundary information and perform reproduction for each received object internal structure.

For example, the broadcast signal receiving apparatus may identify a type of a current object internal structure based on packets corresponding to start and end points of the object internal structure represented by the boundary information or type information included in at least one packet transmitted between the start and end points.

As a result, the broadcast signal receiving apparatus may rapidly identify the object internal structure and perform reproduction in real time even prior to receiving one entire object.

<Mapping of Transport Object and Signaling Information>

FIG. 48 is a diagram illustrating a structure of a packet including mapping information according to another embodiment of the present invention.

According to another embodiment of the present invention, an object internal structure can be identified using mapping information in addition to the aforementioned type information and boundary information.

During transmission of DASH content, the packet information may include the mapping information using LCT header extension. The mapping information maps at least one of a session transmitted in a current packet, an object and an object internal structure to at least one of a transport session identifier (TSI) and a transport object identifier (TOI). The mapping information may be used in a packet, etc. for a transport protocol such as a realtime protocol (RTP), etc.

According to an embodiment of the present invention, mapping information may include a header extension type field (HET), a header extension length field (HEL), and a uniform resource locator field (URL).

The HET field is the same as in the above description and is not described in detail.

The HEL field indicates an overall length of LCT header extension with a variable length. Basically, when HET has a value between 0 and 127, header extension with a variable length of a 32-bit word unit in LCT, and the HEL field subsequent to the HET field indicates an overall length of LCT header extension in a 32-bit word unit.

The URL field may be a variable field and may include a session for current transmission, an object, and a unique address on the Internet of an object internal structure.

Hereinafter, for convenience of description, the URL field may be represented via mapping information.

The mapping information may indicate URL of signaling information. In addition, the mapping information may include an identifier allocated by the signaling information as well as a session, an object, or a unique address of an object internal structure. The identifier may include a period ID, an adaptation set ID, a representation ID, and a component ID. Accordingly, in the case of MPEG-DASH content, the mapping information may include a segment URL, a representation ID, a component ID, an adaptation set ID, a period ID, etc.

For more perfect mapping, signaling information according to another embodiment of the present invention may further include mapping information for mapping URL of an object or identifier to TOT or TSI. That is, the signaling information may further include a portion of the URL of the object or identifier, to which currently transmitted TOI and TSI are mapped. In this case, the mapping information may be information for mapping the URL of the object or identifier to TOI or TSI according to one of 1:1, 1:multi, and multi:1.

<Grouping Method of Transport Session and Transport Object>

FIG. 49 is a diagram illustrating a structure of an LCT packet including grouping information according to another embodiment of the present invention.

According to another embodiment of the present invention, in addition to the aforementioned method, an object internal structure can be identified using the grouping information.

An LCT packet according to another embodiment of the present invention may include a session group identifier field (SGI) and a divided transport session identifier field (DTSI). SGI and DTSI are the form obtained by splitting a legacy transport session identifier field (TSI).

An LCT packet according to another embodiment of the present invention may include an object group identifier field (OGI) and a divided transport object identifier field (DTOI). OGI and DTOI are the form obtained by splitting a legacy transport object identifier field (TOI).

The S field indicates a length of a legacy TSI field, the O field indicates a length of a legacy TOI, and the H field indicates whether half-word (16 bits) is added to a length of a legacy TOI field and legacy TSI field.

Accordingly, the sum of lengths of the SGI field and DTSI field may be the same as a legacy TSI field and may be determined based on values of the S field and H field. In addition, the sum of lengths of the OGI field and DTOI field may be the same as a legacy TOI field and may be determined based on values of the O field and H field.

According to another embodiment of the present invention, the legacy TSI and TOI may be subdivided into SGI, DTSI, OGI, and DTOI, and SGI, DTSI, OGI, and DTOI may identify different data units.

SGI, DTSI, OGI, and DTO will be described in detail with reference to the next diagram.

Figure 50:
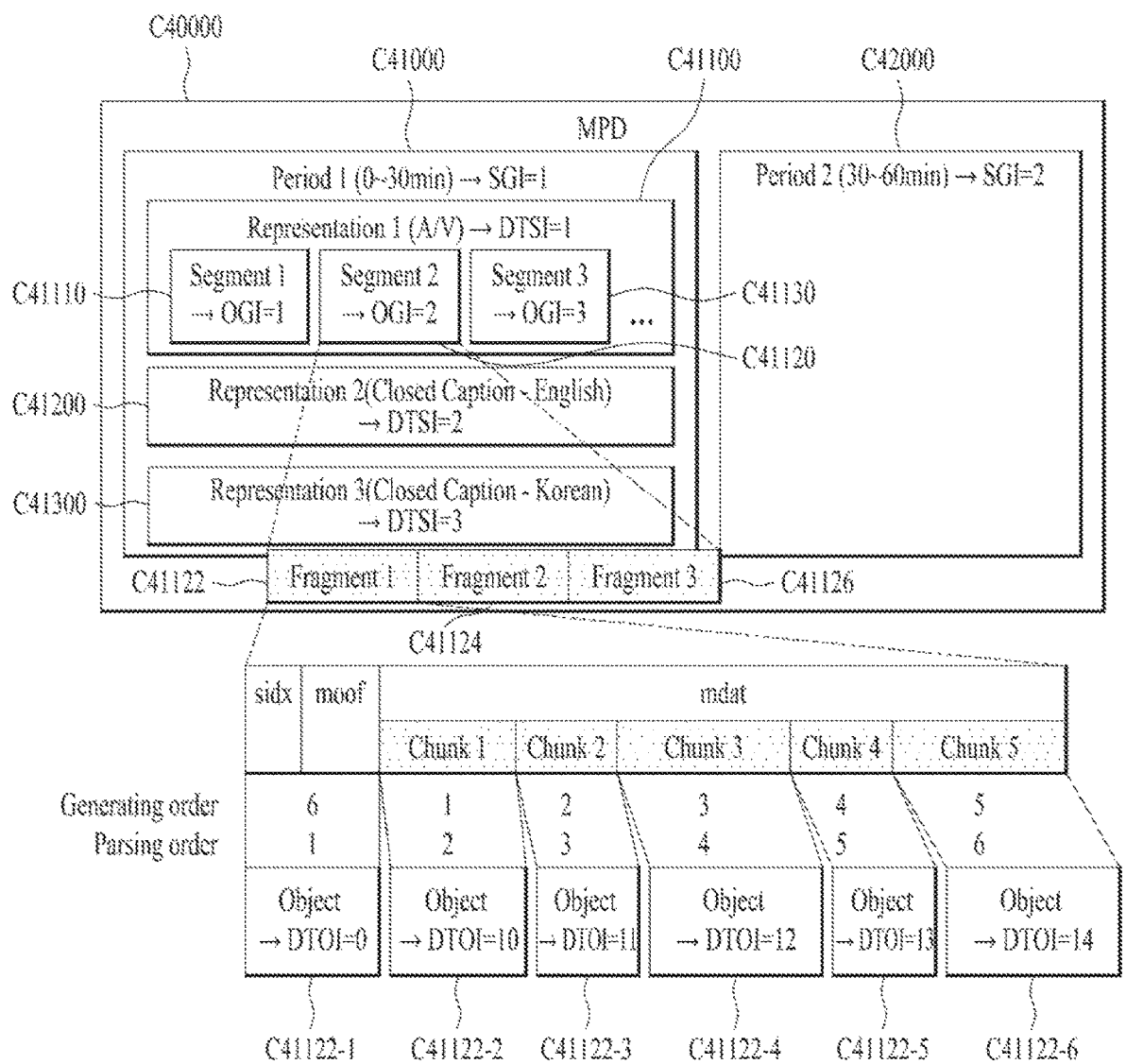
FIG. 50 is a diagram illustrating grouping of a session and an object according to another embodiment of the present invention.

FIG. 50 is a diagram illustrating grouping of a session and an object according to another embodiment of the present invention.

media presentation description (MPD) is an element for providing MPEG-DASH content as a streaming service. For example, the aforementioned presentation may be the concept of one service and may correspond to a package of MMT and MPD of MPEG-DASH. MPD C40000 may include at least one period. For example, the MPD C40000 may include a first period C41000 and a second period C42000.

The Period is an element obtained by dividing MPEG-DASH content according to reproduction time. An available bit rate, a language, a caption, a subtitle, etc. may not be changed in the period. Each period may include start time information and periods may be arranged in ascending order of a start time in MPD. For example, the first period C41000 is an element in a period of 0 to 30 min, and the second period C42000 is an element in a period of 30 to 60 min. A period may include at least one adaptationset (not shown) as a lower element.

The adaptationset is a set of at least one media content component of an interchangeable encoded version. The adaptationset may include at least one Representation as a lower element. For example, The adaptationset may include first representation C41100, second representation C41200, and third representation C41300.

Representation may be an element of a transmissible encoded version of at least one media content component and may include at least one media stream. A media content component may include a video component, an audio component, and a caption component. Representation may include information about quality of the media content component. Thus, a broadcast signal receiving apparatus may change representation in one adaptationset in order to adapt to a network environment.

For example, first representation C41100 may be a video component with a frequency bandwidth of 500 kbit/s, second representation C41200 may be a video component with a frequency bandwidth of 250 kbit/s, and third representation C41300 may be a video component with a frequency bandwidth of 750 kbit/s. Representation may include at least one segment as a lower element. For example, the first representation C41100 may include a first segment C41110, a second segment C41120, and a third segment C41130.

Segment is an element with a greatest data unit, which can be retrieved according to one HTTP request. URL may be provided to each segment. For example, the aforementioned object may be the concept corresponding to a file, initialization segment, media segment, or self-initializing segment, may correspond to a segment of MPEGDASH, and may correspond to MPU of MMT. Each Segment may include at least one fragment as a lower element. For example, the second segment C41120 may include a first fragment C41122, a second fragment C41124, and a third fragment C41126.

Fragment refers to a data unit that can be independently decoded and reproduced without depending upon preceding data. For example, Fragment may correspond to subsegment of MPEG-DASH and fragment of MMT. Fragment may include at least one chunk or at least one GOP. For example, the first fragment C41122 may include a fragment header and a fragment payload. The fragment header may include a segment index box (sidx) and a movie fragment box (moof). The fragment payload may include a media data container box (mdat). The media data container box (mdat) may include first to fifth Chunks.

The chunk is a set of adjacent samples having the same media type and is a data unit with a variable size.

According to the aforementioned embodiment of the present invention, TSI may identify a transport session, and each representation may be mapped to each TSI. In addition, TOI may identify a transport object in a transport session and each segment may be mapped to each TOI.

However, according to another embodiment of the present invention, TSI may be divided into GSI and DTSI, TOI is divided into OGI and DTOI, and GSI, DTSI, GOI, and DTOI may be mapped to respective new data units, which is not limited to the following embodiment of the present invention.

For example, SGI may identify a group of the same transport session and each period may be mapped to each SGI. A value of SGI of a first period C41000 may be mapped to "1" and a value of SGI of a second period C42000 may be mapped to "2". The value of SGI may not be limited to the aforementioned embodiment and may have the same value as period ID for identification of period.

DTSI may identify a transport session and each representation may be mapped to each DTSI. A value of DTSI of the first representation C41100 may be mapped to "1", a value of DTSI of the second representation C41200 may be mapped to "2", and a value of the DTSI of the third representation C41300 may be mapped to "3". The value of DTSI may not be limited to the aforementioned embodiment and may have the same value as a representation ID for identification of representation.

OGI may identify a group of the same object in a transport session and each Segment may be mapped to each OGI. A value of OGI of the first segment C41110 may be mapped to "1", a value of OGI of the second segment C41120 may be mapped to "2", and a value of OGI of the third segment C41130 may be mapped to "3".

DTOI may identify a delivery object. One delivery object may be one ISO BMFF file or a part of one ISO BMFF file. The part of one ISO BMFF file may include a GOP, a chunk, an access unit and/or an NAL unit.

For example, a fragment header, and each chunk or each GOP of a fragment payload may be mapped to each DTOI. A value of DTOI of a header of the first fragment C41122 may be mapped to "0" and values of DTOI of first to fifth chunks in a payload of the first fragment C41122 may be mapped to "10" to "14".

In the case of DTOI, usage may be defined according to a given value. For example, a DTOI value may be set in an ascending order or a descending order according to an arrangement order of objects. In this case, a broadcast signal receiving apparatus may rearrange objects based on a DTOI value and generate a fragment or a segment. In addition, a specific DTOI value may indicate a fragment header. In this case, the broadcast signal transmitting apparatus or the broadcast signal receiving apparatus may determine whether a fragment header is completely transmitted based on the corresponding DTOI value.

If a delivery object means one segment, a group of delivery objects may correspond to a content component such as DASH representation. In this case, DTIO may be mapped to a segment and OGI may be mapped to representation. For example, OGI may be mapped to a representation ID, a content component ID, etc. in one-to-one correspondence and may be used as information for multiplexing/demultiplexing content components transmitted within one session.

Figure 51:
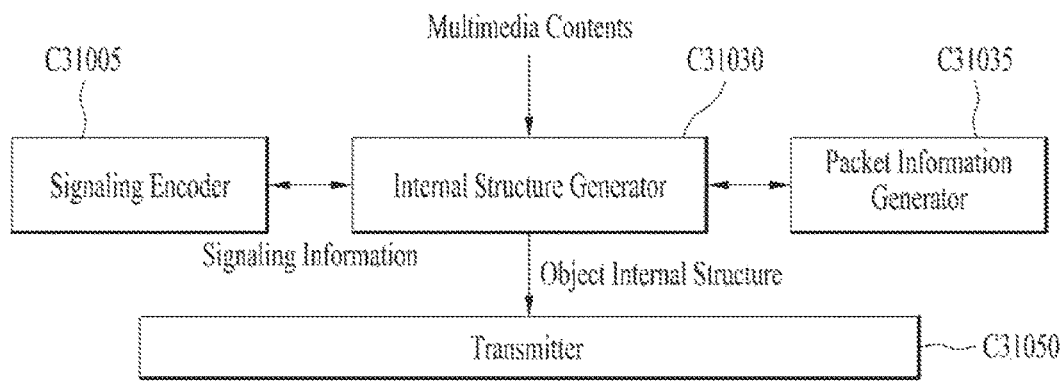
FIG. 51 is a diagram illustrating a structure of a broadcast signal transmitting apparatus using packet information according to another embodiment of the present invention.

FIG. 51 is a diagram illustrating a structure of a broadcast signal transmitting apparatus using packet information according to another embodiment of the present invention.

The broadcast signal transmitting apparatus may include a signaling encoder C31005, an internal structure generator C31030, a packet information generator C31035, and/or a transmitter C31050.

The signaling encoder C31005 may generate signaling information indicating whether a broadcast signal including multimedia content is transmitted in real time using a broadcast network. The signaling information may indicate that multimedia content is transmitted in real time in at least one of a file level or an FDT level. When the signaling information indicates that multimedia content is transmitted in real time in a file level, all data belonging to the corresponding file can be transmitted in real time. In addition, when the signaling information indicates that multimedia content is transmitted in real time in an FDT level, all files or data belonging to the corresponding FDT can be transmitted in real time.

The internal structure generator C31030 may generate at least one object internal structure as an independently encoded or decoded data unit. The object internal structure is obtained by dividing a file included in multimedia content into at least one data unit.

When the signaling information indicates that multimedia content is transmitted in real time, the packet information generator C31035 may generate packet information including metadata for identification of an object internal structure. Here, the packet information may include metadata about a packet for transmission of multimedia content and include metadata for identification of the object internal structure. The packet information may include boundary information indicating a boundary of the object internal structure and type information indicating a type of the object internal structure.

The boundary information may include a start flag (SF) field indicating whether a corresponding packet includes a start point of an object internal structure and an offset field indicating a position of a start point of the object internal structure in the corresponding packet.

The type of the object internal structure may include one of a fragment indicating a data unit including a pair of movie fragment box (moof) and media data container box (mdat), Chunk indicating a set of adjacent samples having the same media type, GOP indicating a set of frames including at least one I-frame, an access unit indicating a basic data unit of encoded video or audio, and a NAL unit indicating a data unit packetized in a byte unit.

In addition, the packet information may include mapping information for mapping at least one of a session, an object, and an object internal structure to at least one of a transport session identifier (TSI) and a transport object identifier (TOI).

The packet information may include grouping information for grouping a transport session and a transport object transmitted in a packet. The grouping information may include a divided transport session identifier (DTSI) field for identification of a transport session, a session group identifier (SGI) field for identification of a group having the same transport session, a divided transport object identifier (DTOI) field for identification of a transport object, and an object group identifier (OGI) field for identification of a group having the same transport object. Here, the SGI field may include information for identification of a period element of MPEG-DASH, the DTSI field may include information for identification of a representation element of MPEGDASH, the OGI field may include information for identification of a segment element of MPEG-DASH, and the DTOI field may include information for identification of a chunk element of MPEG-DASH.

As described above, the packet information may identity at least one of a session, an object, and an object internal structure based on type information and boundary information, mapping information, and grouping information.

The broadcast signal transmitting apparatus may further include a packetizer (not shown). The packetizer may divide the object internal structure into at least one symbol with the same size and packetize the at least one symbol as at least one packet. However, the present invention is not limited thereto, and the symbol may be generated by another apparatus. The lengths of symbols according to another embodiment of the present invention may be the same. Then the packetizer may packetize at least one symbol as at least one packet. For example, the packet may include a packet header and a packet payload.

The packet header may include packet information for identification of an object internal structure.

The transmitter C31050 may transmit a broadcast signal including an object internal structure and packet information.

Figure 52:
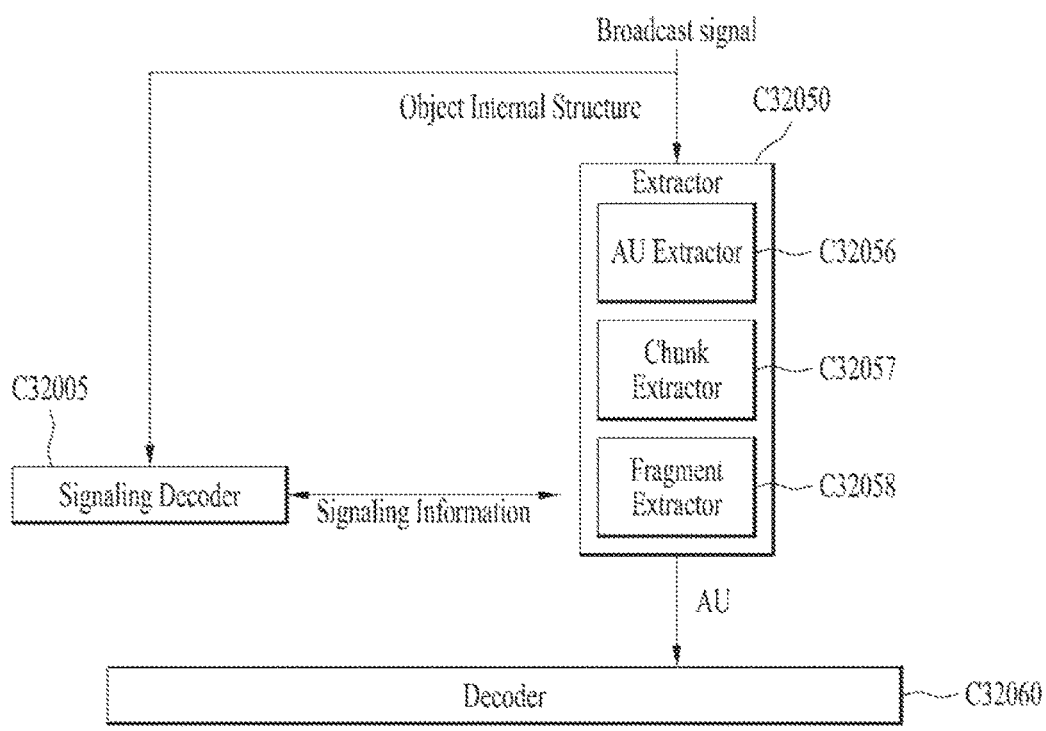
FIG. 52 is a diagram illustrating a structure of a broadcast signal receiving apparatus according to another embodiment of the present invention.

FIG. 52 is a diagram illustrating a structure of a broadcast signal receiving apparatus according to another embodiment of the present invention.

Hereinafter, common parts of the broadcast signal transmitting apparatus are not described, and the broadcast signal receiving apparatus will be described in terms of differences from the broadcast signal transmitting apparatus.

The broadcast signal receiving apparatus may identify an object internal structure based on packet information and performing decoding in a unit of received object internal structure. Thus, the broadcast signal receiving apparatus may not receive one entire object and may produce an object internal structure despite receiving the object internal structure.

A broadcast signal receiving apparatus according to another embodiment of the present invention may include a signaling decoder C32005, an extractor C32050, and/or a decoder C32060. However, the broadcast signal receiving apparatus may further include the aforementioned components.

The signaling decoder C32005 may decode signaling information. The signaling information indicates whether a broadcast signal including multimedia content is transmitted in real time using a broadcast network.

The extractor C32050 may identify an object internal structure from a broadcast signal and extract the object internal structure. The extractor C32050 may extract an object internal structure and transmit the object internal structure to the decoder C32060 based on packet information even prior to receiving one entire object. However, an operation of the extractor C32050 may be changed according to a type of the object internal structure. The aforementioned parser C32050 may perform the same operation as the extractor C32050 and the extractor C32050 may be represented by the parser C32050.

The extractor C32050 may identify a type of a current object internal structure according to type information and boundary information. For example, the extractor C32050 may identify a type of a current object internal structure based on a packet corresponding to start and end points of the object internal structure represented in the boundary information and type information included in at least one packet transmitted between the start and end points.

The extractor C32050 may extract at least one of an access unit, GOP or chunk, and fragment, which are object internal structures stored in an object buffer or a segment buffer. To this end, the extractor C32050 may further include an AU extractor C32056 for extracting the access unit, a chunk extractor C32057 for extracting chunk or GOP, and a fragment extractor C32058 for extracting fragment. Lower components of the extractor C32050 will be described in detail with reference to the next diagram.

The decoder C32060 may receive the object internal structure and decode the corresponding object internal structure based on type information. In this case, the decoder C32060 may receive information about the object internal structure in the form of at least one access unit and decode at least one access unit to generate Media Data.

Figure 53:
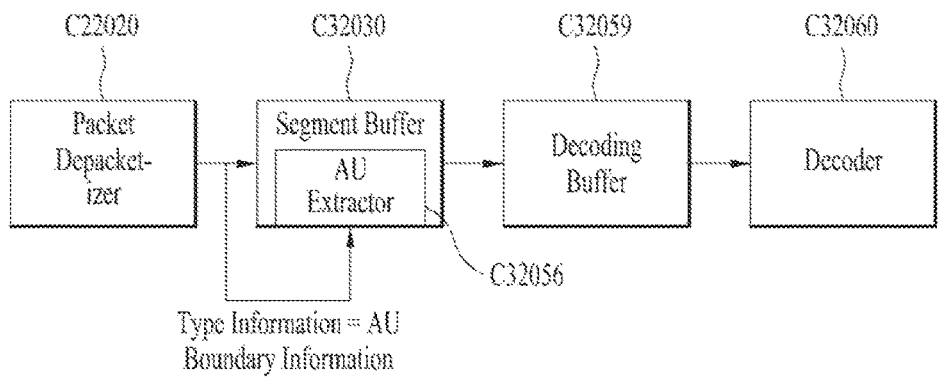
FIG. 53 is a diagram illustrating a structure of a broadcast signal receiving apparatus using packet information according to another embodiment of the present invention.

FIG. 53 is a diagram illustrating a structure of a broadcast signal receiving apparatus using packet information according to another embodiment of the present invention.

Hereinafter, an operation and configuration of a broadcast signal receiving apparatus when a type of an object internal structure is an access unit will be described.

The broadcast signal receiving apparatus may further include a packet depacketizer C22020, a segment buffer C32030, an AU extractor C32056, a decoding buffer C32059, and/or a decoder C32060.

The packet depacketizer C22020 may depacketize at least one packet and extract packet information contained in a packet header. For example, the packet depacketizer C22020 may extract type information and boundary information included in the packet header and extract at least one symbol included in a packet payload. At least one symbol may be a symbol included in the object internal structure or a symbol included in an object.

The packet depacketizer C22020 may transmit the at least one extracted object or the at least one extracted object internal structure to the decoder C32060.

The segment buffer C32030 may receive packet of an LCT packet from the packet depacketizer C22020 and store the data for a predetermined period of time. The segment buffer C32030 may be repeated by an object buffer C32030. The segment buffer C32030 may further include the AU extractor C32056, a chunk extractor (not shown), and/or a fragment extractor (not shown). In addition, the segment buffer C320300 may further include a fragment buffer (not shown) and/or a chunk buffer (not shown).

When type information indicates that the type of the object internal structure is an access unit, the segment buffer C32030 may include the AU extractor C32056. However, the present invention is not limited thereto, and the AU extractor C32056 may be present independently from the segment buffer C32030.

The AU extractor C32056 may extract the access unit stored in the segment buffer C32030 based on boundary information. For example, one access unit may be from a start point of the access unit indicated by the boundary information to a start point of the next access unit.

Then the AU extractor C32056 may transmit the extracted access unit to the decoder C32060 through the decoding buffer C32059.

As described above, even if the broadcast signal receiving apparatus does not receive one entire object, upon completely receiving an internal structure of the corresponding object based on the type information and boundary information, the AU extractor C32056 may immediately extract the object internal structure and may transmit the object internal structure to the decoder C32060.

The decoding buffer C32059 may receive data from the segment buffer C32030 and store the data for a predetermined period of time. The access unit may be transmitted to the decoder C32060 or another component for a processing time given to the access unit in the decoding buffer C32059. In this case, timing information about the processing time such as a presentation timestamp (PTS), etc. may be given to the access unit in the form of LCT header extension.

The decoder C32060 may receive the object internal structure and decode the corresponding object internal structure based on the type information. In this case, the decoder C32060 may receive the corresponding object internal structure in the form of an access unit as well as in the form of object internal structure.

When type information indicates that the type of the object internal structure is an access unit, the decoder C32060 may decode the corresponding access unit as an internal structure of the corresponding object even prior to receiving an entire corresponding object.

Figure 54:
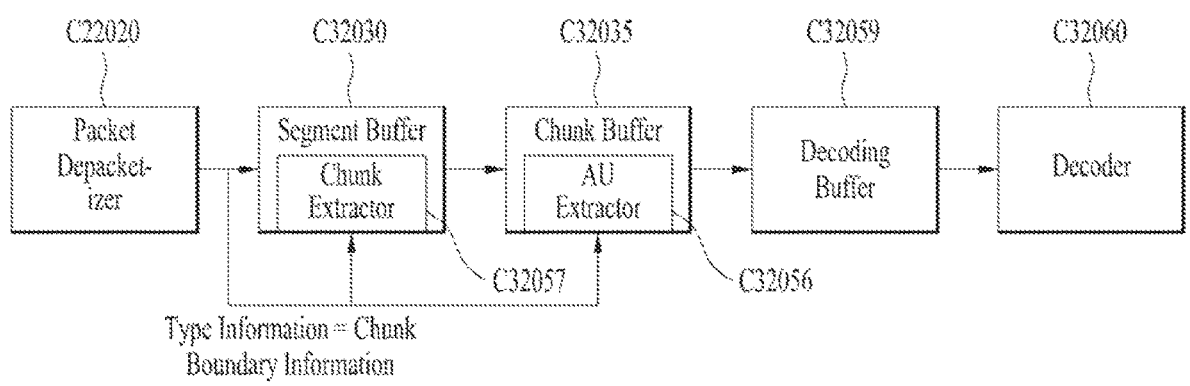
FIG. 54 is a diagram illustrating a structure of a broadcast signal receiving apparatus using packet information according to another embodiment of the present invention.

FIG. 54 is a diagram illustrating a structure of a broadcast signal receiving apparatus using packet information according to another embodiment of the present invention.

The same components as the aforementioned components among the components illustrated in the diagram are the same as in the above description, and thus a detailed description thereof will be omitted herein.

Hereinafter, an operation and configuration of a broadcast signal receiving apparatus when a type of an object internal structure is chunk or GOP will be described. The broadcast signal receiving apparatus may further include a packet depacketizer C22020, a segment buffer C32030, a chunk buffer C32035, a decoding buffer C32059, and/or a decoder C32060.

The packet depacketizer C22020 may transmit at least one extracted object or at least one object internal structure to the decoder C32060 through the segment buffer C32030.

The segment buffer C32030 may include the chunk extractor C32057. In addition, the segment buffer C32030 may further include the chunk buffer C32035.

When type information indicates that the type of the object internal structure is chunk or GOP, the chunk extractor C32057 may extract chunk or GOP stored in the segment buffer C32030 based on boundary information. For example, one chunk or GOP may be from a start point of the chunk or GOP indicated by the boundary information to a start point of the next chunk or GOP. The chunk extractor C32057 may be present in the segment buffer C32030 or independently.

The chunk buffer C32035 may receive at least one chunk or GOP and store the chunk or GOP for a predetermined period of time. The chunk buffer C32035 may be present in the segment buffer C32030 or independently. The chunk buffer C32035 may further include the AU extractor C32056.

The AU extractor C32056 may extract at least one access unit from the chunk or GOP stored in the chunk buffer C32035. Then the AU extractor C32056 may transmit the at least one extracted access unit to the decoder C32060 through the decoding buffer C32059.

When type information indicates that the type of the object internal structure is chunk or GOP, the decoder C32060 may decode the corresponding chunk or GOP as an internal structure of the corresponding object even prior to receiving an entire corresponding object.

Figures 55, 56:
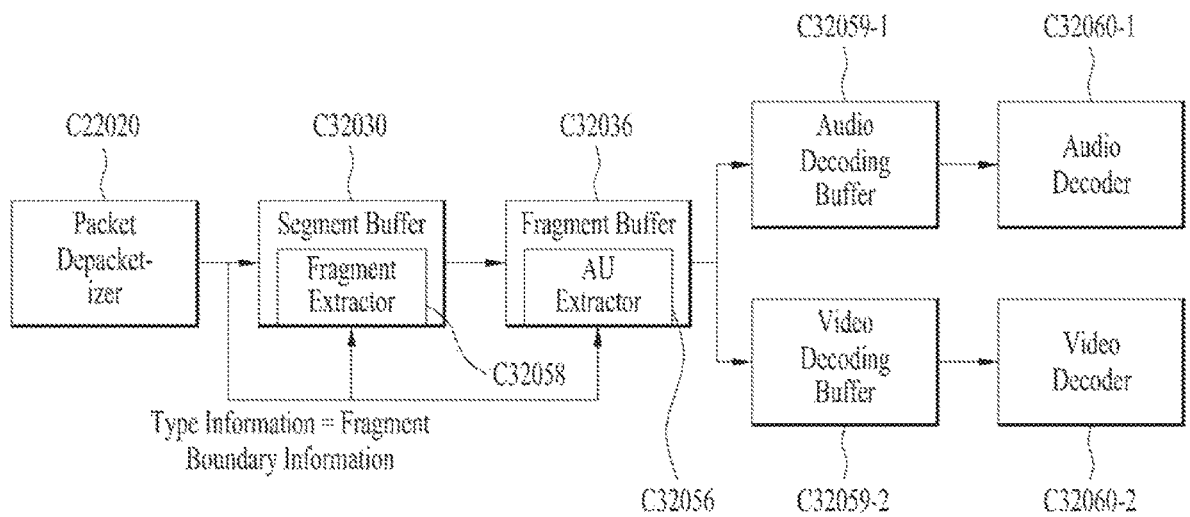
FIG. 55 is a diagram illustrating a structure of a broadcast signal receiving apparatus using packet information according to another embodiment of the present invention.
FIG. 56 is a diagram showing the structure of a packet including priority information according to another embodiment of the present invention.

FIG. 55 is a diagram illustrating a structure of a broadcast signal receiving apparatus using packet information according to another embodiment of the present invention.

The same components as the aforementioned components among the components illustrated in the diagram are the same as in the above description, and thus a detailed description thereof will be omitted herein.

Hereinafter, an operation and configuration of a broadcast signal receiving apparatus when a type of an object internal structure is fragment will be described. The broadcast signal receiving apparatus may further include a packet depacketizer C22020, a segment buffer C32030, a fragment buffer C32036, an audio decoding buffer C32059-1, a video decoding buffer C32059-2, an audio decoder C32060-1, and/or a video decoder C32060-2.

The packet depacketizer C22020 may transmit at least one extracted object or at least one extracted object internal structure to the audio decoder C32060-1 and/or the video decoder C32060-2.

A segment buffer C320300 may include the fragment extractor C32058. In addition, the segment buffer C32030 may further include a fragment buffer C32036.

When the type information indicates that the type of the object internal structure is fragment, the fragment extractor C32058 may extract fragment stored in the segment buffer C320300. For example, one fragment may be from a start point of the fragment to a start point of the next fragment. The fragment extractor C32058 may be present in the segment buffer C32030 or independently.

The fragment buffer C32036 may receive fragment or store the fragment for a predetermined period of time. The fragment buffer C32036 may be present in the segment buffer C32030 or independently. The fragment buffer C32036 may further include the AU extractor C32056. In the fragment buffer C32036 may further include a chunk buffer (not shown).

The AU extractor C32056 may extract at least one access unit from fragment stored in the fragment buffer C32036. The AU extractor C32056 may be present in the fragment buffer C32036 or independently. In addition, the broadcast signal receiving apparatus may further include a chunk buffer (not shown), and the AU extractor C32056 may extract at least one access unit from chunk or GOP included in the chunk buffer. Then the AU extractor C32056 may transmit at least one extracted access unit to the audio decoder C32060-1 and/or the video decoder C32060-2.

The decoding buffer may include an audio decoding buffer C32059-1 and/or a video decoding buffer C32059-2. The audio decoding buffer C32059-1 may receive data associated with audio and store the data for a predetermined period of time. The video decoding buffer C32059-2 may receive data associated with video and store the data for a predetermined period of time.

When the type information indicates that the type of the object internal structure is fragment, the decoder may decode the corresponding fragment as an internal structure of the corresponding object even prior to receiving an entire corresponding object. The decoder may further include the audio decoder C32060-1 for decoding data associated with audio and/or the video decoder C 32060-2 for decoding data associated with video.

As described above, the broadcast signal transmitting apparatus may not transmit data in an object unit and may transmit data in an object internal structure unit with a variable length. In this case, the broadcast signal transmitting apparatus may transmit the transmitted type information and boundary information of the object internal structure.

The broadcast signal receiving apparatus may not reproduce data in an object unit and may reproduce data in an object internal structure unit with a variable length. Accordingly, the broadcast signal receiving apparatus may identify an object internal structure based on the type information and boundary information and perform reproduction for each received object internal structure.

<Priority Identification of Transport Packet Payload Data>

FIG. 56 is a diagram showing the structure of a packet including priority information according to another embodiment of the present invention.

The packet according to another embodiment of the present invention may be a ROUTE packet and the ROUTE packet may represent an ALC/LCT packet. Hereinafter, for convenience, the ROUTE packet and/or the ALC/LCT packet may be referred to as an LCT packet. The LCT packet format used by ROUTE follows the ALC packet format, i.e. the UDP header followed by the LCT header and the FEC Payload ID followed by the packet payload.

The LCT packet may include a packet header and a packet payload. The packet header may include metadata for the packet payload. The packet payload may include data of MPEG-DASH content.

For example, the packet header may include an LCT version number field (V), a Congestion control flag field (C), a Protocol-Specific Indication field (PSI), a Transport Session Identifier flag field (S), a Transport Object Identifier flag field (O), a Half-word flag field (H), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field (TOI), a Header Extensions field, and/or an FEC Payload ID field.

In addition, the packet payload may include an Encoding Symbol(s) field.

For a detailed description of fields having the same names as the above-described fields among the fields configuring the LCT packet according to another embodiment of the present invention, refer to the above description.

The packet header may further include priority information (Priority) indicating priority of the packet payload. The priority information may use two bits located at twelfth and thirteenth bits from a start point of each packet to indicate the priority of the packet payload. In this case, since two bits are used, it is possible to decrease the size of the packet header and to increase efficiency.

The priority information (Priority) may indicate the priority of the packet payload transmitted using a current LCT packet among the LCT packets included in one file. That is, the priority information may indicate relative priority of the packet payload transmitted using a current LCT packet among packets having the same TSI or TOI.

For example, the priority information may have a value of 0 to 3. As the value of the priority information decreases, the priority of the packet payload increases in processing of total file-based media data. As the value of the priority information increases, the priority of the packet payload decreases.

TSI may identify an LCT transport session and TOI may identify a delivery object.

Each ROUTE session consists of one or multiple LCT transport sessions. LCT transport sessions are a subset of a ROUTE session. For media delivery, an LCT transport session would typically carry a media component, for example an MPEGDASH Representation. From the perspective of broadcast MPEG-DASH, the ROUTE session can be considered as the multiplex of LCT transport sessions that carry constituent media components of one or more DASH Media Presentations. Within each LCT transport session, one or multiple Delivery Objects are carried, typically Delivery Objects that are related, e.g. MPEG-DASH Segments associated to one Representation. Along with each Delivery Object, metadata properties are delivered such that the Delivery Objects can be used in applications.

One delivery object may be one ISO BMFF file or a part of one ISO BMFF file. The part of one ISO BMFF file may include a fragment, a GOP, a chunk, an access unit and/or an NAL unit.

As one embodiment, one TSI may match one track (MPEG-DASH representation) and one TOI may match one ISO MBFF file. In addition, one ISO BMFF file may include "ftyp", "moov", "moof" and/or "mdat".

"ftyp" is a container including information about file type and compatibility. "moov" is a container including all metadata for reproducing media data. If media content is divided into at least one media datum within one file or if media content is divided into at least one file, "moof" is a container including metadata for each divided media data. "mdat" includes media data such as audio data and video data. "mdat" may include at least one "1-frame", "P-frame" and/or "B-frame".

An "I-frame" refers to a frame generated using a spatial compression technique only independent of the frames, instead of a temporal compression technique using previous and next frames of a corresponding frame in MPEG. Since the "I-frame" is directly coded and generated from an image, the "I-frame" is composed of inter blocks only and may serve as a random access point. In addition, the "I-frame" may be a criterion of a "P-frame" and/or "B-frame" generated by predicting temporal motion. Accordingly, since the "I-frame reduces an extra spatial element of a frame thereof to perform compression, the "I-frame" provides a low compression rate. That is, according to the result of compression, the number of bits may be greater than the number of bits of other frames.

The "P-frame" means a screen generated by predicting motion with respect to a later scene in MPEG. The "P-frame" is a screen obtained by referring to a latest "I-frame" and/or "B-frame" and predicting a next screen via inter-screen forward prediction only. Accordingly, the "P-frame" provides a relatively high compression rate.

The "B-frame" refers to a predicted screen generated by predicting bidirectional motion in detail from previous and/or next "P-frames" and/or "I-frames" in a temporally predicted screen. The "B-frame" is coded and/or decoded based on a previous "I-frame" and/or "P-frame", a current frame and/or a next "I-frame" and/or "P-frame". Accordingly, coding and/or decoding time delay occurs. However, the "B-frame" provides the highest compression rate and does not form the basis of coding and/or decoding of the "P-frame" and/or "I-frame" so as not to propagate errors.

As described above, the priorities of "ftyp", "moov", "moof" and/or "mdat" in one ISO BMFF file may be different. Accordingly, packets including "ftyp", "moov", "moof" and/or "mdat" have the same TSI and/or TOI but may have different priorities.

For example, the priority information of the packet including "ftyp" and "moov" has a value of "0", the priority information of the packet including "moof" has a value of "1", the priority information of the packet including the "I-frame" has a value of "1", the priority information of the packet including the "P-frame" has a value of "2" and/or the priority information of the packet including the "B-frame" has a value of "3".

The broadcast signal transmission apparatus may assign priorities for packet data processing in order of a packet including "ftyp" and "moov", a packet including "moof", a packet including an "I-Picture", a packet including a "P-Picture" and/or a packet including a "B-Picture", if MPEG-DASH segments including video data, such as advanced video coding (AVC)/high efficiency video coding (HEVC), are transmitted.

In addition, intermediate nodes such as a relay and/or a router over a network may preferentially transmit a packet having high priority and selectively transmit a packet having low priority, according to network bandwidth and service purpose. Accordingly, the priority information is easily applicable to various service states.

In addition, the broadcast signal transmission apparatus may preferentially extract a packet having high priority (that is, a packet having a low priority information value) and selectively extract a packet having low priority (that is, a packet having high priority information value), based on the priority information of "ftyp", "moov", "moof", "I-Picture", "P-Picture" and/or "B-Picture", when video data such as AVC/HEVC is received, thereby configuring one sequence. As a modified embodiment, the broadcast signal reception apparatus may selectively extract a sequence having a high frame rate and a sequence having a low frame rate.

FIG. 57 is a diagram showing the structure of a packet including priority information according to another embodiment of the present invention.

The packet according to another embodiment of the present invention may be an LCT packet and the LCT packet may include a packet header and a packet payload. The packet header may include metadata for the packet payload. The packet payload may include data of MPEG-DASH content.

For example, the packet header may include an LCT version number field (V), a Congestion control flag field (C), a Protocol-Specific Indication field (PSI), a Transport Session Identifier flag field (S), a Transport Object Identifier flag field(O), a Half-word flag field (H), a Close Session flag field (A), a Close Object flag field(B), an LCT header length field (HDR_LEN), a Codepoint field (CP), a Congestion Control Information field (CCI), a Transport Session Identifier field (TSI), a Transport Object Identifier field (TOI), a Header Extensions field, and/or an FEC Payload ID field.

In addition, the packet payload may include an Encoding Symbol(s) field.

For a detailed description of fields having the same names as the above-described fields among the fields configuring the LCT packet according to another embodiment of the present invention, refer to the above description.

The packet header may further include priority information (EXT_TYPE) indicating the priority of the packet payload. The priority information (EXT_TYPE) may use an LCT header extension to indicate relative priority of the packet payload transmitted using a current packet. If the LCT header extension is used, a broadcast signal reception apparatus which does not support the LCT header extension may skip the priority information (EXT_TYPE), thereby increasing extensibility. The priority information (EXT_TYPE) using the LCT header extension is applicable to a packet for a transmission protocol such as real-time protocol (RTP).

The priority information (EXT_TYPE) may include a header extension type (HET) field, a priority field and/or a reserved field. According to embodiments, the priority information (EXT_TYPE) may include the priority field only.

The HET field may be an integer having 8 bits and may indicate the type of the header extension. For example, the HET field may identify the type of the header extension using one unique value among values of 128 to 255. In this case, the header extension may have a fixed length of 32 bits.

The priority field may indicate the priority of the packet payload transmitted using a current LCT packet among the LCT packets included in one file. In addition, the priority field may indicate the relative priority of the packet payload transmitted using the current LCT packet among the packets having the same TSI or TOI.

For example, the priority information may have a value of 0 to 255. As the value of the priority information decreases, the priority of the packet payload increases in processing of file-based media data.

For example, the priority information of the packet including "ftyp" and "moov" has a value of "0", the priority information of the packet including "moof" has a value of "1", the priority information of the packet including the "I-frame" has a value of "2", the priority information of the packet including the "P-frame" has a value of "3" and/or the priority information of the packet including the "B-fame" has a value of "4".

The reserved field may be a field reserved for future use.

Hereinafter, the same description as the above description will be omitted.

FIG. 58 is a diagram showing the structure of a packet including offset information according to another embodiment of the present invention.

The packet according to another embodiment of the present invention may be an LCT packet and the LCT packet may include a packet header and a packet payload.

The packet header may include metadata for the packet payload. The packet payload may include data of MPEG-DASH content.

For example, the packet header may include an LCT version number field (V), a Congestion control flag field (C), a Protocol-Specific Indication field (PSI), a Transport Session Identifier flag field (S), a Transport Object Identifier flag field (O), a Half-word flag field (H), a Reserved field (Res), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field (TOI), a Header Extensions field, and/or an FEC Payload ID field.

In addition, the packet payload may include an Encoding Symbol(s) field.

For a detailed description of fields having the same names as the above-described fields among the fields configuring the LCT packet according to another embodiment of the present invention, refer to the above description.

The packet header may further include offset information. The offset information may indicate an offset within a file of the packet payload transmitted using a current packet. The offset information may indicate the offset in bytes from a start point of the file. The offset information may be in the form of LCT header extension and may be included in an FEC payload ID field.

As one embodiment, the case in which the LCT packet includes the offset information (EXT_OFS) in the form of LCT header extension will be described.

If the LCT header extension is used, the receiver which does not support LCT extension skips the offset information (EXT_OFS), thereby increasing extensibility. The offset information (EXT_OFS) using LCT header extension is applicable to a packet for a transport protocol such as real-time protocol (RTP).

The offset information (EXT_OFS) may include a header extension type (HET) field, a header extension length (HEL) field and a start offset (Start Offset) field only.

The HET field is equal to the above description and a detailed description thereof will be omitted.

The HEL field indicates the total length of LCT header extension having a variable length. Fundamentally, in LCT, if the HET has a value of 0 to 127, variable-length header extension of a 32-bit word unit exists and the HEL field following the HET field indicates the total length of LCT header extension in 32-bit word units.

The start offset field may have a variable length and indicate an offset within a file of the packet payload transmitted using the current packet. The start offset field may indicate the offset in bytes from the start point of the file.

The LCT packet may include the offset information (Start Offset) not only in the format of LCT header extension but also in an FEC payload ID field. Hereinafter, the case in which the LCT packet includes the offset information in the FEC payload ID field will be described.

The FEC Payload ID field contains information that indicates to the FEC decoder the relationships between the encoding symbols carried by a particular packet and the FEC encoding transformation. For example, if the packet carries source symbols, then the FEC Payload ID field indicates which source symbols of the object are carried by the packet. If the packet carries repair symbols, then the FEC Payload ID field indicates how those repair symbols were constructed from the object.

The FEC Payload ID field may also contain information about larger groups of encoding symbols of which those contained in the packet are part. For example, the FEC Payload ID field may contain information about the source block the symbols are related to.

The FEC Payload ID contains Source Block Number (SBN) and/or Encoding Symbol ID (ESI). SBN is a non-negative integer identifier for the source block that the encoding symbols within the packet relate to. ESI is a non-negative integer identifier for the encoding symbols within the packet.

The FEC payload ID field according to another embodiment of the present invention may further include offset information (Start Offset).

An FEC Payload ID field is used that specifies the start address in octets of the delivery object. This information may be sent in several ways.

First, a simple new FEC scheme with FEC Payload ID set to size 0. In this case the packet shall contain the entire object as a direct address (start offset) using 32 bits.

Second, existing FEC schemes that are widely deployed using the Compact No-Code as defined in RFC 5445 in a compatible manner to RFC 6330 where the SBN and ESI defines the start offset together with the symbol size T.

Third, the LSID provides the appropriate signaling to signal any of the above modes using the @sourceFecPayloadID attribute and the FECParameters element.

Hereinafter, the offset information will be described in detail.

In a conventional FLUTE protocol, the offset information did not need to be transmitted. In the conventional FLUTE protocol, since an object (e.g., a file) is transmitted in non real time, one object was divided into at least one data having a fixed size and was transmitted.

For example, in the conventional FLUTE protocol, one object was divided into at least one source block having a fixed size, each source block was divided into at least one symbol having a fixed size, and a header was added to each symbol, thereby generating an LCT packet (or a FLUTE packet). In the conventional FLUTE protocol, one LCT packet may comprise only one fixed size symbol.

Since each source block and/or symbol has a fixed size, the receiver may recognize the position of each source block and/or symbol within the object based on identification information of the source block and/or symbol. Accordingly, the receiver may receive all source blocks and/or symbols configuring one object and then reconfigure the object based on the identification information of the received source blocks and/or symbols.

While the object is transmitted in non real time in the conventional FLUTE protocol, the object is divided into delivery objects each having a variable size and is transmitted in real time in delivery object units in a ROUTE protocol according to another embodiment of the present invention. For example, the ROUTE protocol may transmit the object on the basis of an object internal structure unit having a variable size.

One delivery object may be one ISO BMFF file or a part of one ISO BMFF file. The part of one ISO BMFF file may include a fragment, a GOP, a chunk, an access unit and/or an NAL unit. The part of one ISO BMFF field may mean the above-described object internal structure. The object internal object is an independently meaningful data unit and the type of the object internal structure is not limited thereto and may further include meaningful units.

In the LCT packet according to another embodiment of the present invention, each LCT packet (or ALC/LCT packet, ROUTE packet) may comprise at least one encoding symbol. In the ROUTE protocol according to another embodiment of the present invention, one LCT packet may comprise plural encoding symbols. And, each encoding symbol may be variable size.

In the LCT packet according to another embodiment of the present invention, each TSI may match each track. For example, each TSI may match one of a video track, an audio track and/or representation of MPEG-DASH. In addition, each TOI may be mapped to each delivery object. For example, if TOI is mapped to a segment of MPEG-DASH, the delivery object may be an ISO BMFF file. In addition, each TOI may be mapped to one of a fragment, a chunk, a GOP, an access unit and/or an NAL unit.

When the receiver receives LCT packets in real time on the basis of a delivery object unit having a variable size, the receiver may not recognize where the received LCT packets are located within the object. For example, when the receiver receives LCT packets in an arbitrary order, the receiver may not align the LCT packets in sequence and may not accurately restore and/or parse the delivery object.

Accordingly, the offset information according to another embodiment of the present invention may indicate the offset of the currently transmitted packet payload within the file (e.g., the object). The receiver may recognize that the currently transmitted packets have first data of the file based on the offset information. In addition, the receiver may recognize the order of the currently transmitted packets within the delivery object based on the offset information. In addition, the receiver may recognize the offset within the file of the packet payload currently transmitted by the packets and the offset within the file of the delivery object currently transmitted by the packets, based on the offset information.

For example, TSI may match video track (MPEG-DASH representation and TOI may match an ISO BMFF file (e.g., an object). In this case, the delivery object may represent an ISO BMFF file. One video track (MPEG-DASH representation, TSI=1) may include a first object (TSI=1, TOI=1) and a second object (TSI=1, TOI=2). The first object (TSI=1, TOI=1) may sequentially include a first packet (TSI=1, TOI=1, Start Offset=0), a second packet (TSI=1, TOI=1, Start Offset=200), a third packet (TSI=1, TOI=1, Start Offset=400), a fourth packet (TSI=1, TOI=1, Start Offset=800) and a fifth packet (TSI=1, TOI=1, Start Offset=1000).

In this case, if the value of the offset information (Start Offset) is "0", the packet payload of the packet may have first data of the file. Since the value of the offset information (Start Offset) of the first packet is "0", the receiver may recognize that the packet payload of the first packet has first data of the first object.

In addition, the value of the offset information (Start Offset) may indicate the order of packets within the object. Since the offset information sequentially increases from the first packet to the fifth packet within the first object, the receiver may recognize that the first packet to the fifth packet are sequentially arranged within the first object.

Accordingly, the receiver may sequentially align the received LCT packets within each object and accurately restore each delivery object and/or object based on the offset information. In addition, the receiver may accurately parse and/or decode each delivery object and/or object based on the offset information.

When the receiver receives the LCT packets in real time on the basis of a delivery object unit having a variable size, the receiver may not recognize where the received LCT packets are located within the object (e.g., the file). For example, if the LCT packets are transmitted in arbitrary sequence, the receiver may not accurately confirm the offset within the object of the received LCT packets and thus may not accurately restore the delivery object and/or object via collection of the LCT packets.

For example, TSI may match video track (MPEG-DASH representation) and TOI may match a chunk. In this case, one video track (MPEG-DASH representation, TSI=1) may include a first object (TSI=1) and a second object (TSI=1). In addition, the first object may include a first chunk (TSI=1, TOI=1), a second chunk (TSI=1, TOI=2) and/or a third chunk (TSI=1, TOI=3) and the second object may include a fourth chunk (TSI=1, TOI=4) and/or a fifth chunk (TSI=1, TOI=5).

The receiver may receive a first packet (TSI=1, TOI=1, Start Offset=0) including a first chunk, a second packet (TSI=1, TOI=2, Start Offset=200) including a second chunk, a third packet (TSI=1, TOI=3, Start Offset=1000) including a third chunk, a fourth packet (TSI=1, TOI=4, Start Offset=0) including a fourth chunk and a fifth packet (TSI=1, TOI=5, Start Offset=1000) including a fifth chunk. Although one packet includes one chunk in this description, one chunk may include at least one packet.

If TOT does not match an object (e.g., a file) but matches an object internal structure which is a data unit smaller than an object, the receiver may identify the object unless there is information for identifying the object.

Accordingly, the receiver may not accurately determine whether the received first packet, second packet and/or third packet belong to the first object or the second object using TSI and TOI only. In addition, the receiver may not determine whether the received fourth packet and/or fifth packet belong to the first object or the second object using TSI and TOI only.

That is, the receiver may identify that the first packet to the fifth packet are sequentially arranged based on TSI and TOI but may not identify whether the third packet belongs to the first object or the second object using TSI and TOI only. In addition, the receiver may identify that the fifth packet is a next packet of the third packet based on TSI and TOI but may not identify whether the fourth packet belongs to the first object or the second object using TSI and TOI only.

In this case, the receiver may not accurately restore the first object even when receiving the first packet, the second packet and/or the third packet. In addition, the receiver may not accurately restore the second object even when receiving the fourth packet and/or the fifth packet. As a result, the receiver may not reproduce content in real time.

Accordingly, the LCT packets according to another embodiment of the present invention provide offset information (Start Offset). The offset information may indicate the offset of the currently transmitted packet payload within the object. The receiver may identify the object internal structure and/or packets included in the same object based on the offset information.

If the value of the offset information is "0", the packet is a first packet of the object. That is, since the offset information of the first packet and the fourth packet is "0", the first packet and the fourth packet respectively belong to different objects and respectively indicate first packets of the respective objects. The receiver may identify that the first packet, the second packet and/or the third packet belong to the first object and the fourth packet and the fifth packet belong to the second object, based on the offset information as well as TSI and/or TOI.

Accordingly, the receiver identify where the received LCT packets are located within each object based on at least one of TSI, TOI and/or offset information and align the received LCT packets in sequence. For example, the receiver may align the packets such that the offset information and TOI sequentially increase.

Then, the receiver may identify a packet having offset information of "0" to a previous packet of a next packet having offset information of "0" using one object. The receiver may identify the delivery object and/or the object internal structure within one object based on TOI.

In addition, the receiver may accurately restore each delivery object and/or object.

In addition, the receiver may accurately parse and/or decode each delivery object and/or object based on at least one of TSI, TOI and/or offset information.

As described above, when the transmitter transmits data in object internal structure units as an independently meaningful unit, it is possible to transmit data with a variable size in real time. Accordingly, when the receiver receives and identifies the object internal structure even before completely receiving one object, the receiver may reproduce the object in object internal structure units. As a result, file (or object) based multimedia content may be transmitted and reproduced via a broadcast network in real time.

FIG. 59 is a diagram showing the structure of a packet including random access point (RAP) information according to another embodiment of the present invention.

The packet according to another embodiment of the present invention may be an LCT packet and the LCT packet may include a packet header and a packet payload. The packet header may include metadata for the packet payload. The packet payload may include data of MPEG-DASH content.

For example, the packet header may include an LCT version number field (V), a Congestion control flag field (C), a Protocol-Specific Indication field (PSI), a Transport Session Identifier flag field (S), a Transport Object Identifier flag field (O), a Half-word flag field (H), a Reserved field (Res), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field (TOI), a Header Extensions field, and an FEC Payload ID field.

In addition, the packet payload may include an encoding symbol(s) field.

For a detailed description of fields having the same names as the above-described fields among the fields configuring the LCT packet according to another embodiment of the present invention, refer to the above description.

The packet header may further include random access point (RAP) information (P). The RAP information (P) may indicate whether data corresponding to the random access point (RAP) is included in the packet payload currently transmitted by the packet. The RAP information (P) may use one bit located at a twelfth or thirteenth bit from a start point of each packet to indicate whether the data corresponding to the random access point (RAP) is included in the packet payload currently transmitted by the packet. In this case, since one bit is used, it is possible to decrease the size of the packet header and to increase efficiency.

The random access point (RAP) may be encoded without referring to other frames and means a basic frame able to be randomly accessed. For example, an "I-frame" means a frame which is generated using a spatial compression technique only independently of other frames without a temporal compression technique using a previous frame and a subsequent frame of a corresponding frame in MPEG. Accordingly, since the "I-frame" is directly coded and generated from an image, the "I-frame" is composed of inter blocks only and may serve as a random access point.

The receiver may identify packets able to be randomly accessed from a packet sequence, which is being transmitted, based on the RAP information (P). For example, if the payload of the received packet includes data about the "I-frame", the RAP information (P) may indicate that the packet includes data corresponding to the random access point (RAP). In addition, if the payload of the received packet includes data about "B-frame" and/or "P-frame", the RAP information (P) may indicate that the packet does not include data corresponding to the random access point (RAP).

When the receiver sequentially receives GOP data starting from a specific time, if a first packet corresponds to an RAP such as "I-frame", the receiver may start decoding at that packet. However, if the first packet corresponds to a non-RAP such as "B-frame" and/or "P-frame", the receiver may not start decoding at that packet. In this case, the receiver may skip a packet corresponding to a non-RAP and start decoding at a next packet corresponding to an RAP such as "I-frame".

Accordingly, in channel tuning in a broadcast environment or in approaching an arbitrary point within a sequence according to a user request, since the receiver skips the packet which does not correspond to the RAP based on the RAP information (P) and starts decoding at the packet corresponding to the RAP, it is possible to increase packet reception and decoding efficiency.

FIG. 60 is a diagram showing the structure of a packet including random access point (RAP) information according to another embodiment of the present invention.

The packet according to another embodiment of the present invention may be an LCT packet and the LCT packet may include a packet header and a packet payload. The packet header may include metadata for the packet payload. The packet payload may include data of MPEG-DASH content.

For example, the packet header may include an LCT version number field (V), a Congestion control flag field (C), a Protocol-Specific Indication field (PSI), a Transport Session Identifier flag field (S), a Transport Object Identifier flag field (O), a Half-word flag field (H), a Reserved field (Res), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field (TOI), a Header Extensions field, and an FEC Payload ID field.

In addition, the packet payload may include an encoding symbol(s) field.

The packet header may further include random access point (RAP) information (P).

For a detailed description of fields having the same names as the above-described fields among the fields configuring the LCT packet according to another embodiment of the present invention, refer to the above description.

The RAP information (P) may use one bit located at a sixth or seventh bit from a start point of each packet to indicate whether data corresponding to the random access point (RAP) is included in the packet payload currently transmitted by the packet. In this case, since one bit is used, it is possible to decrease the size of the packet header and to increase efficiency.

Since the packet according to another embodiment of the present invention includes the RAP information (P) using the bit located at the sixth or seventh bit of the packet header, the bit located at the twelfth or thirteenth bit of the packet header may be used for other purposes.

For example, the packet may include the RAP information (P) using the bit located at the sixth or seventh bit of the packet header and include the above-described object type information and/or priority information using the bit located at the twelfth and/or thirteenth bit of the packet header.

Figures 61, 62:
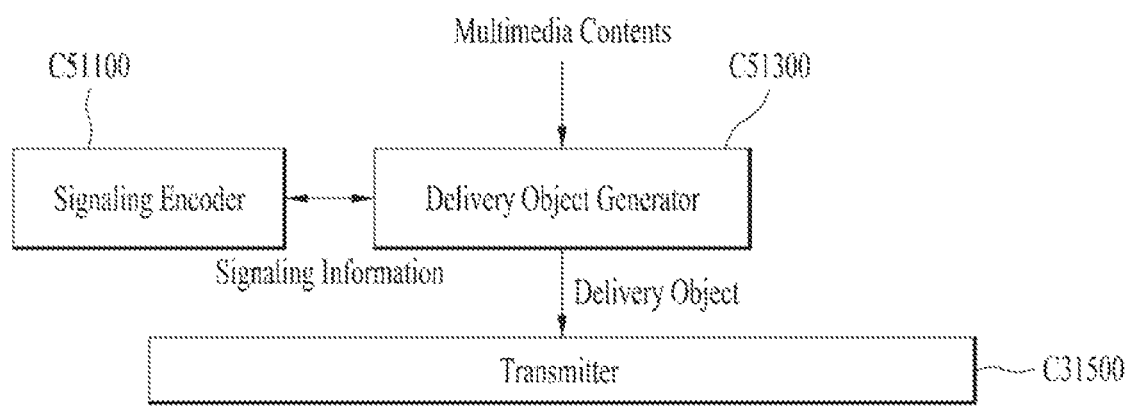
FIG. 61 is a diagram showing the structure of a packet including real time information according to another embodiment of the present invention.
FIG. 62 is a diagram showing the structure of a broadcast signal transmission apparatus according to another embodiment of the present invention.

FIG. 61 is a diagram showing the structure of a packet including real time information according to another embodiment of the present invention.

The packet according to another embodiment of the present invention may be an LCT packet and the LCT packet may include a packet header and a packet payload. The packet header may include metadata for the packet payload. The packet payload may include data of MPEG-DASH content.

For example, the packet header may include an LCT version number field (V), a Congestion control flag field (C), a Protocol-Specific Indication field (PSI), a Transport Session Identifier flag field (S), a Transport Object Identifier flag field (O), a Half-word flag field (H), a Reserved field (Res), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field (TOI), a Header Extensions field, and/or an FEC Payload ID field.

In addition, the packet payload may include an encoding symbol(s) field.

For a detailed description of fields having the same names as the above-described fields among the fields configuring the LCT packet according to another embodiment of the present invention, refer to the above description.

The transmitter may indicate whether the object and/or object internal structure transmitted by the LCT packet is transmitted in real time or in non real time via real time information (T) defined at a file delivery table (FDT) level and/or a delivery object level. The delivery object level may include an object level and/or an object internal structure level.

If the real time information (T) is defined at the FDT level, the real time information (T) may indicate whether all data described in the FDT is transmitted in real time or non real time. For example, an LSID may include real time information (T). In addition, if the real time information (T) is defined at the FDT level, the real time information (T) may indicate whether all objects described in the FDT are transmitted in real time or in non real time. Here, all objects described in the FDT may indicate all objects belonging to a corresponding LCT transport session.

In addition, if the real time information (T) is defined at the delivery object level, the real time information (T) may indicate whether all data belonging to the delivery object is transmitted in real time or in non real time. For example, if the delivery object matches an object and the real time information (T) is defined at the delivery object level, the real time information T may indicate whether all data belonging to the object is transmitted in real time or in non real time. In addition, if the delivery object matches an object internal structure and the real time information (T) is defined at the delivery object level, the real time information (T) may indicate whether all data belonging to the object internal structure is transmitted in real time or in non real time.

As one embodiment, if the real time information (T) is defined at the delivery object level, the packet header may further include real time information (T). The real time information (T) may indicate whether the delivery object transmitted by the LCT packet is transmitted in real time or in non real time.

For example, the delivery object may be a data unit matching TOI. In addition, the value of the real time information (T) of "0" may indicate that the delivery object transmitted by the LCT packet is transmitted in non real time and the value of the real time information (T) of "1" may indicate that the delivery object transmitted by the LCT packet is transmitted in real time.

The real time information (T) may use a first bit of a TOI field to indicate that the delivery object transmitted by the LCT packet is transmitted in real time or in non real time.

As described above, if the TOI field is divided into an OGI field and a DTOI field, the real time information (T) may use a first bit of the OGI field to indicate whether the delivery object transmitted by the LCT packet is transmitted in real time or in non real time.

Since the real time information (T) is included in the first bit of the TOI field and/or the OGI field, the transmitter may transmit real-time data and non-real-time data within one LCT transport session (e.g., video track, audio track and representation of MPEG-DASH). For example, the transmitter may transmit audio data and/or video data within one LCT transport session in real time and transmit an image and/or an application in non real time. In addition, the transmitter may transmit some delivery objects within one LCT transport session in real time and transmit the remaining delivery objects in non real time.

In addition, since the real time information (T) is included in a first bit of an existing TOI field, the LCT packet according to another embodiment of the present invention can guarantee backward compatibility with an existing ALC/LCT and/or FLUTE protocol.

FIG. 62 is a diagram showing the structure of a broadcast signal transmission apparatus according to another embodiment of the present invention.

The broadcast signal transmission apparatus according to another embodiment of the present invention may include a delivery object generator C51300, a signaling encoder C51100 and/or a transmitter C31500.

The delivery object generator may divide a file into at least one delivery object corresponding to a part of the file.

The signaling encoder may encode signaling information including metadata for the delivery object.

The signaling information may include real time information indicating whether at least one delivery object is transmitted in real time via a unidirectional channel using at least one layered coding transport (LCT) packet.

The transmitter may transmit at least one delivery object and signaling information.

The broadcast signal transmission apparatus according to another embodiment of the present invention may include all the functions of the above-described broadcast signal transmission apparatus. In addition, for a detailed description of the signaling information, refer to the above description or the following description of a subsequent figure.

Figure 63:
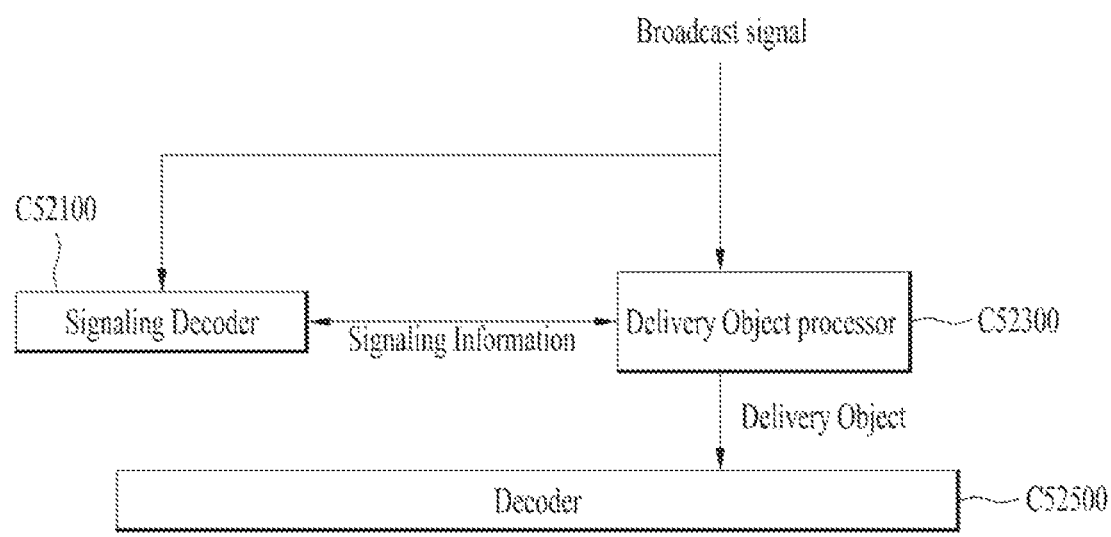
FIG. 63 is a diagram showing the structure of a broadcast signal reception apparatus according to another embodiment of the present invention.

FIG. 63 is a diagram showing the structure of a broadcast signal reception apparatus according to another embodiment of the present invention.

The broadcast signal reception apparatus may receive a broadcast signal. The broadcast signal may include signaling data, ESG data, NRT content data and/or RT content data.

The broadcast signal reception apparatus may join in a ROUTE session based on a ROUTE session description. The ROUTE session description may include an IP address of the broadcast signal transmission apparatus and an address and port number of a ROUTE session, the session is an ROUTE session, and all packets may include information indicating an LCT packet. In addition, the ROUTE session description may further include information necessary to join in and consume the session using an IP/UDP.

Then, the broadcast signal reception apparatus may receive an LCT session instance description (LSID) including information about at least one LCT transport session included in the ROUTE session.

Then, the broadcast signal reception apparatus may receive multimedia content included in at least one LCT transport session. The multimedia content may be composed of at least one file. The broadcast signal reception apparatus may receive file based multimedia content in real time via a unidirectional channel using a layered coding transport (LCT) packet.

The broadcast signal reception apparatus according to another embodiment of the present invention may include a signaling decoder C52100, a delivery object processor C52300 and/or a decoder C52500.

The signaling decoder C52100 may decode signaling information including metadata for at least one delivery object corresponding to a part of a file.

The signaling information may include real time information indicating whether at least one delivery object is transmitted in real time via a unidirectional channel using a layered coding transport (LCT) packet. The signaling information may be included not only in an LSID but also in an extended header of the LCT packet.

The real time information is defined in a file delivery table (FDT) and may indicate whether all delivery objects described in the FDT are transmitted in real time. In addition, the real time information is defined by a first bit of a transport object identifier (TOI) field for identifying the delivery object and may indicate whether all data belonging to the delivery object is transmitted in real time.

The delivery object processor C52300 may collect at least one LCT packet and restore at least one delivery object. The delivery object processor C52300 may include functions of the above-described transmission block regenerator C22030, fragment regenerator C22040 and fragment parser C22050 and/or extractor C32050.

The decoder C52500 may decode at least one delivery object. The decoder C52500 may receive information about the delivery object in the form of at least one access unit, decode the at least one access unit and generate media data. The decoder C52500 may decode the delivery object, upon receiving the delivery object corresponding to the part of the file, although one file is not completely received.

The signaling information may further include offset information indicating the offset of data transmitted by the LCT packet within the file. The delivery object processor C52300 may identify the delivery object based on the offset information. The offset information may be indicated in bytes from the start point of the file. The offset information may be in the form of an LCT header extension and may be included in an FEC payload ID field.

When the broadcast signal reception apparatus receives the LCT packet in real time on the basis of a delivery object unit having a variable size, the receiver may not recognize where the received LCT packets are located in the object. For example, when the receiver receives LCT packets in an arbitrary order, the receiver may not align the LCT packets in sequence and may not accurately restore and/or parse the delivery object.

Accordingly, the offset information according to another embodiment of the present invention may indicate the offset of the currently transmitted packet payload within the file (e.g., the object). The broadcast signal reception apparatus may recognize that the currently transmitted packets have first data of the file based on the offset information. In addition, the broadcast signal reception apparatus may recognize the order of the currently transmitted LCT packets within the file and/or the delivery object based on the offset information.

The broadcast signal reception apparatus may recognize the offset within the file of the packet payload currently transmitted by the LCT packets and the offset within the file of the delivery object currently transmitted by the LCT packets, based on the offset information.

If TOI does not match an object (e.g., a file) but matches an object internal structure which is a data unit smaller than an object, the broadcast signal reception apparatus may identify the object unless there is no information for identifying the object.

Accordingly, the broadcast signal reception apparatus may identify the object internal structure and/or the LCT packets included in the same object based on the offset information.

The signaling information may further include RAP information indicating whether the LCT packet includes data corresponding to a random access point (RAP). The random access point may be encoded without referring to other frames and means a basic frame able to be randomly accessed.

The delivery object processor C52300 may collect at least one packet from packets for transmitting data corresponding to the random access point based on the RAP information.

For example, when the broadcast signal reception apparatus sequentially receives GOP data starting from a specific time, if a first packet corresponds to an RAP such as "I-frame", the broadcast signal transmission apparatus may start decoding at that LCT packet. However, if the first packet corresponds to a non-RAP such as "B-frame" and/or "P-frame", the broadcast signal reception apparatus may not start decoding at that packet. In this case, the receiver may skip an LCT packet corresponding to a non-RAP and start decoding at an LCT packet corresponding to an RAP such as "I-frame".

The signaling information may further include priority information indicating the priority of the data transmitted by the LCT packets.

The delivery object process C52300 may selectively collect the LCT packets based on the priority information.

The broadcast signal reception apparatus may preferentially extract LCT packets having high priority and selectively extract LCT packets having low priority, based on the priority information of 'ftyp', 'moov', 'moof', 'I-Picture', 'P-Picture', and/or 'B-Picture', when receiving video data such as AVC/HEVC, thereby configuring one sequence.

Figure 64:
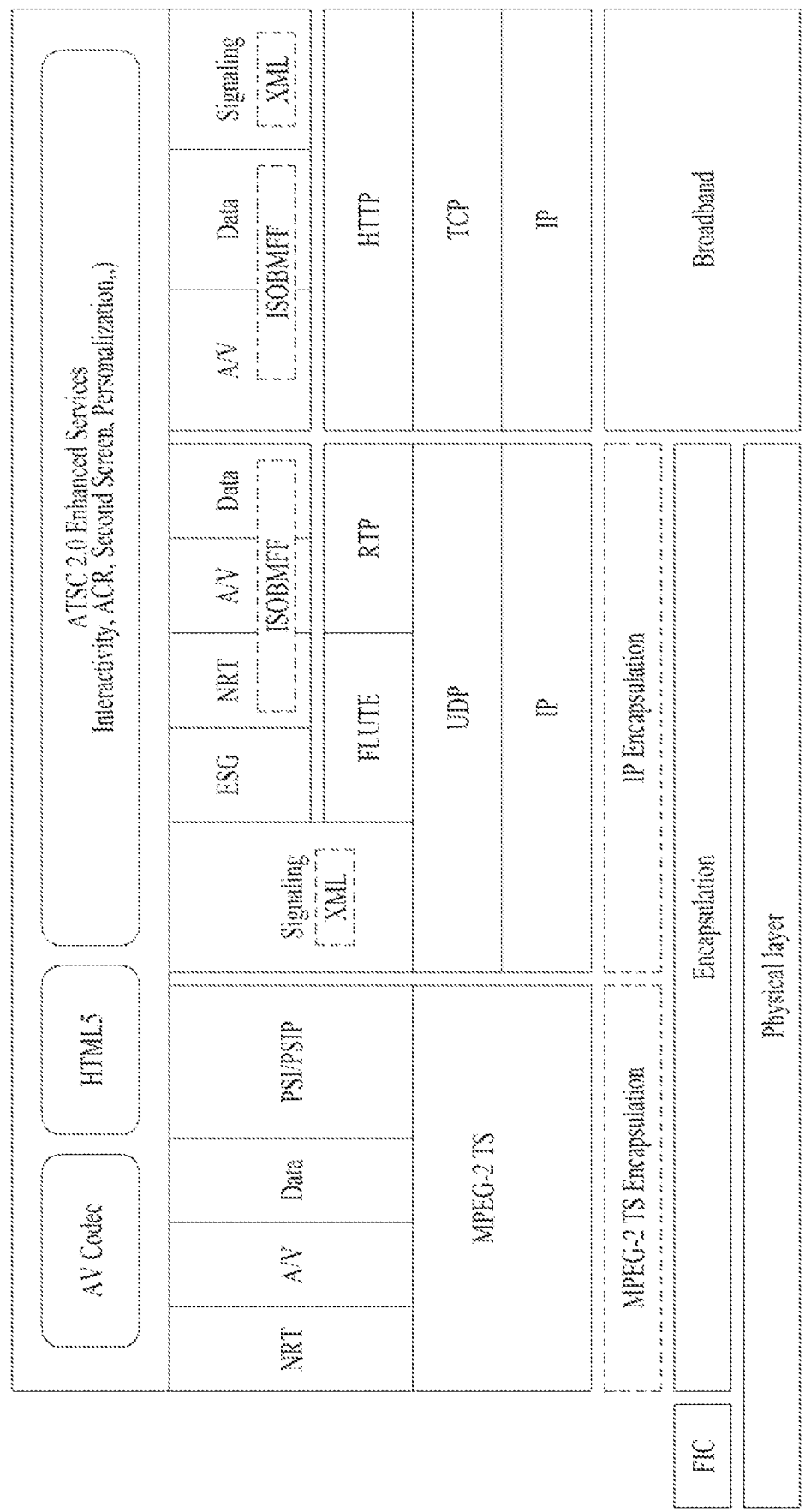
FIG. 64 is a view showing a protocol stack for a next generation broadcasting system according to an embodiment of the present invention. 1941

FIG. 64 is a view showing a protocol stack for a next generation broadcasting system according to an embodiment of the present invention.

The broadcasting system according to the present invention may correspond to a hybrid broadcasting system in which an Internet Protocol (IP) centric broadcast network and a broadband are coupled.

The broadcasting system according to the present invention may be designed to maintain compatibility with a conventional MPEG-2 based broadcasting system.

The broadcasting system according to the present invention may correspond to a hybrid broadcasting system based on coupling of an IP centric broadcast network, a broadband network, and/or a mobile communication network (or a cellular network).

Referring to the figure, a physical layer may use a physical protocol adopted in a broadcasting system, such as an ATSC system and/or a DVB system. For example, in the physical layer according to the present invention, a transmitter/receiver may transmit/receive a terrestrial broadcast signal and convert a transport frame including broadcast data into an appropriate form.

In an encapsulation layer, an IP datagram is acquired from information acquired from the physical layer or the acquired IP datagram is converted into a specific frame (for example, an RS Frame, GSE-lite, GSE, or a signal frame). The frame main include a set of IP datagrams. For example, in the encapsulation layer, the transmitter include data processed from the physical layer in a transport frame or the receiver extracts an MPEG-2 TS and an IP datagram from the transport frame acquired from the physical layer.

A fast information channel (FIC) includes information (for example, mapping information between a service ID and a frame) necessary to access a service and/or content. The FIC may be named a fast access channel (FAC).

The broadcasting system according to the present invention may use protocols, such as an Internet Protocol (IP), a User Datagram Protocol (UDP), a Transmission Control Protocol (TCP), an Asynchronous Layered Coding/Layered Coding Transport (ALC/LCT), a Rate Control Protocol/RTP Control Protocol (RCP/RTCP), a Hypertext Transfer Protocol (HTTP), and a File Delivery over Unidirectional Transport (FLUTE). A stack between these protocols may refer to the structure shown in the figure.

In the broadcasting system according to the present invention, data may be transported in the form of an ISO based media file format (ISOBMFF). An Electrical Service Guide (ESG), Non Real Time (NRT), Audio/Video (A/V), and/or general data may be transported in the form of the ISOBMFF.

Transport of data through a broadcast network may include transport of a linear content and/or transport of a non-linear content.

Transport of RTP/RTCP based AN and data (closed caption, emergency alert message, etc.) may correspond to transport of a linear content.

An RTP payload may be transported in the form of an RTP/AV stream including a Network Abstraction Layer (NAL) and/or in a form encapsulated in an ISO based media file format. Transport of the RTP payload may correspond to transport of a linear content. Transport in the form encapsulated in the ISO based media file format may include an MPEG DASH media segment for A/V, etc.

Transport of a FLUTE based ESG, transport of non-timed data, transport of an NRT content may correspond to transport of a non-linear content. These may be transported in an MIME type file form and/or a form encapsulated in an ISO based media file format. Transport in the form encapsulated in the ISO based media file format may include an MPEG DASH media segment for A/V, etc.

Transport through a broadband network may be divided into transport of a content and transport of signaling data.

Transport of the content includes transport of a linear content (A/V and data (closed caption, emergency alert message, etc.)), transport of a non-linear content (ESG, nontimed data, etc.), and transport of a MPEG DASH based Media segment (A/V and data).

Transport of the signaling data may be transport including a signaling table (including an MPD of MPEG DASH) transported through a broadcasting network.

In the broadcasting system according to the present invention, synchronization between linear/non-linear contents transported through the broadcasting network or synchronization between a content transported through the broadcasting network and a content transported through the broadband may be supported. For example, in a case in which one UD content is separately and simultaneously transported through the broadcasting network and the broadband, the receiver may adjust the timeline dependent upon a transport protocol and synchronize the content through the broadcasting network and the content through the broadband to reconfigure the contents as one UD content.

An applications layer of the broadcasting system according to the present invention may realize technical characteristics, such as Interactivity, Personalization, Second Screen, and automatic content recognition (ACR). These characteristics are important in extension from ATSC 2.0 to ATSC 3.0. For example, HTML5 may be used for a characteristic of interactivity.

In a presentation layer of the broadcasting system according to the present invention, HTML and/or HTML5 may be used to identify spatial and temporal relationships between components or interactive applications.

In the present invention, signaling includes signaling information necessary to support effective acquisition of a content and/or a service. Signaling data may be expressed in a binary or XMK form. The signaling data may be transmitted through the terrestrial broadcasting network or the broadband.

A real-time broadcast A/V content and/or data may be expressed in an ISO Base Media File Format, etc. In this case, the A/V content and/or data may be transmitted through the terrestrial broadcasting network in real time and may be transmitted based on IP/UDP/FLUTE in non-real time. Alternatively, the broadcast A/V content and/or data may be received by receiving or requesting a content in a streaming mode using Dynamic Adaptive Streaming over HTTP (DASH) through the Internet in real time. In the broadcasting system according to the embodiment of the present invention, the received broadcast A/V content and/or data may be combined to provide various enhanced services, such as an Interactive service and a second screen service, to a viewer.

An example of the physical layer (a Broadcast PHY and a Broadband PHY) of the transmitter may be the structure shown in FIG. 1. An example of the physical layer of the receiver may be the structure shown in FIG. 9.

The signaling data and the IP/UDP datagram may be transmitted through a specific data pipe (hereinafter, DP) of a transport frame (or a frame) delivered to the physical layer. For example, the input formatting block 1000 may receive signaling data and IP/UDP datagram and demultiplex each of the signaling data and the IP/UDP datagram into at least one DP. The output processor 9300 may perform an operation contrary to that of the input formatting block 1000.

Figure 65:
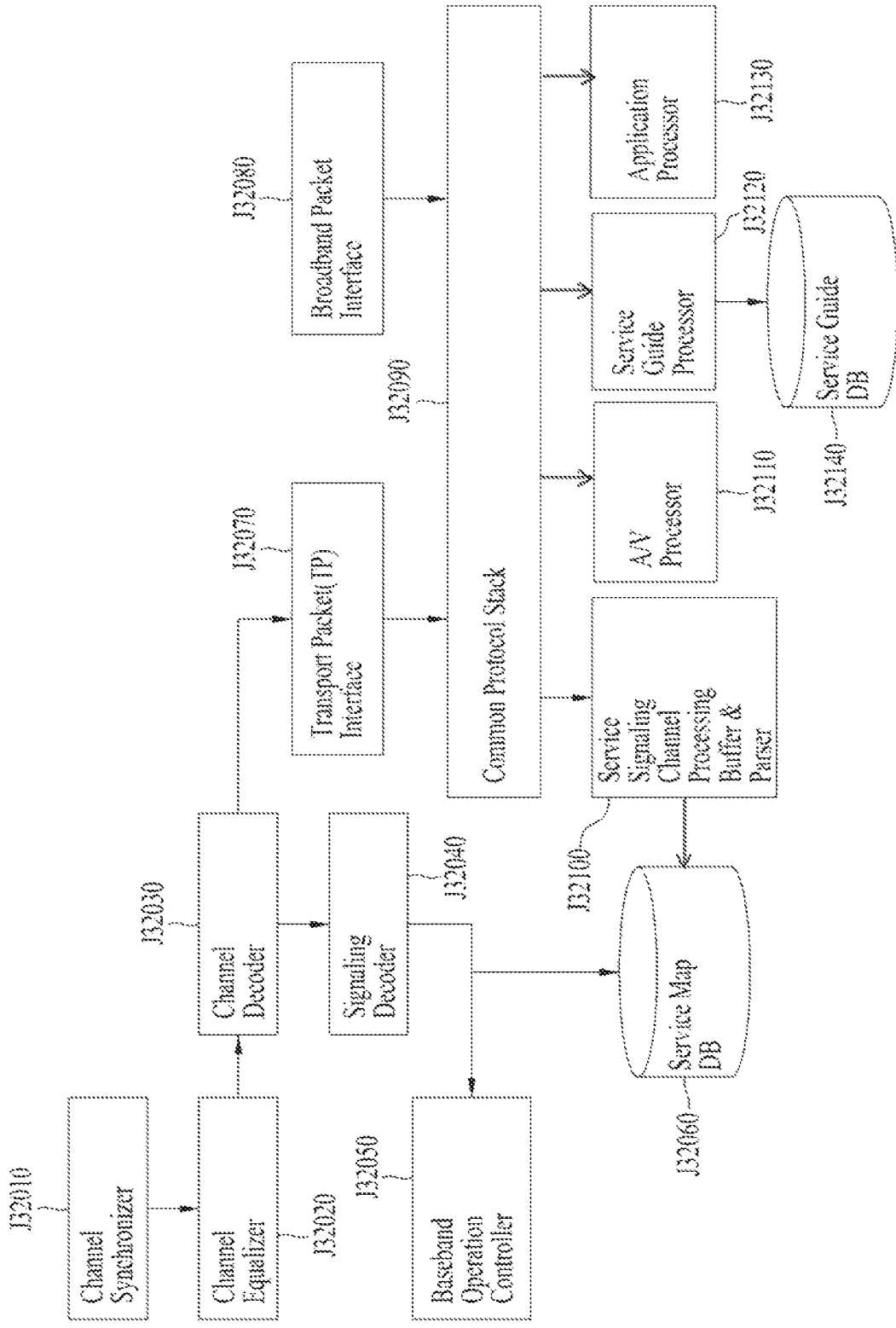
FIG. 65 illustrates a receiver of a next generation broadcasting system according to an embodiment of the present invention.

FIG. 65 illustrates a receiver of a next generation broadcasting system according to an embodiment of the present invention.

The receiver according to the present embodiment may include a receiving unit (not illustrated), a channel synchronizer J32010, a channel equalizer J32020, a channel decoder J32030, a signaling decoder J32040, a baseband operation controller J32050, a service map database (DB) J32060, a transport packet interface J32070, a broadband packet interface J32080, a common protocol stack J32090, a service signaling channel processing buffer & parser J32100, an A/V processor J32110, a service guide processor J32120, an application processor J32130 and/or a service guide DB J32140.

The receiving unit (not illustrated) receives a broadcast signal.

The channel synchronizer J32010 synchronizes a symbol frequency and timing so as to decode a signal received in a baseband. Here, the baseband refers to a region in which the broadcast signal is transmitted/received.

The channel equalizer J32020 performs channel equalization upon a received signal. The channel equalizer J32020 compensates for the received signal when the signal is distorted due to multipath, Doppler effect, or the like.

The channel decoder J32030 restores the received signal to a meaningful transport frame. The channel decoder J32030 performs forward error correction (FEC) on data or a transport frame included in the received signal.

The signaling decoder J32040 extracts and decodes signaling data included in the received signal. Here, the signaling data includes signaling data and/or service information to be described below.

The baseband operation controller J32050 controls processing of a signal in the baseband.

The service map DB J32060 stores the signaling data and/or the service information. The service map DB J32060 may store signaling data which is transmitted by being included in a broadcast signal and/or the signaling data which is transmitted by being included in a broadband packet.

The transport packet interface J32070 extracts a transport packet from a transport frame or a broadcast signal. The transport packet interface J32070 extracts signaling data or an IP datagram from the transport packet.

The broadband packet interface J32080 receives a broadcasting-related packet through the Internet. The broadband packet interface J32080 extracts the packet acquired through the Internet, and combines or extracts signaling data or AN data from the packet.

The common protocol stack J32090 processes a received packet according to a protocol which is included in a protocol stack. For example, the common protocol stack J32090 may process the received packet according to the above-described protocol stack.

The service signaling channel processing buffer & parser J32100 extracts signaling data included in the received packet. The service signaling channel processing buffer& parser J32100 extracts signaling information related to scanning and/or acquisition of a service and/or content from an IP datagram and the like, and parses the extracted signaling information. The signaling data may be present at a certain position or channel in the received packet. The position or channel may be referred to as a service signaling channel. For example, the service signaling channel may have a particular IP address, a UDP port number, a transmission session identifier, and the like. The receiver may recognize data transmitted to the particular IP address, the UDP port number, the transmission session, and the like as signaling data.

The A/V processor J32110 decodes and presents received A/V data.

The service guide processor J32120 extracts announcement information from the received signal, manages the service guide DB J32140 and provides a service guide.

The application processor J32130 extracts application data and/or application-related information included in the received packet, and processes the extracted data and/or information.

The service guide DB J32140 stores service guide data.

Figure 66:
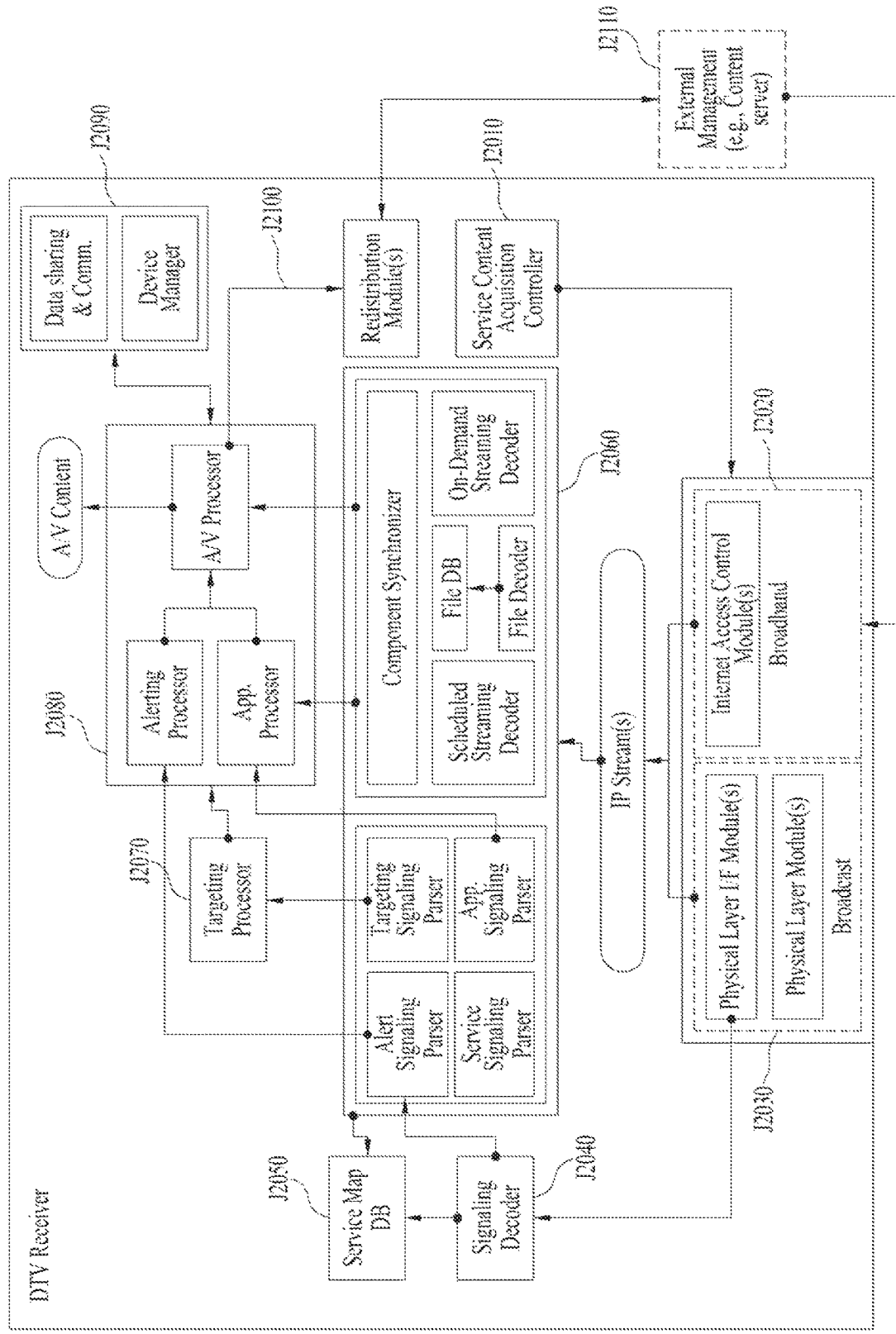
FIG. 66 is a view showing a broadcast receiver according to an embodiment of the present invention.

FIG. 66 is a view showing a broadcast receiver according to an embodiment of the present invention.

The broadcast receiver according to an embodiment of the present invention includes a service/content acquisition controller J2010, an Internet interface J2020, a broadcast interface J2030, a signaling decoder J2040, a service map database J2050, a decoder J2060, a targeting processor J2070, a processor J2080, a managing unit J2090, and/or a redistribution module J2100. In the figure is shown an external management device J2110 which may be located outside and/or in the broadcast receiver.

The service/content acquisition controller J2010 receives a service and/or content and signaling data related thereto through a broadcast/broadband channel. Alternatively, the service/content acquisition controller J2010 may perform control for receiving a service and/or content and signaling data related thereto.

The Internet interface J2020 may include an Internet access control module. The Internet access control module receives a service, content, and/or signaling data through a broadband channel. Alternatively, the Internet access control module may control the operation of the receiver for acquiring a service, content, and/or signaling data.

The broadcast interface J2030 may include a physical layer module and/or a physical layer I/F module. The physical layer module receives a broadcast-related signal through a broadcast channel. The physical layer module processes (demodulates, decodes, etc.) the broadcast-related signal received through the broadcast channel. The physical layer I/F module acquires an Internet protocol (IP) datagram from information acquired from the physical layer module or performs conversion to a specific frame (for example, a broadcast frame, RS frame, or GSE) using the acquired IP datagram.

The signaling decoder J2040 decodes signaling data or signaling information (hereinafter, referred to as 'signaling data') acquired through the broadcast channel, etc.

The service map database J2050 stores the decoded signaling data or signaling data processed by another device (for example, a signaling parser) of the receiver.

The decoder J2060 decodes a broadcast signal or data received by the receiver. The decoder J2060 may include a scheduled streaming decoder, a file decoder, a file database (DB), an on-demand streaming decoder, a component synchronizer, an alert signaling parser, a targeting signaling parser, a service signaling parser, and/or an application signaling parser.

The scheduled streaming decoder extracts audio/video data for real-time audio/video (A/V) from the IP datagram, etc. and decodes the extracted audio/video data.

The file decoder extracts file type data, such as NRT data and an application, from the IP datagram and decodes the extracted file type data.

The file DB stores the data extracted by the file decoder.

The on-demand streaming decoder extracts audio/video data for on-demand streaming from the IP datagram, etc. and decodes the extracted audio/video data.

The component synchronizer performs synchronization between elements constituting a content or between elements constituting a service based on the data decoded by the scheduled streaming decoder, the file decoder, and/or the on-demand streaming decoder to configure the content or the service.

The alert signaling parser extracts signaling information related to alerting from the IP datagram, etc. and parses the extracted signaling information.

The targeting signaling parser extracts signaling information related to service/content personalization or targeting from the IP datagram, etc. and parses the extracted signaling information. Targeting is an action for providing a content or service satisfying conditions of a specific viewer. In other words, targeting is an action for identifying a content or service satisfying conditions of a specific viewer and providing the identified content or service to the viewer.

The service signaling parser extracts signaling information related to service scan and/or a service/content from the IP datagram, etc. and parses the extracted signaling information. The signaling information related to the service/content includes broadcasting system information and/or broadcast signaling information.

The application signaling parser extracts signaling information related to acquisition of an application from the IP datagram, etc. and parses the extracted signaling information. The signaling information related to acquisition of the application may include a trigger, a TDO parameter table (TPT), and/or a TDO parameter element.

The targeting processor J2070 processes the information related to service/content targeting parsed by the targeting signaling parser.

The processor J2080 performs a series of processes for displaying the received data.

The processor J2080 may include an alert processor, an application processor, and/or an A/V processor.

The alert processor controls the receiver to acquire alert data through signaling information related to alerting and performs a process for displaying the alert data.

The application processor processes information related to an application and processes a state of an downloaded application and a display parameter related to the application.

The A/V processor performs an operation related to audio/video rendering based on decoded audio data, video data, and/or application data.

The managing unit J2090 includes a device manager and/or a data sharing & communication unit.

The device manager performs management for an external device, such as addition/deletion/renewal of an external device that can be interlocked, including connection and data exchange.

The data sharing & communication unit processes information related to data transport and exchange between the receiver and an external device (for example, a companion device) and performs an operation related thereto. The transportable and exchangeable data may be signaling data, a PDI table, PDI user data, PDI Q&A, and/or A/V data.

The redistribution module J2100 performs acquisition of information related to a service/content and/or service/content data in a case in which the receiver cannot directly receive a broadcast signal.

The external management device J2110 refers to modules, such as a broadcast service/content server, located outside the broadcast receiver for providing a broadcast service/content. A module functioning as the external management device may be provided in the broadcast receiver.

Figure 67:
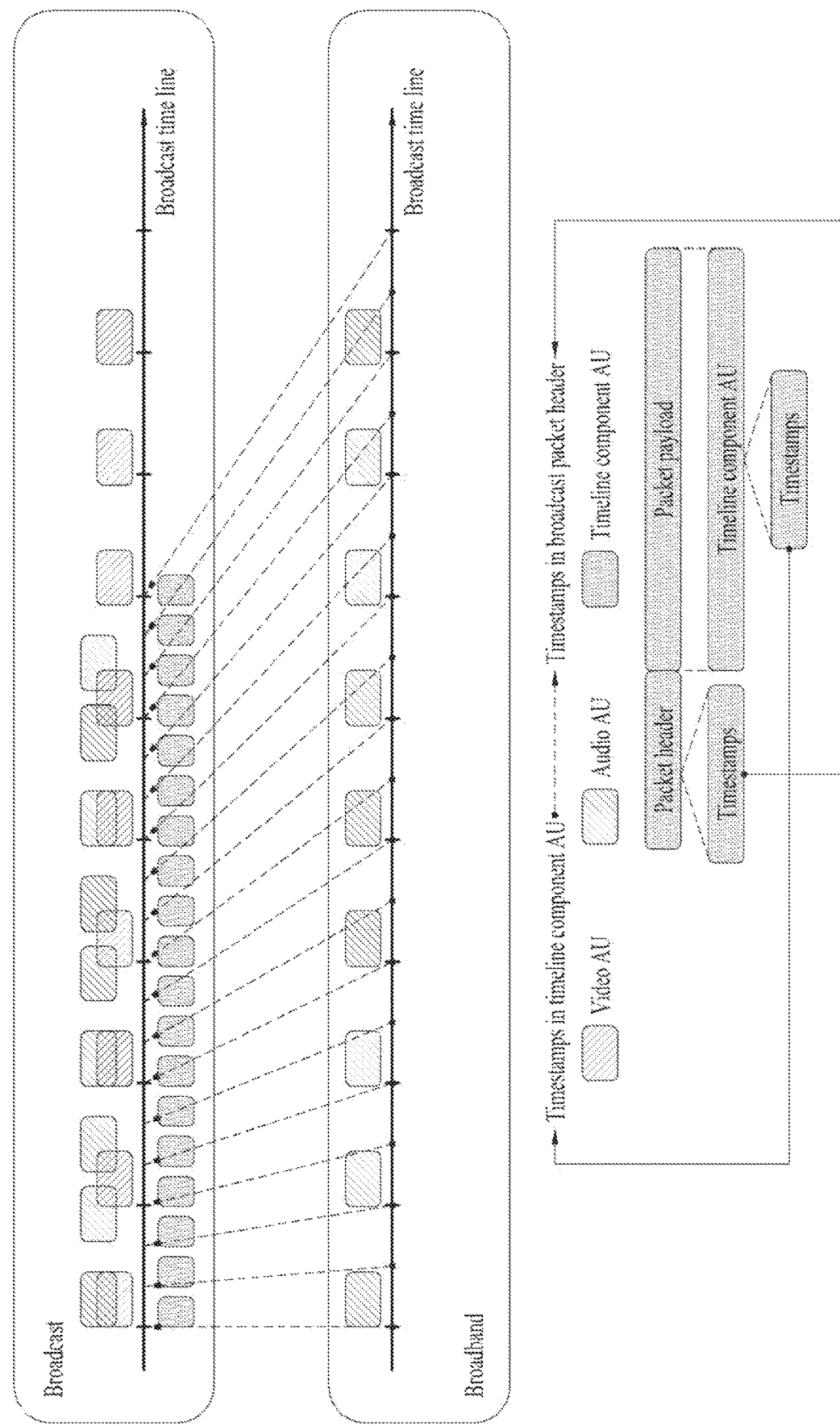
FIG. 67 illustrates a timeline component for synchronization between a transport stream in the broadcasting network and a transport stream in the Internet (heterogeneous network) according to an embodiment of the present invention.

FIG. 67 illustrates a timeline component for synchronization between a transport stream in the broadcasting network and a transport stream in the Internet (heterogeneous network) according to an embodiment of the present invention.

There is a possibility that streams transmitted through heterogeneous networks such as the broadcasting network and the Internet may be synchronized and used for one service in the receiver of the above-described broadcasting system. For example, as illustrated, when a video stream is transmitted through the broadcasting network and an audio stream is transmitted through the Internet, the two streams need to be synchronized, decoded and reproduced for one service. In other words, video is acquired over the broadcasting network and audio is acquired over the Internet to use one service. For example, a viewer who desires to view the same content using audio recorded in a different language from a language provided in the broadcasting network may receive the audio of the corresponding content recorded in the desired language through the Internet and use the received audio.

However, the two streams have different timelines and thus a mechanism is needed to perform mapping between the two timelines. Here, each of the timelines may indicate absolute or relative time serving as a criterion for reproduction or decoding of data or content transmitted through each transport network. In a service, content contained in video transmitted through the broadcasting network needs to be identical to content contained in audio transmitted through the Internet.

The present embodiment proposes a method and apparatus for using a timeline component for synchronization between streams transmitted through heterogeneous networks such as the broadcasting network and the Internet. A timeline component stream may include one or more timeline component access units (AUs). The timeline components AU may be contiguously disposed in the timeline component.

The timeline component AU shows an example in which a timeline of a stream transmitted through the Internet is mapped to a timeline of a stream transmitted through the broadcasting network. When a header of a packet transmitted through the broadcasting network includes information about the timeline of the stream transmitted through the broadcasting network, a timeline component AU transmissible through the broadcasting network may include timestamp information and the like such as a decoding timestamp (DTS), a presentation timestamp (PTS), and the like of a stream transmitted through a heterogeneous network (for example, the Internet). When information about a timeline of the stream transmitted through the heterogeneous network (for example, the Internet) is included in the timeline component AU, the information about the timeline of the stream transmitted through the heterogeneous network (for example, the Internet) may be packetized in the same packet structure as that of the stream transmitted through the broadcasting network. In this way, a timestamp of the stream transmitted through the broadcasting network included in the packet header may be mapped to a timestamp of the stream transmitted through the Internet on a one-to-one basis, and both the streams may be synchronized in one timeline, and decoded and reproduced. The aforementioned timestamp information may represent a timeline reference value for constituting a timeline of a stream transmitted over an external network (e.g., a heterogeneous network, an Internet network, etc.).

The presentation timestamp (PTS) is a timestamp metadata field in an MPEG transport stream, MPEG program stream or similar data stream that is used to achieve synchronization of programs' separate elementary streams (for example Video, Audio, Subtitles) when presented to the viewer. The PTS is given in units related to a program's overall clock reference, either Program Clock Reference (PCR) or System Clock Reference (SCR), which is also transmitted in the transport stream or program stream.

The Decode Timestamp (DTS) indicates the time at which an access unit should be instantaneously removed from the receiver buffer and decoded. It differs from the Presentation Timestamp (PTS) only when picture reordering is used for B pictures. If DTS is used, PTS may be provided in the bit stream.

The above description may be applied to a case in which streams transmitted through one network use different timelines. For example, when the above-described scheme is used, a relay service provider, who collects streams transmitted through a plurality of heterogeneous networks and provides the streams to viewers, does not need to directly perform reprocessing for synchronization of different streams.

FIG. 68 illustrates syntax of the timeline component AU according to an embodiment of the present invention.

The timeline component AU may be expressed in another format such as XML or the like.

The timeline component AU may include identifier information, version information, AU_length information, location flag information, PTS_flag information, DTS_flag information, media_time_flag information, NTP_time_flag information, PTP_time_flag information, timecode_flag information, PCR_time_flag information, location_length information, location information, timescale information, media_time_PTS information, media_time_DTS information, NTP_time_PTS information, NTP_time_DTS information, PTP_time_PTS information, PTP_time_DTS information, timecode_PTS information, timecode_DTS information, PCR_time_PTS information, and/or PCR_time_DTS information.

The identifier information is an identifier that uniquely indicates a structure of the timeline component AU.

The version information may indicate lengths of timestamp fields such as a lower PTS, DTS and the like. For example, the length may correspond to 64 bits when the version information has a value of 1, and correspond to 32 bits when the version information has a value of 0.

The AU_length information indicates a length of the timeline component AU.

The location flag information indicates whether the timeline component AU includes location information of a stream transmitted through an external network.

The PTS_flag information indicates whether the timeline component AU includes a PTS value.

The DTS_flag information indicates whether the timeline component AU includes a DTS value.

The media_time_flag information indicates whether a timestamp having a media time format is included.

The NTP_time_flag information indicates whether a timestamp having an NTP format is included.

The PTP_time_flag information indicates whether a timestamp having a PTP format is included.

The timecode_flag information indicates whether a timestamp having a society of motion picture and television engineers (SMPTE) time code format is included.

The PCR_time_flag information indicates whether a PCR-based timestamp of an MPEG-2 TS is included.

The location length information indicates a length of a location field.

The location information indicates a URL or a unique ID of a stream transmitted through a heterogeneous network. When the location information indicates the unique ID, the location information may be used by being linked to information such as signaling data or the like.

The timescale information indicates a media timescale. The timescale information is information for identifying a unit of time indicated by other information.

The media_time_PTS information indicates a PTS expressed in a media time format.

The media_time_DTS information indicates a DTS expressed in a media time format.

The NTP_time_PTS information indicates a PTS expressed in an NPT format.

The NTP_time_DTS information indicates a DTS expressed in an NPT format.

The PTP_time_PTS information indicates a PTS expressed in a PTP format.

The PTP_time_DTS information indicates a DTS expressed in a PTP format.

The timecode PTS information indicates a PTS expressed in an SMPTE time code format.

The timecode_DTS information indicates a DTS expressed in an SMPTE time code format.

The PCR_time_PTS information indicates a PTS expressed in a PCR format.

The PCR_time_DTS information indicates a DTS expressed in a PCR format.

According to an embodiment of the present invention, the receiver may synchronize a stream transmitted through the broadcasting network with a stream transmitted through a heterogeneous network by applying at least one timestamp information included in the timeline component AU to a stream in an external network which is identified by the location information.

FIG. 69 illustrates syntax of the timeline component AU according to another embodiment of the present invention.

The timeline component AU may be expressed in another format such as XML or the like.

The timeline component AU may include identifier information, version information, AU_length information, location flag information, PTS_flag information, DTS_flag information, timestamp_version_flag information, timestamp_type information, location_length information, location information, timescale information, media_time_PTS information, media_time_DTS information, timestamp_type_PTS information, and/or timestamp_to_DTS information (or timestamp_type_DTS information).

Description of information corresponding to the same term as that of the information included in syntax of the timeline component AU described above is replaced by the above description.

The timestamp_version_flag information indicates a timestamp format of a timeline to be mapped. For example, it is possible to indicate that a 32-bit format is to be used when the timestamp_version_flag information has a value of 0, and a 64-bit format is to be used when the timestamp_version_flag information has a value of 1.

The timestamp_type information indicates a type of a timestamp of a timeline to be mapped. For example, the timestamp_type information indicates that the type corresponds to a media time when the information has a value of 0x00, indicates that the type corresponds to NTP when the information has a value of 0x01, indicates that the type corresponds to PTP when the information has a value of 0x02, and indicates that the type corresponds to a time code when the information has a value of 0x03. When the information has a value of 0x04-0x1F, the type may be defined later, and the value may be reserved.

The timescale information may indicate a timescale that expresses a media time of a timeline to be mapped. For example, in an MPEG-2 TS, the timescale may have a value of 90K.

The media_time_PTS information may indicate a presentation timestamp of a timeline to be mapped, that is, a media time with respect to a point in time at which reproduction is performed. The media_time_PTS information may be indicated by a 32-bit format when a timestamp_version_flag value is 0, and indicated by a 64-bit format when the value is 1.

The media_time_DTS information may indicate a decoding timestamp of a timeline to be mapped, that is, a media time with respect to a point in time at which decoding is performed. The media_time_DTS information may be indicated by a 32-bit format when a timestamp_version_flag value is 0, and indicated by a 64-bit format when the value is 1.

The timestamp_type_PTS information may indicate a presentation timestamp according to a timestamp type of a timeline to be mapped, that is, a point in time at which reproduction is performed. The timestamp_type_PTS information may be indicated by a 32-bit format when a timestamp_version_flag value is 0, and indicated by a 64-bit format when the value is 1. For example, when a timestamp_type field value indicates NTP, a timestamp_type_PTS field value may have a timestamp value for an NTP-based reproduction time point.

The timestamp_type_DTS information may indicate a decoding timestamp according to a timestamp type of a timeline to be mapped, that is, a point in time at which decoding is performed. The timestamp_type_DTS information may be indicated by a 32-bit format when a timestamp_version_flag value is 0, and indicated by a 64-bit format when the value is 1. For example, when a timestamp_type field value indicates an NTP, a timestamp_type_PTS field value may have a timestamp value for an NTPbased decoding time point.

Figure 70:
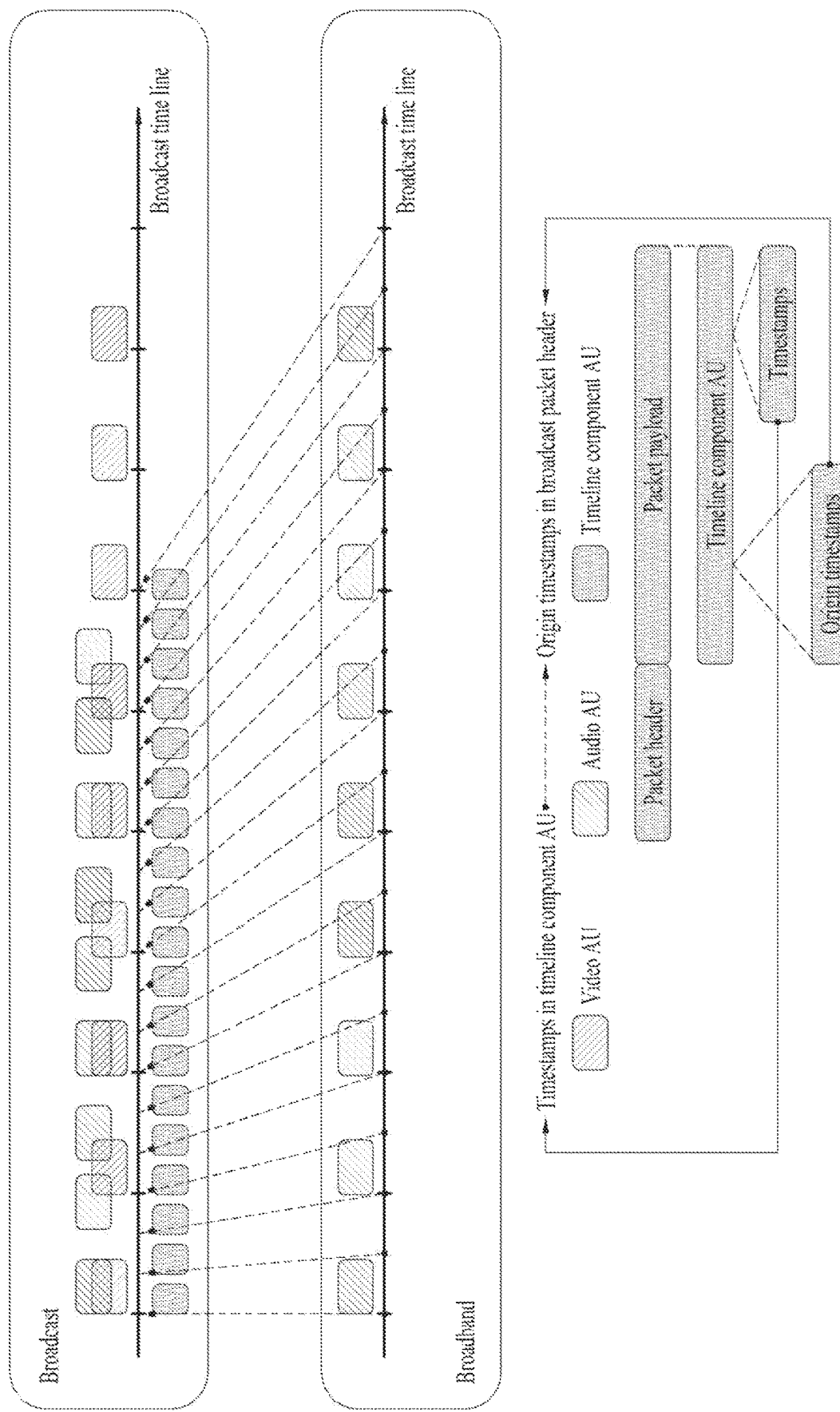
FIG. 70 illustrates a scheme of synchronizing a stream transmitted through a heterogeneous network (for example, the Internet) with a stream transmitted through the broadcasting network using a timeline component when a timestamp of a broadcasting network transmission packet is absent according to an embodiment of the present invention.

FIG. 70 illustrates a scheme of synchronizing a stream transmitted through a heterogeneous network (for example, the Internet) with a stream transmitted through the broadcasting network using a timeline component when a timestamp of a broadcasting network transmission packet is absent according to an embodiment of the present invention.

In the above-described synchronization scheme through sharing of a timeline between transport streams transmitted through heterogeneous networks using the timeline component, the timeline may be shared by mapping a timestamp of a packet header of a broadcasting network transport stream to a timestamp of an Internet transport stream included in a timeline component AU of a packet payload on a one-to-one basis.

However, timestamp-related information may not be present in a header of the broadcasting network transmission packet.

As in the figure, when the timestamp-related information is not present in the header of the transmission packet, additional information for an origin timestamp in a timeline is needed. The timeline may be shared between the broadcasting network and the Internet by mapping the origin timestamp to the timestamp of the Internet transport stream on a one-to-one basis.

Information related to the origin timestamp and the timestamp of the transport stream in the heterogeneous network (for example, the Internet) may be included in the timeline component AU.

The origin timestamp may be defined as a timestamp on a reference timeline. For example, in the above-described embodiment, a timestamp for the stream transmitted through the broadcasting network may be defined as the origin timestamp.

The origin timestamp may represent a timeline reference value for constituting a timeline of a stream transmitted over an internal network (e.g., the broadcast network).

FIG. 71 illustrates syntax of the timeline component AU according to another embodiment of the present invention.

Syntax of the timeline component AU according to another embodiment of the present invention may include information related to the origin timestamp in addition to syntax of the timeline component AU described above.

The timeline component AU may include identifier information, version information, AU length information, location flag information, origin_PTS_flag information, origin_DTS_flag information, origin_PTS information, origin_DTS information, location length information, PTS_ flag information, DTS flag information, media_time_flag information, NTPtime_flag information, PTP_time_flag information, timecode_flag information, PCRtime_flag information, location_URL_length information, location_URL information, timescale information, media_time PTS information, media_time_DTS information, NTP_time_PTS information, NTP_time_DTS information, PTP_time_PTS information, PTP_time_DTS information, timecode_PTS information, timecode_DTS information, PCR_time_PTS information, and/or PCR_time_DTS information.

Description of information corresponding to the same term as that of the information included in syntax of the timeline component AU described above is replaced by the above description.

The origin_PTS_flag information indicates whether the timeline component AU includes an origin_PTS value.

The origin_DTS_flag information indicates whether the timeline component AU includes an origin DTS value.

The origin_PTS information indicates a PTS of a current packet on a reference base timeline of timeline mapping.

The origin_DTS information indicates a DTS of a current packet on a reference base timeline of timeline mapping.

The location_URL_length information indicates a length of the location_URL information.

The location_URL information may indicate a URL of a stream transmitted through a heterogeneous network, or an identifier that uniquely identifies the stream transmitted through the heterogeneous network.

The receiver may acquire a timeline component AU from a packet payload of a transport stream in the broadcasting network, and parse origin_PTS information and/or origin_DTS information in the timeline component AU to acquire timestamp information for the transport stream in the broadcasting network based on the parsed information. The receiver may synchronize a transport stream of the broadcasting network with a transport stream of a heterogeneous network using information related to the timestamp of the transport stream in the broadcasting network acquired through the origin_PTS information and/or the origin_DTS information and a timestamp for the heterogeneous network included in the timeline component AU.

FIG. 72 illustrates syntax of the timeline component AU according to another embodiment of the present invention.

The timeline component AU may include additional metadata related to a media stream transmitted through the broadcasting network or the Internet. The figure illustrates the timeline component AU which includes metadata for a timeline related to the media stream among the additional metadata.

The timeline component AU may be expressed in another format such as XML.

The timeline component AU may include identifier information, AU length information, location_flag information, origin_timestamp_flag information, timestamp_version information, timestamp_type information, timestamp_format information, location length information, location information, origin_timestamp_version information, origin_timestamp_type information, origin_timestamp_format information, origin location_flag information, origin_location_length information, origin_location information, origin_timescale information, origin_media_time information, origin timestamp information, private_data_length information, private_data_bytes( )information, timescale information, media_time information, timestamp information and/or data_bytes( )information.

Description of information corresponding to the same term as that of the information included in syntax of the timeline component AU described above is replaced by the above description.

The identifier information may be an identifier indicating that it is metadata related to a timeline, or an identifier indicating that a structure of the timeline component AU is included.

The AU_length information may indicate a length of information included in the timeline component AU.

The location_flag information may indicate whether location information of a service, a content component, or the like related to information included in the timeline component AU is included.

The origin_timestamp_flag information may indicate whether information related to an origin timestamp is included.

The timestamp_version information may indicate version information of a timestamp included in the timeline component AU.

The timestamp_type information may indicate a type of a timestamp included in the timeline component AU. For example, the timestamp_type information may indicate a DTS that indicates a point in time at which data of an access unit or the like (for example, an audio access unit) of a related service/content component is decoded when the timestamp_type information has a value of 0x00, and the timestamp_type information may indicate a PTS that indicates a point in time at which data of an access unit or the like (for example, an audio access unit) of a related service/content component is reproduced when the timestamp_type information has a value of 0x01.

The timestamp_format information may indicate a format of a timestamp included in the timeline component AU. For example, the timestamp_format information may indicate that the format is a media time when the information has a value of 0x00, an NTP when the information has a value of 0x01, a PTP when the information has a value of 0x02, and a time code when the information has a value of 0x03. Values of 0x04-0x0F may be reserved for future extension.

The location_length information may indicate a length of a location field.

The location information may indicate location information of a service, a content component, or the like related to information included in the timeline component AU. The location information may be expressed in a form such as an IP address/port number, a URI, or the like.

The origin_timestamp_version information may indicate a version of a timestamp format with respect to a base timeline that may serve as a reference line of timeline mapping. It is possible to indicate that a 32-bit format is used when a value of the corresponding field is 0, and a 64-bit format is used when the value is 1. For example, when a video stream is transmitted through the broadcasting network and an audio stream is transmitted through the Internet, and timeline mapping of the audio stream to the video stream is performed, a timestamp of the video stream transmitted through the broadcasting network may correspond to a reference base timeline. In this case, the origin_timestamp_version information may indicate a timestamp format of the video stream transmitted through the broadcasting network.

The origin_timestamp_type information may indicate a type of a timestamp with respect to a base timeline that may serve as a reference line of timeline mapping. For example, the origin_timestamp_type information may indicate a DTS that indicates a point in time at which data of an access unit or the like (for example, an audio access unit) of a service/content component or the like related to the base timeline is decoded when the origin_timestamp_type information has a value of 0x00, and the origin_timestamp_type information may indicate a PTS that indicates a point in time at which data of an access unit or the like (for example, an audio access unit) of a service/content component or the like related to the base timeline is reproduced when the origin_timestamp_type information has a value of 0x01.

The origin_timestamp_format information may indicate a format of a timestamp with respect to a base timeline that may serve as a reference line of timeline mapping. For example, the origin_timestamp_format information may indicate that the format is a media time when the information has a value of 0x00, an NTP when the information has a value of 0x01, a PTP when the information has a value of 0x02, and a time code when the information has a value of 0x03. Values of 0x04-0x0F may be reserved for future extension.

The origin_location_flag information may indicate whether location information of a service/content component or the like related to a base timeline that may serve as a reference line of timeline mapping is included.

The origin_location_length information may indicate a length of an origin_location field.

The origin_location information may indicate location information of a service/content component or the like related to a base timeline that may serve as a reference line of timeline mapping. The origin_location information may be expressed in a form such as an IP address/port number, a URI, or the like.

The origin_timescale information may indicate a timescale that may be used when expressing a media time of a base timeline that serves as a reference line of timeline mapping. For example, in an MPEG-2 TS, the timescale may have a value 90K.

The origin_media_time information may indicate a media time on a base timeline that serves as a reference line of timeline mapping. Content contained in a corresponding media time may vary with an origin_timestamp_type. For example, the origin_media_time information may indicate a media time with respect to a reproduction time point when the origin_timestamp_type is a PTS, and indicate a media time with respect to a decoding time point when the origin_timestamp_type is a DTS. The origin_media_time information may be indicated by 32 bits when an origin_timestamp_version value is 0 and by 64 bits when the corresponding field value is 1.

The origin_timestamp information may indicate a timestamp of a format that varies with a field value of an origin_timestamp_format on a base timeline serving as a reference line of timeline mapping, and content contained in a timestamp corresponding to the origin_timestamp information may vary with the origin_timestamp_type. For example, when the origin_timestamp_type indicates a DTS and a value of the origin_timestamp_format is '0x01', the timestamp corresponding to the origin_timestamp information may indicate a decoding time point expressed by an NTP. The origin_timestamp information may be indicated by 32 bits when the origin_timestamp_version is 0 and by 64 bits when the corresponding field value is 1.

The private_data_length information may indicate a length having a byte as a unit of the following private_data_bytes.

The private_data_bytes( ) information indicates an area which may be privately defined to have a length corresponding to a private_data_length or include extended content later.

The timescale information may indicate a time scale available for use when expressing a media time.

The media_time information may indicate a media time. Content contained in a media time corresponding to the media_time information may vary with a timestamp_type. For example, when the timestamp_type is a PTS, the media_time information may indicate a media time with respect to a reproduction time point. The media_time information may be indicated by 32 bits when a timestamp_version value is 0 and by 64 bits when the corresponding field value is 1.

The timestamp information may indicate a timestamp of a format that varies with a field value of a timestamp_format, and content contained in a timestamp corresponding to the timestamp information may vary with a timestamp_type. For example, when the timestamp_type indicates a DTS and the timestamp_format has a value '0x01', the timestamp corresponding to the timestamp information may indicate a decoding time point expressed by an NTP. The timestamp information may be indicated by 32 bits when a timestamp_version value is 0 and by 64 bits when the corresponding field value is 1.

The data_bytes( ) information indicates fields or areas for including extended content later.

Figure 73:
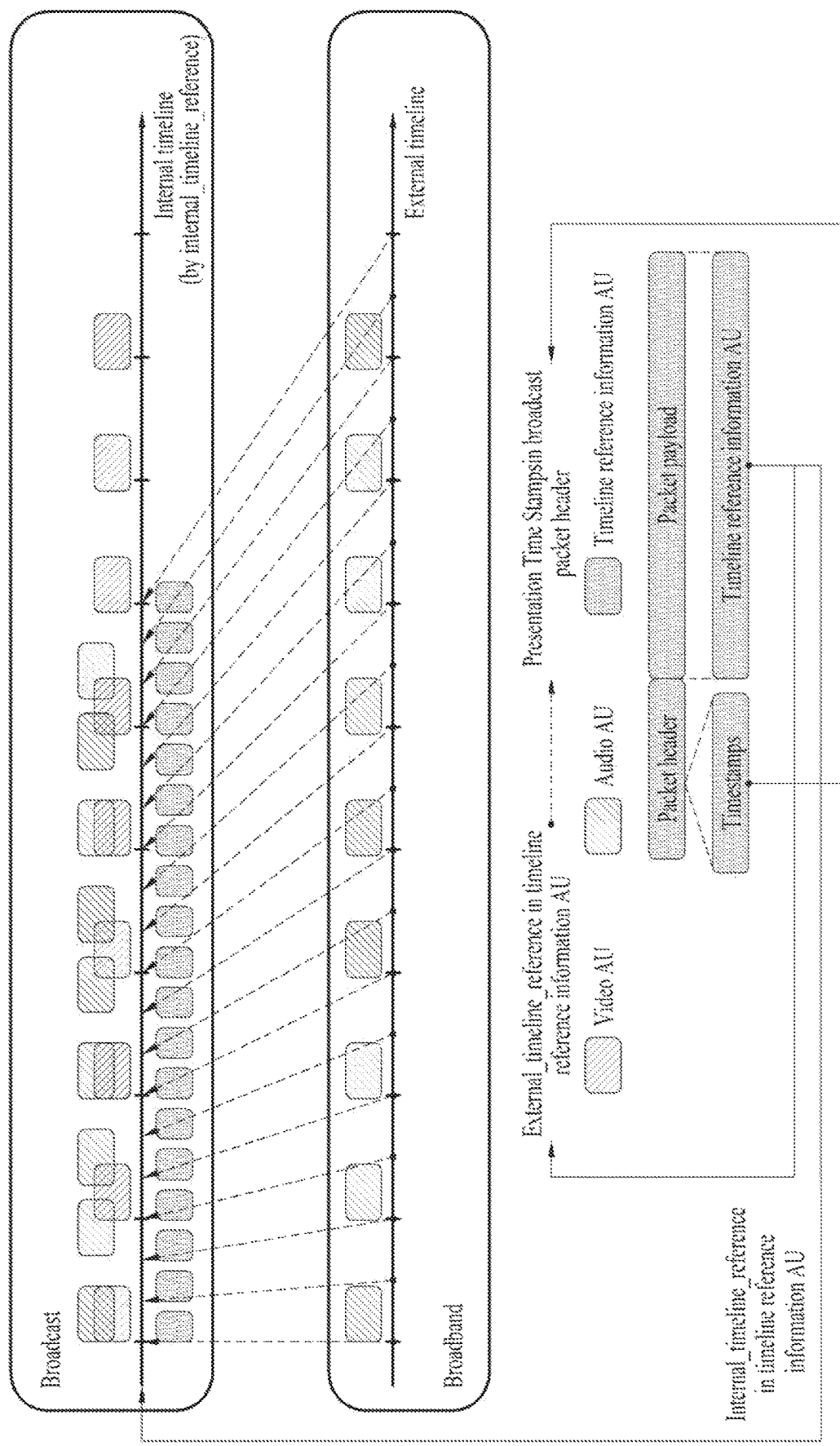
FIG. 73 illustrates a method of synchronization between a stream transmitted over a broadcast network and a stream transmitted over a heterogeneous network using timeline reference signaling information according to another embodiment of the present invention.

FIG. 73 illustrates a method of synchronization between a stream transmitted over a broadcast network and a stream transmitted over a heterogeneous network using timeline reference signaling information according to another embodiment of the present invention.

As described above, when a video stream is transmitted over the broadcast network and an audio stream is transmitted over the Internet network, the two streams need to be synchronized for one service to be decoded and/or reproduced. However, since the two streams have different timelines, a mechanism to map the two timelines to each other is needed.

According to another embodiment, at least one stream transmitted over a heterogeneous network such as the broadcast network and the Internet network maybe synchronized using the timeline reference signaling information. That is, streams transmitted from the receiver of the aforementioned broadcast system over heterogeneous networks such as the broadcast network and the Internet network may be synchronized and used for one service.

The transmitter according to another embodiment transmits information enabling a stream transmitted over the broadcast network to be synchronized with a stream transmitted over the heterogeneous network using the timeline reference signaling information. To this end, the transmitter of this embodiment may include a signaling encoder (not shown), a broadcast network interface (not shown), and/or a heterogeneous network interface (not shown).

The signaling encoder encodes timeline reference signaling information containing metadata for synchronizing streams transmitted via one or more networks.

The signaling encoder may include a first encoder for encoding a broadcast stream including a first portion (e.g., video information) of the broadcast content and the timeline reference signaling information and a second encoder for encoding a heterogeneous stream including a second portion (e.g., audio information) of the broadcast content.

The timeline reference signaling information may include at least one timeline reference information constituting timeline of at least one of the broadcast stream and the heterogeneous stream.

The broadcast network interface may transmit the encoded broadcast stream via a broadcast network.

The heterogeneous network interface may transmit the encoded heterogeneous stream via a heterogeneous network.

In addition, the receiver according to another embodiment may synchronize a stream transmitted via the broadcast network with a stream transmitted via a heterogeneous network using the timeline reference signaling information. To this end, the receiver of this embodiment may include a broadcast network interface (not shown), a heterogeneous network interface (not shown), and/or a processor (not shown).

The broadcast network interface may receive a broadcast stream including a first portion (e.g., video information) of the broadcast content via a broadcast network. The broadcast network interface may include the broadcast interface J2030 and/or the transport packet interface J32070 as described above.

The heterogeneous network interface may receive a heterogeneous stream including a second portion (e.g., audio information) of the broadcast content via a heterogeneous network. The heterogeneous network interface may include the Internet interface J2020 and/or the broadband packet interface J32080 as described above.

The broadcast stream may include timeline reference signaling information containing metadata for synchronizing streams transmitted via the one or more networks. The timeline reference signaling information may include at least one timeline reference information constituting a timeline of at least one of the broadcast stream and the heterogeneous stream.

The processor may configure the broadcast content using the broadcast stream and the heterogeneous stream based on the timeline reference signaling information. The processor may include the processor J2080 and/or the A/V processor J32110 described above.

The broadcast stream according to another embodiment may include a packet header and/or a packet payload. The packet header may include a timestamp for the broadcast stream. The packet payload may include the timeline reference signaling information. However, embodiments of the present invention are not limited thereto. The timeline reference signaling information may be included in the packet header.

When the timeline reference signaling information is included in the packet payload and transmitted, the timeline reference signaling information may be included in a timeline reference information AU (access unit). A timeline component AU may include the timeline reference information AU. However, embodiments of the present invention are not limited thereto. The timeline reference information AU may be present independently of the timeline component AU.

In the case in which the timeline reference signaling information is included in the packet header, timeline reference signaling information may be included in an extended header extension.

The timeline component AU and/or timeline reference information AU transmitted via the broadcast network may include internal timeline reference information constituting timeline of a stream transmitted via the broadcast network, which is an internal network, and/or external timeline reference information capable of mapping the timeline of a stream transmitted via the heterogeneous network (e.g., Internet network), which is an external network to the internal network.

The timestamp described above represents a time to start decoding such as a DTS and/or a PTS and/or a time to start presentation. Accordingly, the timestamp indicates only times such as the decoding time and the presentation time at which a specific event occurs.

The timeline reference information according to another embodiment represents a reference clock value constituting the timeline of a media stream transmitted over the internal network and/or the external network. Herein, the reference clock value represents time information indicating a time constituting the timeline of the media stream. Herein, the time constituting the timeline may correspond to a predetermined time in a broadcast system. For example, the reference clock value may include timestamp information such as DTS and PTS and/or a wall clock. However, the reference clock value is not limited to the DTS and/or the PTS.

In addition, the timeline reference information AU may be packetized in the form of a packet structure identical to that of a broadcast network transmission stream.

According to another embodiment of the present invention, the receiver may synchronize two streams transmitted via the broadcast network and the heterogeneous network (e.g., the Internet network) on one timeline based on the timeline reference information AU, thereby decoding and/or reproducing the same. For example, the receiver and/or the processor may configure broadcast content using the broadcast stream and the heterogeneous stream based on the timestamps and/or the timeline reference signaling information. The receiver and/or the processor may map a stream transmitted via the broadcast network to a stream transmitted via the heterogeneous network based on the internal timeline reference information and the external timeline reference information. In the case in which the external timeline reference information includes timestamp information such as DTS and/or PTS, the receiver and/or the processor may map the stream transmitted via the broadcast network to the stream transmitted via the heterogeneous network based on the external timeline reference information and the timestamp information constituting the timeline of a media stream transmitted over the internal network.

The description given above may also be applied to a case in which streams transmitted via one network use different timelines. For example, when a heterogeneous stream corresponds to a broadcast stream, the timeline of the heterogeneous stream may differ from that of the broadcast stream.

With the method described above, a relay service operator collecting the streams transmitted via a plurality of heterogeneous networks and providing the same to viewers need not directly perform reprocessing for synchronization of the different streams.

FIG. 74 illustrates a syntax of a timeline reference information AU according to another embodiment of the present invention.

The timeline reference information AU may be presented in other formats such as XML. The timeline reference information AU may be applied to various media transmission protocols such as RPT and ALC/LCT, and used by being operatively connected with service signaling information proper for the protocols.

The service signaling information may include information such as information indicating that a stream is carrying a timeline reference of an internal network or an external network, external media URL information contained in the timeline reference information AU, flag information indicating whether various fields are included, and/or timescale information which are applicable to each packet in common.

Specifically, the timeline reference information AU may include AU_identifier information, AU_length information, external_media_URL_flag information, internal_timeline_reference_flag information, external_timeline_reference_flag information, external_media_URL_length information, external_media_URL information, internal_timeline_reference_format information, internal_timeline_reference_timescale_flag information, internal_timeline_reference_length information, internal_timeline_reference_timescale information, internal_timeline_reference information, external_timeline_reference_format information, external_timeline_reference_timescale_flag information, external_timeline_reference_length information, external_timeline_reference_timescale information, and/or external_timeline_reference information. The information which the timeline reference information AU includes may be referred to as timeline reference signaling information.

Description of the information included in the syntax of the timeline component AU described above may be applied to the information assigned the same names.

The AU_identifier information is an identifier uniquely representing the structure of the timeline reference information AU.

The AU_length information indicates the length of a timeline reference information AU.

The external_media_URL_flag information indicates whether or not the timeline reference information AU includes URL information of a stream transmitted via an external network (e.g., the Internet network).

The internal_timeline_reference_flag information indicates whether not the timeline reference information AU includes internal timeline reference information.

The external_timeline_reference_flag information indicates whether or not the timeline reference information AU includes external timeline reference information.

The external_media_URL_length information indicates the length of the external media URL information. For example, the external_media_URL_length information may indicate the length of the external media URL information in bytes.

The external_media_URL information may include such information as location information about media transmitted via an external network (e.g., the Internet network), and/or a unique identifier (identification information). For example, if the media transmitted over the external network is MPEG-DASH, the external_media_URL information may include a URL of the corresponding MPD and/or MPD ID.

The internal_timeline_reference_format information may indicate the format of the internal timeline reference. For example, if the value of the internal_timeline_reference_format information is 0x00, this may indicate that the format is the media time. If the value is 0x01, this may indicate that the format is the network time protocol (NTP). If the value is 0x02, this may indicate that the format is PTP. If the value is 0x03, this may indicate that the format is the timecode. If the value is one of 0x04 to 0x1F, it may be reserved such that the format can be defined later.

The internal_timeline_reference_timescale_flag information indicates whether or not the timeline reference information AU contains a timescale about the internal timeline reference.

The internal_timeline_reference_length information indicates the length of the internal timeline reference value. For example, the internal_timeline_reference_length information may indicate the length of the internal timeline reference value in bytes.

The internal_timeline_reference_timescale information indicates the time unit of the internal timeline reference information. For example, the internal_timeline_reference_timescale information may indicate the time unit of the internal timeline reference value in Hz.

The internal_timeline_reference information indicates a reference clock value constituting the timeline of a media stream transmitted over the internal network.

The external_timeline_reference_format information may indicate the format of the external timeline reference. For example, if the value of the external_timeline_reference_format information 0x00, this may indicate the media time. If the values is 0x01, this may indicate the network time protocol (NTP). If the value is 0x02, this may indicate PTP. If the value is 0x03, this may indicate the timecode. If the value is one of 0x04 to 0x1F, it may be reserved such that the format can be defined later.

The external_timeline_reference_timescale_flag information indicates whether or not the timeline reference information AU contains a timescale of the external timeline reference.

The external_timeline_reference_length information indicates the length of the external timeline reference value. For example, the external_timeline_reference_length information may indicate the length of the external timeline reference value in bytes.

The external_timeline_reference_timescale information indicates the time unit of the external timeline reference information. For example, the external_timeline_reference_timescale information may indicate the time unit of the external timeline reference value in Hz.

The external_timeline_reference information indicates a reference clock value constituting the timeline of a media stream transmitted over an external network.

According to another embodiment of the present invention, the receiver and/or the processor may synchronize a stream transmitted over the broadcast network with a stream transmitted over a heterogeneous network by applying the internal_timeline_reference information and/or external_timeline_reference information which are included in the timeline reference information AU and/or the timeline component AU to the stream of the external network identified by the external_media_URL information. In addition, the receiver and/or the processor may configure broadcast content using the broadcast stream and the heterogeneous stream based on the external media URL information, the timeline reference information, and/or the timestamps.

FIG. 75 illustrates a syntax of a timeline reference information AU according to another embodiment of the present invention.

The timeline reference information AU of this embodiment may include at least one piece (or multiple pieces) of internal_timeline_reference information. In addition, the timeline reference information AU may include at least one (or multiple) external_timeline_reference information.

Specifically, the timeline reference information AU may include AU_identifier information, AU_length information, external_media_location_flag information, nb_of_timeline_reference information, external_media_URL_length information, external_media_URL information, timeline_reference_type information, timeline_reference_identifier information, timeline_reference_information, timeline_reference_timescale_lag information, timeline_reference_length information, timeline_reference_timescale information, and/or timeline reference information. The information included in the timeline reference information AU may be referred to as timeline reference signaling information.

Description of the information included in the syntax of the timeline reference information AU described above may be applied to the information assigned the same names.

The AU_identifier information is an identifier uniquely representing the structure of the timeline reference information AU.

The AU_length information indicates the length of a timeline reference information AU.

The external_media_URL_flag information indicates whether or not the timeline reference information AU includes URL information of a stream transmitted via an external network (e.g., the Internet network).

The nb_of_timeline_reference information indicates the number of timeline reference informations included in the timeline reference information AU.

The external_media_URL_length information indicates the length of the external media URL information. For example, the external_media_URL_length information may indicate the length of the external media URL information in bytes.

The external_media_URL information may include such information as location information about media transmitted via an external network (e.g., the Internet network), and/or a unique identifier. For example, if the media transmitted over the external network is MPEG-DASH, the external_media_URL information may include may include a URL of the corresponding MPD, and/or MPD ID.

The timeline_reference_type information indicates the type of the timeline reference information. For example, if the timeline_reference_type information is set to '0', the type of the timeline reference information may indicate internal timeline reference information. If the timeline_reference_type information is set to '1', the type of the timeline reference information may indicate external_timeline_reference information.

The timeline_reference_identifier information is a unique identifier of the timeline reference information. For example, the timeline_reference_identifier information may be assigned an integer value between 0 and 127.

The timeline_reference_format information may indicate the format of the internal timeline reference information and/or the format of the external_timeline_reference information. For example, if the value of the timeline_reference_information is 0x00, this may indicate that the format is the media time. If the value is 0x01, this may indicate that the format is the network time protocol (NTP). If the value is 0x02, this may indicate that the format is PTP. If the value is 0x03, this may indicate that the format is the timecode. If the value is one of 0x04 to 0x1F, it may be reserved such that the format can be defined later.

The timeline_reference_timescale_flag information indicates whether or not the timeline reference information AU contains timescale information about the internal timeline reference information and/or the external_timeline_reference information.

The timeline_reference_length information indicates the length of the internal timeline reference value and/or the length of the external_timeline_reference value. For example, the timeline_reference_length information may indicate the length of the internal timeline reference value and/or the length of the external_timeline_reference value in bytes.

The timeline_reference_timescale information indicates the time unit of the internal timeline reference value and/or the time unit of the external_timeline_reference value. For example, the timeline_reference_timescale information may indicate the time unit of the internal timeline reference value and/or the time unit of the external_timeline_reference value in Hz.

The timeline_reference information indicates a reference clock value constituting the timeline of a media stream transmitted over an internal network and/or an external network. For example, the timeline_reference information may have at least one value (or multiple values) based on the nb_of_timeline_reference information. The timeline_reference information may include at least one internal_timeline_reference information and/or at least one external_timeline_reference information described above.

According to another embodiment of the present invention, the receiver may synchronize a stream transmitted over the broadcast network with a stream transmitted over a heterogeneous network by applying at least one timeline_reference information included in the timeline component AU and/or the timeline reference information AU to the stream of the external network identified by the external_media_URL information. Specifically, the receiver may synchronize a stream transmitted over the broadcast network with a stream transmitted over a heterogeneous network by applying at least one (or multiple) internal_timeline_reference information and/or at least one (multiple) external_timeline_reference information included in the timeline component AU and/or the timeline_reference information AU to the stream of the external network identified by the external_media_URL information.

Figure 76:
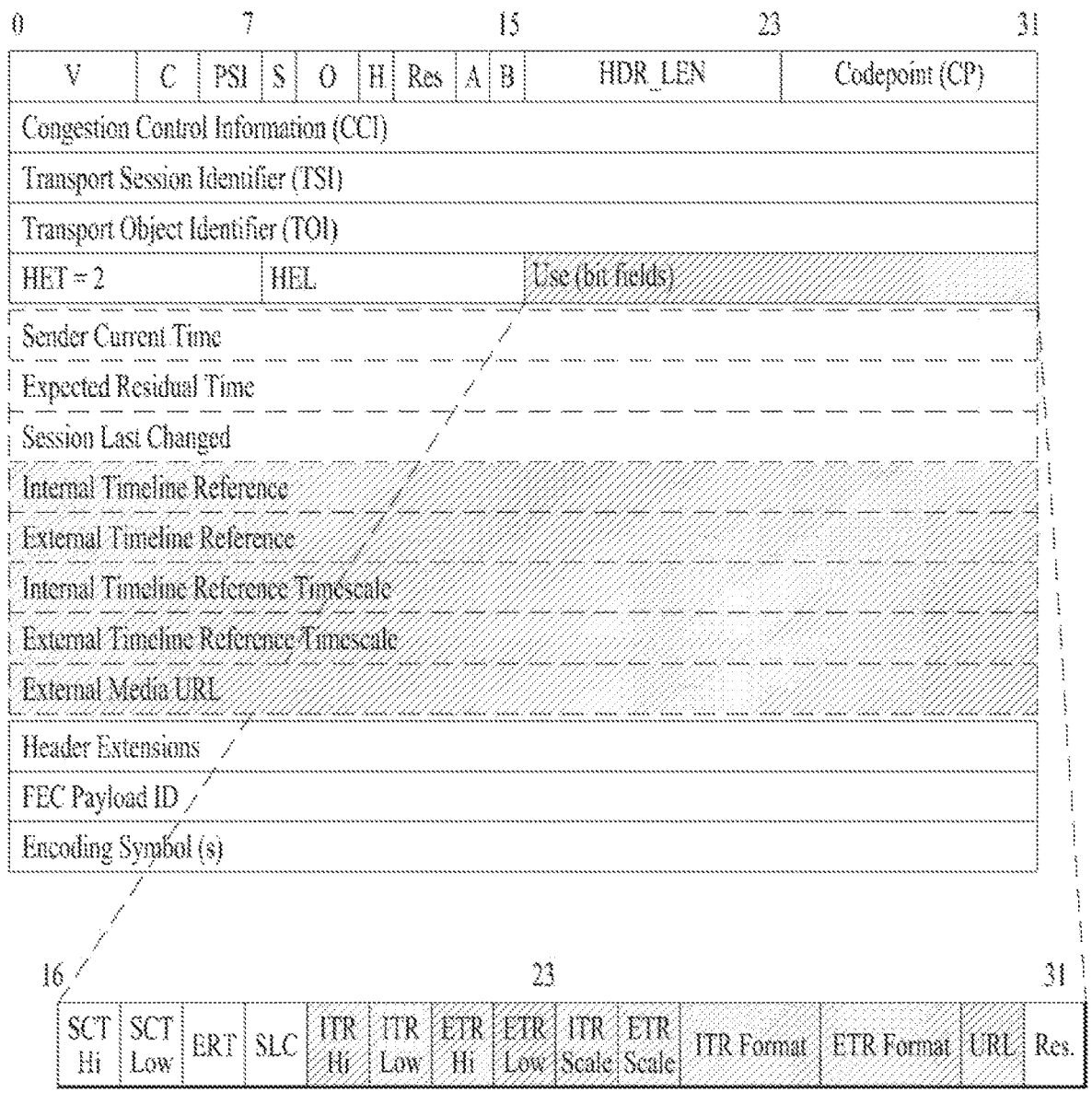
FIG. 76 illustrates the structure of an LCT packet supporting transmission of timeline reference information according to another embodiment of the present invention.

FIG. 76 illustrates the structure of an LCT packet supporting transmission of timeline reference information according to another embodiment of the present invention.

A broadcast stream according to this embodiment may include an LCT packet. The timeline reference signaling information of this embodiment may be transmitted by being included in an extended Header Extension. For example, the LCT packet may include the timeline reference signaling information by extending the existing header extension (EXT_TIME). According to this embodiment, the timeline reference signaling information is information for synchronization of media streams transmitted over heterogeneous networks. The timeline reference signaling information may include information identical and/or similar to the timeline reference information AU described above. The timeline reference signaling information may be applied to a packet for a transmission protocol such as the real-time protocol (RTP).

The timeline reference signaling information may operate in connection with service signaling information proper for the aforementioned protocol. The service signaling information may include information such as information indicating that a stream is carrying a timeline reference of an internal network or an external network, external media URL information contained in the timeline reference information AU, flag information, and/or timescale information which are applicable to each packet in common.

A packet according to another embodiment may be an LCT packet. The LCT packet may include an LCT version number field (V), a congestion control flag field (C), a Protocol-Specific Indication field (PSI), a Transport Session Identifier flag field (S), a Transport Object Identifier flag field (O), a Half-word flag field (H), a Reserved field (Res), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field (TOI), a Header Extensions field, an FEC Payload ID field, and/or an Encoding Symbol(s) field.

LCT version number field (V) indicates the protocol version number. For example, this field indicates the LCT version number. The version number field of the LCT header may be interpreted as the ROUTE version number field. This version of ROUTE implicitly makes use of version '1' of the LCT building block. For example, the version number is '0001b'.

The congestion control flag field (C) indicates the length of a Congestion Control Information field. C=0 indicates that the Congestion Control Information (CCI) field is 32-bits in length. C=1 indicates that the CCI field is 64-bits in length. C=2 indicates that the CCI field is 96-bits in length. C=3 indicates that the CCI field is 128-bits in length.

The Protocol-Specific Indication field (PSI) may be used as an indicator for a specific purpose in an LCT higher protocol. The PSI field indicates whether the current packet is a source packet or an FEC repair packet. As the ROUTE source protocol only delivers source packets, this field shall be set to '10b'. Transport Session Identifier flag field(S) indicates the length of a Transport Session Identifier field.

The Transport Object Identifier flag field (O) indicates the length of a Transport Object Identifier field. For example, an object may represent one file, and the TOI is identification information about each object. A file with the TOI set to 0 is referred to as FDT.

The Half-word flag field (H) indicates whether or not a half-word (16 bits) is added to the length of the TSI and TOI fields.

Reserved field (Res) reserved for future use.

The Close Session flag field (A) indicates that a session closes or is about to close.

The Close Object flag field (B) indicates that an object being transmitted closes or is about to close.

The LCT header length field (HDR_LEN) indicates the total length of the LCT header in units of 32-bit words.

The Codepoint field (CP) indicates the type of the payload that is carried by this packet. Depending on the type of the payload, additional payload header may be added to prefix the payload data.

The Congestion Control Information field (CCI) is used in transmitting Congestion Control information such as layer numbers, logical channel numbers, and sequence numbers. The Congestion Control Information field in the LCT header contains the required Congestion Control Information.

The Transport Session Identifier field (TSI) is a unique identifier of a session. The TSI uniquely identifies a session among all sessions from a particular sender. Each TSI field may be mapped to each component and/or representation of MPEG-DASH.

This field identifies the Transport Session in ROUTE. The context of the Transport Session is provided by the LSID (LCT Session Instance description). The LSID defines what is carried in each constituent LCT transport session of the ROUTE session. Each transport session is uniquely identified by a Transport Session Identifier (TSI) in the LCT header. The LSID may be transmitted through the same ROUTE session including LCT transport sessions, or may be transmitted via a communication network, a broadcast network, an Internet network, a cable network, and/or a satellite network. Means for transmission of the LSID are not limited thereto. For example, the LSID may be transmitted through a specific LCT transport session with the value of TSI set to '0'. The LSID may include signaling information about all transport sessions transmitted through the ROUTE session. The LSID may include LSID version information and information about validity of the LSID. The LSID may also include transport session information providing information about the LCT transport session. The transport session information may include TSI information for identifying a transport session, source flow information transmitted to a corresponding TSI and providing information about a source flow through which source data is transmitted, repair flow information transmitted to a corresponding TSI and providing information about a repair flow through which repair data is transmitted, and transport session property information including additional property information about the transport session.

The Transport Object Identifier field (TOI) is a unique identifier of an object. The TOI indicates which object within the session this packet pertains to. Each TOI field may be mapped to each segment of MPEG-DASH. However, embodiments of the present invention are not limited thereto. Each TOI field may be mapped to a part of a segment of MPEG-DASH such as Chunk, GOP, and/or Access Unit.

This field indicates to which object within this session the payload of the current packet belongs. The mapping of the TOI field to the object is provided by the Extended FDT. Extended FDT specifies the details of the file delivery data. This is the extended FDT instance. The extended FDT together with the LCT packet header may be used to generate the FDT-equivalent descriptions for the delivery object. The Extended FDT may either be embedded or may be provided as a reference. If provided as a reference the Extended FDT may be updated independently of the LSID. If referenced, it shall be delivered as an in-band object on TOI=0 of the included source flow.

The Header Extensions field is used as an LCT header extension part for transmission of additional information. The Header Extensions are used in LCT to accommodate optional header fields that are not always used or have variable size.

For example, EXT_TIME extension is used to carry several types of timing information. It includes general purpose timing information, namely the Sender Current Time (SCT), Expected Residual Time (ERT), and Sender Last Change (SLC) time extensions described in the present document.

The FEC Payload ID field includes identification information about an encoding symbol or a transmission block. FEC Payload ID indicates an identifier for a case in which the file is FEC-encoded. For example, when the FLUTE protocol file is FECencoded, an FEC Payload ID may be allocated in order for a broadcasting station or a broadcasting server to identify the file.

The Encoding Symbol(s) field may include data of a transmission block or an encoding symbol.

The packet payload contains bytes generated from an object. If more than one object is carried in the session, then the Transmission Object ID (TOI) within the LCT header MUST be used to identify from which object the packet payload data is generated.

Header Extensions (EXT_TIME) according to another embodiment may include a Header Extension Type field (HET), a Header Extension Length field (HEL), an SCT Hi field, an SCT Low field, an ERT field, an SLC field, a Reserved field, a Sender Current Time field, an Expected Residual Time field, and/or a Session Last Changed field. Header Extensions (EXT_TIME) may also include a Use field. The Use field may include an SCT Hi field, an SCT Low field, an ERT field, an SLC field, and/or a Reserved field.

The Header Extension Type field (HET) indicates the type of a corresponding Header Extension. The HET field may be an 8-bit integer. Basically, in LCT, if HET has a value between 0 and 127, Header Extension with a variable length in the unit of 32-bit word is present in HET, and the length thereof is described in Header Extension Length field (HEL) subsequent to HET. If HET has a value between 128 and 255, the Header Extension has a 32-bit fixed length. For example, the HET field may have '2' or a value less than or equal to '127' and identify Header Extension described above.

The HEL field indicates the total length of Header Extension with a variable length. Basically, in LCT, if HET has a value between 0 and 127, Header Extension with a variable length in the unit of 32-bit word is present in HET, and the HEL field subsequent to the HET field indicates the total length of Header Extension in the unit of 32-bit word.

The Use field (Use) indicates the semantic of the following 32-bit time value(s).

The SCT Hi field indicates whether or not a Sender Current Time field is included in the header extension.

The SCT Low field indicates whether or not a 64-bit Sender Current Time field is included in the header extension.

The ERT field indicates whether or not an Expected Residual Time field is included in the header extension.

The SLC field indicates whether or not a Session Last Changed field is included in the header extension.

The Reserved field (Res) is reserved for future use.

The Sender Current Time field represents the current clock at the sender and at the time this packet was transmitted, measured in units of 1 ms and computed modulo 2^32 units from the start of the session.

When the SCT High field is set, the associated 32-bit time value provides an unsigned integer representing the time in seconds of the sender's wall clock. In the particular case where NTP is used, these 32 bits provide an unsigned integer representing the time in seconds relative to 00:00 hours GMT, January 1st 1900, (i.e., the most significant 32 bits of a full 64-bit NTP time value).

When the SCT-Low flag is set, the associated 32-bit time value provides an unsigned integer representing a multiple of ½^32 of a second, in order to allow sub-second precision. When the SCT-Low flag is set, the SCT-High flag MUST be set, too. In the particular case where NTP is used, these 32 bits provide the 32 least significant bits of a 64-bit NTP timestamp.

Expected Residual Time field represents the sender expected residual transmission time for the current session or for transmission of the current object, measured in units of 1 ms. If the packet containing the ERT field also contains the TOI field, then ERT refers to the object corresponding to the TOT field, otherwise it refers to the session.

If the packet containing the ERT timing information also contains the TOI field, then ERT refers to the object corresponding to the TOI field; otherwise, it refers to the only object in the session. When the ERT flag is set, it is expressed as a number of seconds. The 32 bits provide an unsigned integer representing this number of seconds.

Session Last Changed field represents the server wall clock time, in seconds, at which the last change to session data occurred. That is, it expresses the time at which the last (most recent) Transport Object addition, modification, or removal was made for the delivery session. In the case of modifications and additions, it indicates that new data will be transported that was not transported prior to this time. In the case of removals, SLC indicates that some prior data will no longer be transported. When the SLC field is set, the associated 32-bit time value provides an unsigned integer representing a time in seconds. In the particular case where NTP is used, these 32 bits provide an unsigned integer representing the time in seconds relative to 00:00 hours GMT, January 1st 1900, (i.e., the most significant 32 bits of a full 64-bit NTP time value). In that case, handling of wraparound of the 32-bit time is outside the scope of NTP and LCT. In some cases, it may be appropriate that a packet containing an EXT_TIME Header Extension with SLC information also contain an SCT-High information.

The LCT packet may further include the timeline reference signaling information (internal_timeline_reference information and/or external timeline_reference information) described above by extending the Header Extensions (EXT_TIME).

The timeline reference signaling information may include ITR Hi information, ITR Low information, ETR Hi information, ETR Low information, internal_timeline_reference_ timescale_flag information (ITR Scale), external_ timeline_reference_timescale_flag information (ETR Scale), internal_timeline_reference_format information (ITR Format), external_timeline_reference_format information (ETR Format), external_media_URL_flag information (URL), internal_timeline_reference information (Internal Timeline Reference), external_timeline_reference information (External Timeline Reference), internal_timeline_reference timescale information (Internal Timeline Reference Timescale), external_timeline_reference_timescale information (External Timeline Reference Timescale), and/or external media URL information (External Media URL).

Header Extensions (EXT_TIME) may include Use information. The Use information may include ITR Hi information, ITR Low information, ETR Hi information, ETR Low information, internal_timeline_reference_timescale_flag information (ITR Scale), external_timeline_reference_timescale_flag information (ETR Scale), internal_timeline_reference_format information (ITR Format), external_timeline_reference_format information (ETR Format), and/or external_media_URL_flag information (URL).

The ITR Hi information and/or the ITR Low information may be referred to as the internal_timeline_reference_flag information described above. The ETR Hi information and/or the ETR Low information may be referred to as the external_timeline_reference_flag information described above.

The ITR Hi (Internal Timeline Reference High Flag) information indicates whether or not 64-bit internal_timeline_reference information (Internal Timeline Reference) is included in the header extension.

The ITR Low (Internal Timeline Reference Low Flag) information indicates whether or not 32-bit internal_timeline_reference information (Internal Timeline Reference) is included in the header extension.

The ETR Hi (External Timeline Reference High Flag) information indicates whether or not 64-bit external_timeline_reference information is included in the header extension.

The ETR Low (External Timeline Reference Low Flag) information indicates whether or not 32-bit external_timeline_reference information is included in the header extension.

The internal_timeline_reference_timescale_flag information (ITR Scale) indicates whether or not 32-bit internal_timeline_reference timescale information is included in the header extension.

The external_timeline_reference_timescale_flag information (ETR Scale) indicates whether or not 32-bit external_timeline_reference_timescale information is included in the header extension.

The internal_timeline_reference_format information (ITR Format) may indicate the format of an internal_timeline_reference. For example, if the value of the internal_timeline_reference_format information (ITR Format) is 0x00, this may indicate that the format is the media time. If the value is 0x01, this may indicate that the format is the network time protocol (NTP). If the value is 0x02, this may indicate that the format is PTP. If the value is 0x03, this may indicate that the format is the timecode. If the value is one of 0x04 to 0x1F, it may be reserved such that the format can be defined later.

The external_timeline_reference_format information (ETR Format) may indicate the format of an external_timeline_reference. For example, if the value of the external_timeline_reference_format information (ETR Format) is 0x00, this may indicate that the format is the media time. If the value is 0x01, this may indicate that the format is the network time protocol (NTP). If the value is 0x02, this may indicate that the format is PTP. If the value is 0x03, this may indicate that the format is the timecode. If the value is one of 0x04 to 0x1F, it may be reserved such that the format can be defined later.

The external_media_URL_flag information (URL) may indicate whether or not the external_media_URL information (External Media URL) is included in the header extension.

The internal_timeline_reference information (Internal Timeline Reference) indicates a reference clock value constituting the timeline of a media stream transmitted over the Internal network.

The external_timeline_reference information (External Timeline Reference) is a reference clock value constituting the timeline of a media stream transmitted over an external network.

The internal_timeline_reference_timescale information (Internal Timeline Reference Timescale) indicates the time unit of internal_timeline_reference information. For example, the internal_timeline_reference_timescale information may indicate the time unit of the internal_timeline_reference value in Hz.

The external_timeline_reference_timescale information (External Timeline Reference Timescale) indicates the time unit of external_timeline_reference information. For example, the external_timeline_reference_timescale information may indicate the time unit of the external_timeline_reference value in Hz.

The external_media_URL information (External Media URL) may include information such as location information about media transmitted via an external network (e.g., the Internet network), and/or a unique identifier. For example, if the media transmitted over the external network is MPEG-DASH, the external_media_URL information may include information such as URL of the corresponding MPD and/or MPD ID. The length of this field may be identified through the HEL field.

According to another embodiment of the present invention, the receiver and/or the processor may acquire LCT Header Extensions (EXT_TIME) from broadcast signals of the broadcast network and acquire the timeline reference signaling information from the Header Extensions (EXT_TIME). In addition, the receiver and/or the processor may synchronize a stream transmitted via the broadcast network with a stream transmitted via a heterogeneous network by applying timestamps, internal_timeline_reference information, and/or external_timeline_reference information to a stream of an external network identified by the external_media_URL information.

Figure 77:
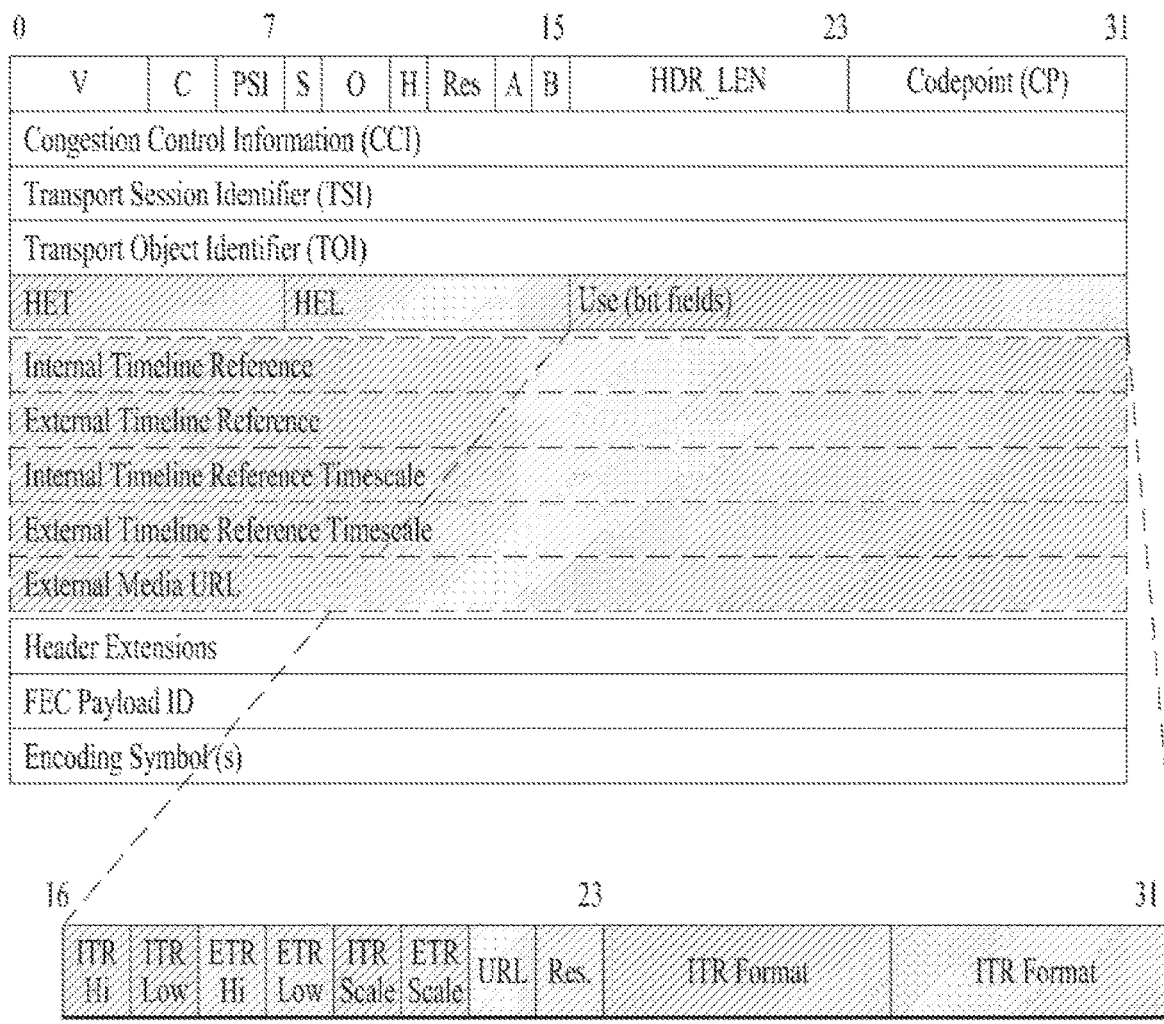
FIG. 77 illustrates the structure of an LCT packet supporting transmission of timeline reference information according to another embodiment of the present invention.

FIG. 77 illustrates the structure of an LCT packet supporting transmission of timeline reference information according to another embodiment of the present invention.

The LCT packet of this embodiment may include timeline reference signaling information (EXT_TRC (Extension for Timeline Reference Clock)) by extending the existing Header Extension. The timeline reference signaling information may include information identical and/or similar to the timeline reference information AU described above. The timeline reference signaling information may be applied to a packet for a transmission protocol such as the real-time protocol (RTP).

The timeline reference signaling information may operate in connection with service signaling information proper for the aforementioned protocol. The service signaling information may include information such as information indicating that a stream is carrying a timeline reference of an internal network or an external network, external_media_URL information contained in the timeline reference information AU, flag information, and/or timescale information which are applicable to each packet in common.

A packet according to another embodiment may be an LCT packet. The LCT packet may include an LCT version number field (V), a congestion control flag field (C), a Protocol-Specific Indication field (PSI), a Transport Session Identifier flag field (S), a Transport Object Identifier flag field (O), a Half-word flag field (H), a Reserved field (Res), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field (TOI), a Header Extensions field, an FEC Payload ID field, and/or an Encoding Symbol(s) field.

The LCT packet may further include the timeline reference signaling information described above by extending the existing Header Extensions (EXT_TRC (Extension for Timeline Reference Clock)).

The timeline reference signaling information may include ITR Hi information, ITR Low information, ETR Hi information, ETR Low information, internal_timeline_reference_timescale_flag information (ITR Scale), external_timeline_reference_timescale_flag information (ETR Scale), external_media_URL_flag information (URL), Reserved information (Res), internal_timeline_reference format information (ITR Format), external_timeline_reference_format information (ETR Format), internal_timeline_reference information (Internal Timeline Reference), external_timeline_reference information (External Timeline Reference), internal_timeline_reference_timescale information (Internal Timeline Reference Timescale), external_timeline_reference_timescale information (External Timeline Reference Timescale), and/or external_media_URL information (External Media URL).

Header Extensions (EXT_TIME) may include Use information. The Use information may include ITR Hi information, ITR Low information, ETR Hi information, ETR Low information, internal_timeline_reference_timescale_flag information (ITR Scale), external_timeline_reference_timescale_flag information (ETR Scale), external_media_URL_ flag information (URL), Reserved information (Res), internal_timeline_reference format information (ITR Format), and/or external_timeline_reference_format information (ETR Format).

Description of the information included in the LCT packet described above is applied to the information assigned the same names.

According to another embodiment of the present invention, the receiver and/or the processor may acquire Header Extensions (EXT_TIME) from broadcast signals of the broadcast network and acquire the timeline reference signaling information from the Header Extensions (EXT_TIME). In addition, the receiver and/or the processor may synchronize a stream transmitted via the broadcast network with a stream transmitted via a heterogeneous network by applying timestamps, internal_timeline_reference information, and/or external_timeline_reference information to a stream of an external network identified by the the external_media_URL information.

Figure 78:
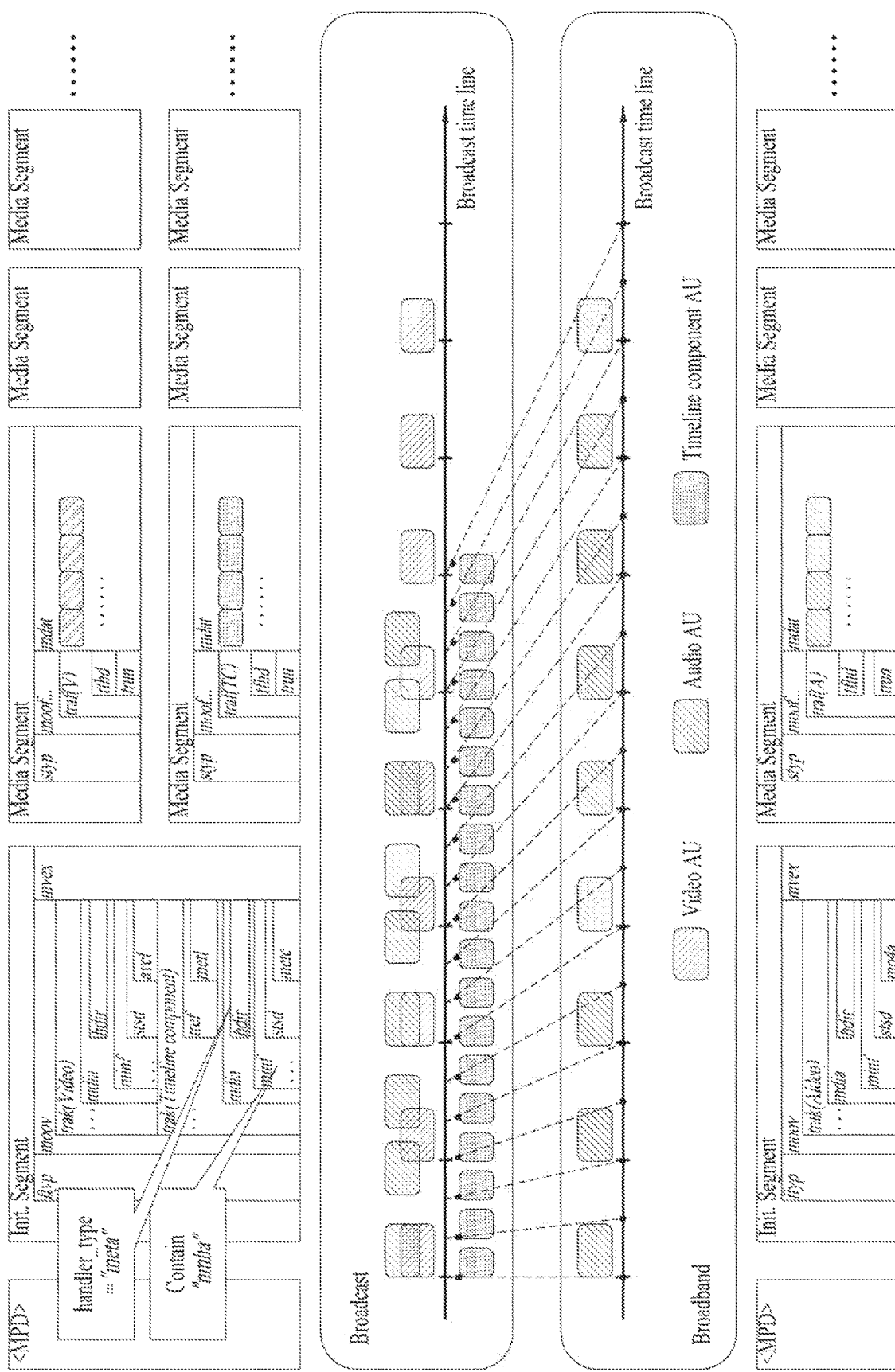
FIG. 78 illustrates a synchronization scheme using the timeline component AU between a transport stream in the broadcasting network to which DASH is applied and a transport stream in a heterogeneous network (for example, the Internet) according to an embodiment of the present invention.

FIG. 78 illustrates a synchronization scheme using the timeline component AU between a transport stream in the broadcasting network to which DASH is applied and a transport stream in a heterogeneous network (for example, the Internet) according to an embodiment of the present invention.

This figure illustrates an example in which a synchronization scheme between transport streams through heterogeneous networks is applied to DASH using a timeline component. In this example, a video stream may be transmitted through the broadcasting network, and an audio stream may be transmitted through the Internet. Even though both the streams are serviced by being encapsulated through DASH, the streams are transmitted through separate networks and thus may have different timelines as separate forms of content having separate MPDs.

To synchronize the two streams having separate timelines, the timeline component may be included in DASH content transmitted through the broadcasting network. The video stream transmitted through the broadcasting network and a timeline component stream may be included in one content to share one timeline. The timeline component includes timeline information of the audio stream transmitted through the Internet. The receiver may synchronize the transport stream in the Internet through a timeline of the broadcasting network based on this information.

The timeline component stream may be configured as one track similarly to the video stream or the audio stream in the DASH content. The timeline component stream may be assigned a timestamp such as a DTS, a PTS, or the like with an AU as a unit using timing information provided by MPD and traf boxes and the like, and mapped to a broadcasting network timeline. When the timeline component stream is configured as the track, signaling information may be needed to verify that the track includes the timeline component stream. The signaling information may be included in an hdlr box in an ISO BMFF-based DASH initialization segment, and provided as a handler_type that indicates a type of included media, a sample entry in an stsd box indicating initialization information and a specific type of a media stream and a media header box included in an minf box, and the like.

The timeline component may be indicated to be included in a metadata type by a handler type of "meta" in the hdlr box, and include a null media header box referred to as "nmhd".

FIG. 79 illustrates the sample entry for identifying a timeline component in the ISO BMFF according to an embodiment of the present invention.

According to the present embodiment, stream signaling information included in the stsd box may be configured as illustrated to identify the timeline component.

To identify a timeline component stream in a file, Timeline Component MetaData SampleEntry may be defined as a derived type of a metadata sample entry. Timeline Component MetaData SampleEntry may have a 4-byte type such as 'metc', and be uniquely identified in a file using the above-mentioned type field.

A location URL of a stream described by the timeline component or parameters for signaling and initialization such as an initial delay occurring until the stream is reproduced may be included in an "metc" sample entry.

FIG. 80 illustrates a track reference type box for expressing a dependency relation between a timeline component track and another track in the ISO BMFF according to an embodiment of the present invention.

To include the timeline component in an ISO BMFF-based file structure such as a DASH segment, it is possible to signal information about the dependency relation with respect to another track in addition to the above-described signaling information. This figure illustrates an example in which a dependency relation between the timeline component track and another track of the DASH segment is expressed through a tref box that expresses a dependency relation between tracks.

The tref box includes the track reference type box therein. The tref box may define a reference_type referred to as 'metl' as described above as a type for expressing a dependency relation between the above-described timeline component and another track. A track_ID in the tref box indicates an ID of a track having a reference relation. It is possible to express a dependency relation between the timeline component track and another track that shares a timeline with the timeline component track by defining the 'metl' reference type box.

As illustrated in the figure described above, the tref box including the above described 'metl' box is included in a timeline component track box, and includes an ID of a video track having a dependency relation in the 'metl' box. Alternatively, the tref box and the 'metl' box may be included in the video track of the example, and a track_ID of 'metl' may include an ID of the timeline component track.

Figure 81:
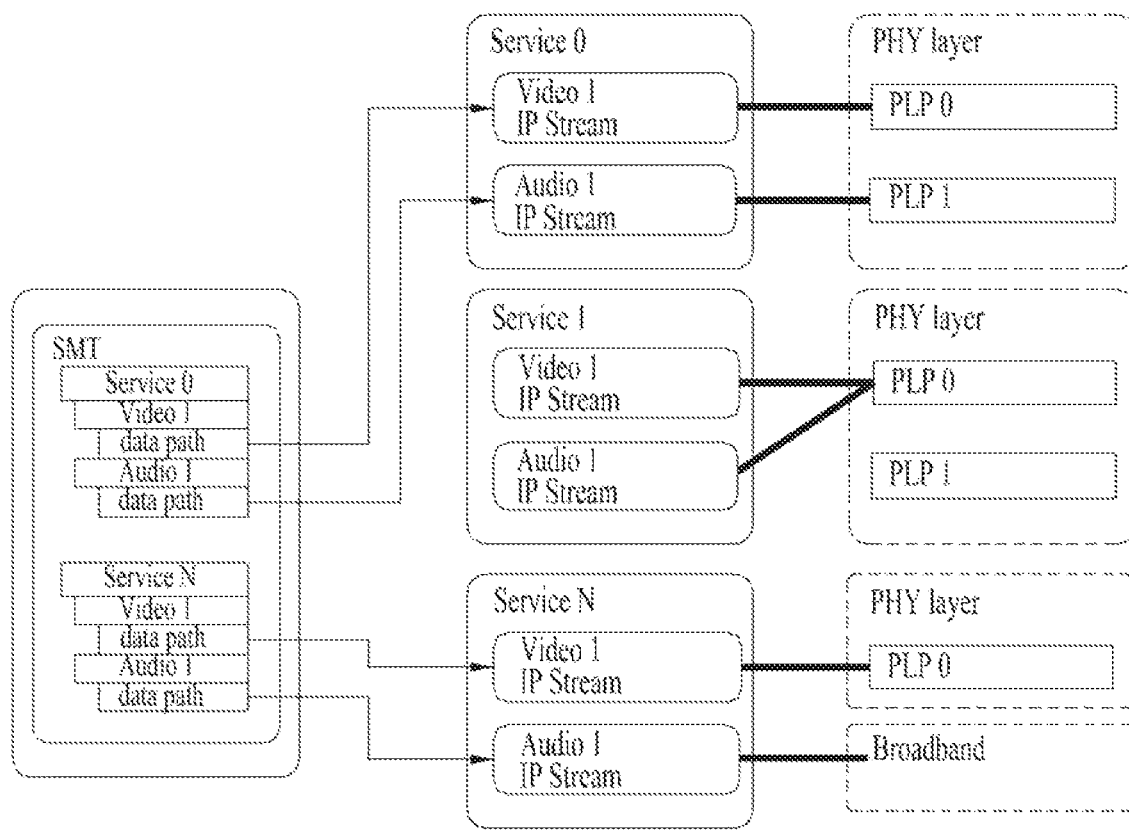
FIG. 81 illustrates a configuration for acquiring a service and/or content in the next generation broadcasting system according to an embodiment of the present invention.

FIG. 81 illustrates a configuration for acquiring a service and/or content in the next generation broadcasting system according to an embodiment of the present invention.

The scheme proposed in the present invention enables the receiver to efficiently acquire a service or content through the broadcasting network or the Internet in the next generation broadcasting system.

The figure illustrates an example for acquisition of a service or content in a hybrid broadcasting system.

For example, Service 0 includes one video and one audio, and each video/audio may vbe acquired through an IP stream transmitted through a terrestrial broadcasting network.

In Service 1, an IP stream for transmitting a video and an IP stream for transmitting audio are transmitted through one PLP and thus the receiver may acquire Service 1 by decoding the PLP.

In Service N, while video is transmitted through the terrestrial broadcasting network, audio may be acquired through the Internet.

As described in the foregoing, the above-described embodiments of the present invention may be used when the receiver acquires a component included in Service 0, Service 1 or Service N. That is, the receiver may identify a PLP for transmitting each component included in Service 0, Service 1 or Service N, and decode the PLP to acquire a desired service.

Figure 82:
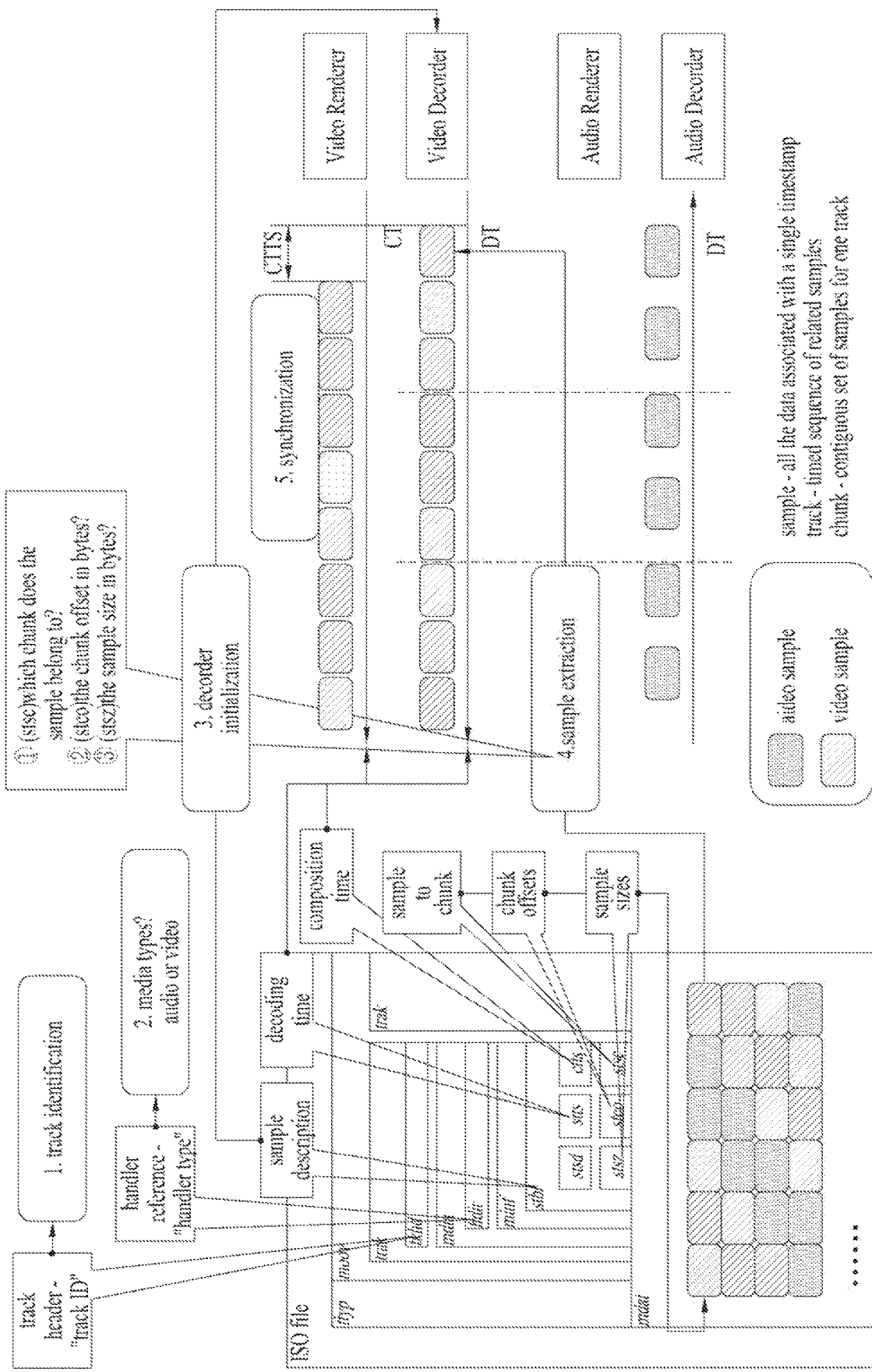
FIG. 82 illustrates a scheme of accessing video data and/or audio data in the ISO BMFF according to an embodiment of the present invention.

FIG. 82 illustrates a scheme of accessing video data and/or audio data in the ISO BMFF according to an embodiment of the present invention.

The figure illustrates a partial structure of the ISO BMFF. The illustrated scheme of accessing video data and/or audio data includes synchronization between data during a local replay.

The receiver identifies a track using 'tkhd' in an ISO file.

The receiver may verify whether a media type is audio or video using 'hdlr' (handler_type).

The receiver may initialize a decoder using sample description of 'stbl', and decode data (samples) included in mdat using information included therein.

An 'stbl' box may include an 'stts' box, a 'ctts' box, an 'stsc' box, an 'stco' box and/or an 'stsz' box.

The 'stts' box indicates a decoding time. The 'sus' box includes information enabling indexing from a decoding time to a sample number. The stts' box may provide a pointer and a sample size derived from the sample number.

The 'ctts' box provides information about an offset between a decoding time and a composition time.

The 'stsc' box includes attribute information related to a chunk including a sample, a location of the chunk and/or the sample. Samples in media data may be grouped into chunks. Chunks may have different sizes, and samples in one chunk may have different sizes.

The 'stco' box may include index information of each chunk included in files. 'stco' box gives the offset of the start of a chunk into its containing media file.

'stsz' box contains the sample count and a table giving the size in bytes of each sample. This allows the media data itself to be unframed. The total number of samples in the media is always indicated in the sample count. 'stsz' box contains may contain information specifying the default sample size. If all the samples are the same size, the information contains that size value. If this information is set to 0, then the samples have different sizes, and those sizes are stored in the sample size table. If this information is not 0, it specifies the constant sample size, and no array follows.

The receiver may synchronize a video sample (video data) with an audio sample (audio data) using the above-described information included in the 'stbl' box.

Figure 83:
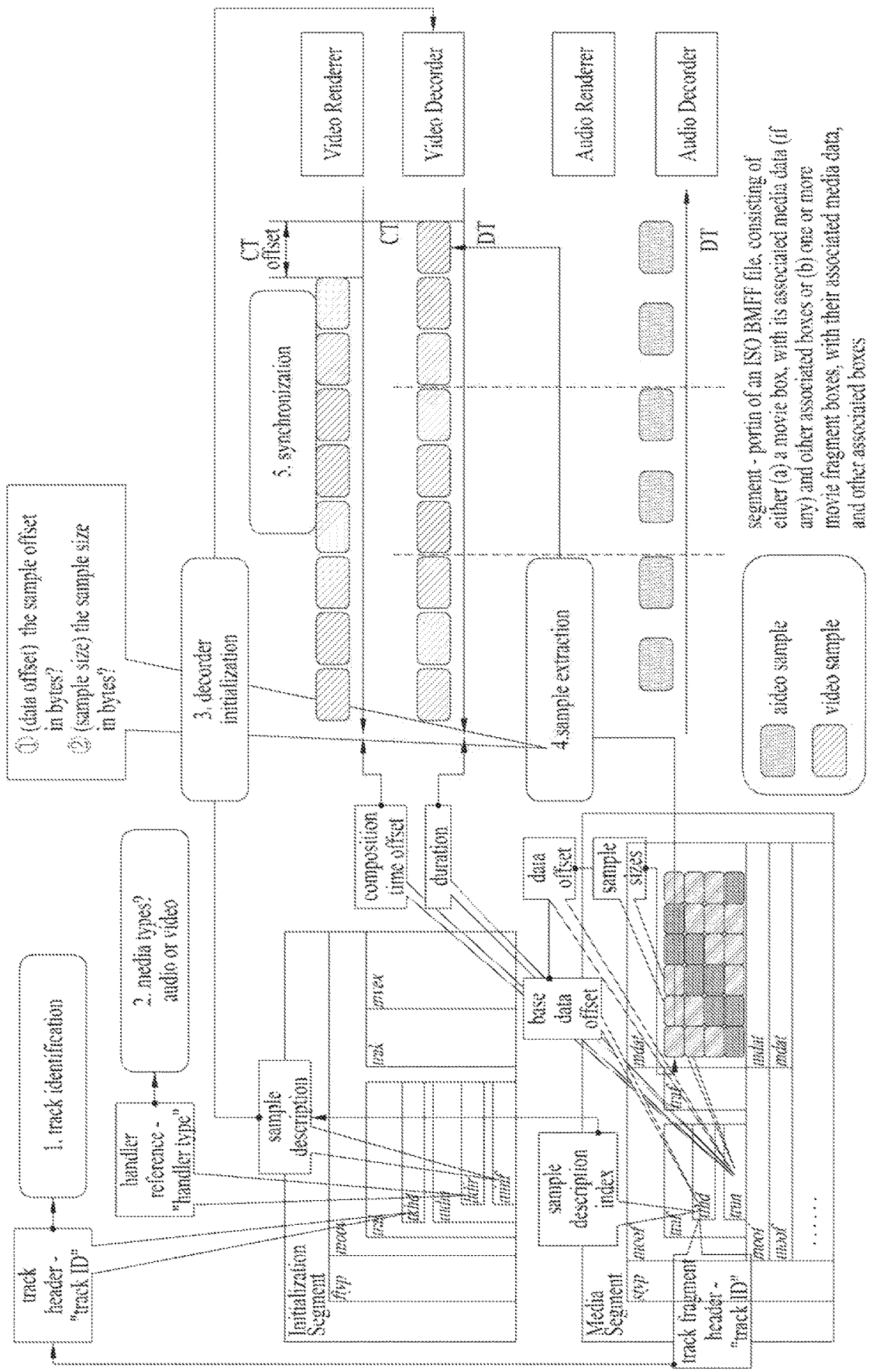
FIG. 83 illustrates a scheme of accessing video data and/or audio data in the ISO BMFF according to another embodiment of the present invention.

FIG. 83 illustrates a scheme of accessing video data and/or audio data in the ISO BMFF according to another embodiment of the present invention.

The illustrated scheme of accessing video data and/or audio data includes synchronization between data during a streaming replay. In this case, the video data and/or the audio data are transmitted/received in states of being fragmented and/or segmented.'

The receiver acquires basic information necessary for file decoding from an initialization segment. The receiver identifies a track using 'tkhd' in the ISO file.

The receiver may verify whether a media type is audio or video using 'hdlr' (handler_type).

The receiver initializes a decoder using attribute information of media on a current track included in an 'minf' box.

The receiver identifies a media segment corresponding to the track identified by 'tkhd' using a 'tfhd' box in the media segment, and acquires a sample description index corresponding to sample description of the 'mint' box.

The receiver extracts samples of the video data and/or the audio data using base data offset information included in the 'tfhd' box, data offset information included in a 'trun' box and/or sample size information included in the 'trun' box.

The receiver performs synchronization between the samples of the video data and/or the audio data using sample duration information and sample composition time offset information included in the 'trun' box.

A detailed transmission frame and transport packet transmitting broadcast service will be described with reference to FIGS. 84 to 87.

Figure 84:
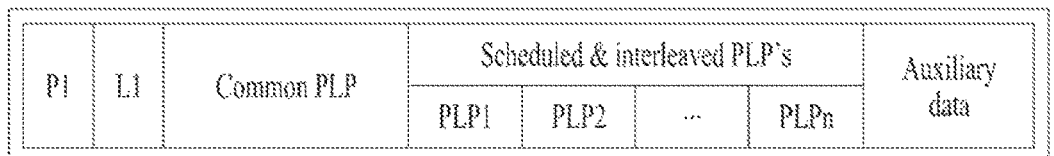
FIG. 84 is a view illustrating a broadcast transmission frame according to an embodiment of the present invention.

FIG. 84 is a view illustrating a broadcast transmission frame according to an embodiment of the present invention.

According to the embodiment of FIG. 84, the broadcast transmission frame includes a P1 part, an L1 part, a common PLP part, an interleaved PLP part (e.g., a scheduled & interleaved PLP's part), and an auxiliary data part.

According to the embodiment of FIG. 84, the broadcast transmission device transmits information on transport signal detection through the P1 part of the transmission frame. Additionally, the broadcast transmission device may transmit turning information on broadcast signal tuning through the P1 part.

According to the embodiment of FIG. 84, the broadcast transmission device transmits a configuration of the broadcast transmission frame and characteristics of each PLP through the L1 part. At this pint, the broadcast reception device 100 decodes the L1 part on the basis of the P1 part to obtain the configuration of the broadcast transmission frame and the characteristics of each PLP.

According to the embodiment of FIG. 84, the broadcast transmission device may transmit information commonly applied to PLPs through the common PLP part. According to a specific embodiment of the present invention, the broadcast transmission frame may not include the common PLP part.

According to the embodiment of FIG. 84, the broadcast transmission device transmits a plurality of components included in broadcast service through an interleaved PLP part. At this point, the interleaved PLP part includes a plurality of PLPs.

Moreover, according to the embodiment of FIG. 84, the broadcast transmission device may signal to which PLP components configuring each broadcast service are transmitted through an L1 part or a common PLP part. However, the broadcast reception device 100 decodes all of a plurality of PLPs of an interleaved PLP part in order to obtain specific broadcast service information on broadcast service scan.

Unlike the embodiment of FIG. 84, the broadcast transmission device may transmit a broadcast transmission frame including a broadcast service transmitted through a broadcast transmission frame and an additional part that includes information on a component included in the broadcast service. At this point, the broadcast reception device 100 may instantly obtain information on the broadcast service and the components therein through the additional part. This will be described with reference to FIG. 85.

Figure 85:
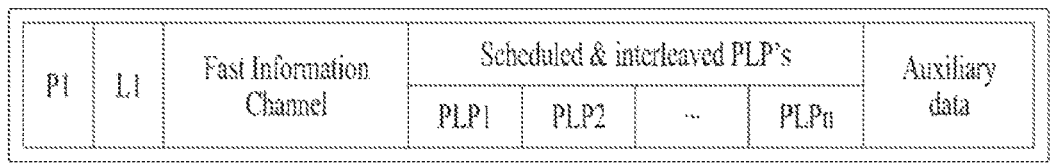
FIG. 85 is a view of a broadcast transmission frame according to another embodiment of the present invention.

FIG. 85 is a view of a broadcast transmission frame according to another embodiment of the present invention.

According to the embodiment of FIG. 85, the broadcast transmission frame includes a P1 part, an L1 part, a fast information channel (FIC) part, an interleaved PLP part (e.g., a scheduled & interleaved PLP's part), and an auxiliary data part.

Except the FIC part, other parts are identical to those of FIG. 84.

The broadcast transmission device transmits fast information through the FIC part. The fast information may include configuration information of a broadcast stream transmitted through a transmission frame, simple broadcast service information, and service signaling relating to a corresponding service/component. The broadcast reception device 100 may scan broadcast service on the basis of the FIC part. In more detail, the broadcast reception device 100 may extract information on broadcast service from the FIC part.

Figure 86:
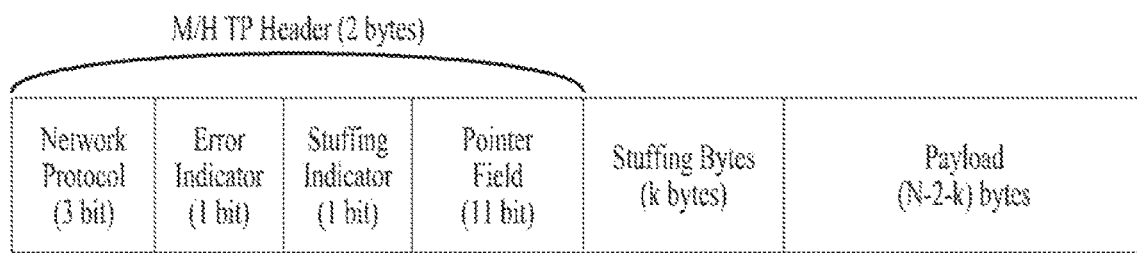
FIG. 86 is a view illustrating a structure of a transport packet transmitting a broadcast service according to an embodiment of the present invention.

FIG. 86 is a view illustrating a structure of a transport packet transmitting a broadcast service according to an embodiment of the present invention.

In the embodiment of FIG. 86, a transport packet transmitting a broadcast service includes a Network Protocol field, an Error Indicator field, a Stuffing Indicator field, a Pointer field, a Stuffing bytes field, and payload data.

Figures 87, 88:
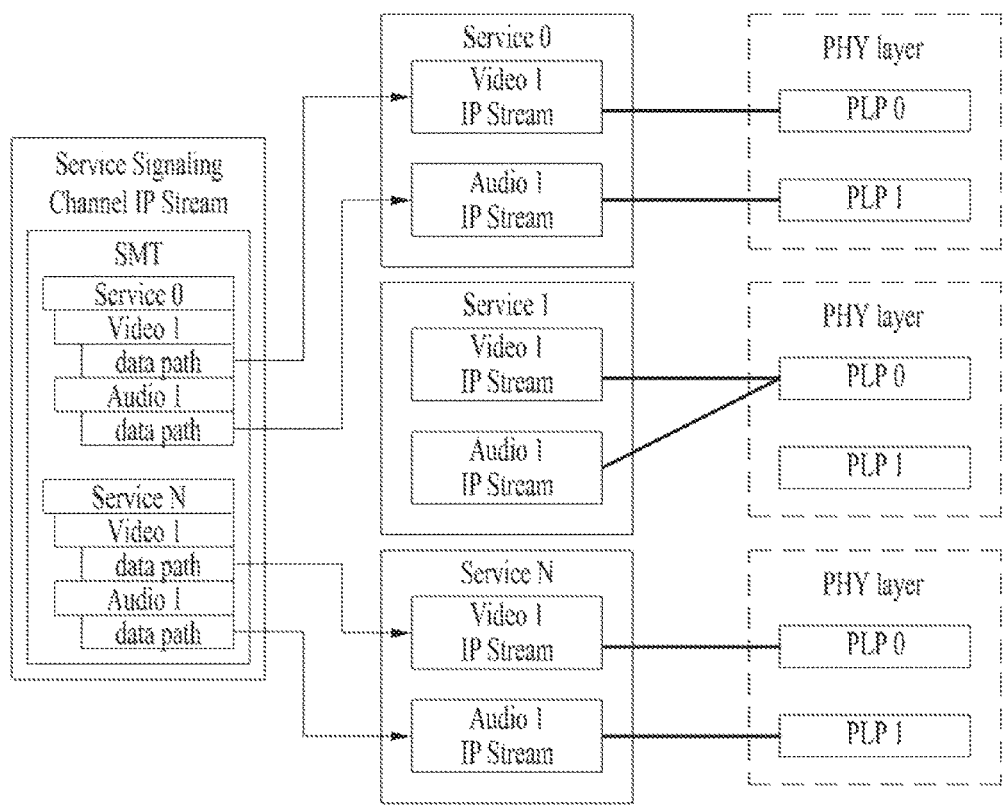
FIG. 87 is a view illustrating a value of a network_protocol field included in a transport packet for transmitting a broadcast service according to an embodiment of the present invention.
FIG. 88 is a view that a broadcast service signaling table and broadcast service transmission path signaling information signal broadcast service and a broadcast service transmission path.

The Network Protocol field represents the type of a network protocol. According to a specific embodiment of the present invention, a value of the Network Protocol field may represent the IPv4 protocol or a frame packet type. In more detail, as shown in the embodiment of FIG. 87, when a value of the Network Protocol field is 000, it may represent the IPv4 protocol. In more detail, as shown in the embodiment of FIG. 87, when a value of the Network Protocol field is 111, it may represent a frame_packet_type protocol. At this point, framed_packet_type may be a protocol defined by ATSC A/153. In more detail, framed_packet_type may represent a network packet protocol not including a field representing information on the length. According to a specific embodiment of the present invention, the Network Protocol may be a 3-bit field.

The Error Indicator field represents that an error is detected from a corresponding transport packet. In more detail, if a value of the Error Indicator field is 0, it represents that no error is detected from a corresponding packet and if a value of the Error Indicator field is 1, it represents that an error is detected from a corresponding packet According to a specific embodiment of the present invention, the Error Indicator field may be a 1-bit field.

The Stuffing Indicator field represents whether stuffing bytes are included in a corresponding transport packet. At this point, the stuffing bytes represent data included in a payload to maintain the length of a fixed packet. According to a specific embodiment of the present invention, when a value of the Stuffing Indicator field is 1, a transport packet includes a stuffing byte and when a value of the Stuffing Indicator field is 0, a transport packet includes no stuffing byte According to a specific embodiment of the present invention, the Stuffing Indicator field may be a 1-bit field.

The Pointer field represents a start point of a new network packet in a payload part of a corresponding transport packet. According to a specific embodiment of the present invention, when a value of the Pointer field is 0x7FF, it may represent that there is no start point of a new network packet. Additionally, According to a specific embodiment of the present invention, when a value of the Pointer field is not 0x7FF, it may represent an offset value from the last part of a transport packet header to the start point of a new network packet. According to a specific embodiment of the present invention, the Pointer field may be an 11-bit field.

The Stuffing Bytes field represents a stuffing byte filling between the header and the payload data to maintain a fixed packet length.

A configuration of a broadcast reception device for receiving broadcast service will be described below.

FIG. 88 is a view that a broadcast service signaling table and broadcast service transmission path signaling information signal broadcast service and a broadcast service transmission path.

The broadcast service signaling table may signal broadcast service information. In more detail, the broadcast service signaling table may signal a media component that broadcast service includes. Additionally, the broadcast service signaling table may signal broadcast service and a transmission path of a media component that the broadcast service includes. For this, the broadcast service signaling table may include broadcast service transmission path signaling information. In the embodiment of FIG. 88, the broadcast service signaling table includes information on a plurality of broadcast services. At this point, the broadcast service signaling table includes media component signaling information signaling a plurality of media components respectively included in a plurality of broadcast services. Especially, the broadcast service signaling table includes broadcast service transmission path signaling information signaling transmission paths of a plurality of media components. For example, it is shown that the broadcast reception device 100 may transmit Video 1 in Service 0 through PLP 0 according to the signaling table. Additionally, it is shown that the broadcast reception device 100 may transmit Audio 1 in Service N through internet network according to the signaling table. At this point, the PLP is a series of logical data delivery paths identifiable on a physical layer. The PLP may be also referred to as a data pipe.

FIG. 89 is a view illustrating a broadcast service signaling table according to an embodiment of the present invention.

The broadcast service signaling table may include at least one of broadcast service identification information, information representing the current state of a broadcast service, the name of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

In more detail, as shown in the embodiment of FIG. 89, the broadcast service signaling table may include at least one of a table_id field, section_syntax_indicator field, a private_indicator field, a section length field, a table_id_extension field, a version_number field, a current_next_indicator field, a section_number field, a last_section_numberr field, a num_services field, a service_id field, a service_status field, an SP_indicator field, a short_service_name_length field, a short_service_name field, a channel_number field, a service_ category field, a num_components field, an essential_ component_indicator field, a num_component_level_descriptor field, a component_level_descriptor field, a num_ service_level_descriptors field, and a service_level_descriptor field.

The table_id field represents an identifier of a broadcast service signaling information table. At this point, a value of the table_id field may be one of reserved id values defined in ATSC A/65. According to a specific embodiment of the present invention, the table_id field may be an 8-bit field.

The section_syntax_indicator field represents whether the broadcast service signaling information table is a private section table in a long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying a broadcast service signaling information table in combination with the table_id field. Especially, the table_id field may include a SMT_protocol_version field representing a protocol version of a service signaling information table. According to a specific embodiment of the present invention, the SMT_protocol_version field may be an 8-bit field.

The version_number field represents a version of a service signaling table. The broadcast reception device 100 may determine the availability of a service signaling information table on the basis of a value of the vserion_number field. In more detail, when a value of the version_number field is identical to a version of a previously received service signaling table, the information of the service signaling table may not be used. According to a specific embodiment of the present invention, the version number field may be a 5-bit field.

The current_next_indicator field represents whether information of a broadcast service signaling table is currently available. In more detail, when a value of the current_next_indicator field is 1, it may represent that the information of the broadcast service signaling table is available. Moreover, when a value of the current_next_indicator field is 1, it may represent that the information of the broadcast service signaling table is available next time. According to a specific embodiment of the present invention, the current_next_indicator field may be a 1-bit field.

The section_number field represents a current section number. According to a specific embodiment of the present invention, the section_number field may be an 8-bit field.

The last section_number field represents the last section number. When the size of a broadcast service signaling table is large, it may be divided into a plurality of sections and then transmitted. At this point, the broadcast reception device 100 determines whether all sections necessary for a broadcast service signaling table are received on the basis of the section_number field and the last_section_number field. According to a specific embodiment of the present invention, the last_section_number field may be an 8-bit field.

The service_id field represents a service identifier for identifying a broadcast service. According to a specific embodiment of the present invention, the service_id field may be a 16-bit field.

The service_status field represents the current state of a broadcast service. In more detail, it may represent whether the broadcast service is available currently. According to a specific embodiment of the present invention, when a value of the service_status field is 1, it may represent that the broadcast service is available currently. According to a specific embodiment of the present invention, the broadcast reception device 100 may determine whether to display a corresponding broadcast service in a broadcast service list and a broadcast service guide on the basis of a value of the service_status field. For example, when a corresponding broadcast service is unavailable, the broadcast reception device 100 may not display the corresponding broadcast service in a broadcast service list and a broadcast service guide. According to another specific embodiment of the present invention, the broadcast reception device 100 may limit an access to a corresponding broadcast service on the basis of a value of the service_status field. For example, when a corresponding broadcast service is unavailable, the broadcast reception device 100 may limit an access to a corresponding broadcast service through a channel up/down key. According to a specific embodiment of the present invention, the service_status field may be a 2-bit field.

The SP_indicator field may represent whether service protection is applied to at least one component in a corresponding broadcast service. For example, when a value of SP_indicator is 1, it may represent that service protection is applied to at least one component in a corresponding broadcast service. According to a specific embodiment of the present invention, the SP_indicator field may be a 1-bit field.

The short_service_name_length field represents the size of the short_service_name field.

The short_service_name field represents the name of a broadcast service. In more detail, the short_service_name field may be displayed by summarizing the name of a broadcast service.

The channel_number field displays a virtual channel number of a corresponding broadcast service.

The service_category field represents a category of a broadcast service. In more detail, the service_category field may represent at least one of TV service, radio service, broadcast service guide, RI service, and emergency alerting. For example, as shown in the embodiment of FIG. 89, in the case that a value of the service_category field is 0x01, it represents TV service. In the case that a value of the service_category field is 0x02, it represents radio service. In the case that a value of the service_category field is 0x03, it represents RI service. In the case that a value of the service_category field is 0x08, it represents service guide. In the case that a value of the service_category field is 0x09, it represents emergency alerting. According to a specific embodiment of the present invention, the service_category field may be a 6-bit field.

The num_component field represents the number of media components that a corresponding broadcast service includes. According to a specific embodiment of the present invention, the num_component field may be a 5-bit field.

The essential_component_indicator field represents whether a corresponding media component is an essential media component essential to a corresponding broadcast service presentation. According to a specific embodiment of the present invention, the essential_component_indicator field may be a 1-bit field.

The num_component_level_descriptor field represents the number of component_level_descrptor fields. According to a specific embodiment of the present invention, the num_component_level_descriptor field may be a 4-bit field.

The component_level_descriptor field includes an additional property for a corresponding component.

The num_service_level_descriptors field represents the number of service_level_descriptor fields. According to a specific embodiment of the present invention, the num_service_level_descriptors field may be a 4-bit field.

The service level descriptor field includes an additional property for a corresponding service.

The service signaling table may further include information on ensemble. When the same Forward Error Correction (FEC) is applied to at least one service and transmitted, the ensemble represents a collection of the at least one service.

Figures 92, 93:
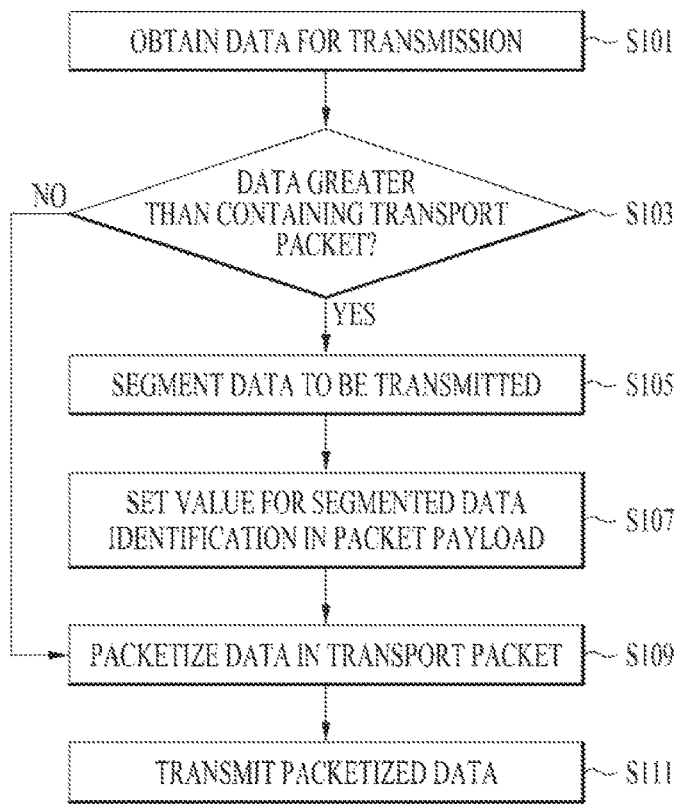
FIG. 92 is a view of a stream identifier descriptor according to another embodiment of the present invention.
FIG. 93 is a view illustrating an operation when a broadcast transmission device transmits a broadcast service signaling table according to an embodiment of the present invention.

FIG. 93 is a view of a broadcast service signaling table according to another embodiment of the present invention.

In more detail, as shown in the embodiment of FIG. 93, the broadcast service signaling table may further include a num_ensemble_level_descriptors field and an ensemble_level_descriptor field.

The num_ensemble_level_descriptors field represents the number of ensemble_level_descriptor fields. According to a specific embodiment of the present invention, the num_ensemble_level_descriptors field may be a 4-bit field.

The ensemble_level_descriptor field includes an additional property for a corresponding ensemble.

Additionally, the service signaling table may further include stream identifier information for identifying a media component. This will be described in more detail with reference to FIG. 92.

FIG. 92 is a view of a stream identifier descriptor according to another embodiment of the present invention.

The stream identifier information includes at least one of a descriptor_tag field, a descriptor_length field, and a component_tag field.

The descriptor_tag field represents a descriptor including stream identifier information. According to a specific embodiment of the present invention, the descriptor_tag field may be an 8-bit field.

The descriptor_length field represents the length of stream identifier information after a corresponding field. According to a specific embodiment of the present invention, the descriptor_length field may be an 8-bit field.

The component_tag field represents a media component identifier for identifying a media component. At this point, the media component identifier may have a different unique value than a media component identifier of another media component on a corresponding signaling information table. According to a specific embodiment of the present invention, the component_tag field may be an 8-bit field.

An operation for transmitting/receiving a broadcast service signaling table will be described with reference to FIGS. 93 and 99.

The above broadcast service table is described as in a bitstream format but according to a specific embodiment of the present invention, a broadcast service table may be in an XML format.

FIG. 93 is a view illustrating an operation when a broadcast transmission device transmits a broadcast service signaling table according to an embodiment of the present invention.

The broadcast transmission device may include a transmission unit for transmitting a broadcast signals and a control unit for controlling operations of the broadcast transmission unit. A transmission unit may include one or more processors, one or more circuits, and one or more hardware modules, which perform each of a plurality of functions that the transmission unit performs. In more detail, the transmission unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The control unit may include one or more processors, one or more circuits, and one or more hardware modules, which perform each of a plurality of functions that the control unit performs. In more detail, the control unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one.

The broadcast transmission device obtains data to be contained in a transport packet and transmitted through the control unit in operation S101. The data that the broadcast transmission device transmits may be real-time content or metadata relating to real-time content. In more detail, real-time content may be a broadcast A/V content transmitted through a terrestrial broadcast network or enhancement data relating to broadcast AV content.

The broadcast transmission device determines whether data obtained through the control unit exceeds the size that a transport packet for data transmission contains in operation S103. In more detail, a transport packet that the broadcast transmission device is to use may be based on a protocol using a fixed packet length. At this point, when data to be transmitted exceeds the size that a packet covers, it is difficult to transmit data smoothly. Additionally, when data to be transmitted is very smaller than a packet, it is inefficient to transmit only a small size of one data in one packet. Accordingly, in order to overcome the inefficiency, the broadcast transmission device compares the sizes of a transport packet and data through the control unit.

If it is determined that a transport packet cannot contain the size of data that the broadcast transmission device is to transmit, the broadcast transmission device segments data to be transmitted through the control unit in operation S107. The segmented data may be divided in a plurality of transport packets and then transmitted. Then, the plurality of transport packets may additionally include information for identifying the segmented data. According to another embodiment, the information for identifying segmented data may be transmitted through additional datagram instead of a transport packet.

The broadcast transmission device packetizes data having a smaller size than segmented data or a transport packet through the control unit in operation S109. In more detail, the broadcast transmission device processes data to be in a delivery from. The processed broadcast packet may include a packet header and packet payload. Additionally, the packet payload may include data and the header of a payload. Herein, besides the packet header, the payload header is a field for signaling payload data in the packet payload. Additionally, the packet payload including segmented data may include a segmented data header in addition to the header of a payload. Herein, besides the payload header, the segmented data header is a field for signaling payload data in the packet payload.

According to an embodiment, the broadcast transmission device may packetize one data in one packet. According to another embodiment, the broadcast transmission device may packetize a plurality of data in one packet. According to another embodiment, the broadcast transmission device may segment and packetize one data in a plurality of packets.

As mentioned above, according to the size of data or the length of a packet, a packetized transport packet may vary. Therefore, it is necessary for the broadcast transmission device to transmit different transport packets in distinguishable forms. According to an embodiment, the broadcast transmission device may packetize data by including information representing the form of a packet in the payload header of a transport packet through the control unit. According to another embodiment, when it is difficult to distinguish data to be transmitted only with information in the payload header, the control unit of the broadcast transmission device may packetize data by additionally including information for identifying the type of a transport packet.

The broadcast transmission device transmits the packetized broadcast packet through the transmission unit in operation S1111. According to an embodiment, a broadcast packet may be transmitted through a terrestrial broadcast network. According to another embodiment, a broadcast packet may be transmitted through an internet network.

Figure 94:
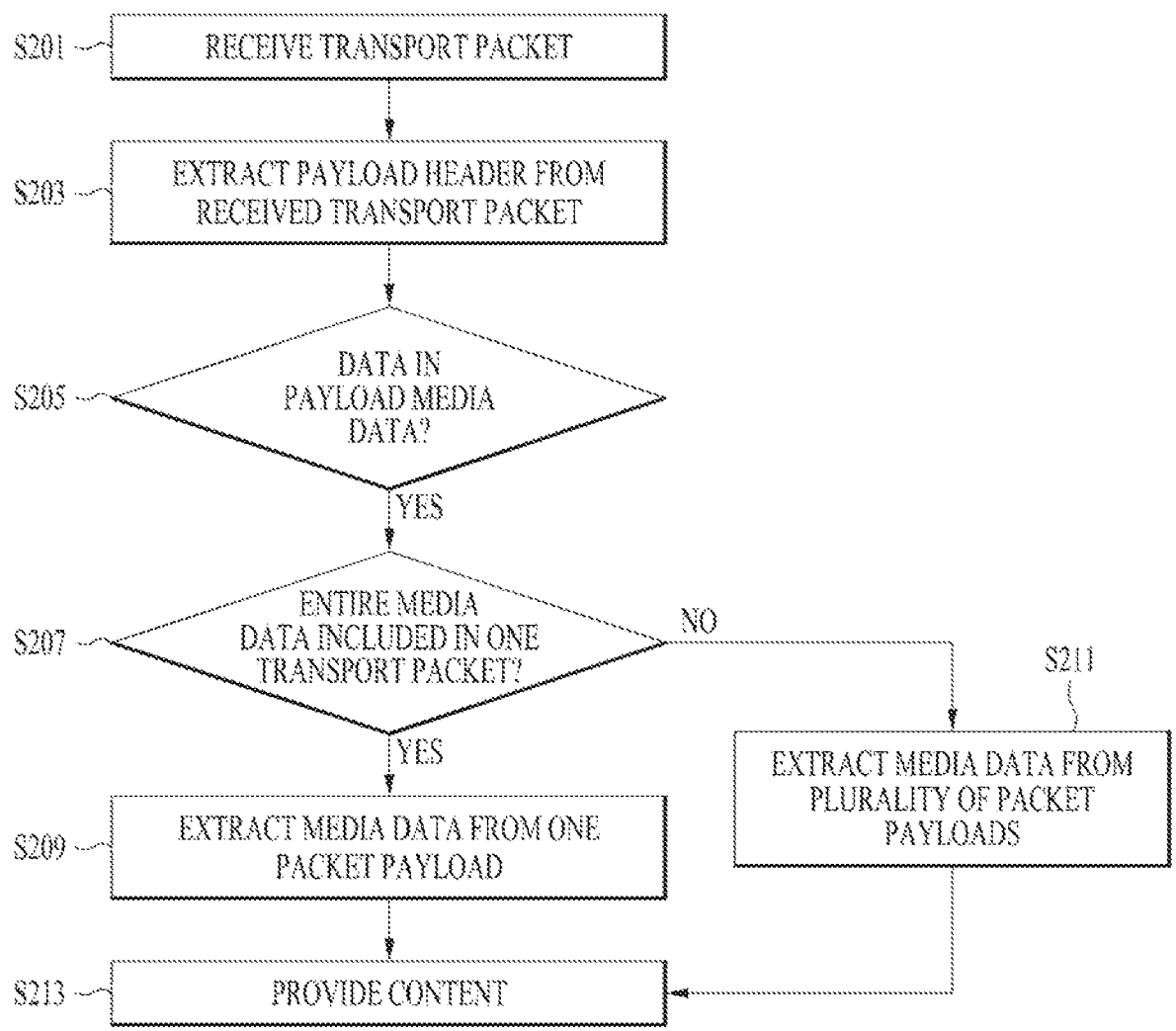
FIG. 94 is a view illustrating an operation when a broadcast reception device receives a packetized broadcast packet according to an embodiment of the present invention.

FIG. 94 is a view illustrating an operation when a broadcast reception device receives a packetized broadcast packet according to an embodiment of the present invention.

The broadcast reception device 100 receives a packetized transport packet through the broadcast reception unit 110 in operation S201.

The broadcast reception device 100 extracts a payload header from the received transport packet through the control unit 150 in operation S203. The control unit 150 may obtain payload data including data and a payload header signaling the payload data from the payload of the transport packet. In more detail, the control unit 150 of the broadcast reception device 100 may extract additional information for providing at least one of a broadcast content in the packet payload and an enhancement content relating to the broadcast content, from the received transport packet.

According to an embodiment, the control unit 150 of the broadcast reception device 100 may extract at least one of payload error determination information, payload priority information, and payload type information from the payload header. In more detail, the payload error determination information represents whether there is an error in the payload in a broadcast packet or whether a corresponding payload includes a content violating a predetermined syntax.

Additionally, the priority information represents a priority of data in the payload. Additionally, the priority information represents property information of data in the payload. For example, in the case of a payload including signaling information of file format media data, the priority information of a corresponding packet is set to the highest priority.

Additionally, the payload type information represents the type of a packet payload including payload data. For example, the payload type information may represent whether the broadcast transmission device packetizes one data in one packet payload or divides and packetizes one data in a plurality of packet payloads.

The broadcast reception device 100 determines whether data in the payload is media data from information in the extracted payload header through the control unit 150 in operation S205. In more detail, the control unit 150 of the broadcast reception device 100 may determine the type of a payload in a corresponding packet on the basis of the packet header information. According to an embodiment, the type of a payload may be media data including broadcast content and an enhancement content relating to the broadcast content. According to another embodiment, the type of a payload may be metadata including additional information necessary for providing media data.

When it is determined that data in the payload is media data, the control unit 150 of the broadcast reception device 100 determines whether entire media data is included in one transport packet in operation S207. According to a specific embodiment, according to the length of a transport packet and the size of entire media data, the broadcast transmission device may packetize the entire media data in one transport packet. According to another embodiment, the broadcast transmission device may divide entire media data and packetize them in different transport packets. Accordingly, the control unit 150 of the broadcast reception device 100 may determine the type of a broadcast packet through the payload header so as to extract complete media data for content output.

On the other hand, according to an embodiment of the present invention, when the control unit 150 of the broadcast reception device 100 determines that data in the payload is not media data, this will be described in more detail with reference to FIG. 117.

When it is determined that entire media data is included in one transport packet, the control unit 150 extracts media data from one packet payload in operation S209. According to an embodiment, the control unit 150 of the broadcast reception device 100 may extract only one media data from one transport packet. According to another embodiment, the control unit 150 of the broadcast reception device 100 may extract a plurality of media data from one transport packet. On the other hand, when it is determined that entire media data is not included in a transport packet, the control unit 150 extracts media data from a plurality of packet payloads on the basis of a payload header and a segment data header in operation S211. In more detail, the control unit 150 may obtain information of divided and packetized media data from the payload header and the segment data header. Accordingly, the control unit 150 may identify divided media data according to the obtained information. That is, the control unit 150 may obtain the order of divided media data according to the obtained information. The control unit 150 may concatenate media data obtained from different transport packets on the basis of a corresponding order.

The broadcast reception device 100 provides content through the control unit 150 in operation S213. According to an embodiment, the control unit 150 may provide content on the basis of extracted media data. According to another embodiment, the control unit 150 may provide content on the basis of concatenated media data.

The control unit 150 may output A/V content. According to another embodiment, the broadcast reception device 100 may output enhancement data relating to A/V content.

Figure 95:
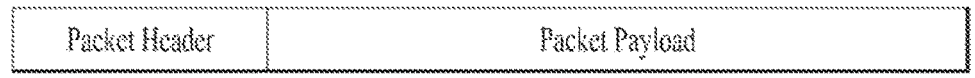
FIG. 95 is a view illustrating a segment configuration according to an embodiment of the present invention.

FIG. 95 is a view illustrating a segment configuration according to an embodiment of the present invention.

On a packet based data transfer protocol, each packet is configured with a packet header and a packet payload as shown in FIG. 91 in general. The packet header may include information of a packet payload in a packet. The packet payload may include media data to be transmitted via a broadcast network or an internet network. Media data that the packet payload includes may be at least one of audio, video, enhancement service, and additional information.

Figure 96:
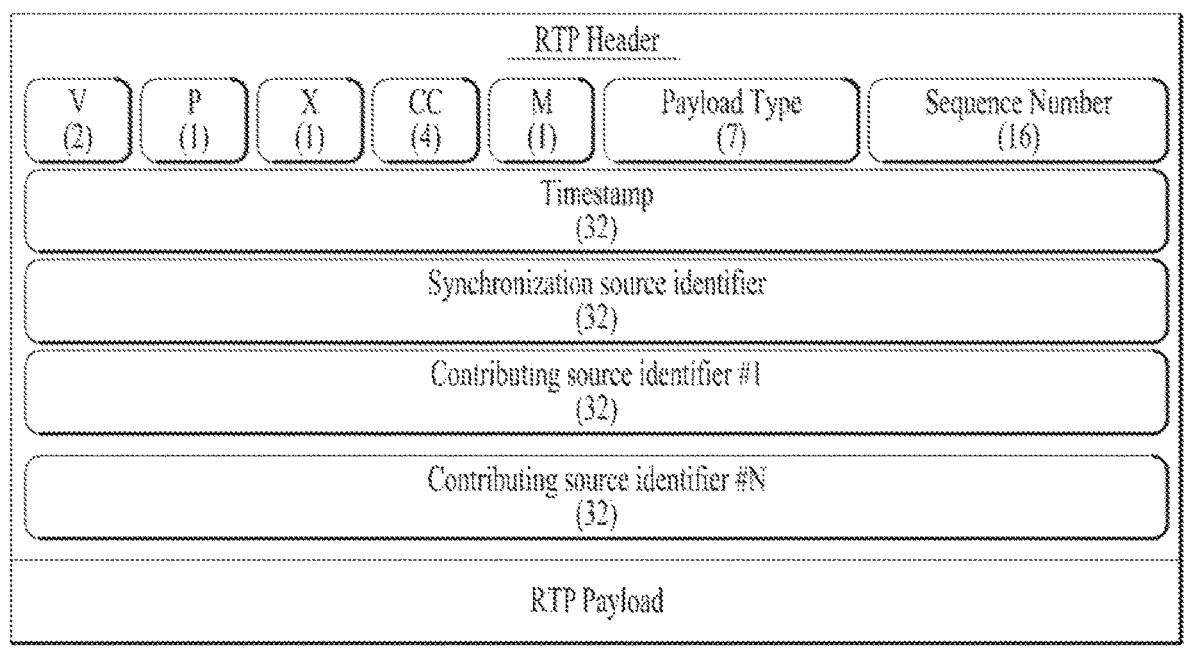
FIG. 96 is a view illustrating a structure of a real-time transport protocol (RTP) packet for real-time content transmission according to an embodiment of the present invention.

FIG. 96 is a view illustrating a structure of a real-time transport protocol (RTP) packet for real-time content transmission according to an embodiment of the present invention.

An RTP packet may include an RTP Header and an RTP Payload. The RTP header include at least one of a Timestamp, a Synchronization source identifier, and a Contributing source identifier.

The RTP Header may include at least one of a V (version) field, a P (padding) field, an X (extension) field, a CC field, an M (Marker bit) field, a Payload Type field, a Sequence Number field, and a Timestamp field.

The V (version) field represents version information of a corresponding RTP. According to a specific embodiment of the present invention, the V (version) field may be a 2-bit field.

The P (padding) field represents whether there are padding bits in a payload. According to a specific embodiment of the present invention, the P (padding) field may be a 1-bit field.

The X (extension) field represents whether there is an extension field in the RTP Header. According to a specific embodiment of the present invention, the X (extension) field may be a 1-bit field.

The CC field represents the number of Contributing sources. According to a specific embodiment of the present invention, the CC field may be a 4-bit field.

The M (Marker bit) field may represent a different meaning according to the Payload type. For example, when a transport object is a file, the M (Marker bit) field may represent the end of the file. According to another embodiment, when a transport object is video or audio data, the M (Marker bit) field may represent the first or last object of related access units. According to a specific embodiment of the present invention, the M (Marker bit) field may be a 1-bit field.

The Payload Type field represents the type of an RTP Payload. According to a specific embodiment of the present invention, the Payload Type field may be a 7-bit field.

The Sequence Number field represents the sequence number of an RTP packet. According to a specific embodiment of the present invention, the Sequence Number field may be a 16-bit field.

The Timestamp field may represent time information relating to an RTP packet. The Timestamp field may be interpreted differently according to a value of the Payload Type field. According to a specific embodiment of the present invention, the Timestamp field may be a 32-bit field.

RTP payload may be included in an audio/video access unit according to the payload type of RTP Header. For example, in the case of H.264, a network abstract layer (NAL) unit may be included.

Figure 97:
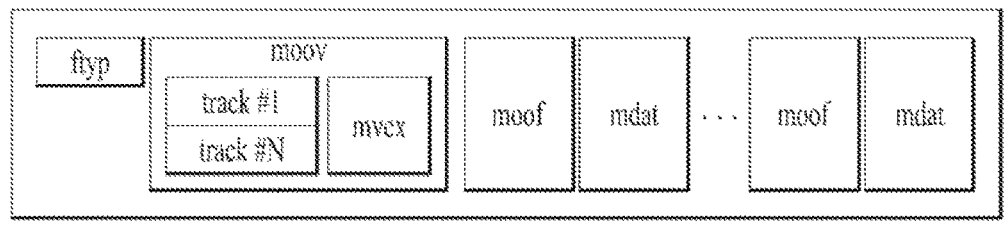
FIG. 97 is a view illustrating a media file format based on an ISO base media file format (ISO BMFF) according to an embodiment of the present invention.

FIG. 97 is a view illustrating a media file format based on an ISO base media file format (ISO BMFF) according to an embodiment of the present invention.

As shown in FIG. 97, the media file format may include one ftyp and at least one moov, moof, and mdat in general.

ftyp represents the type and suitability of a media file. Ftyp is located at the front in a media file if possible.

moov is a container for all media data. In more detail, moov is a container box for single track of presentation. Presentation may be configured with one or more tracks. Each track is separated from another track in presentation. According to an embodiment, a track may contain media data and according to another embodiment, a track may contain information for packetized streaming protocol.

mdat is a container of media data and moof contains information on mdat.

Figure 98:
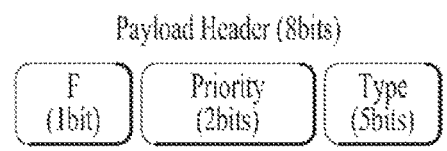
FIG. 98 is a view illustrating a configuration of a payload header in a packet payload according to an embodiment of the present invention.

FIG. 98 is a view illustrating a configuration of a payload header in a packet payload according to an embodiment of the present invention.

Currently, a real-time transport protocol is mostly transmitted based on an access unit of a media file. In more detail, an access unit refers to a minimum unit for transmitting a media file or data. Accordingly, there is insufficient consideration on a method of transmitting media file format based data in real-time.

According to an embodiment of the present invention, a broadcast transmission device may transmit one file format based media data through a payload included in one transport packet. In this case, the transport packet may be referred to as a single unit packet. According to an embodiment of the present invention, a broadcast transmission device may transmit a plurality of file format based media data through a payload included in one transport packet. In this case, the transport packet may be referred to as an aggregation packet. According to another embodiment of the present invention, a broadcast transmission device may divide one file format based media data into several transport packets and may then transmit them. In this case, the transport packet may be referred to as a fragmented packet. According to another embodiment of the present invention, a broadcast transmission device may transmit one or a plurality of metadata for media stream through the payload of one transport packet. According to another embodiment, the broadcast transmission device may transmit one metadata through the payloads of a plurality of transport packets.

Additionally, a broadcast transmission device according to an embodiment of the present invention may transmit media data through various protocols. The protocol may include at least one of a real-time transport protocol (RTP), an asynchronous layered coding (ALC), and a layered coding transport (LCT).

In more detail, a broadcast transmission device may insert a field representing information on a payload type in the header of a transport packet to represent that there is file format based media data in a payload through a corresponding field. For example, in the case of the RTP, the payload type field of a header may represent the data type of a payload and a specific value may be assigned to a corresponding field as a payload type value for file format based media data. Then, in this case, when data including the end of one media file is included in the payload of a packet, the M field of an RTP packet header may be set to 1.

In order to overcome the above issues, a payload header according to an embodiment of the present invention may include at least one of information representing whether there is an error or syntax error on data in a payload, information representing the priority of data, and information representing the type of data. In this case, information representing whether there is an error or syntax error on data in the payload of a payload header may be referred to as an F field. According to an embodiment, the information representing whether there is an error or syntax error on data in the payload of a payload header may be set to 1 as forbidden_zero_bit when there is an error or syntax violation on data in a payload. In more detail, the information representing whether there is an error or syntax error on data in the payload of a payload header may be one bit.

Additionally, information representing the priority of data in a payload header may be referred to as an information Priority field. According to an embodiment, the information representing the priority of data is a field representing the priority of payload data. Then, the information representing the priority of data may represent whether payload data includes important metadata on a media file format.

For example, in ISO BMFF, in the case of payload data including ftyp and moov, information representing the priority of data may be set to the highest priority. According to an embodiment, information representing the priority of data may represent the highest priority highest (highest), a relatively lower priority than the highest priority (medium), and the lowest priority (low) through a control unit of a broadcast transmission device. In this case, information representing the priority of data may be set to 0x00 in the case of the highest priority, 0x01 in the case of a relatively lower priority than the highest priority, and 0x02 in the case of the lowest priority. The above setting value is just one exemplary and may be wet to another arbitrary value.

Additionally, in this case, information representing the type of data may be referred to as a type field. In more detail, through information representing the type of data, the control unit 150 of the broadcast reception device 100 may identify whether a transport packet is a packet transmitting one data by one packet, a packet transmitting a plurality of different data by one packet, or a packet transmitting data obtained by dividing one into a plurality of data.

Additionally, through information representing the type of data, the control unit 150 of the broadcast reception device 100 may identify whether a transport packet is a packet transmitting metadata including time information of content or a packet transmitting metadata including description information of content.

According to an embodiment, in the case of a packet transmitting one data by one packet, the broadcast reception device may set information representing the type of data to 0x00. Additionally, in the case of a packet transmitting a plurality of different data by one packet, the broadcast reception device may set information representing the type of data to 0x01. Additionally, in the case of a packet dividing one data and transmitting divided data, the broadcast reception device may set information representing the type of data to 0x02.

Additionally, the broadcast transmission device may packetize metadata including presentation or decoding time information of content instead of media data and may then transmit the packetized metadata. In the case the broadcast reception device may set information representing the type of data to 0x03. Moreover, the time information may be referred to as timeline data.

Additionally, the broadcast transmission device may packetize and transmit metadata including description information of content. In the case the broadcast reception device may set information representing the type of data to 0x04. Moreover, the time information may be referred to as labeling data.

However, the above setting values are just exemplary so that the present invention is not limited to the above values. According to a specific embodiment of the present invention, the type field may be a 5-bit field.

Figure 99:
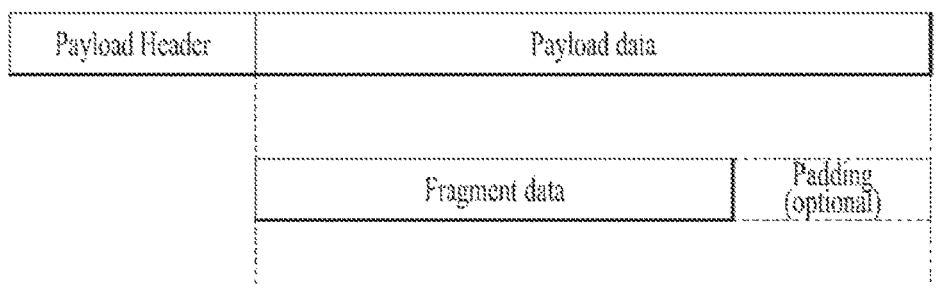
FIGS. 99 and 100 are views illustrating a payload configuration of a transport packet in which one media data is packetized in one packet.
Figure 100:
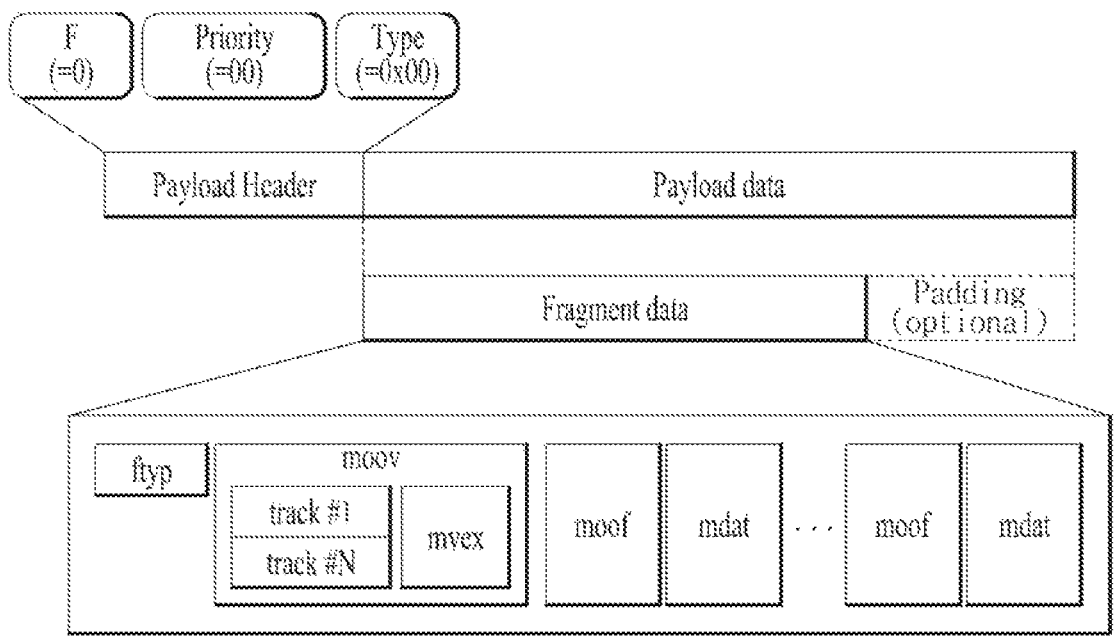

FIGS. 99 and 100 are views illustrating a payload configuration of a transport packet in which one media data is packetized in one packet.

As shown in FIG. 99, a packet in which one media data is included in one packet may be referred to as a single unit packet. The payload of a single unit packet may include a payload header and payload data. The payload data may include fragmented data including one file format based media data. According to an embodiment, when a transport protocol uses a transport packet of a fixed length, payload data may include padding bits in addition to fragmented data. Herein the padding bit refers to a bit for filling the remaining space after filling data in a transport packet.

FIG. 100 is a detailed view of a transport packet shown in FIG. 99. As shown in FIG. 100, a payload header may include at least one of information representing whether there is an error or syntax error in data in a payload, information representing the priority of data, and information representing the type of data.

As shown in FIG. 100, information representing whether there is an error or syntax error on data in a payload may include a value representing a content that there is no error and syntax violation. According to a specific embodiment of the present invention, a corresponding value may be 0.

Since a media file in payload data includes important data such as ftyp, Information representing the priority of data may have the highest priority. As mentioned above, in the case of ftyp, since ftyp includes information for signaling a media file, it may have the highest priority. According to a specific embodiment of the present invention, a value representing the highest priority may be 0x00.

Since one media file is all included in one packet payload, Information representing the type of data may represent a single unit packet. According to a specific embodiment, information representing the type of data may have a value of 0x00. Additionally, a padding bit may be selectively inserted into payload data according to the length and transport protocol of media file.

Figure 101:
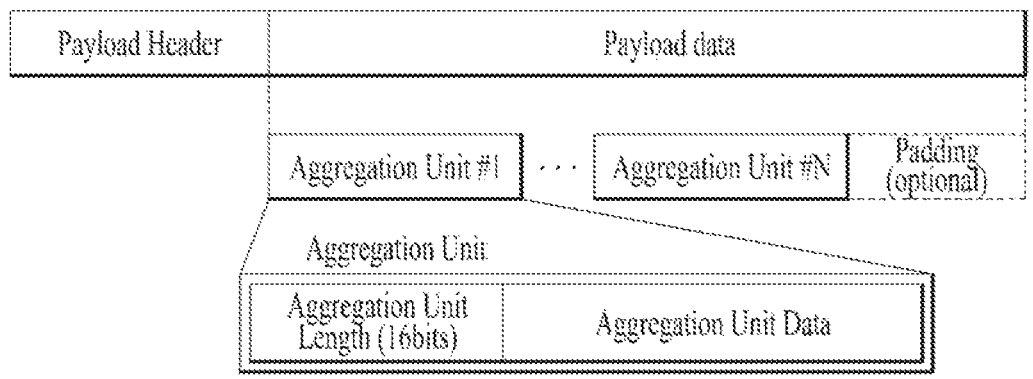
FIGS. 101 and 102 are views illustrating a configuration of a transport packet in which a plurality of media data are packetized in one packet.
Figure 102:

FIGS. 101 and 102 are views illustrating a configuration of a transport packet in which a plurality of media data are packetized in one packet. The above packet may be referred to as an aggregation packet. As shown in FIG. 101, when the payload of one transport packet includes a plurality of different file format based media data, payload data may include a plurality of aggregation units. Each aggregation unit may include another file format based media data. According to an embodiment, when a transport protocol uses a packet of a fixed length, payload data may include padding bits in addition to fragmented data.

According to an embodiment, one aggregation unit may include at least one of information representing the length of an aggregation unit and aggregation data. In this case, information representing the length of an aggregation unit may be referred to as an aggregation unit length field. According to a specific embodiment of the present invention, the aggregation unit may be 16 bits. Additionally, aggregation unit data represent data in one file.

FIG. 102 is a view illustrating a configuration of an aggregation unit according to another embodiment of the present invention. One aggregation unit may further include information representing the type of a file in an aggregation unit in addition to the embodiment of FIG. 101.

Information representing the type of aggregation may be referred to as an aggregation unit type field. According to a specific embodiment, the broadcast transmission device may set the aggregation type to 0x00.

According to another embodiment, the aggregation type may represent that a corresponding aggregation unit includes a file in Self-initializing Segment format on MPEG-Dynamic Adaptive Streaming over HTTP (DASH). Herein, a self-initializing segment is obtained by integrating an initializing segment and a media segment without an additional initializing segment. In more detail, the self-initializing segment may include a media segment and its media form. According to a specific embodiment, in this case, the broadcast transmission device may set the aggregation type to 0x01.

According to another embodiment, the aggregation type may represent that a corresponding aggregation unit includes a file in Initialization Segment format on MPEG-DASH. Herein, the initializing segment is a format following ISO BMFF. In more detail, the initializing segment needs to include ftyp and moov. But, it does not include mod. According to a specific embodiment, in this case, the broadcast transmission device may set the aggregation type to 0x02.

Figure 103:
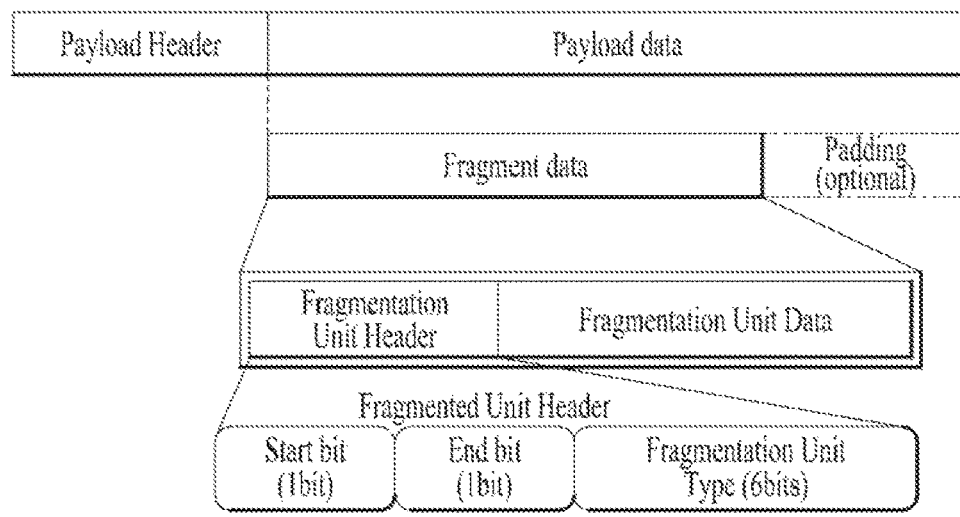
FIG. 103 is a view illustrating the payload of a fragmented packet according to an embodiment of the present invention.
Figure 109:
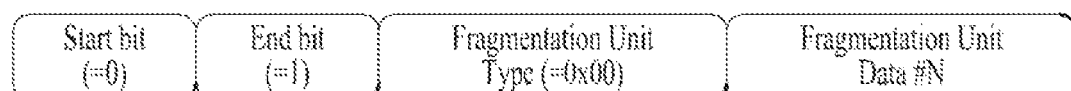

FIGS. 103 and 109 are views illustrating a payload configuration of a transport packet (hereinafter referred to as a fragmented packet) in which one media data is divided and packetized into a plurality of transport packets. FIG. 103 is a view illustrating the payload of a fragmented packet according to an embodiment of the present invention. As shown in FIG. 103, the payload of a fragmented packet may include a fragmentation unit. Additionally, when a transport protocol uses a packet of a fixed length, the payload of a fragmented packet may include padding bits.

According to an embodiment, a fragmentation unit FU may include at least one a Fragmentation unit header and Fragmentation unit data. The Fragmentation unit data may include part of one file format based media data. The Fragmentation unit header may include information of fragmentation unit data.

In more detail, the fragmentation unit header may include at least one of information representing whether fragmentation unit data includes the start part data among entire file media data, information representing whether fragmentation unit data includes the end part data among entire file media data, and information representing the type of a fragmentation unit.

According to an embodiment, the information representing whether fragmentation unit data includes the start part data among entire file media data may be referred to as a start bit field. In more detail, the start part data may be part of entire data including the first bit of entire media data.

For example, the fragmentation unit data of a corresponding payload includes start part data, the broadcast transmission device may set information representing whether fragmentation unit data includes the start part data among entire file media data to 1. In more detail, the information representing whether fragmentation unit data includes the start part data among entire file media data may be one bit.

According to an embodiment, the information representing whether fragmentation unit data includes the end part data among entire file media data may be referred to as an end bit field. In more detail, the end part data may be part of entire data including the end bit of entire media data.

For example, the fragmentation unit data of a corresponding payload includes end part data, the broadcast transmission device may set information representing whether fragmentation unit data includes the end part data among entire file media data to 1. In more detail, the information representing whether fragmentation unit data includes the end part data among entire file media data may be one bit.

According to an embodiment, information representing the type of a fragmentation unit may be referred to as a fragmentation unit type field.

According to an embodiment, a fragmentation unit type may represent that a corresponding packet indicates that a fragmentation unit includes a file format based basic file. In more detail, the file format based basic file may be a media file having a file format based on ISO BMFF. According to a specific embodiment, the broadcast transmission device may set the fragmentation unit type to 0x00.

According to another embodiment, the fragmentation unit type may represent that a corresponding fragmentation unit includes a file in Self-initializing Segment format on MPEG-DASH. According to a specific embodiment, in this case, the broadcast transmission device may set the fragmentation unit type to 0x01.

According to another embodiment, the fragmentation unit type may represent that a corresponding fragmentation unit includes a file in Initialization Segment format on MPEG-DASH. According to a specific embodiment, in this case, the broadcast transmission device may set the fragmentation unit to 0x02.

According to another embodiment, the fragmentation unit type may represent that a corresponding fragmentation unit includes a file in media Segment format on MPEG-DASH. According to a specific embodiment, in this case, the broadcast transmission device may set the fragmentation unit to 0x03.

In more detail, information representing a fragmentation unit type may be six bits.

Figure 104:
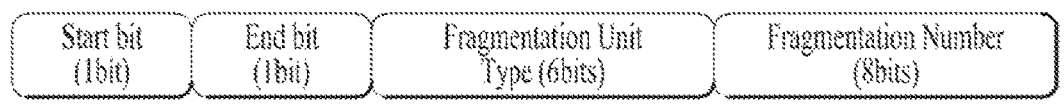
FIG. 104 is a view illustrating a configuration of a payload in a fragmented packet according to another embodiment of the present invention.

FIG. 104 is a view illustrating a configuration of a payload in a fragmented packet according to another embodiment of the present invention. The embodiment of FIG. 104 may be applied to the case there is no information relating to the order of a transport packet in the header therein.

As shown in FIG. 104, the fragmentation unit header in a fragmentation unit FU may include at least one of information representing whether fragmentation unit data includes the start part data among entire file media data, information representing whether fragmentation unit data includes the end part data among entire file media data, information representing the type of a fragmentation unit, and information representing the order in entire data of a fragmentation unit. Among the information, the remaining information other than the information representing the order of a fragmentation unit is identical to that described with reference to FIG. 103.

The information representing the order of a fragmentation unit may be referred to as a fragmentation number field. In more detail, when file format based media data is divided into a plurality of fragmented packets, the broadcast transmission device may set a value to the information representing the order of a fragmentation unit to assign the order of a corresponding packet. According to a specific embodiment of the present invention, the Fragmentation number field may be an 8-bit field.

Figure 105:
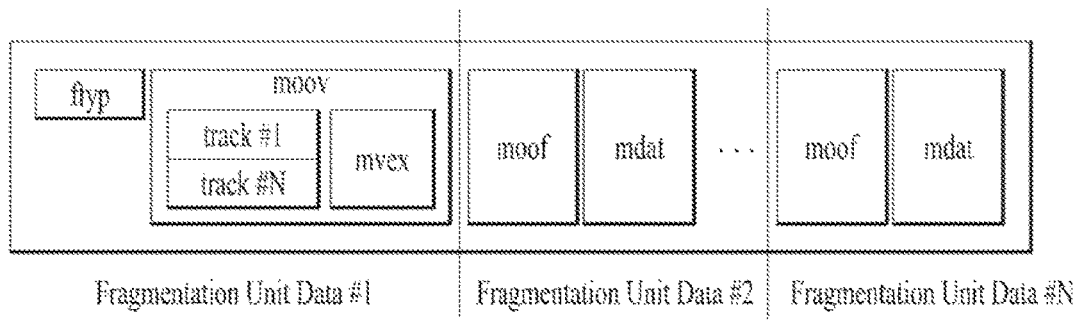
FIG. 105 is a view when a broadcast transmission device fragments an ISO BMFF based media file into a plurality of packets.

FIG. 105 is a view when a broadcast transmission device fragments an ISO BMFF based media file into a plurality of packets. As shown in FIG. 105, in ISO BMFF based media file may include ftyp and moov, and a plurality of moof and mdat.

The broadcast transmission device may divide an ISO BMFF based media file into a plurality of files and may then include them in different fragmentation unit data. Additionally, the broadcast transmission device may include related information in a payload header by dividing an ISO BMFF based media file.

Figure 106:
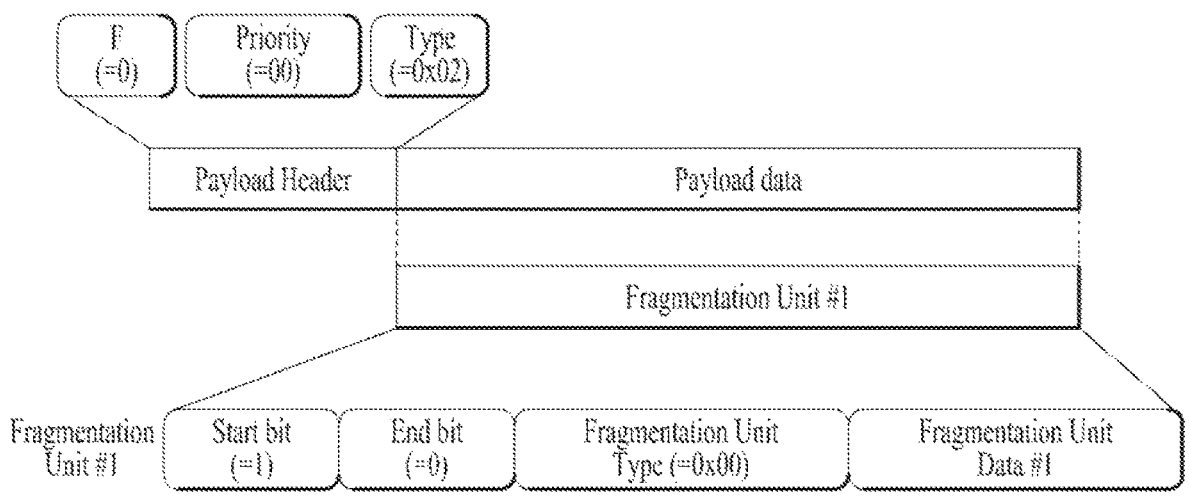
FIG. 106 is a view illustrating first fragmentation unit data packetized by the broadcast transmission device of FIG. 105.

FIG. 106 is a view illustrating first fragmentation unit data packetized by the broadcast transmission device of FIG. 105.

As shown in FIG. 106, according to an embodiment of the present invention, the broadcast transmission device determines that there is no error or syntax error in a corresponding packet and sets the F field to 0.

Additionally, the broadcast transmission device may set the Priority field to a value representing the highest priority. According to a specific embodiment of the present invention, a corresponding value may be 0x00.

Additionally, the broadcast transmission device may set the Type field to a value representing a packet for dividing one file format based media file into several payloads and transmitting them. According to a specific embodiment of the present invention, a corresponding value may be 0x02.

The payload data may include a fragmentation unit. Again, the fragmentation unit may include a Start bit field, an End bit field, a fragmentation unit type field, and a fragmentation unit data field.

The broadcast transmission device may set the Start bit field to a value representing a content that a corresponding packet includes the start data of a media file. In more detail, since a first fragmentation unit includes the start data of media data as shown in FIG. 105, the broadcast transmission device may set a value representing a corresponding content to the start bit field.

Moreover, the broadcast transmission device may set the End bit field of a first fragmentation unit shown in FIG. 106 to a value representing a content that the end data of a media file is not included. According to a specific embodiment, the broadcast transmission device may set the End bit field to 0 to represent a content that a corresponding packet does not include the end data of a media file.

Moreover, as shown in FIG. 106, the broadcast transmission device may set the fragmentation unit type field to a value representing a content that the first fragmentation unit includes a file format based basic form of file. In more detail, the file format based basic form may be file format data following ISO BMFF. According to a specific embodiment, the broadcast transmission device may set the fragmentation unit type field to 0x00 to represent corresponding content.

Figure 107:
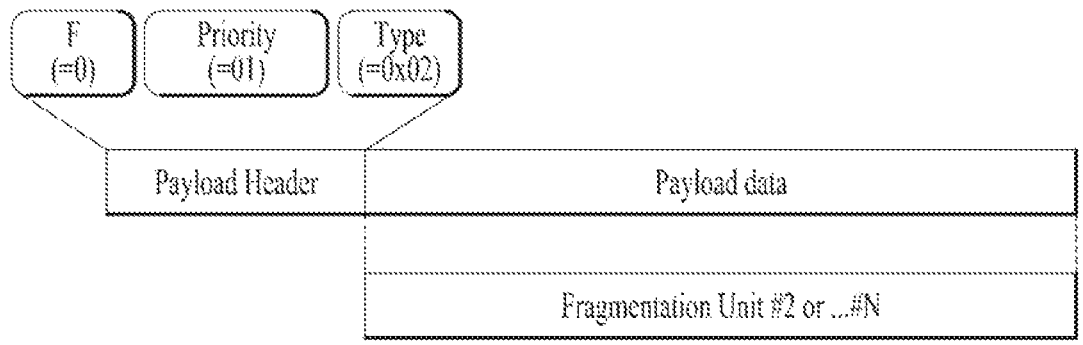
FIGS. 107 to 109 are views illustrating a fragmentation unit including remaining data except for the start data in the fragmentation unit data of FIG. 105 according to an embodiment of the present invention.
Figure 108:
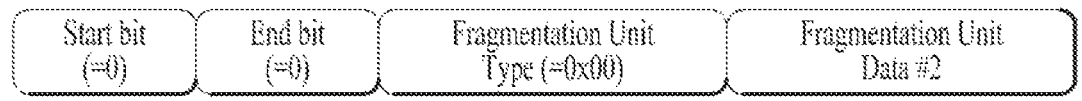

FIGS. 107 to 109 are views illustrating a fragmentation unit including remaining data except for the start data in the fragmentation unit data of FIG. 105 according to an embodiment of the present invention.

As shown in FIG. 107, according to an embodiment of the present invention, the broadcast transmission device may set the F field of a payload header to a value representing that there is no error or syntax error in a corresponding packet. According to a specific embodiment, the broadcast transmission device may set the F field to 0. Additionally, the broadcast transmission device sets the Priority field to a value representing the payload data shown in FIG. 107 has a relatively low priority.

According to a specific embodiment, data signaling entire media data may not be included from a second fragment unit. Accordingly, since the second fragmentation unit has a relatively lower priority than the first fragmentation unit, the priority field may be set to a value having a relatively lower priority. For example, a corresponding value may be 0x01.

Additionally, the broadcast transmission device may set the Type field to 0x02 as a Fragmented packet that a corresponding packet represents a packet dividing one file format based media file into several payloads and transmitting them. FIG. 108 is a view illustrating a payload configuration when payload data does not include fragmentation unit data including start data and fragmentation unit data including end data.

According to an embodiment of the present invention, since the fragmentation unit data of FIG. 108 does not include start data and end data, the broadcast transmission device may set the start bit field and the end bit field to a value representing corresponding information. According to a specific embodiment, the broadcast transmission device may set the start bit and end bit fields to 0.

Additionally, the broadcast transmission device may set the content that a fragmentation unit type field includes a file format based basic form of file to a specific value of a fragmentation unit type field. In more detail, the file format based basic form may be file format data following ISO BMFF. According to a specific embodiment, the broadcast transmission device may set the fragmentation unit type field to 0x00 to represent corresponding content. File format based media data divided into packets may have a unique order from an entire file. The broadcast reception device 100 may identify that the fragmentation unit data divided through the control unit 150 includes the start part among entire data on the basis of the start bit field. Additionally, the fact that the fragmentation unit data includes the end part in entire data may be identified on the basis of the End bit field.

However, there may be a case that cannot be identified only by the Start bit field and the End bit field.

When the fragmentation unit data does not include start data or end data in entire data, the broadcast reception device 100 may identify a corresponding packet through information representing the order of the fragmentation unit data included in a payload according to an embodiment. In more detail, information representing the order of fragmentation unit data may be a fragmentation number field. Additionally, a broadcast transmission device may set the order of corresponding fragmentation unit data to the above-mentioned presentation field.

However, according to another embodiment, a transport packet may not include order information of fragmentation unit data. In this case, according to an embodiment, a broadcast transmission device may insert information for identifying the order of fragmentation unit data into a packet header. The information for identifying the order of fragmentation unit data into a packet header may be referred to as a sequence number field. According to another embodiment, a broadcast transmission device may insert information for identifying the order of fragmentation unit data into offset information of an IP datagram.

FIG. 109 is a view illustrating a configuration of a payload including a fragmentation unit including the end data among divided entire media data. In more detail, FIG. 109 is a view illustrating a payload configuration when payload data does not include fragmentation unit data including start data but includes fragmentation unit data including end data.

According to an embodiment of the present invention, since the fragmentation unit data of FIG. 109 includes end data, the broadcast transmission device may set the start bit field and the end bit field to a value representing corresponding information. According to a specific embodiment, the broadcast transmission device may set the start field to 0. Then, the broadcast transmission device may set the end bit field to 1.

Additionally, a broadcast transmission device may set the fragmentation unit type field to represent the content that media data including a corresponding packet includes a basic form of file starting from ISO BMFF based ftyp. According to a specific embodiment, a broadcast transmission device may set the fragmentation unit type field to 0x00.

Data that a broadcast transmission device transmits through a transport packet may include metadata in addition to the above-mentioned media data. The metadata represents additional information necessary for providing media data. Hereinafter, referring to FIGS. 110 to 117, suggested are a broadcast transmission device and an operating method thereof, and a broadcast reception device and an operating method thereof, in order for packetizing metadata in a transport packet and transmitting and receiving it.

Additionally, hereinafter, timeline information is mainly described as one example of metadata. The timeline information is a series of time information for media content. In more detail, the timeline information may be a series of time information for presentation or decoding.

Additionally, the timeline information may include base timeline information. The basic timeline means a reference timeline necessary for synchronizing media data transmitted through a plurality of different transmission networks. In more detail, when the timeline of media data transmitted through a second transmission network is mapped into the timeline of media data transmitted through a first transmission network, the timeline of the media data transmitted through the first transmission network becomes a basic timeline.

Moreover, the broadcast transmission device may express the metadata in XML format. Additionally, the broadcast transmission device may express the metadata in a descriptor format includable in a signaling table.

FIG. 110 is a view illustrating a timeline signaling table of metadata according to an embodiment of the present invention.

According to an embodiment of the present invention, the timeline signaling table may include information representing metadata relating to a timeline or information that corresponding metadata includes a timeline component access unit. The above information may be referred to as an identifier field. According to a specific embodiment of the present invention, the identifier field may be an 8-bit field.

Additionally, according to an embodiment of the present invention, the timeline signaling table may include information representing the length of timeline information of a timeline component access unit. The above information may be referred to as an AU_length field. According to a specific embodiment of the present invention, the AU_length field may be a 32-bit field.

Additionally, according to an embodiment of the present invention, the timeline signaling table may include information on whether including location information on services and content components relating to a timeline component access unit. The above information may be referred to as a location_flag field. According to a specific embodiment of the present invention, the location_flag field may be a 1-bit field.

Additionally, according to an embodiment of the present invention, the timeline signaling table may include version information of a timestamp in a timeline component access unit. The timestamp represents time information through which a corresponding access unit needs to be outputted in a continuous timeline. The above information may be referred to as a timestamp_version field. According to a specific embodiment of the present invention, the timestamp_version field may be a 1-bit field.

Additionally, according to an embodiment of the present invention, the timeline signaling table may include timestamp type information of a timeline component access unit. The above information may be referred to as a timestamp_type field.

According to an embodiment, the timestamp type information may be set to a value representing a decoding time of a service or content component relating to a timeline component access unit. In more detail, the decoding time of a content component may be referred to as a decoding timestamp. According to a specific embodiment, the broadcast transmission device may set timestamp type information to 0x00 when corresponding information represents a decoding time.

According to another embodiment, the timestamp type information may be set to a value representing the presentation time of a service or content component relating to a timeline component access unit. In more detail, the presentation time of a content component may be referred to as a presentation timestamp. According to a specific embodiment, the broadcast transmission device may set timestamp type information to 0x01 when corresponding information represents a presentation time.

Moreover, according to a specific embodiment of the present invention, the timestamp_type field may be a 1-bit field.

Additionally, according to an embodiment of the present invention, the timeline signaling table may include timestamp format information of a timeline component access unit. The above information may be referred to as a timestamp_format field.

According to an embodiment, the timestamp format information may represent that a timestamp in a timeline component access unit is a format of a media time. According to a specific embodiment, the broadcast transmission device may set the timestamp_format field to 0x00 to represent that the timestamp format of a corresponding access unit is a media time format.

According to another embodiment, the timestamp format information may represent that a timestamp in a timeline component access unit is a format of a Network time protocol (NTP). According to a specific embodiment, the broadcast transmission device may set the timestamp_format field to 0x01 to represent that the timestamp format of a corresponding access unit is an NTP format.

According to another embodiment, the timestamp format information may represent that a timestamp in a timeline component access unit is a format of a precision time protocol (PTP). According to a specific embodiment, the broadcast transmission device may set the timestamp_format field to 0x02 to represent that the timestamp format of a corresponding access unit is a PTP format.

According to another embodiment, the timestamp format information may represent that a timestamp in a timeline component access unit is a format of a timecode. According to a specific embodiment, the broadcast transmission device may set the timestamp_format field to 0x03 to represent that the timestamp format of a corresponding access unit is a timecode format. Moreover, according to a specific embodiment of the present invention, the timestamp_format field may be a 4-bit field.

Additionally, according to an embodiment of the present invention, the timeline signaling table may include location information on a component of service or content relating to information in a timestamp in a timeline component access unit. The above information may be referred to as a location field.

Additionally, according to an embodiment of the present invention, the timeline signaling table may include information representing the length of the location information. The information representing a location information length may be referred to as a location_length field. According to a specific embodiment of the present invention, the location_length field may be an 8-bit field.

Additionally, according to an embodiment of the present invention, the timeline signaling table may include timestamp format version information of a basic timestamp that is a matching reference. The above information may be referred to as an origin_timestamp_version field.

According to an embodiment, when the origin_timestamp_version field is set to 0, this represents that a timestamp format has a 32-bit format. According to another embodiment, when the origin_timestamp_version field is set to 1, this represents that a timestamp format has a 64-bit format.

Additionally, according to an embodiment of the present invention, the timeline signaling table may include timestamp type information of a basic timeline. The above information may be referred to as an origine_timestamp_type field.

According to an embodiment, the origine_timestamp_type field may be set to a value representing a decoding time of a service or content component relating to a basic timeline. In more detail, the decoding time of a content component may be referred to as a decoding timestamp. According to a specific embodiment, the broadcast transmission device may set the origine_timestamp_type field to 0x00 when corresponding information represents a decoding time.

According to another embodiment, the origine_timestamp_type field may be set to a value representing a presentation time of a service or content component relating to a basic timeline. In more detail, the presentation time of a content component may be referred to as a presentation timestamp. According to a specific embodiment, the broadcast transmission device may set the origine_timestamp_type field to 0x01 when corresponding information represents a presentation time.

Additionally, according to an embodiment of the present invention, the timeline signaling table may include information representing a timestamp format for a base timeline. The above information may be referred to as an origine_timestamp_format field.

According to an embodiment, the origin_timestamp_format field may represent that a timestamp of a basic timeline is a format of a media time. According to a specific embodiment, the broadcast transmission device may set the origin_timestamp_format field to 0x00 to represent that the timestamp format of a corresponding basic timeline is a media time format.

According to another embodiment, the origin_timestamp_ format field may represent that a timestamp of a basic timeline is a format of an NTP. According to a specific embodiment, the broadcast transmission device may set the origin_timestamp_format field to 0x01 to represent that the timestamp format of a corresponding basic timeline is an NTP format.

According to another embodiment, the origin_timestamp_ format field may represent that a timestamp of a basic timeline is a format of a precision time protocol (PTP). According to a specific embodiment, the broadcast transmission device may set the timestamp_format field to 0x02 to represent that the timestamp format of a corresponding basic timeline is a PTP format.

According to another embodiment, the origin_timestamp_ format field may represent that a timestamp of a basic timeline is a format of a timecode. According to a specific embodiment, the broadcast transmission device may set the origin_timestamp_format field to 0x03 to represent that the timestamp format of a corresponding basic timeline is a timecode format.

Additionally, according to an embodiment of the present invention, the timeline signaling table may include information on whether including location information on services and content components relating to a basic timeline that is a timeline mapping reference. The above information may be referred to as an origin_location_flag field. According to an embodiment, when the origin_location_flag field is set to a value other than 0, a timeline AU may include at least one of an origin_location_length field and an origin_location field.

Additionally, according to an embodiment of the present invention, the timeline signaling table may include location information on a service or content relating to a basic timeline. The above information may be referred to as an origin_location field. According to a specific embodiment, information in the origin_location field may be an IP address, a port number, or a URI form.

Additionally, according to an embodiment of the present invention, the timeline signaling table may include length information of position information on a service or content relating to a basic timeline. The above information may be referred to as an origin_location length field. According to a specific embodiment of the present invention, the origin_location_length field may be an 8-bit field.

Additionally, according to an embodiment of the present invention, when a basic timeline that the reference of timeline mapping is a format of a media time, the timeline signaling table may include information of an available time scale. The above information may be referred to as an origin_timescale field. For example, in the case of MPEG-2 TS, the time scale may represent 9000 Hz. According to a specific embodiment of the present invention, the origin_timescale field may be a 32-bit field.

Additionally, according to an embodiment of the present invention, the timeline signaling table may include media time information on a basic timeline. The above information may be referred to as an origin_media_time field. Moreover, the origin_media_time field may mean differently according to origin_timestamp_type. For example, when origin_timestamp_type means PTS, the origin_media_time field may represent a presentation time. For example, when origin_timestamp_type means DTS, the origin_media_time field may represent a decoding time. According to a specific embodiment, the origin_media_time field may be 32 bits when the origin_timestamp_version field is set to 0 and may be 64 bits when the origin_timestamp_version field is set to 1.

Additionally, according to an embodiment of the present invention, the timeline signaling table may include timestamp type information of a basic timeline. The above information may be referred to as an origin_timestamp field. The basic timeline timestamp information may represent different formats of timestamps according to a value of the origin_timestamp_format field. Additionally, the basic timeline timestamp information may represent different meanings according to a value of the origin_timestamp_type field. For example, when origin_timestamp_type signals PTS, the basic timeline timestamp information may represent a presentation time.

For example, when the origin_timestamp_type field represents DTS and the origin_timestamp_format field is 0x01, the corresponding origin_timestamp field may represent a decoding time expressed in NTP. According to a specific embodiment, the origin timestamp field may be 32 bits when the origin_timestamp_version field is set to 0 and may be 64 bits when the origin_timestamp_version field is set to 1.

According to an embodiment, when the origin_timestamp_format field represents reserved, a timeline AU may include at least one of a private_data_length field and a private_data_bytes ( ) field.

The private_data_length field may represent the byte unit length of the private_data bytes( ) field. According to a specific embodiment of the present invention, the private_data_length field may be a 16-bit field.

The private_data_bytes0 field may define by the length that the private_data_length field represents or may include future expansion content.

Figure 111:
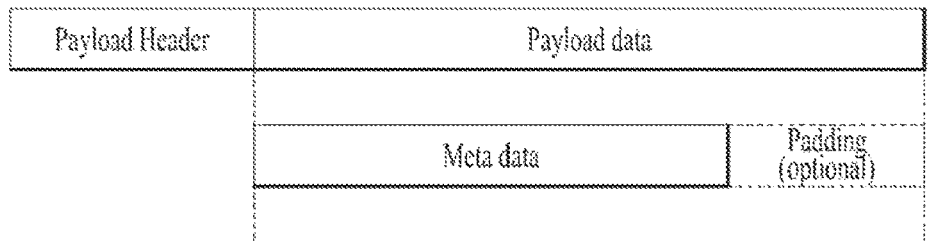
FIG. 111 is a view illustrating a configuration of payload data in which one metadata is packetized in payload data of a transport packet.

FIG. 111 is a view illustrating a configuration of payload data in which one metadata is packetized in payload data of a transport packet. According to an embodiment, the payload data may include metadata and the metadata may include media stream related timeline data. Additionally, according to an embodiment, when a broadcasts transmission device uses a packet of a fixed length in a transport protocol, payload data may include a padding bit additionally.

Figure 112:
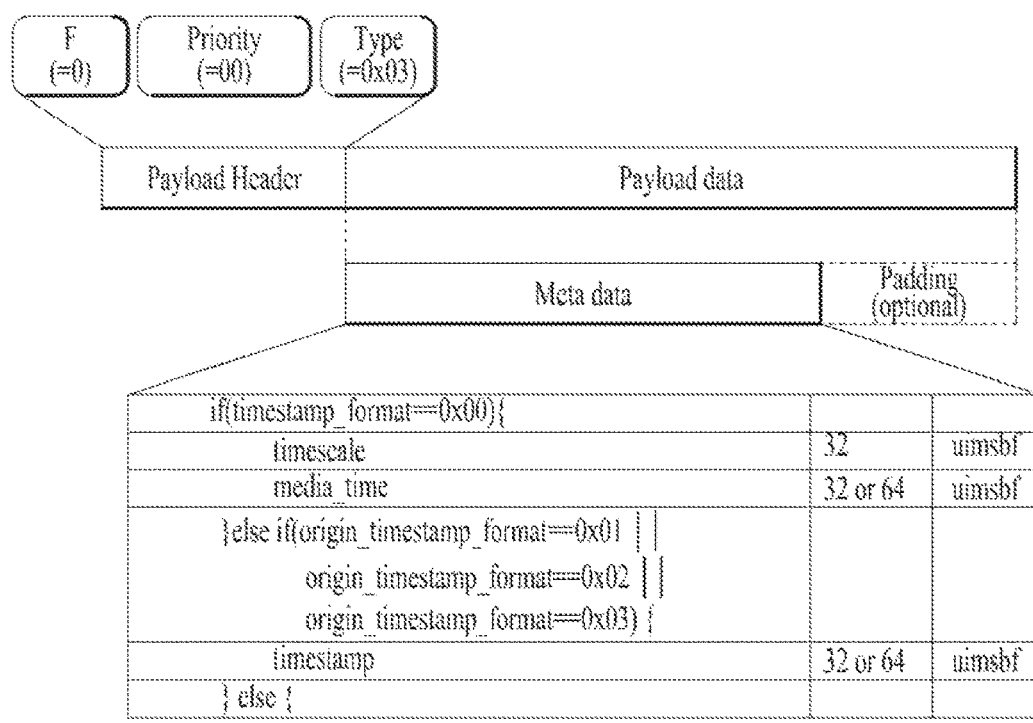
FIG. 112 is a view when payload data of a transport packet includes metadata for a timeline according to an embodiment of the present invention.

FIG. 112 is a view when payload data of a transport packet includes metadata for a timeline according to an embodiment of the present invention.

As shown in FIG. 112, according to an embodiment, the payload header may include at least one of an F field, a Priority field, and a Type field.

According to an embodiment, a broadcast transmission device may set the F field to a value representing there is no error or syntax violation in a payload. In more detail, the broadcast transmission device may set the F field to 0. Additionally, the broadcast transmission device may set the Priority field to a value representing the highest priority as payload data includes all important data of a media file configuration. In more detail, the broadcast transmission device may set the Priority field to 0x00. Additionally, the broadcast transmission device may set the Type field to a value representing information including metadata of timeline information in a payload. In more detail, the broadcast transmission device may set the Type field to 0x03. Additionally, the metadata may include the syntax of FIG. 110.

Figure 113:
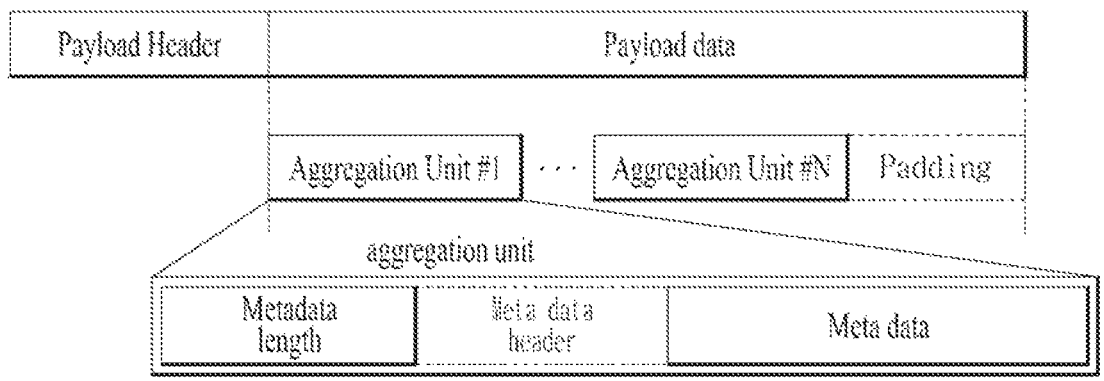
FIG. 113 is a view when a plurality of metadata are packetized in one transport packet.

FIG. 113 is a view when a plurality of metadata are packetized in one transport packet.

As shown in FIG. 113, the case that one transport packet includes a plurality of metadata may be referred to as an aggregation packet. According to an embodiment, the payload data may include a plurality of aggregation units.

According to an embodiment, the aggregation unit may include information representing the length of metadata. According to another embodiment, when there is a metadata header field additionally, the aggregation unit may include information on the sum of a metadata header field and a metadata field length. The above information may be referred to as a metadata length field.

Figure 114:
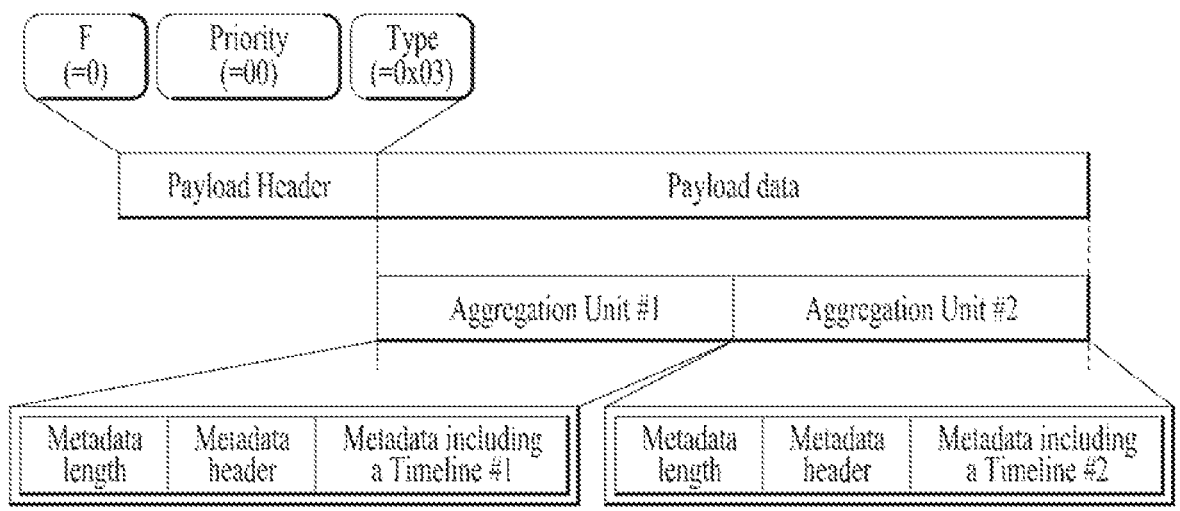
FIG. 114 is a view when one transport packet includes several timeline information.

FIG. 114 is a view when one transport packet includes several timeline information. In more detail, FIG. 114 illustrates the case that one transport packet includes a plurality of timeline information having different references in relation to one media stream. According to an embodiment, a transport packet may include a payload header and a content of the payload header is identical to that of FIG. 113.

Additionally, according to an embodiment, the payload data may include two aggregation units. However, the number of aggregation units in payload data may be two or more.

According to an embodiment, as shown in FIG. 113, each aggregation unit may include at least one of a metadata length field, a metadata header field, and a metadata field including timeline information.

However, the first aggregation unit shown in FIG. 114 may include a metadata field including a first timeline and the second aggregation unit may include a metadata field including a second timeline. According to a specific embodiment, each timeline may have data based on different references. For example, the first timeline may have data based on a media time and the second timeline may have data based on NTP.

Figure 115:
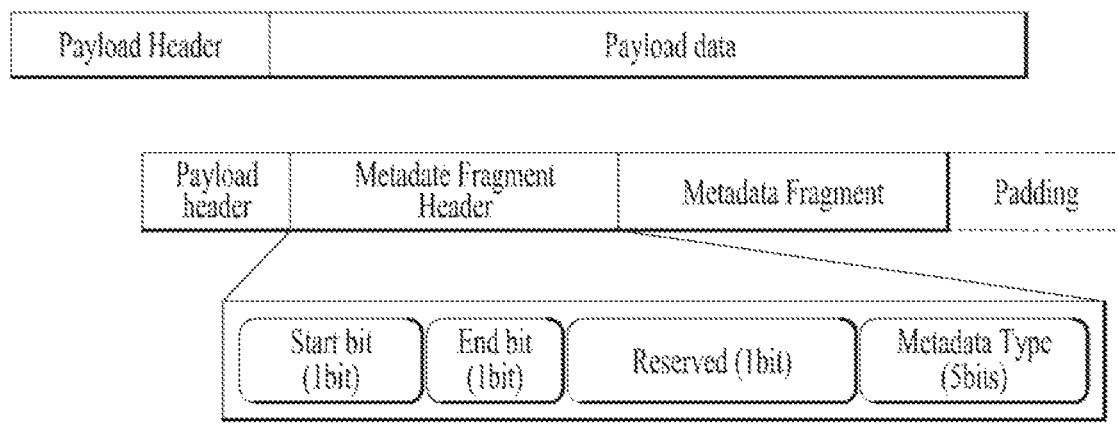
FIG. 115 is a view illustrating a packet payload in which one metadata is divided and packetized in a plurality of transport packets.

FIG. 115 is a view illustrating a packet payload in which one metadata is divided and packetized in a plurality of transport packets.

According to an embodiment, when the length of one metadata is greater than the length of a transport packet, in this case, a broadcast transmission device may divide corresponding metadata in several transport packets and may then transmit them. As shown in FIG. 115, a transport packet may include at least one of a payload header, a metadata fragment header, and a metadata fragment. Additionally, when a transport protocol uses a packet of a fixed length, a transport packet may include padding bits.

As shown in FIG. 115, according to an embodiment, a metadata fragment header may include information representing whether a metadata fragment in payload data of a corresponding transport packet includes the start part of entire metadata. In more detail, the start part data may be part of entire data including the first bit of entire media data. The above information may be referred to as a start bit field. According to a specific embodiment of the present invention, the start bit field may be a 1-bit field. According to an embodiment, the broadcast transmission device may set start bit to 1 when a metadata fragment in a corresponding transport packet includes the start part of entire metadata.

According to another embodiment, a metadata fragment header may include information representing whether a metadata fragment in payload data of a corresponding transport packet includes the end part of entire metadata. In more detail, the end part data may be part of entire data including the end bit of entire media data. The above information may be referred to as an end bit field. According to a specific embodiment of the present invention, the end bit field may be a 1-bit field. According to an embodiment, the broadcast transmission device may set end bit to 1 when a metadata fragment in a corresponding transport packet includes the end part of entire metadata.

According to another embodiment, the metadata header may include information representing a metadata type. The above information may be referred to as a metadata type field. According to a specific embodiment, the metadata type may represent that a corresponding metadata fragment includes timeline information. In this case, the broadcast transmission device may set the metadata type field to 0x00. According to another embodiment, the metadata type may represent that a corresponding metadata fragment includes metadata relating to labeling. In this case, the broadcast transmission device may set the metadata type field to 0x01. According to a specific embodiment of the present invention, the metadata type field may be a 5-bit field.

Figure 116:
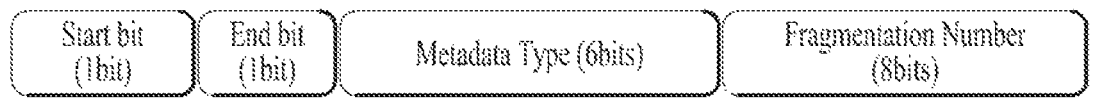
FIG. 116 is a view illustrating a metadata fragment header according to another embodiment of the present invention.

FIG. 116 is a view illustrating a metadata fragment header according to another embodiment of the present invention. Hereinafter, description for the same content as that of FIG. 115 is omitted.

According to an embodiment of the present invention, a metadata fragment header may include information representing the order of a metadata fragment in a corresponding packet payload. The above information may be referred to as a Fragmentation number field. The broadcast reception device 100 may determine which number metadata is included in a corresponding packet on the basis of metadata fragment order information in a packet payload.

Figure 117:
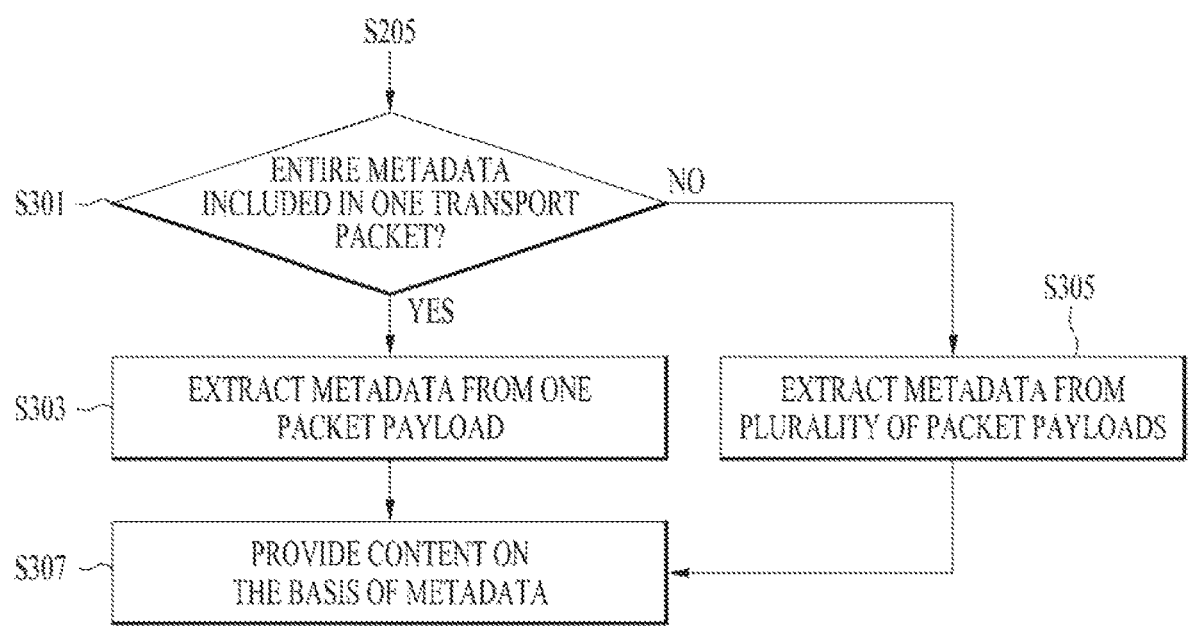
FIG. 117 is a view illustrating an operation when a broadcast reception device receives a broadcast packet according to an embodiment of the present invention.

FIG. 117 is a view illustrating an operation when a broadcast reception device receives a broadcast packet according to an embodiment of the present invention.

When it is determined that the data in the payload is not the media data in operation S205 of FIG. 43, the control unit 150 of the broadcast reception device 100 determines whether entire metadata is included one transport packet in operation S301. In more detail, the control unit 150 may determine that data in a payload is not metadata instead of media data from payload header information. Then, the control unit 150 may determine whether corresponding entire metadata is included in one transport packet and transmitted. As mentioned above, one or more different metadata may be included in one transport packet. Or, one metadata is divided and included in a plurality of different transport packets.

According to an embodiment of the present invention, when the control unit 150 of the broadcast reception device 100 determines that entire metadata is included in one transport packet, the control unit 150 extracts metadata from one packet payload in operation S303. In more detail, the control unit 150 extracts a payload header and extracts metadata on the basis of the extracted payload header. According to an embodiment, the control unit 150 may extract one metadata from one packet payload. Moreover, according to another embodiment, the control unit 150 may extract a plurality of metadata from one packet payload. According to another embodiment of the present invention, the control unit 150 of the broadcast reception device 100 may determine that one metadata is divided and included in a plurality of transport packets. In this case, the control unit 150 extracts metadata from a plurality of packets payloads in operation S305. According to a specific embodiment, one metadata may be divided and packetized in a plurality of transport packets. The control unit 150 of the broadcast reception device 100 obtains metadata signaling data from a packet payload. Then, the control unit 150 may extract metadata from a plurality of packet payloads on the basis of the obtained signaling data.

The control unit 150 of the broadcast reception device 100 provides content on the basis of the extracted metadata in operation S307. According to a specific embodiment, the control unit 150 may obtain the presentation or decoding time information of a content from metadata. According to another embodiment, the control unit 150 may obtain content describing information from metadata.

Figure 118:
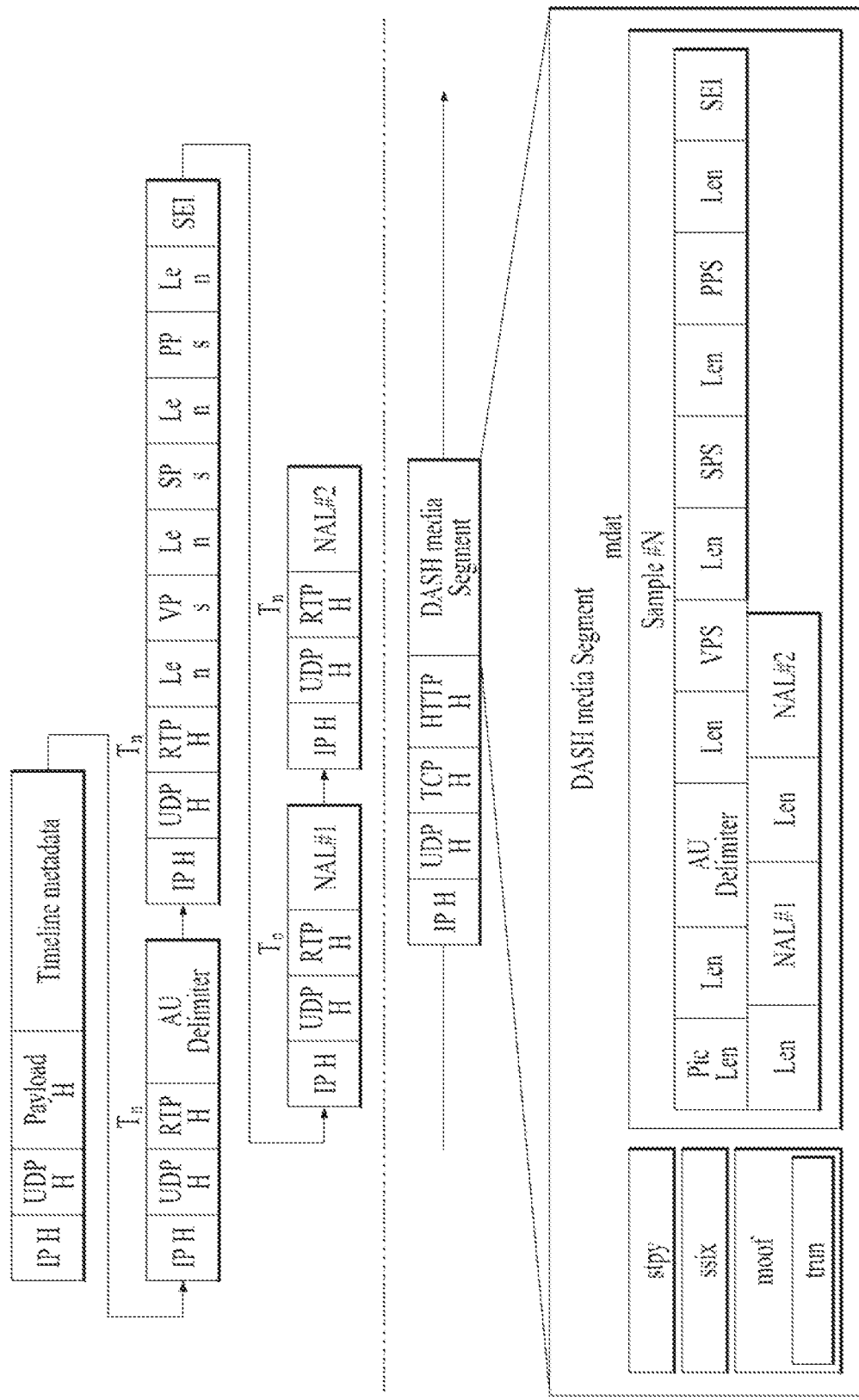
FIG. 118 is a view when video stream is transmitted using RTP through broadcast network and video stream is transmitted using file format based media data through an internet network.

FIG. 118 is a view when video stream is transmitted using RTP through broadcast network and video stream is transmitted using file format based media data through an internet network. In this case, after receiving an RTP packet or IP/UDP packet including timeline related metadata, the broadcast reception device 100 may allow decoding and presentation between related streams by matching an RTP protocol based video stream and a DASH based video stream.

As mentioned above, a conventional broadcast transmission device loads time information relating to the presentation of data (or object) included in a transport packet into a payload and transmits the payload. Or, the broadcast transmission device transmits additional signaling for transmitting time information. In the case of a conventional method, since time information is loaded into an additional transport packet or packet payload, the capacity of a packet header or the capacity of a transport become small relatively. However, in the case of a conventional method, since time information is transmitted through a packet separated from data to be transmitted, effectiveness may be reduced in terms of accurate and fast synchronization.

On the other hand, an embodiment of the present invention includes time information relating to the decoding or presentation of a corresponding packet in the packet header of a transport packet for supporting real time content. Accordingly, since time information of a corresponding packet is included in the header of a corresponding packet, compared to a conventional method, relatively accurate and fast synchronization is possible. Especially, according to an embodiment of the present invention, suggested is a content of packetizing a transport packet by setting the time information relating to decoding or presentation in the header extension in the packet header. Herein, the header extension may be part of the packet header including a selective header field that is not essential or has a changeable size. Or, a transport packet may be generated based on an object and accordingly, the object may be a target to be transmitted through a transport packet. The object may be included in a session and transmitted.

Figure 119:
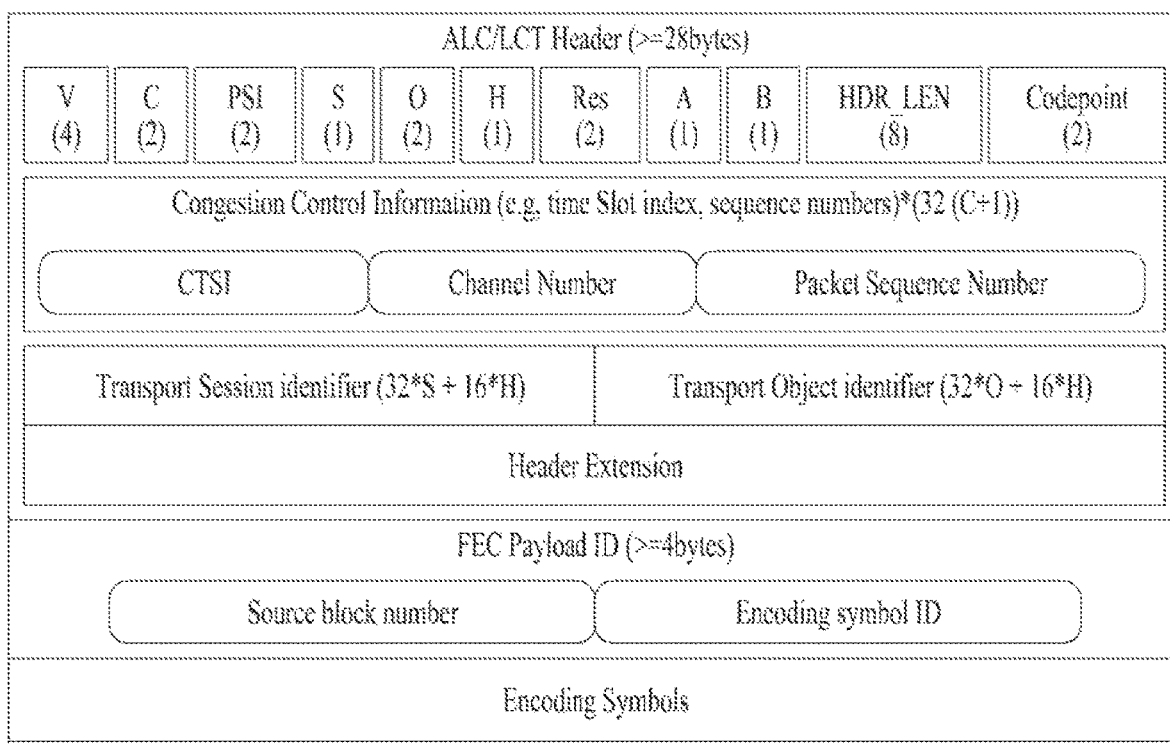
FIG. 119 is a view illustrating a configuration of a transport packet according to an embodiment of the present invention.

FIG. 119 is a view illustrating a configuration of a transport packet according to an embodiment of the present invention. The transport packet shown in FIG. 119 may use a transport protocol for supporting reliable data transmission. According to a specific embodiment, a reliable data transmission protocol may be Asynchronous Layered Coding (ALC). According to another embodiment, a reliable data transmission protocol may be Layered Coding Transport (LCT).

A packet header according to an embodiment of the present invention may include version information of a packet. In more detail, the packet header may include version information of a transport packet using a corresponding transport protocol. According to a specific embodiment, the information may be a V field. Additionally, the V field may be a 4-bit field.

Additionally, a packet header according to an embodiment of the present invention may include information relating to the length of information for congestion control. In more detail, the packet header may include multiple information relating to the multiplication of the length of information for congestion control and a base unit thereof.

According to a specific embodiment, the information may be a C field. According to an embodiment, the C field may be set to 0x00 and in this case, represents that the length of information for congestion control is 32 bits. According to another embodiment, the C field may be set to 0x01 and in this case, represents that the length of information for congestion control is 64 bits. According to another embodiment, the C field may be set to 0x02 and in this case, represents that the length of information for congestion control is 96 bits. According to another embodiment, the C field may be set to 0x03 and in this case, represents that the length of information for congestion control is 128 bits. The C field may be a 2 bit field.

Additionally, a packet header according to an embodiment of the present invention may include information specified for protocol. According to a specific embodiment, the information may be a PSI field. Additionally, the PSI field may be a 2-bit field.

Additionally, a packet header according to an embodiment of the present invention may include information relating to the length of a field representing identification information of a transport session. In more detail, the packet header may include multiple information of a field representing identification information of a transport session. The above information may be referred to as an S field. The S field may be a 1 bit field.

Additionally, a packet header according to an embodiment of the present invention may include information relating to the length of a field representing identification information of a transport object. In more detail, the packet header may include multiple information multiplied to the base length of a field representing identification information of a transport object. The above information may be referred to as an O field. The O field may be a 2 bit field.

Additionally, a packet header according to an embodiment of the present invention may include additional information relating to the length of a field representing identification information of a transport session. Then, the packet header may include additional information relating to the length of a field representing identification information of a transport object. The additional information may be information on whether to add half-word. Since a field representing identification information of a transport packet and a field representing identification information of a transport object should exist, the S field and the H field, or the O field and the H field cannot represent zero at the same time.

Additionally, a packet header according to an embodiment of the present invention may include information representing that a session is terminated or the end is imminent. The above information may be referred to as an A field. According to a specific embodiment, when the A field represents session termination or imminent end, it may be set to 1. Accordingly, in typical cases, the A field may be set to 0. When a broadcast transmission device set the A field to 1, it represents that the last packet is transmitted through a session. When the A field is set to 1, the broadcast transmission device may need to maintain the A field as 1 until all packets following a corresponding packet are transmitted completely. Additionally, when the A field is set to 1, a broadcast reception device may recognize that the broadcast transmission device stops packet transmission through a session immediately. That is, when the A field is set to 1, the broadcast reception device may recognize that there is no more packet transmission through a session. According to an embodiment, the A field may be a 1-bit field.

Additionally, a packet header according to an embodiment of the present invention may include information representing that object transmission is terminated or the end is imminent. The above information may be referred to as a B field. According to a specific embodiment, when object transmission termination is imminent, a broadcast transmission device may set the B field to 1. Accordingly, in typical cases, the B field may be set to 0. When information for identifying a transport object is not in a transport packet, the B field may be set to 1. Then, it may represent that object transmission termination in a session identified by out-of-band information is imminent. Or, when the last packet for an object is transmitted, the B field may be set to 1. Or, when the last packet for an object is transmitted, the B field may be set to 1. When the B field of a packet for a specific object is set to 1, the broadcast transmission device may need to set the B field to 1 until the transmission of packets following a corresponding packet is terminated. Additionally, when the B field is set to 1, a broadcast reception device 100 may recognize that the broadcast transmission device is to stop the transmission of a packet for object. That is, the broadcast reception device 100 may recognize that there is no more object transmission through a session from the B field set to 1. According to an embodiment, the B field may be a 1-bit field.

Additionally, a packet header according to an embodiment of the present invention may include information representing the total length of a header. The above information may be referred to as an HDR_LEN field. The HDR_LEN field may be a 32 multiple bit field. According to a specific embodiment, when HDR_LEN field is set to 5, the total length of a packet header may be 160 bits that are five multiples of 32. Additionally, the HDR_LEN field may be an 8-bit field.

Additionally, a packet header according to an embodiment of the present invention may include information relating to encoding or decoding of a payload included in a corresponding packet. The above information may be referred to as a Codepoint field. According to an embodiment, the Codepoint field may be an 8-bit field.

Additionally, a packet header according to an embodiment of the present invention may include information for congestion control. The above information may be referred to as a Congestion Control Information (CCI) field. According to a specific embodiment, the CCI field may include at least one of a Current time slot index (CTSI) field, a channel number field, and a packet sequence number field.

Additionally, a packet header according to an embodiment of the present invention may include information for identifying a transport session. The above information may be a Transport Session Identifier (TSI). Additionally, a field in a packet header including TSI information may be referred to as a TSI field.

Additionally, a packet header according to an embodiment of the present invention may include information for identifying an object transmitted through a transport session. The above information may be a Transport Object Identifier (TOI). Additionally, a field in a packet header including TOI information may be referred to as a TOI field.

Additionally, a packet header according to an embodiment of the present invention may include information for transmitting additional information. The above information may be referred to as a Header Extension field. According to an embodiment, the additional information may be time information relating to the presentation of a transport object. According to another embodiment, the additional information may be time information relating to the decoding of a transport object.

Additionally, a packet header according to an embodiment of the present invention may include payload identification information. According to an embodiment, the identification information may be payload identification information relating to a Forward Error Correction (FEC) scheme. Herein, the FEC may be one type of payload format defined in RFC 5109. The FEC may be used in RTP or SRTP. The above information may be referred to as an FEC Payload ID field.

According to an embodiment, the FEC Payload ID field may include information for identifying a source block of an object. The above information may be referred to as a Source block number field. For example, when the Source block number field is set to N, source blocks in an object may be numbered with 0 to N−1.

According to another embodiment, the FEC Payload ID field may include information for identifying a specific encoding symbol. The above information may be referred to as an Encoding symbol ID field.

Additionally, a transport packet according to an embodiment of the present invention may include data in a payload. The field including data may be referred to as an Encoding symbol(s) field. According to an embodiment, the broadcast reception device 100 may reconfigure an object by extracting the Encoding symbol(s) field. In more detail, data in the Encoding symbol(s) field may be generated from a source block transmitted through a packet payload.

Figure 120:
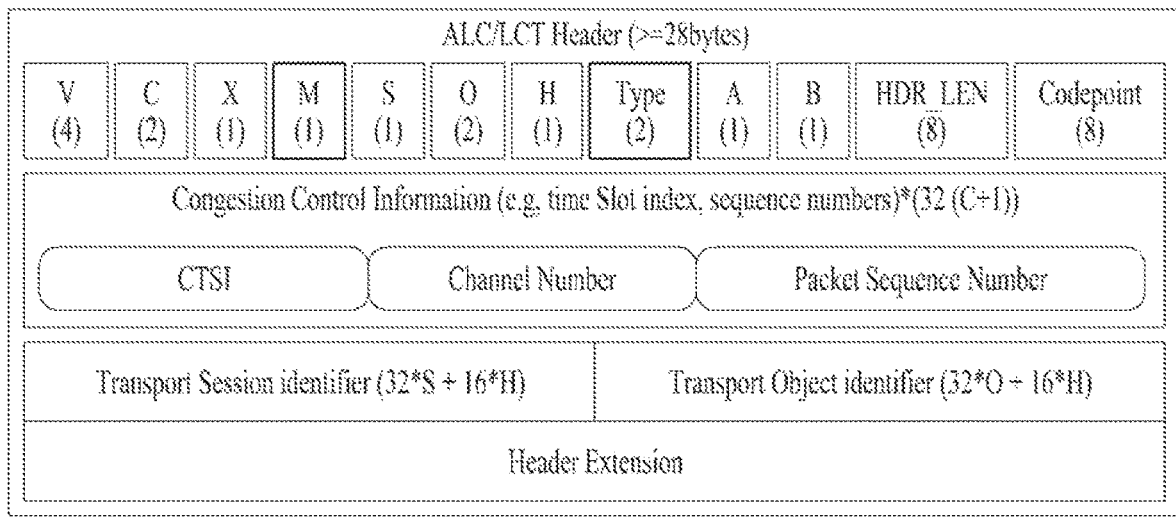
FIG. 120 is a view illustrating a configuration of a packet header according to an embodiment of the present invention.

FIG. 120 is a view illustrating a configuration of a packet header according to an embodiment of the present invention.

In order to support the transmission of real time content, it is effective that a transport packet received by the broadcast reception device 100 includes property information of a packet and timing information relating to decoding or presentation. Accordingly, in order to solve the above issue, as shown in FIG. 120, a packet header may be configured.

The packet header of FIG. 120 has a configuration mostly similar to that of the packet header of FIG. 119. Therefore, description of the same parts will be omitted.

A packet header according to an embodiment of the present invention may include information representing the type of an object for transmission. The above information may be referred to as a type field. The type field may be a 2 bit field.

According to a specific embodiment, the type field may represent that the type of an object for transmission is a regular file. Herein, the regular file may be an ISO BMFF based media file. In more detail, the regular file may be obtained by encapsulating a media file in ISO BMFF format. In this case, the type field may be set to $01_{(2)}$. According to another embodiment, the type field may represent that the type of an object for transmission is an HTTP entity type. In this case, the type field may be set to $10_{(2)}$. According to another embodiment, the type field may represent that the type of an object for transmission is an audio access unit or a video access unit. Additionally, the type field may represent that an object type is a network abstract layer (NAL) unit. In this case, the type field may be set to $11_{(2)}$.

Additionally, a packet header according to an embodiment of the present invention may represent that a corresponding transport packet includes the first part or end part of a transport object. Information representing that a transport packet includes the first part or end part of a transport object may be a marker bit. According to a specific embodiment, the marker bit may be an M field. In more detail, the M field may be interpreted differently according to a value of the type field. For example, when the type of an object for transmission is a file, it may represent that a corresponding transport packet includes the end part of a file. Herein, the end part is part including the last bit of a file. For another example, when the type of an object for transmission is Audio or Video (AV) data, it may represent that a corresponding transport packet includes the first or last bit of an access unit.

Figure 121:
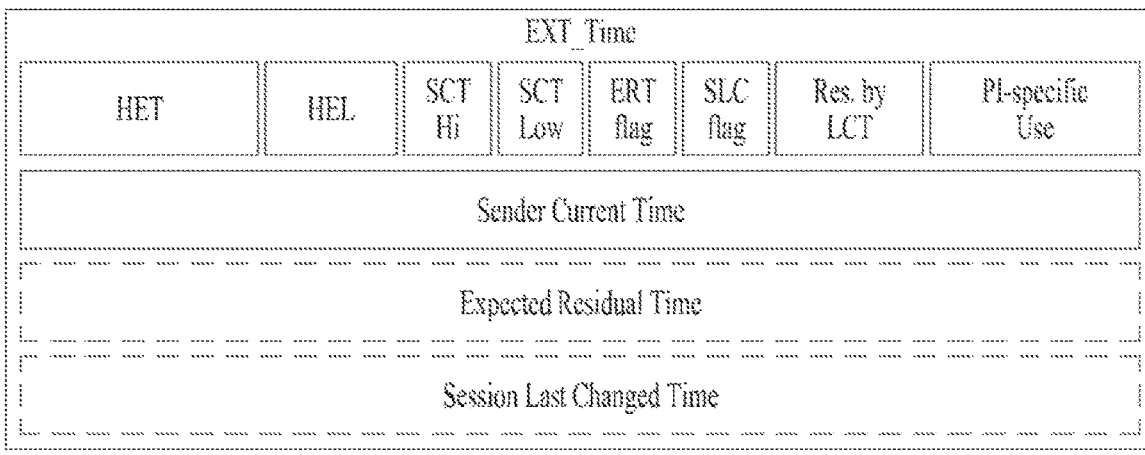
FIGS. 121 and 122 are views illustrating a configuration of a header extension including time information.
Figure 122:
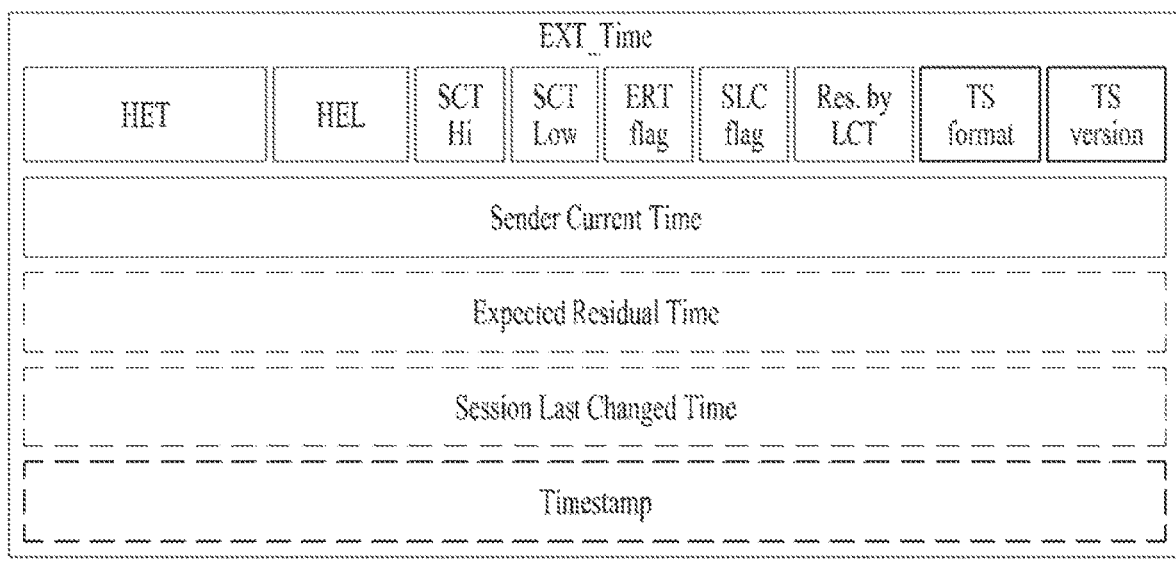

FIGS. 121 and 122 are views illustrating a configuration of a header extension including time information. The header extension shown in FIGS. 121 and 122 may included in the header extension field shown in FIG. 120.

As shown in FIG. 121, a header extension according to an embodiment of the present invention may include type information of a header extension. The above information may be referred to as a Header Extension Type (HET) field.

Additionally, a header extension according to an embodiment of the present invention may include the length information of the header extension. The above information may be referred to as a Header Extension length (HEL) field.

Additionally, a header extension according to an embodiment of the present invention may represent the current time of a broadcast transmission device. That is, the header extension may include corresponding packet transmission time information of a broadcast transmission device. For example, the broadcast transmission device may be a server. According to a specific embodiment, information representing the current time of a broadcast transmission device may be a Sender Current Time (SCT) field.

Additionally, a header extension according to an embodiment of the present invention may represent whether the SCT field is a 64 bit field. In more detail, the header extension may represent whether the SCT field is included in a header extension configured with 64 bits. According to a specific embodiment, information representing whether the SCT field is 64 bits may be an SCT Hi field.

Additionally, a header extension according to an embodiment of the present invention may represent whether the SCT field is a 32 bit field. In more detail, the header extension may represent whether the SCT field is included in a header extension configured with 32 bits. According to a specific embodiment, information representing whether the SCT field is 32 bits may be an SCT Low field.

Additionally, a header extension according to an embodiment of the present invention may include expected residual time information of an object for transmission. The above information may be an Expected Residual Time (ERT) field.

Additionally, a header extension according to an embodiment of the present invention may represent whether the ERT field exits in a corresponding packet. Corresponding information may be an ERT flag field.

Additionally, a header extension according to an embodiment of the present invention may include information on a time at which a session is changed lastly. The above information may be an SLC field.

Additionally, a header extension according to an embodiment of the present invention may represent whether the SLC field exits in a corresponding packet. Corresponding information may be an SLC flag field.

Additionally, a header extension according to an embodiment of the present invention may include a field extended and used according to a transport protocol that a broadcast transmission device uses. Corresponding information may be a PI-specific Use field.

FIG. 122 is a view illustrating a header extension having an added configuration according to another embodiment of the present invention.

A header extension according to another embodiment of the present invention may include timing information of data included in a packet payload. The above information may be a Timestamp field. For example, the Timestamp field may include information on a time point at which the first byte of data included in a packet payload is decoded. For another example, the Timestamp field may include information on a presentation time point of data. Furthermore, the Timestamp field may include timescale information or timescale based timing information. Herein, the timescale information may be a unit representing a time for a decoding or presentation time point of a transport object. In the case of timescale based timing information, the broadcast reception device may obtain information a decoding or presentation time point by multiplying a value of the Timestamp field and a timescale.

A header extension according to another embodiment of the present invention may include format information of a Timestamp field. The above information may be a TS format field. According to a specific embodiment, the TS format field may represent that timing information included in a transport packet is in the format of media time. The media time is a media presentation time according to an arbitrary media timeline. In this case, the TS format field may be set to 0x01. Additionally, the TS format field may represent that timing information included in a transport packet is in the format of Network Time Protocol (NTP). In this case, the TS format field may be set to 0x02. Additionally, the TS format field may represent that timing information included in a transport packet is in the format of normal playing time. The format of normal playing time may be a playing time expressed relative from a presentation start time point and may be expressed in hour, minute, second, or second decimal point unit. In this case, the TS format field may be set to 0x03. Additionally, the TS format field may represent that timing information included in a transport packet is in the format of SMPTE time code. Society of Motion Picture and Television Engineers (SMPTE) time code is time code defined in SMPTE. In more detail, the SMPTE time code may be a time information format defined for individual frame labeling of video in SMPTE. In this case, the TS format field may be set to 0x04. Additionally, the TS format field may represent that timing information included in a transport packet is 90 KHz timing information. In this case, the TS format field may be set to 0x05.

A header extension according to another embodiment of the present invention may represent a configuration of a timestamp field. Information representing a configuration of timing information may be referred to as a TS version field. For example, the TS version field may represent that the timestamp field is a 32 bit field. In this case, the TS version field may be set to 0. For another example, the TS version field may represent that the timestamp field is a 64 bit field. In this case, the TS version field may be set to 1.

FIGS. 123 to 126 are views illustrating a configuration of a header extension according to another embodiment of the present invention. In more detail, the header extension structure shown in FIGS. 123 to 126 may include at least one of object type information and timing information for transmission. Additionally, a corresponding header extension structure may be included in a header extension field (header extension). Additionally, it may be used as part of a packet header transmitting content.

Figure 123:
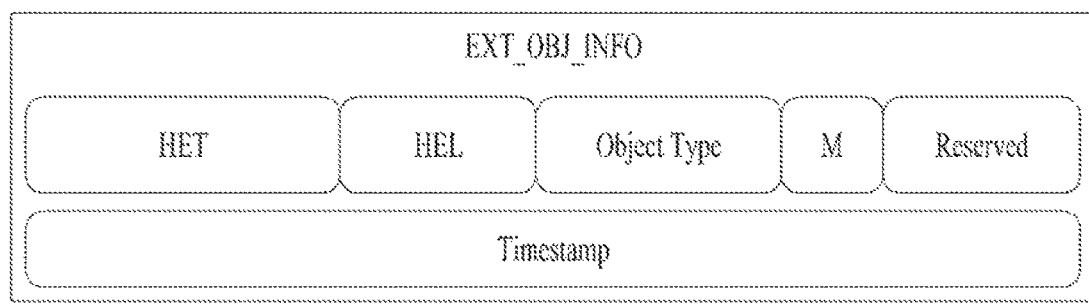
FIGS. 123 to 126 are views illustrating a configuration of a header extension according to another embodiment of the present invention.

As shown in FIG. 123, a structure (EXT_OBJ_INFO) of a header extension according to another embodiment of the present invention may include type information of header extension part. The above type information may be referred to as an HET field. Additionally, the header extension structure may include length information of header extension part. The above length information may be referred to as an HEL field. Additionally, the header extension structure may include type information of a transport object. The above object type information may be referred to as an Object type field.

In a specific embodiment, the Object type field may represent that a transport object is the type of a regular file. Herein, the regular file may be an ISO BMFF based media file. In more detail, the regular file may be obtained by encapsulating a media file in ISO BMFF format. In this case, the Object type field may be set to 0x01. According to another embodiment, the Object type field may represent that a transport object is the type of an HTTP entity type. In this case, the Object type field may be set to 0x02. According to another embodiment, the Object type field may represent that a transport object is an audio data type. The Object type field may represent that a transport object is an AAC based audio data type. At this point, the AAC based audio data type may be audio data encoded through AAC. In this case, the Object type field may be set to 0x03. According to another embodiment, the Object type field may represent that a transport object is an audio data type. In more detail, the Object type field may represent that a transport object is an H.264 type. In this case, the Object type field may be set to 0x04. According to another embodiment, the Object type field may represent that a transport object is an HEVC based video data type. At this point, the HEVC based video data type may be encoded video data encoded through HEVC. In this case, the Object type field may be set to 0x05. According to another embodiment, the Object type field may represent that a transport object is an ISO BMFF based file type. In this case, the Object type field may be set to 0x06. According to another embodiment, the Object type field may represent that a transport object is metadata. In this case, the Object type field may be set to 0x07.

Additionally, a structure (EXT_OBJ_INFO) of a header extension according to another embodiment of the present invention may represent that a corresponding transport packet includes the first part or end part of a transport object. Information representing that a transport packet includes the first part or end part of a transport object may be a marker bit. According to a specific embodiment, the marker bit may be an M field. The M field may be interpreted differently according to a value of the Object type field. For example, when the type of an object for transmission is a file, it may represent that a corresponding transport packet includes the end part of a file. Herein, the end part is part including the last bit of a file. For another example, when the type of an object for transmission is Audio or Video (AV) data, it may represent that a corresponding transport packet includes the first or last bit of an access unit.

Additionally, a structure (EXT_OBJ_INFO) of a header extension according to another embodiment of the present invention may include timing information of data included in a packet payload. The above information may be a Timestamp field. For example, the Timestamp field may include information on a time at which the first byte of data included in a packet payload is decoded. For another example, the Timestamp field may include information on a presentation time of data. Furthermore, the Timestamp field may include timescale information or timescale based timing information. Herein, the timescale information may be a unit representing a time for a decoding or presentation time point of a transport object. In the case of the timescale based timing information, a broadcast reception device may obtain information on a decoding or presentation time point by multiplying the value of the Timestamp field by a timescale.

Figure 124:
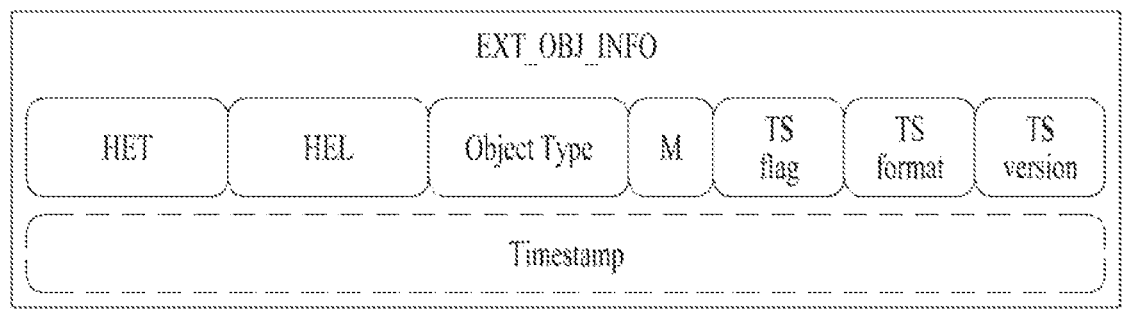

FIG. 124 is a view illustrating some configurations added to the header extension structure of FIG. 123 according to another embodiment of the present invention.

As shown in FIG. 124, the header extension structure may represent whether a timestamp field exists in a corresponding header structure. Information representing whether the Timestamp field exists may be referred to as a TS flag field. In a specific embodiment, when the TS flag field is set to 1, it may represent that the timestamp field exists in a corresponding header structure.

Additionally, a structure of a header extension according to another embodiment of the present invention may include format information of a Timestamp field. The above information may be a TS format field. According to a specific embodiment, the TS format field may represent that timing information included in a transport packet is in the format of media time. The media time may be a media presentation time according to an arbitrary media timeline. In this case, the TS format field may be set to 0x01. Additionally, the TS format field may represent that timing information included in a transport packet is in the format of Network Time Protocol (NTP). In this case, the TS format field may be set to 0x02. Additionally, the TS format field may represent that timing information included in a transport packet is in the format of a normal playing time. The format of a normal playing time may be a presentation time expressed relative from a presentation start time point and may be expressed in hour, minute, second, or second decimal point unit In this case, the TS format field may be set to 0x03. Additionally, the TS format field may represent that timing information included in a transport packet is in the format of SMPTE time code. The SMPTE time code is time code defined in Society of motion picture and television engineers (SMPTE). In this case, the TS format field may be set to 0x04. Additionally, the TS format field may represent that timing information included in a transport packet is 90 KHz timing information. In this case, the TS format field may be set to 0x05.

Additionally, a structure of a header extension according to another embodiment of the present invention may represent a configuration of a timestamp field. In more detail, a structure of a header extension may represent a configuration of timing information relating to object presentation or decoding included in the timestamp field. The above information may be referred to as a TS version field. For example, the TS version field may represent that the timestamp field is a 32 bit field. In this case, the TS version field may be set to 0. For another example, the TS version field may represent that the timestamp field is a 64 bit field. In this case, the TS version field may be set to 1.

Figure 125:
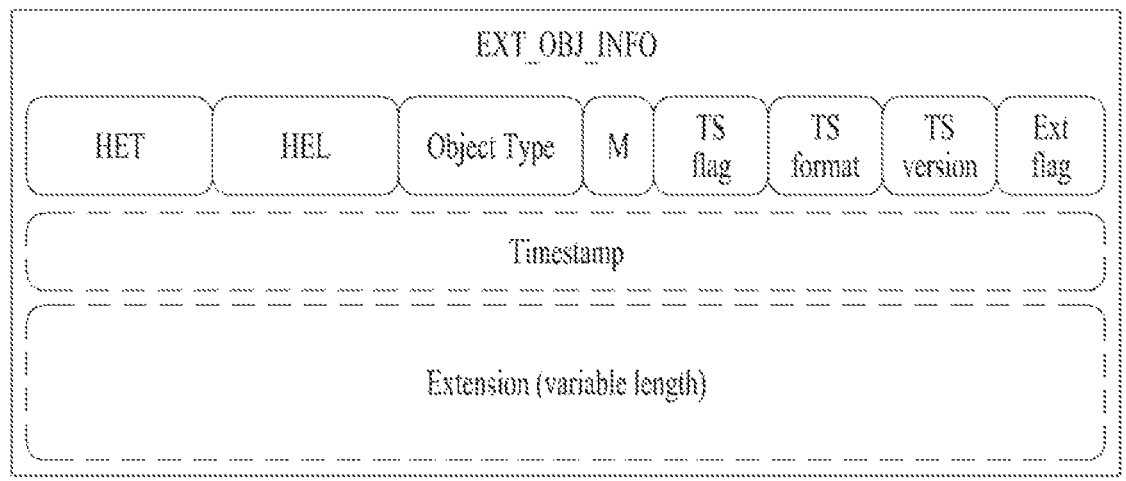

FIG. 125 is a view illustrating some configurations added to the header extension structure of FIG. 123 according to another embodiment of the present invention.

As shown in FIG. 125, a structure of a header extension according to another embodiment of the present invention may include additional information relating to a transport object. According to a specific embodiment, a structure of a header extension may include location information of an object. For example, the location information of an object may represent URL information of an ISO BMFF based segment. In more detail, the location information of an object may represent URL information through which ISO BMFF based segments are downloaded. In this case, additional information relating to a transport object may be referred to as an Extension field.

Additionally, a structure of a header extension according to another embodiment of the present invention may represent whether an Extension field exists in a corresponding header extension structure. In this case, Information representing whether the Extension field exists may be referred to as an Ext Flag field.

Figure 126:
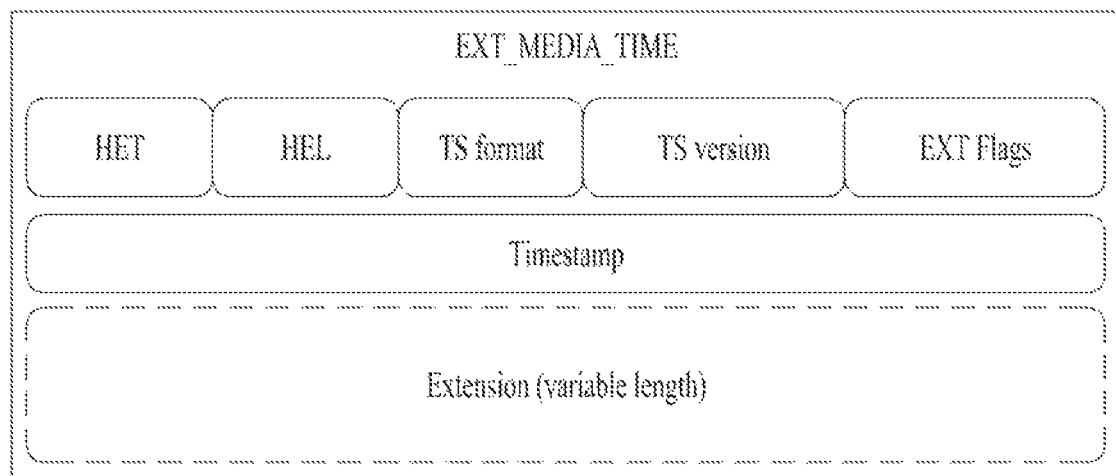

FIG. 126 is a view when a new header extension structure is used as part of a packet header according to an embodiment of the present invention. As shown in FIG. 126, the part of the packet header may include timing information of a transport object. The part of the packet header including timing information of a transport object may be an EXT_MEDIA_TIME field.

The EXT MEDIA_TIME field may include timing information of data included in a packet payload. The above information may be a Timestamp field. For example, the Timestamp field may include information on a time at which the first byte of data included in a packet payload is decoded. For another example, the Timestamp field may include information on a presentation time of data. Furthermore, the Timestamp field may include timescale information or timescale based timing information. Herein, the timescale information may be a unit representing a time for a decoding or presentation time point of a transport object. In the case of the timescale based timing information, a broadcast reception device may obtain information on a decoding or presentation time point by multiplying the value of the Timestamp field by a timescale.

Additionally, the EXT_MEDIA_TIME field may include format information of a Timestamp field. The above information may be a TS format field. According to a specific embodiment, the TS format field may represent that timing information included in a transport packet is in the format of media time. In this case, the TS format field may be set to 0x01. Additionally, the TS format field may represent that timing information included in a transport packet is in the format of Network Time Protocol (NTP). In this case, the TS format field may be set to 0x02. Additionally, the TS format field may represent that timing information included in a transport packet is in the format of normal playing time. In this case, the TS format field may be set to 0x03. Additionally, the TS format field may represent that timing information included in a transport packet is in the format of SMPTE time code. The SMPTE time code is time code defined in Society of motion picture and television engineers (SMPTE). In this case, the TS format field may be set to 0x04. Additionally, the TS format field may represent that timing information included in a transport packet is 90 KHz timing information. In this case, the TS format field may be set to 0x05. Additionally, the TS format field may represent that timing information included in a transport packet is in a GPS time format. In this case, the TS format field may be set to 0x06.

Additionally, the EXT_MEDIA_TIME field may represent a configuration of a Timestamp field. A structure of a header extension may represent a configuration of timing information relating to object presentation or decoding included in the timestamp field. The above information may be referred to as a TS version field. For example, the TS version field may represent that the timestamp field is a 32 bit field. In this case, the TS version field may be set to 0. For another example, the TS version field may represent that the timestamp field is a 64 bit field. In this case, the TS version field may be set to 1.

Additionally, the EXT_MEDIA_TIME field may include additional information relating to timing information. For example, data information relating to timing information to be mapped may be included. The additional information relating to timing information may be referred to as an Extension field.

Additionally, the EXT_MEDIA_TIME field may include information on a configuration of the Extension field. In more detail, various information may be included in the Extension field and flags may form a set in various information. In this case, a set of flags may be referred to as an Ext Flags field.

A transport object that the broadcast reception device 100 receives through a broadcast reception unit may need to synchronize with timing information having a different format or reference time. In more detail, the broadcast reception device 100 may need to synchronize timing information of a transport object with a base timeline that is the reference for synchronization having a different format or reference time than timing information of a transport object. According to an embodiment, timing information for synchronization may be a presentation timing of a transport object. Timing information for synchronization according to another embodiment may be a decoding timing of a transport object. In this case, a broadcast transmission device may need to transmit information on a mapping relationship between different timing information and timing information of a transport object to the broadcast reception device 100. According to an embodiment of the present invention to solve the above issue, metadata including the above-mentioned timeline_component_AU may be transmitted as one transport object.

According to an embodiment of the present invention to solve the above issue, the above-mentioned header extension may include additional mapping information different from timing information of a transport object. In more detail, a header extension (EXT_TIME_MAP) may include information for mapping a timestamp of a transport object into another timeline. For example, the broadcast reception device 100 may map a presentation time of a packet payload into a GPS time by using the above information through the control unit 150. In this case, the GPS time may be a base timeline.

Figure 127:
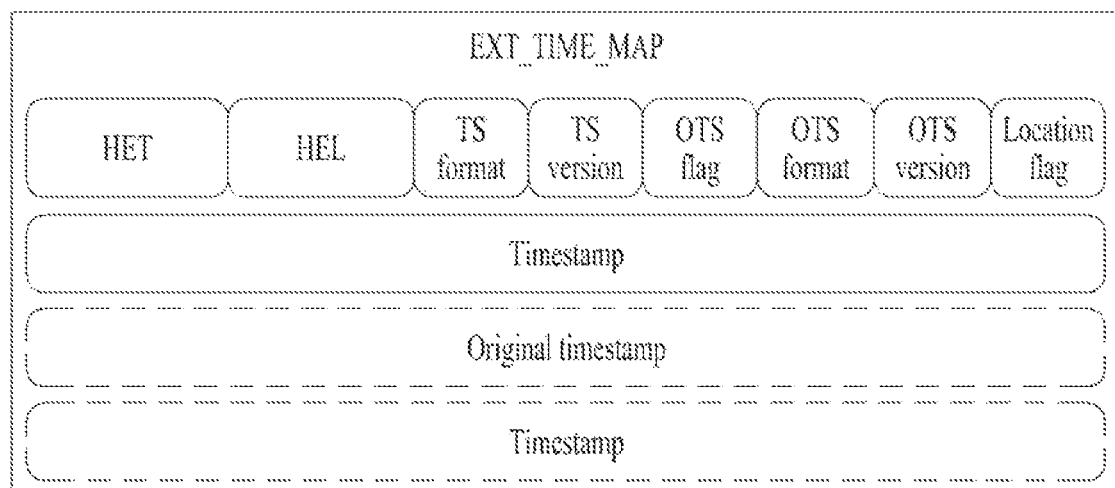
FIG. 127 is a view illustrating a structure of a header extension for supporting mapping with another timing information according to an embodiment of the present invention.

FIG. 127 is a view illustrating a structure of a header extension for supporting mapping with another timing information according to an embodiment of the present invention.

As shown in FIG. 127, the header extension may include format information of a Timestamp field. The above information may be a TS format field. According to a specific embodiment, the TS format field may represent that a timestamp included in a transport packet is in the format of media time. In this case, the TS format field may be set to 0x01. Additionally, the TS format field may represent that a timestamp included in a transport packet is in the format of Network Time Protocol (NTP). In this case, the TS format field may be set to 0x02. Additionally, the TS format field may represent that a timestamp included in a transport packet is in the format of normal playing time. In this case, the TS format field may be set to 0x03. Additionally, the TS format field may represent that a timestamp included in a transport packet is in the format of SMPTE time code. The SMPTE time code is time code defined in Society of motion picture and television engineers (SMPTE). In this case, the TS format field may be set to 0x04. Additionally, the TS format field may represent that a timestamp included in a transport packet is a 90 KHz based timestamp. In this case, the TS format field may be set to 0x05. Additionally, the TS format field may represent that a timestamp included in a transport packet is in a GPS time format. In this case, the TS format field may be set to 0x06.

Additionally, the header extension may represent the version or configuration of a timestamp field. A structure of a header extension may represent a configuration of timing information relating to object presentation or decoding included in the timestamp field. The above information may be referred to as a TS version field. For example, the TS version field may represent that the timestamp field is a 32 bit field. In this case, the TS version field may be set to 0. For another example, the TS version field may represent that the timestamp field is a 64 bit field. In this case, the TS version field may be set to 1.

Additionally, the header extension may represent whether timing information of a time line into which a timestamp of a transport object is mapped exists. In this case, information representing the presence may be referred to as an OTS flag field. In a specific embodiment, when the OTS flag field is set to 1, it may represent that timing information of a timeline into which a timestamp of a transport object is mapped exists.

Additionally, a header extension may represent a timestamp format of a time line into which a timestamp of a transport object is mapped. In more detail, a timestamp of a transport object may be at least one of a presentation time and a decoding time of an object. Additionally, a timeline in which a transport object is mapped into a timestamp may be a base timeline. Herein, the base timeline is a reference timeline for synchronization between a plurality of different timelines.

The above information may be an OTS format field. According to a specific embodiment, the OTS format field may represent that a timestamp mapped into a timestamp of a transport object included in a transport packet is in the format of a media time. In this case, the OTS format field may be set to 0x01. Additionally, the OTS format field may represent that timing information included in a transport packet is in the format of Network Time Protocol (NTP). In this case, the OTS format field may be set to 0x02. Additionally, the OTS format field may represent that a timestamp mapped into a timestamp of a transport object included in a transport packet is in the format of normal playing time. In this case, the OTS format field may be set to 0x03. Additionally, the OTS format field may represent that a timestamp mapped into a timestamp of a transport object included in a transport packet is in the format of SMPTE time code. The SMPTE time code is time code defined in Society of motion picture and television engineers (SMPTE). In this case, the OTS format field may be set to 0x04. Additionally, the OTS format field may represent that a timestamp mapped into a timestamp of a transport object included in a transport packet is 90 KHz based timing information. In this case, the OTS format field may be set to 0x05. Additionally, the OTS format field may represent that a timestamp mapped into a timestamp of a transport object included in a transport packet is in a GPS time format. In this case, the OTS format field may be set to 0x06.

Additionally, a header extension may represent a version or configuration of a timestamp of a timeline mapped into a timestamp of an object and a timestamp of a transport object. In more detail, a timestamp of a transport object may be at least one of a presentation time and a decoding time of an object. Additionally, a timeline in which a transport object is mapped into a timestamp may be a base timeline. Herein, the base timeline is a reference timeline for synchronization between a plurality of different timelines.

In this case, information representing a configuration or version of a timestamp mapped into a timestamp of a transport object may be referred to as an OTS version field. For example, the OTS version field may represent that a timestamp mapped into a timestamp of a transport object is 32 bits. In this case, the OTS version field may be set to 0. For another example, the OTS version field may represent that a timestamp mapped into a timestamp of a transport object is 64 bits. In this case, the OTS version field may be set to 1.

Additionally, the header extension may represent whether location information is included. In this case, information representing whether location information is included may be a Location flag field. For example, when the Location flag field is set to 1, it may represent that location information is included in a corresponding header extension.

Additionally, the header extension may include a timestamp of a transport object and timing information of a timeline mapped into the timestamp of the transport object. The above information may be referred to as a timestamp field.

Additionally, the header extension may include a timestamp of a corresponding header extension and timing information relating to a transport object mapped into a timestamp of a transport object. The above information may be an Origin timestamp field.

Additionally, the header extension may include location information of data relating to a timeline mapped into a timestamp of an object. The above information may be referred to as a location field. In an embodiment, when mapping with a timeline of a specific ISO BMFF based data segment is required, the Location field may include the URL of a corresponding data segment.

Figure 128:
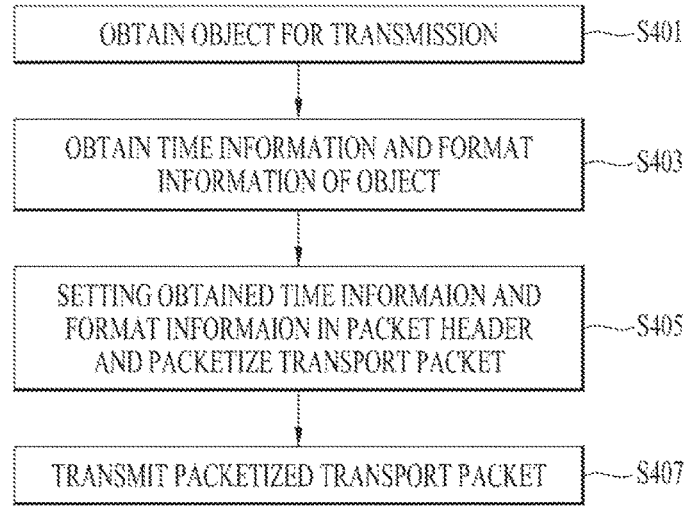

FIG. 128 is a view illustrating a method of operating a broadcast transmission device according to an embodiment of the present invention.

The broadcast transmission device obtains an object for transmission through a control unit in operation S401. According to an embodiment, the object may be AV content. According to another embodiment, an object may be AV content related enhancement data.

The broadcast transmission device may obtain time information and format information of an object through a control unit in operation S403. According to an embodiment, the time information may be a timestamp of a transport object. According to another embodiment, the time information may be timing information of a timeline to be mapped into a timestamp of a transport object. According to another embodiment, the time information may be a timestamp of a header extension structure. According to another embodiment, the time information may be timing information of a transport object to be mapped into a timestamp of a header extension structure. Additionally, the format information may be at least one of a regular file, an HTTP entity, and an audio/video access unit.

In more detail, a timestamp of a transport object may be at least one of a presentation time and a decoding time of an object. Additionally, a timeline in which a transport object is mapped into a timestamp may be a base timeline. Herein, the base timeline is a reference timeline for synchronization between a plurality of different timelines. For example, the base timeline may be GPS time and information for synchronizing a transport object with the GPS time may be included in the above header extension.

The broadcast transmission device sets the time information and format information obtained through the control unit in a packet header and packetizes a transport packet in operation S405. In more detail, a control unit of a broadcast transmission device packetizes a packet header including the obtained time information and a packet payload including data according to a transport protocol. According to another embodiment, the broadcast transmission device may set time information and format information in a header extension that is selectively included in a packet header through the control unit.

In more detail, the time information may be information relating to a presentation time of an object. The information relating to a presentation time may be at least one of a presentation time point (timing information) and a decoding time point (timing information) of a transport object. According to another embodiment, the additional information may be type information of a transport object. The broadcast transmission device may set at least one of whether a header extension exists in a packet header, the length of a header extension, and type information of a header extension, in a normal packet header.

The broadcast transmission device transmits the packetized transport packet through a transmission unit in operation S407. The transmission unit may transmit a transport packet through at least one of a terrestrial broadcast network and an internet network.

Figure 129:
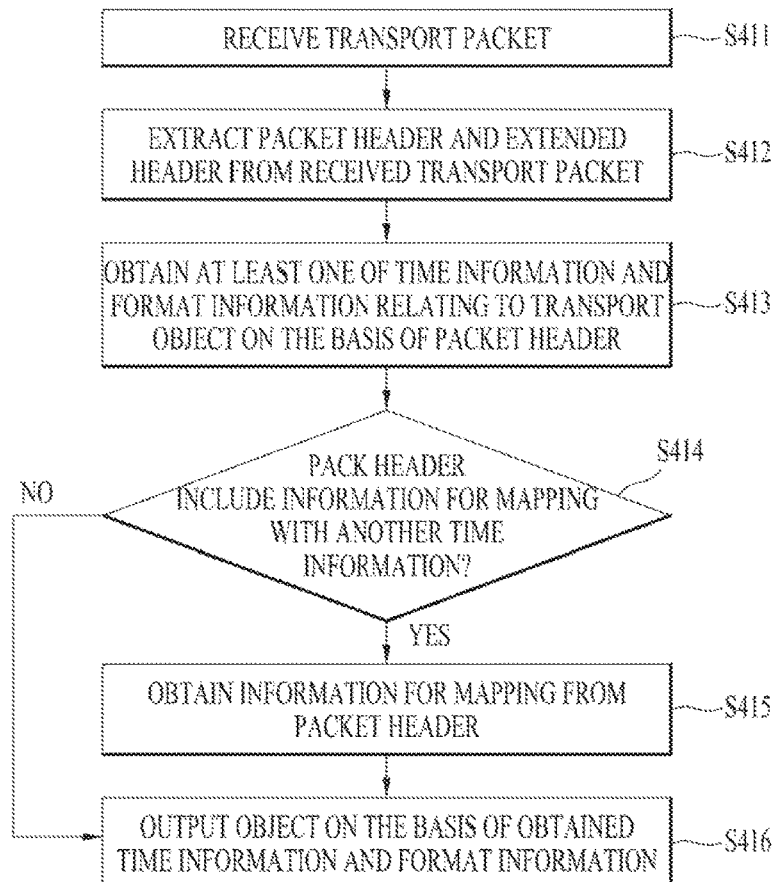

FIG. 129 is a view illustrating a method of operating a broadcast reception device according to an embodiment of the present invention.

The broadcast reception device 100 receives a transport packet through the broadcast reception unit 110 in operation S411. As described with reference to FIG. 128, a transport packet may include a packet header and a packet payload and the packet header may include a header extension selectively.

The control unit 150 of the broadcast reception device 100 extracts a packet header and a header extension from the received transmission packet in operation S412. According to a specific embodiment, the control unit 150 may extract a packet header included in a transport packet. Additionally, a header extension that is selectively included in a packet header may be extracted from a packet header.

The control unit 150 of the broadcast reception device 100 obtains at least one of time information relating to a transport object and format information of a transport object on the basis of a packet header in operation S413. According to another embodiment, the control unit 150 may obtain at least one of the time information and the format information from a header extension that is selectively included in a packet header. According to a specific embodiment, the control unit 150 may obtain a timestamp of a transport object on the basis of a header extension. Additionally, the control unit 150 may obtain format information of a transport object. The format information of the transport object may represent at least one of a regular file, an HTTP entity, and an audio/video access unit. Herein, the regular file may be an ISO BMFF based media file.

The control unit 150 of the broadcast reception device 100 determines whether information for mapping into another time information is obtained from a packet header in operation S414. In more detail, the control unit 150 determines whether another time information mapping into time information for a corresponding transport object exists in a packet header. According to another embodiment, the control unit 150 may determine the other time information on the basis of specific information extracted from a header extension that is selectively included in a packet header.

According to an embodiment, when the control unit 150 determines that information for mapping into another time information from a packet header, it obtains information for mapping from the packet header in operation S415. Herein, the other time information may be the above mentioned timing information of the base timeline. Additionally, the timing information may include at least one of presentation timing information and decoding timing information of a transport object. According to a specific embodiment, the control unit 150 may obtain timing information of a timeline mapped into a transport object on the basis of a packet header. According to another embodiment, the control unit 150 may obtain timing information of a transport object mapped into a timestamp of a corresponding packet header on the basis of a packet header. Additionally, the control unit 150 may obtain location information of data mapped into a transport object on the basis of a packet header. According to another embodiment, the control unit 150 may obtain information for mapping from a header extension that is selectively included in a packet header.

The control unit 150 of the broadcast reception device 100 obtains a transport object on the basis of the obtained time information in operation S416. According to an embodiment, when the control unit 150 does not obtain another time information and mapping information, it outputs an object on the basis of a timestamp of a corresponding transport object. According to another embodiment, when the control unit 150 obtains the other time information and the mapping information, it outputs an object on the basis of corresponding mapping information and a timestamp of an object.

Figure 130:
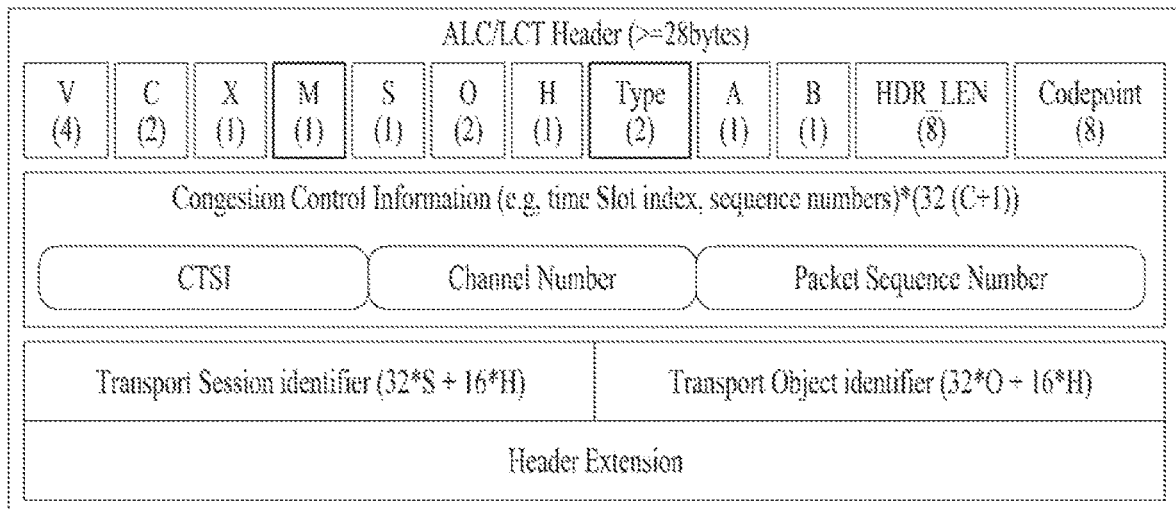

FIG. 130 is a view illustrating a structure of a packet header including information on a configuration of a transport packet.

A packet header according to an embodiment of the present invention may represent that the first or end part data in an entire transport object is included in a packet payload. In this case, Information representing that the first or end part data is included may be a marker bit. According to a specific embodiment, the marker bit may be an M field. The M field may be a 1 bit field.

Additionally, a packet header according to an embodiment of the present invention may include information on a configuration of a corresponding transport packet. In this case, the information on the configuration of the transport packet may be a type field. The type field may be a 2 bit field.

In another case, the information on the configuration of the transport packet may be included in a codepoint field. The Codepoint field may be an 8 bit field.

According to a specific embodiment, the Type field may represent that a corresponding transport object has a regular packet structure. In more detail, it represents that a corresponding packet uses an existing transport packet structure shown in FIG. 119 as it is. In this case, the transport packet may include at least one of a packet header, a header extension, a packet payload, an identifier, and data. Additionally, the broadcast transmission device may set the Type field to 0x00.

Additionally, according to a specific embodiment, the Type field may represent that a corresponding transport packet does not include a payload. In more detail, it represents that a corresponding transport packet includes only a packet header and a header extension. In this case, the broadcast transmission device may set the type field to 0x01.

Additionally, according to a specific embodiment, the Type field may represent that a corresponding transport packet includes offset information for an entire transport object. Herein, the offset information is offset information of data including an encoding symbol field of a corresponding transport packet. That is, the offset information represents offset information of data of a corresponding transport packet in an entire transport object. At this point, according to an embodiment, a corresponding transport packet may have a structure and configuration identical to those of a regular transport packet but the payload identifier field may be replaced with a data offset field. In this case, the broadcast transmission device may set the type field to 0x02.

Figure 131:
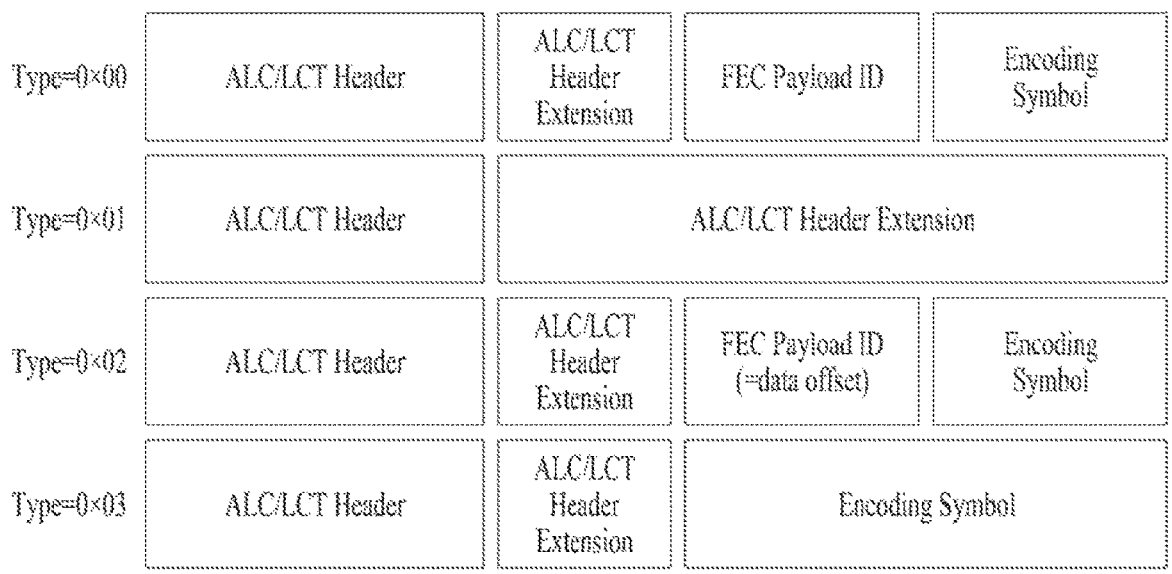

Additionally, according to a specific embodiment, the Type field may represent that a corresponding transport packet includes a different configuration than a structure of an existing regular transport packet. In this case, the broadcast transmission device may set the type field to 0x03. According to a specific embodiment, the Type field may represent that a corresponding transport object does not include a payload identifier field. In this case, the broadcast transmission device may set the type field to 0x04. FIG. 131 is a view illustrating a configuration of the transport packet described with reference to FIG. 130. As shown in FIG. 131, the Type field may represent a structure of a transport packet. However, the present invention is not limited to the transport packet shown in FIG. 131 and also is not limited to the set value in FIG. 131.

Figure 132:
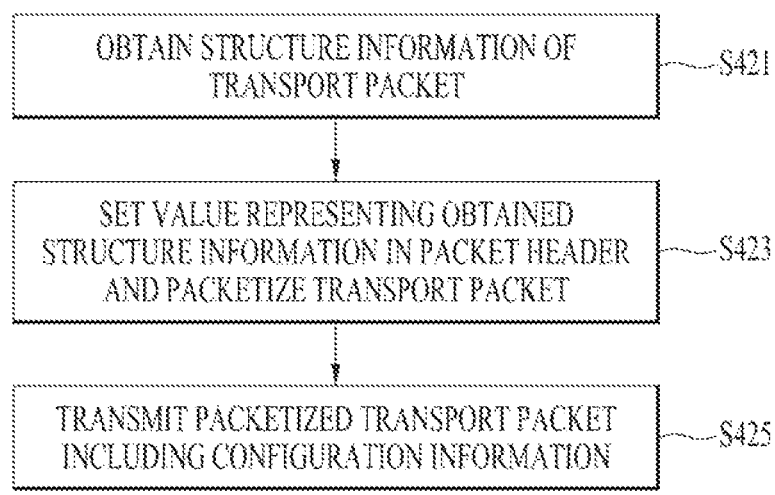

FIG. 132 is a view illustrating a method of operating a broadcast transmission device according to an embodiment of the present invention.

The broadcast transmission device obtains structure information of a transport packet through a control unit in operation S421. According to an embodiment, a structure of a transport packet may be an existing regular packet structure. According to another embodiment, a structure of a transport packet may have a structure configured with only a packet header and a header extension. According to another embodiment, a structure of a transport packet may be a structure including a configuration that replaces an existing payload identifier. According to another embodiment, a structure of a transport packet may be a structure not including a payload identifier.

The broadcast transmission device packetizes a transport packet by setting a value that represents information of a corresponding structure in a packet header on the basis of a structure of the transport packet obtained through the control unit in operation S423. In more detail, the control unit may set information of a corresponding structure in the Type field.

The broadcast transmission device transmits the packetized transport packet through a transmission unit in operation S425. According to an embodiment, the transmission unit may transmit the packetized transport packet through a terrestrial broadcast network. According to another embodiment, the transmission unit may transmit the packetized transport packet through an internet network.

Figure 133:
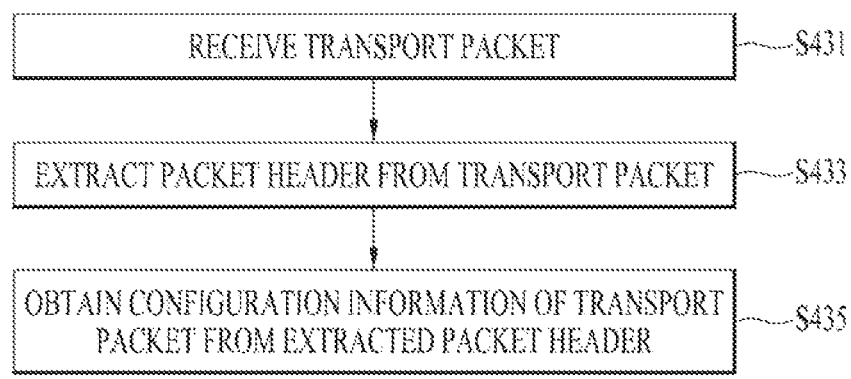

FIG. 133 is a view illustrating a method of operating a broadcast reception device according to an embodiment of the present invention.

The broadcast reception device 100 receives a transport packet through the broadcast reception unit 110 in operation S431. According to an embodiment, the broadcast reception unit 110 may receive a transport packet through a terrestrial broadcast network. According to another embodiment, an IP communication unit 130 may receive a transport packet through an internet network.

The broadcast reception device 100 extracts a packet header from the received transport packet through the control unit 150 in operation S433. In more detail, the transport packet may include at least one of a packet header and a packet payload. Accordingly, the control unit 150 may extract a packet header signaling a packet payload from a transport packet.

The broadcast reception device 100 obtains configuration information of a transport packet from the extracted packet header in operation S435. In more detail, the packet header may include information representing a structure of a transport packet. Accordingly, the broadcast reception device 100 obtains information representing a structure of a transport packet from a packet header through the control unit 150. According to an embodiment, a structure of a transport packet may be an existing regular transport packet structure. According to another embodiment, a structure of a transport packet may be a structure including only a packet header and a header extension. According to another embodiment, a structure of a transport packet may be a structure including offset information that replaces a packet payload identifier. According to another embodiment, a structure of a transport packet may be a structure not including a packet payload identifier.

FIG. 134 is a view illustrating timeline reference information AU including suggested presentation delay (SPD) according to an embodiment of the present invention.

The present invention proposes insertion of SPD into the aforementioned timeline reference information AU and transmission of the resulting information. In addition, the present invention proposes insertion of SPD into the aforementioned LCT packet field and transmission of the resulting information. As such, a timeline of media streams transmitted through different networks (e.g., the Internet and a broadcast network) may be reconfigured and may be smoothly reproduced by a receiver. In addition, a timeline reference/timestamp to which the SPD is applied may be transmitted so as to effectively support synchronization between receivers present in different reception environments.

The SPD may refer to suggested presentation delay up to consumption time based on generation time of a media stream transmitted through an external network or an internal network. In some embodiments, the SPD may refer to suggested presentation delay to decoding time based on encoding time of a media stream. Alternatively, when a specific unit for enabling random access of a media stream accumulates on a broadcast stream, the SPD may refer to a time difference between time in which a first byte of the corresponding unit accumulates and a last byte of the corresponding unit accumulates. The corresponding data unit may include a random access point (RAP). Both time points as a reference of the SPD may be changed in some embodiments. The SPD, that is, suggested presentation delay may be used to compensate for a difference between presentation time periods according to a buffer time (BT) of a receiver. With regard to a plurality of receivers, respective practical network bandwidths are different and, thus, a buffer time may be different for each receiver. According to a buffer time difference, even if the same media data is broadcast by a transmitting side, presentation time of a receiver may be changed. This may be compensated for and the SPD may be applied to a timeline reference or timestamp value so as to reproduce the same media at the same time for each receiver. In addition, when a specific unit for enabling random access of a media stream is transmitted through a broadcast stream, the SPD may be used to induce fastest presentation time included in the corresponding unit. The fastest presentation time included in the corresponding unit may be induced in consideration of a presentation timestamp obtained by considering the SPD and sender current time of a server for generating a packet for carrying data, time in which a packet is actually received, and so on.

The SPD may be applied when a timeline of a media stream transmitted through an internal network or an external network is reconfigured using the timeline reference information AU. That is, when the timeline of an internal network or an external network is reconfigured, an SPD value may be subtracted from the timeline reference value of the internal network or the external network to configure the timeline to which the suggested presentation delay is applied.

In addition, the SPD may be applied when a timestamp including information of presentation time of corresponding media data is transmitted and synchronization is performed. That is, with regard to synchronization using a timestamp, a value of the SPD may be added to the timestamp value to perform synchronization to which suggested presentation delay is applied.

As described above, the timeline reference information AU may be used for synchronization between streams transmitted through different networks. Here, the illustrated timeline reference information AU may correspond to another embodiment of the aforementioned timeline component AU or timeline reference information AU.

Fields and structures of the timeline reference information AU including SPD according to an embodiment of the present invention will be described An AU_identifier field may refer to the aforementioned AU_identifier information. That is, the AU identifier field may identify corresponding timeline reference information AU. In addition, the AU_identifier field may also identify a structure of the corresponding timeline reference information AU. In some embodiments, the AU_identifier field may have a size of 8 bits.

An AU_length field may refer to the aforementioned AU_length information. That is, the AU_length field may include length information of the corresponding timeline reference information AU. In some embodiments, the corresponding field may have a size of 32 bits and have uimsbf format.

An external_media_URL flag field may refer to the aforementioned external_media_URL_flag information. The external_media_URL_flag field may be a flag indicating whether the corresponding timeline reference information AU has the external_media_URL field. That is, the corresponding field may indicate whether URL information of a stream transmitted through an external network is included in the timeline reference information AU. The corresponding field may have a size of 1 bit and have bsibf format.

An internal_timeline_reference flag field may refer to the aforementioned internal_timeline_reference_flag information. The internal_timeline_reference_flag field may be a flag indicating whether the corresponding timeline reference information AU includes the internal_timeline_reference field. That is, the corresponding field may indicate whether timeline reference information of an internal network is included in the timeline reference information AU. The corresponding field may have a size of 1 bit and have bslbf format.

An external timeline_reference_flag field may refer to the aforementioned external_timeline_reference_flag information. The external_timeline_reference_flag field may be a flag indicating whether the corresponding timeline reference information AU includes the external_timeline_reference field. That is, the corresponding field may indicate whether timeline reference information of an external network is included in timeline reference information AU. The corresponding field may have a size of 1 bit and have bsibf format.

A suggested_presentation_delay_flag field may indicate whether corresponding timeline reference information AU includes the suggested_presentation_delay field. That is, the corresponding field may indicate whether the SPD information is included in timeline reference information AU. The corresponding field may have a size of 1 bit and have bslbf format. The suggested_presentation_delay field will be described below.

After flag fields, a predetermined size of bits may be reserved for future use. In the present embodiment, a 4-bit space may be reserved for future use.

The timeline reference information AU may further include information items related to timeline reference of an internal network. According to a value of an external_media_URL_flag field, the timeline reference information AU may further include URL information of a stream transmitted through an external network. In this case, the added fields will be described below.

An external_media_URL_Jength field may be further included in the timeline reference information AU. The external_media_URL__length field may represent a length of an external_media_URL field in a byte unit. The corresponding field may be an 8-bit field and have uimsbf format.

An external_media_URL field may also be further included in the timeline reference information AU. The external_media_URL field may include position information of media transmitted through an external network and/or unique identification information of the corresponding media. The media transmitted through an external network may be accessed through these information items. For example, when the media transmitted through an external network is a media according to DASH, information of MPD URL, MPD ID, etc. of a corresponding MPD of the media may be included in the external_media_URL field. The corresponding field may have a bit number corresponding to a value indicated by the external_media_URL_length field. In some embodiments, the corresponding field may have a bit number obtained by multiplying a value indicated by the external_media_URL_length field by 8.

The timeline reference information AU may further include information items related to timeline reference of an internal network. According to a value of the internal_timeline_reference Jag field, the timeline reference information AU may further include additional fields related to a timeline of an internal network. In this case, the added fields will be described below.

An internal timeline field may be further included in the timeline reference information AU. The internal_timeline_reference_format field may indicate format of timeline reference information of an internal network included in the timeline reference information AU. For example, when the corresponding field has a value of 0x00, the timeline reference information of the internal network may have media time format, when the corresponding field has a value of 0x01, the timeline reference information of the internal network may have network time protocol (NTP) format, when the corresponding field has a value of 0x02, the timeline reference information of the internal network may have PTP format, and when the corresponding field has a value of 0x03, the timeline reference information of the internal network may have timecode format. When the corresponding field has a value of 0x04 to 0xFF, the timeline reference information of the internal network may be reserved for future use. The corresponding field may have a size of 8 bits and have format uimsbf.

An internal_timeline_reference_timescale_flag field may be further included in timeline reference information AU. The internal_timeline_reference_timescale_flag field may be a flag indicating whether the timeline reference information AU include a time scale of timeline reference information of an internal network. The corresponding field may have a size of 1 bit and have bslbf format.

Arm internal_timeline_reference_length field may be further included in timeline reference information AU. The internal_timeline_reference_length field may represent a length of timeline reference information of an internal network included in the timeline reference information AU as a byte unit. The corresponding field may have a size of 7 bits and have uimsbf format. The internal_timeline_reference_timescale field may be further included in the timeline reference information AU.

An internal_timeline_reference_timescale field may represent a time scale of the timeline reference information of the internal network included in the timeline reference information AU in a Hz unit. The corresponding field may or may not be present according to a value of the aforementioned internal_timeline_reference_timescale_flag field. The corresponding field may have a size of 32 bits and have uimsbf format.

An internal_timeline_reference field may be further included in timeline reference information AU. The internal_timeline_reference field may have timeline reference information of an internal network. According to a value of the corresponding field, a timeline of a media stream transmitted through the internal network may be reconfigured. The corresponding field may have a bit number corresponding to a value indicated by the internal_timeline_reference_length field. In some embodiments, the corresponding field may have a bit number obtained by multiplying a value indicated by the internal_reference_length field by 8.

The timeline reference information AU may further include information items related to timeline reference of an external network. According to a value of the external_timeline_reference_flag field, the timeline reference information AU may further include additional fields related to the timeline of the external network. In this case, the added fields will be described below.

In this case, the timeline reference information AU may further include an external_timeline_reference_format field, an external_timeline_reference_timescale_flag field, an external_timeline_reference_length field, an external_timeline_reference_timescale field, and/or an external_timeline_reference field.

Each of the added fields may have information on the media stream transmitted through an external network. The respective fields may correspond to fields of the aforementioned media stream transmitted through an internal network and perform similar operations. However, in this case, each field may have information on an external network but not an internal network.

That is, the external_timeline_reference_format field, the external_timeline_reference_timescale_flag field, the external_timeline_reference_length field, and the external_timeline_reference_timescale field, and external_timeline_reference field may perform similar operations to the aforementioned internal_timeline_reference_format field, internal_timeline_reference_timescale_flag field, internal_timeline_reference_length field, internal timeline_reference_ timescale field, and internal_timeline_reference field, respectively.

Fields of the media stream transmitted through the external network may each indicate format of a media stream transmitted through an external network, whether time scale information is present, a length, a time scale, and timeline reference, respectively.

The timeline reference field AU may further include fields related to the SPD. According to a value of the suggested_presentation_delay_flag field, the timeline reference field AU may further include additional fields related to the SPD. In this case, the added fields will be described below.

A suggested_presentation_delay_timescale_flag field may be further included in the timeline reference information AU. The suggested_presentation_delay_timescale_flag field may indicate whether the suggested_presentation_delay_timescale field is included in the corresponding timeline reference information AU. The suggested_presentation_delay_timescale field will be described below. That is, the corresponding field may indicate whether time scale related information of the SPD is included in the timeline reference information AU. When the corresponding field is set to 0 and the time scale related information of the SPD is not present, a time scale of the SPD may be represented as a normal clock value. The corresponding field may be a 1-bit field and have blsbf format.

A suggested_presentation_delay_length field may be further included in the timeline reference information AU. The corresponding field may indicate a length of the SPD in a byte unit. The corresponding field may have a size of 7 bits and have uimsbf format.

A suggested_presentationdelay_timescale field may be further included in the timeline reference information AU. The corresponding field may indicate a time scale of the SPD in a Hz unit. The corresponding field may or may not be present according to a value of the aforementioned suggested_presentation_delay_timescale_flag field. The corresponding field may have a size of 32 bits and have uimsbf format.

A suggested_presentation_delay field may be further included in the timeline reference information AU. The corresponding field may have SPD information. That is, the corresponding field may include suggested presentation delay information up to consumption time based on generation time of a media stream transmitted through an external network or an internal network. When a timeline of the media stream of the internal network/external network is reconfigured using the timeline reference information AU, a value obtained by subtracting a value of the corresponding field from the timeline reference of each of the internal network/external network may be applied. As such, a timeline to which the suggested presentation delay is applied may be configured. The corresponding field may have a bit number corresponding to a value indicated by the aforementioned suggested_presentation_delay_length field. In some embodiments, the corresponding field may have a bit number obtained by multiplying a value indicated by the suggested_presentation_delay_length field by 8. The corresponding field may have uimsbf format.

FIG. 135 is a view illustrating timeline reference information AU including suggested presentation delay (SPD) according to another embodiment of the present invention.

The illustrated timeline reference information AU including SPD according to another embodiment of the present invention may include timeline reference information of a plurality of internal networks or external networks. As described above, the timeline reference information AU may be used for synchronization of a timeline between media streams transmitted through different networks.

The AU_identifier field, the AU_length field, the suggested_presentation_delay_flag field, the external_media_URL_ length field, and/or the external_media_URL field are the same as in the above description. The external media location_flag field may perform the same function as the aforementioned external_media_URL field.

An nb_of_timeline_reference field may indicate the number of timeline references included in the corresponding timeline reference information AU. As described above, timeline reference information AU according to the present embodiment may have a plurality of timeline reference information items. The corresponding field may have a size of 6 bits and have uimsbf format.

Timeline reference related information items, the number of which is indicated by the nb_of_timeline_reference field, may be included in the timeline reference information AU. With respect to each timeline reference, the following fields may be present.

A timeline_reference_type field may indicate a type of a corresponding timeline reference. For example, when a value of the corresponding field is 0, the corresponding timeline reference may be timeline reference of a media stream transmitted through an internal network. In addition, when a value of the corresponding field is 1, the corresponding timeline reference may be timeline reference of a media stream transmitted through an external network. The corresponding field may have a size of 1 bit and have bslbf format.

A timeline_reference_identifier field may indicate a unique identifier of corresponding timeline reference. The corresponding field may be allocated to an integer between 0 to 127. The corresponding field may have a size of 7 bits and have a uimsbf field.

A timeline_reference_format field may indicate format of the corresponding timeline reference. The corresponding field may indicate format of corresponding timeline reference using the same method as the aforementioned internal_timeline_reference_format field and external_timeline_reference_format field. The corresponding field may have a size of 8 bits and have uimsbf format.

A timeline reference_timescale flag field may indicate whether information on a time scale of corresponding timeline reference is included in the timeline reference information AU. The corresponding field may indicate whether time scale related information is present using the same method as the aforementioned internal_timeline_reference_timescale_flag field and external_timeline_reference_timescale_flag field. The corresponding field may have a size of 1 bit and have bslbf format.

A timeline_reference_length field may indicate a length of the corresponding timeline reference in a byte unit. The corresponding field may indicate a length using the same method as the aforementioned internal_timeline_reference_length field and external_timeline_reference_length field. The corresponding field may have a size of 7 bits and have uimsbf format.

The timeline_reference_timescale field may indicate a time scale of the corresponding timeline reference in a Hz unit. The corresponding field may indicate a time scale using the same method as the aforementioned internal_timeline_reference_timescale field and external_timeline_reference_timescale field. The corresponding field may have a size of 32 bits and have uimsbf format.

A timeline_reference field may indicate a timeline reference value of the corresponding timeline reference. According to a value of the corresponding field, a timeline of a media stream transmitted through the corresponding internal/external network may be reconfigured. The corresponding field may indicate a timeline using the same method as the aforementioned internal_timeline_reference field and external_timeline_reference field. The corresponding field may have a bit number corresponding to a value indicated by the aforementioned timeline_reference_length field. In some embodiments, the corresponding field may have a bit number obtained by multiplying a value indicated by the timeline_reference_length field by 8. The corresponding field may uimsbf format.

Fields related to the SPD may have the same structure as the aforementioned structure and may be included in the timeline reference information AU. The suggested_presentation_delay_timescale_flag field, the suggested_presentation_delay_length field, the suggested_presentation_delay_timescale field, and/or the suggested_presentation_delay field may be the same as the aforementioned fields with the same names as the above-described fields.

Figure 136:
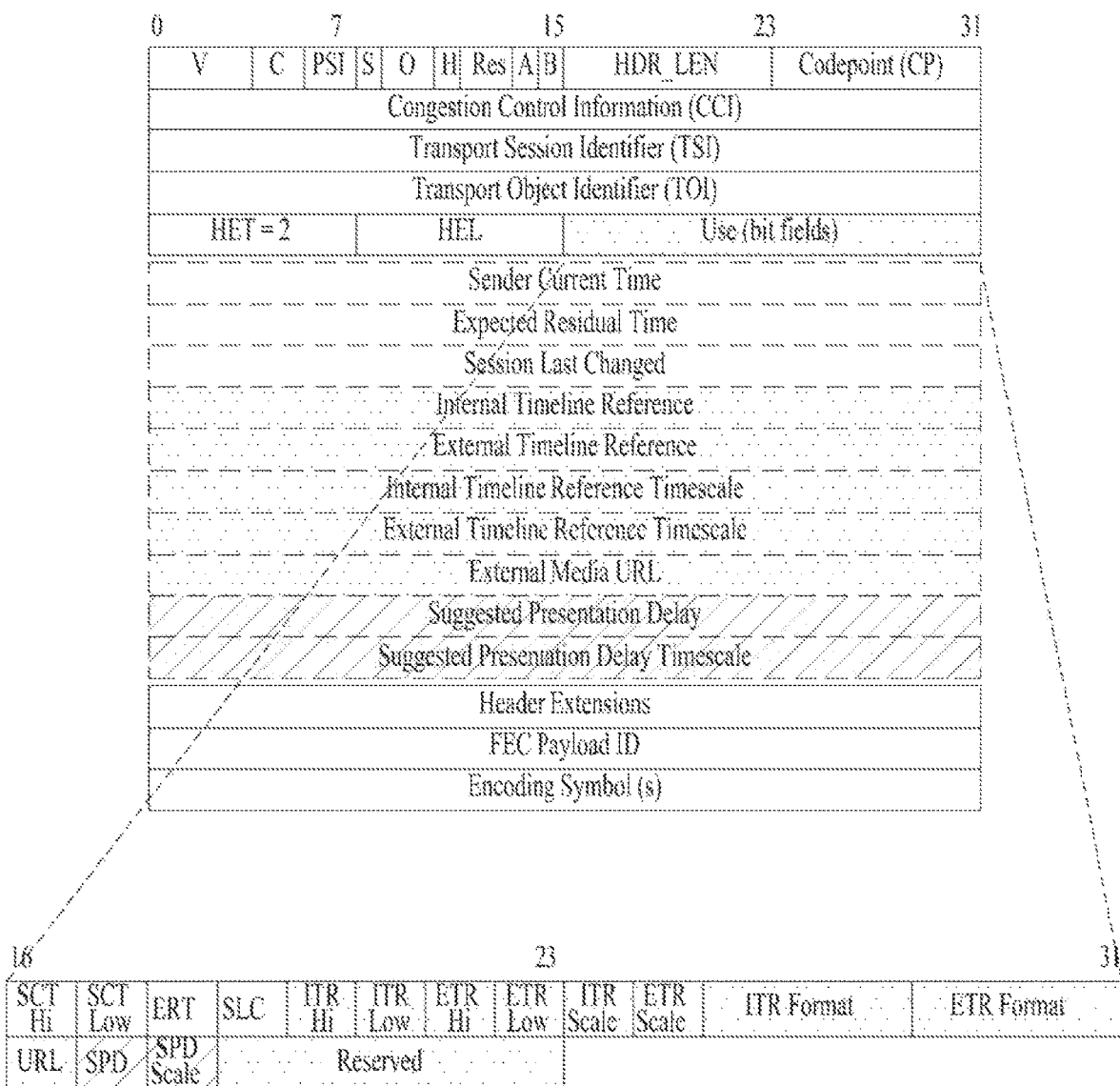

FIG. 136 is a view illustrating an LCT packet structure including suggested presentation delay (SPD) according to an embodiment of the present invention.

As described above, an LCT packet may transmit timeline reference related information. A header of the LCT packet may be extended and information for synchronization between media streams transmitted through different networks may be transmitted. The proposed structure may be applied to a packet for a transfer protocol such as a real time protocol (RTP). In addition, the proposed structure may be used in association with service signaling information suitable for a transfer protocol. The service signaling information may include information indicating that a corresponding stream transmits timeline reference of an internal or external network, URL information of media transmitted through an external network, the aforementioned various flag information items, time scale information of timeline reference, and information that is commonly applicable to each packet.

The V field, the C field, the PSI field, the S field, the O field, the H field, the Res field, the A field, the B field, the HDR_LEN field, the CP field, the CCI field, the TSI field, and the TOT field are the same as the aforementioned fields.

A header extension type (HET) field may an extension type of a corresponding LCT packet header. The corresponding field may allocate a value equal to or less than 127 so as to indicate an extension type of the LCT packet header. In the present embodiment, the HET field may have a value of 2 and indicate that an LCT packet header has an extension type of EXT_TIME.

A header extension length (HEL) field may indicate a length of a corresponding LCT packet header. The length may be represented in 32-bit word units.

Detailed fields of a USE field may be as follows. The SCT HI field, the SCT Low field, the ERT field, and the SLC field are the same as the described description.

An internal timeline reference high flag (ITR Hi) field may indicate that an internal timeline reference field of 64 bits is included in extension of a corresponding LCT packet header.

An internal timeline reference low flag (ITR Low) field may indicate that an internal timeline reference field of 32 bits is included in extension of a corresponding LCT packet header.

An external timeline reference high flag (ETR Hi) field may indicate that an external timeline reference field of 64 bits is included in extension of a corresponding LCT packet header.

An external timeline reference low flag (ETR Low) field may indicate that an external timeline reference field of 32 bits is included in extension of a corresponding LCT packet header.

An ITR Scale field may indicate that an internal timeline reference timescale field of 32 bits is included in extension of a corresponding LCT packet header.

An ETR Scale field may indicate that an external timeline reference timescale field of 32 bits is included in extension of a corresponding LCT packet header.

An ITR Format field may indicate format of an internal timeline reference field included in extension of a corresponding LCT packet header. That is, the corresponding field may indicate format of timeline reference of a media stream transmitted through an internal network.

An ETR Format field may indicate format of an external timeline reference field included in extension of a corresponding LCT packet header. That is, the corresponding field may indicate format of timeline reference of a media stream transmitted through an external network.

When values of the ITR Format field and ETR Format field are each 0x00, corresponding timeline reference may have media time format, when the values are each 0x01, the corresponding timeline reference may have network time protocol (NTP) format, when the values are each 0x02, the corresponding timeline reference may have PTP format, and when the values are each 0x03, the corresponding timeline reference may have time code format. When the values are each 0x04 to 0x0F, the corresponding timeline reference may be reserved for future use.

An external media. URI: flag (URL) field may be a flag indicating whether an external media URL field is present in extension of a corresponding LCT packet header.

A suggested presentation delay flag (SPD) field may be a flag indicating whether a suggested presentation delay field is included in extension of a corresponding LCT packet.

The SPD Scale field may be a flag indicating whether a suggested presentation delay timescale field is included in extension of a corresponding LCT packet header. When the corresponding flag field is set to 0, the suggested presentation delay timescale field may not be present. In this case, the suggested presentation delay field may represent SPD as a normal clock in a second unit.

The remaining bits of the USE field may be reserved for future use.

The Sender Current Time field, the Expected Residual Time field, and the Session Last Changed field are the same as in the above description.

An Internal Timeline Reference field may indicate timeline reference information of a media stream transmitted through an internal network. A timeline of a media stream transmitted through an internal network may be reconfigured through a value of the corresponding field. According to a value of the aforementioned ITR Hi field or ITR Low field, whether the corresponding field is present may be determined.

An External Timeline Reference field may indicate timeline reference information of a media stream transmitted through an external network. A timeline of a media stream transmitted through an external network may be reconfigured through a value of the corresponding field. According to a value of the aforementioned ETR Hi field or ETR Low field, whether the corresponding field is present may be determined.

An Internal Timeline Reference Timescale field may represent a time scale of timeline reference of a media stream transmitted through an internal network. Whether the corresponding field is present may be determined according to the aforementioned ITR Scale field.

An External Timeline Reference Timescale field may represent a time scale of timeline reference of a media stream transmitted through an external network as Hz. Whether the corresponding field is present may be determined according to the aforementioned ETR Scale field.

An External Media URL field may include position information of media transmitted through an external network and/or unique identification information of the corresponding media. The media transmitted through the external network may be accessed through the information items. For example, when media transmitted through the external network is media according to DASH, information of MPD UM, and MPD ID of corresponding MPD of media may be included in the URL field.

A Suggested. Presentation Delay field may include SPD information. That is, suggested presentation delay up to consumption time based on generation time of a media stream transmitted through an external network or an internal network may be represented by the corresponding field. When a timeline of a media stream transmitted through an internal network or an external network, a value obtained by subtracting a value of the corresponding field from each timeline reference value may be applied to configure a timeline.

A Suggested Presentation Delay Timescale field may represent a time scale of SPD information represented by the aforementioned suggested presentation delay field. The corresponding time scale may be Hz in some embodiments.

The Header Extensions field, the FEC Payload ID field, and the Encoding Symbol (s) field are the same as in the above description.

Figure 137:
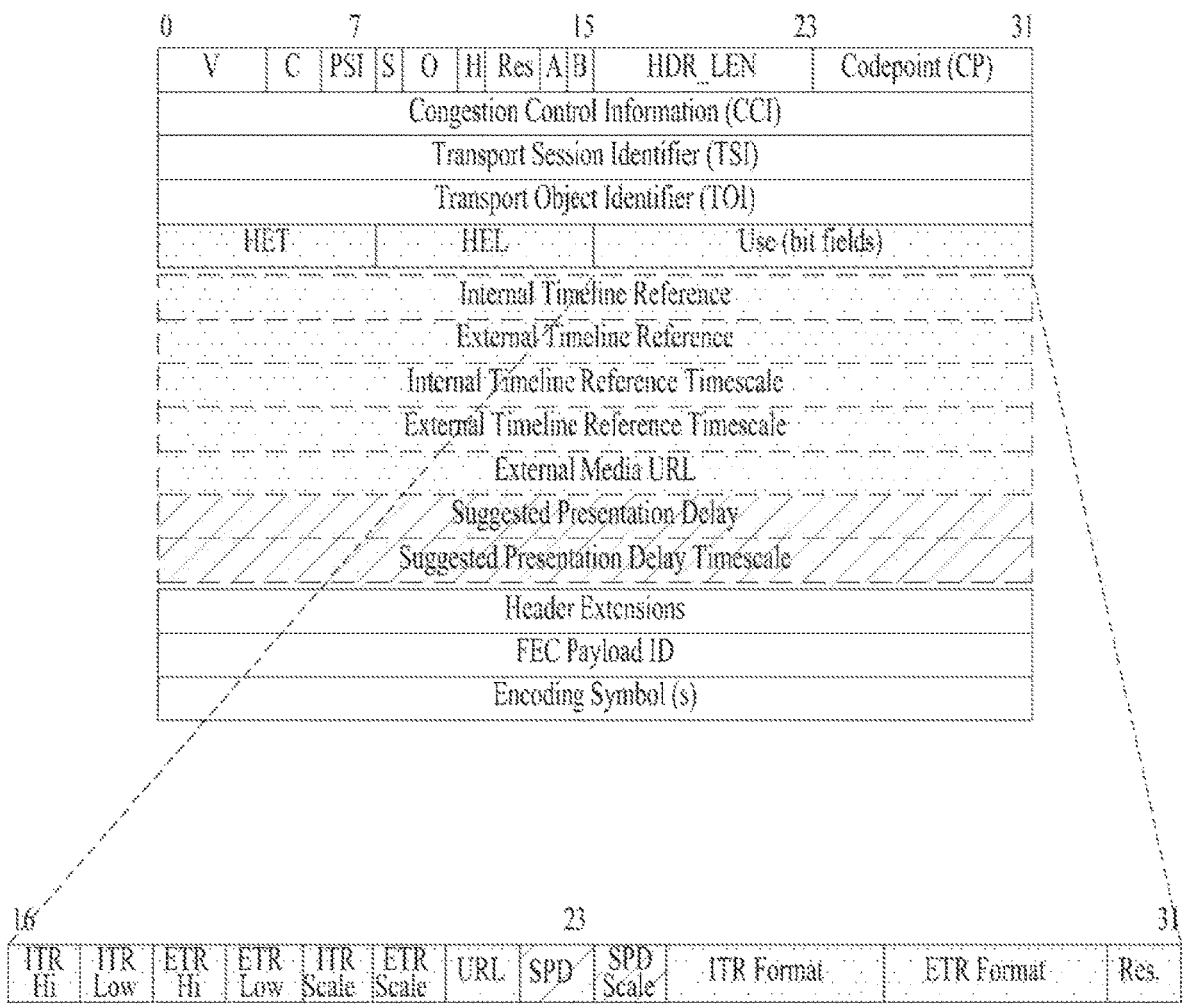

FIG. 137 is a view illustrating an LCT packet structure including suggested presentation delay (SPD) according to another embodiment of the present invention.

The present embodiment is similar to the aforementioned LCT packet structure including the SPD but the Sender Current Time field, the Expected Residual Time field, and/or the Session Last Changed field may be omitted. As the fields are omitted, the SCT Hi field, the SCT Low field, the ERT field, and/or the SLC field as flag fields of the corresponding fields may also be omitted.

Since timeline reference information through internal/external networks as general purpose of timing information items is already included in an LCT packet, the omitted fields may be omitted for efficiency of the LCT packet structure.

FIG. 138 is a view illustrating an LCT packet structure including suggested presentation delay (SPD) according to another embodiment of the present invention.

Extension of an ALC/LCT packet header may have various types. The extension type of a header may include header extension (EXT_TIME) for transmitting time related information such as a wall clock of a server. The present embodiment may correspond to an embodiment of EXT_TIME.

In the present embodiment, the HET field, the HEL field, the SCT Hi field, the SCT Low field, the ERT field (or the ERT flag field), the SLC field (or the SLC flag field), the Res field (or the Res. by LCT field), the SPD field (or the SPD flag field), the Sender Current Time field, the Expected Residual Time field Session Last Changed field, and/or the Suggested Presentation Delay Timescale field are the same as in the above description.

The LCT packet structure according to the present embodiment may be similar to an LCT packet structure including the aforementioned SPD but may further include a TS format field, a TS version field, and/or a Timestamp field. In this diagram, parts except for the extension part of the LCT packet structure are omitted.

The TS format field may indicate format of a timestamp field included in the extension part of the corresponding LCT packet header. For example, when a value of the corresponding field is 0x01, a timestamp may have media time format, when the value is 0x02, the timestamp may have NTP format, when the value is 0x03, the timestamp may have normal playing time format, when the value is 0x04, the timestamp may have SMPTE time code format, and when the value is 0x05, the timestamp may have 90 KHz-based timestamp format. When a value of the corresponding field is 0x00 or 0x06 to 0x0F, the timestamp may be reserved for future use.

The TS version field may indicate a configuration of a timestamp field included in the extension part of the corresponding LCT packet header. For example, when a value of the corresponding field is 0, a timestamp field may have 32 bits, and when the value is 1, the timestamp field may have 64 bits. In some embodiments, lengths of the Suggested Presentation Delay field and Suggested Presentation Delay Timescale field may also be determined according to a value of the corresponding field using the same method. In some embodiments, a separate field may be used to represent the lengths of the Suggested Presentation Delay field and Suggested Presentation Delay Timescale field.

The SPDT flag field may be the same as the aforementioned SPD scale field. In some embodiments, when a value of the corresponding field is set to 0, the corresponding field may be set such that the Suggested Presentation. Delay is not present.

The Timestamp field may include timing information related to data included in a payload of the corresponding ALC/LCT packet. For example, a value of the corresponding field may indicate information on time in which a first byte of the data included in the payload is decoded. In some embodiments, the value of the corresponding field may indicate presentation time information of corresponding data. The corresponding field may also include a time scale of a timestamp and/or corresponding time scale based timing information. In some embodiments, the corresponding field may have a value obtained by adding suggested presentation delay (SPD) to timing information such as current time of a transmitting side, encoding time of corresponding media data, and time in which a first byte of corresponding media data is decoded.

The Suggested Presentation Delay field may include SPD information. The corresponding field may indicate suggested presentation delay up to consumption time based on generation time of payload data of a corresponding ALC/LCT packet or an object including the payload data. When a timestamp value of the aforementioned timestamp field is used for synchronization of a timestamp value, the SPD value be used. That is, a value obtained by adding the SPD value to the timestamp value may be applied to perform synchronization so as to perform synchronization to which the suggested presentation delay is applied.

FIG. 139 is a diagram illustrating an extension part of an LCT packet structure including Suggested Presentation Delay (SPD) according to another embodiment of the present invention.

The present invention proposes EXT_OBJ_INFO as a new header extension structure in an extension part of an ALC/LCT packet structure. The new header extension structure may include type related information of a transport object and/or timing information related to the corresponding transport object. The new header extension structure may be included in a header extension field of the ALC/LCT packet header and may be used as a part of a content transport protocol packet header.

The present embodiment corresponds to one embodiment of EXT_OBJ_INFO. In the present embodiment, the HET field, the HEL field, the SPD field (or the SPD flag field), the SDPT flag field, the Timestamp field, the Suggested Presentation Delay field, and/or the Suggested Presentation Delay Timescale field are the same as in the above description.

The LCT packet structure according to the present embodiment is similar to the aforementioned LCT packet structure including the SPD but an Object type field and/or an M field may be further included. In the drawing, parts except for the extension part of the LCT packet structure are omitted.

The Object Type field may indicate a type of a corresponding transport object. A transport object type indicated by the corresponding field may have a similar value to a payload type value of an RTP packet header. In some embodiments, a value of the corresponding field may indicate various types of a transport object. For example, when a value of the corresponding field is 0x01, a type of a transport object may be a regular file, when the value is 0x02, the type of the transport object may be HTTP entity format, when the value is 0x03, the type of the transport object may be AAC-based audio data format, when the value is 0x04, the type of the transport object may be H.264-based video data format, when the value is 0x05, the type of the transport object may be HEVC-based video data forma, when the value is 0x06, the type of the transport object may be DASH segment or ISO base media file format, and when the value is 0x07, the type of the transport object may be metadata format. When a value of the corresponding field is 0x00 or 0x07 or more, the type of the transport object may be reserved for future use.

An M field may function as a marker and indicate various objects according to a value of the Object Type field. For example, when an object type indicated by the Object Type field is a file, the M field may indicate a start or end of the file. In addition, when an object type of the Object Type field is video/audio data, the M field may indicate a start or end of the related data unit. The M field may also be referred to as a marker bit field.

In the present embodiment, the Timestamp field, the Suggested Presentation Delay field, and/or the Suggested Presentation Delay Timescale field may have the same fixed length of 32 bits, 64 bits, and so on. The length may be indicated by a separate length field and indicated by an FILL field.

FIG. 140 is a diagram illustrating an extension part of an LCT packet structure including Suggested Presentation Delay (SPD) according to another embodiment of the present invention.

The present invention proposes another structure of the aforementioned EXT_OBJ_INFO. Compared with the aforementioned EXT_OBJ_INFO structure, a TS flag field, a TS format field, and/or a TS version field may be further included. In the drawing, parts except for the extension part of the LCT packet structure are omitted.

TS flag field may be a flag indicating whether a timestamp field is present in a corresponding header extension structure. In some embodiments, when a value of the corresponding field is 1, the timestamp field may be present, and when the value is 0, the timestamp field may not be present. In some embodiments, the meaning of the value of the corresponding field may be changed.

The TS format field and the TS version field may be the same as in the above description. However, when the TS flag field is 1, that is, when the timestamp field is indicated to be present, the two fields may indicate format and version of the corresponding timestamp.

The other fields having the same names are the same as in the above description.

FIG. 141 is a diagram illustrating an extension part of an LCT packet structure including Suggested Presentation Delay (SPD) according to another embodiment of the present invention.

The present invention proposes another structure of the aforementioned EXT_OBJ_INFO. Compared with the aforementioned EXT_OBJ_INFO structure, an Ext flag field and/or an Extension field may be further included. In the drawing, parts except for the extension part of the LCT packet structure are omitted.

The Ext Flag field may be a flag indicating whether an extension field is present in a corresponding header extension structure. In some embodiments, when a value of the corresponding field is 1, the extension field may be present, and when the value is 0, the extension field may not be present. In some embodiments, the meaning of the value of the corresponding field may be changed.

The Extension field may include additional information related to the corresponding transport object. For example, the Extension field may include location information of a transport object, and so on. Here, the location information of the transport object may be position information for obtaining correspond ding information. For example, when a DASH segment is transmitted to a transport object, a location of the transport object may be a URL of the DASH segment. In some embodiments, various information items related to the transport object may be added as a function of extension of the corresponding field.

The other fields having the same names are the same as in the above description.

FIG. 142 is a diagram illustrating an extension part of act LCT packet structure including Suggested Presentation Delay (SPD) according to another embodiment of the present invention.

The present invention proposes EXT_MEDIA_TIME as a new header extension structure of a header extension part of the ALC/LCT packet structure. The new header extension structure may be included in information of timing related information, timestamp information, and so on of media data. The new header extension structure may be included in a header extension field of the ALC/LCT packet and used as a portion of a content transport protocol packet header, or the like.

The present embodiment corresponds to one embodiment of EXT_MEDIA_TIME. In the case of EXT_MEDIA_TIME, the Object Type field, the M field, and the TS flag field may be omitted compared with the EXT_OBJ_INFO. In the drawing, pails except for an extension part of the LCT packet structure may be omitted.

The TS format field is the same as in the above description. However, in this case, the corresponding field may indicate that a timestamp has GPS time format according to a value of the field.

The TS version field is the same as in the above description. However, in this case, the corresponding field may indicate whether time scale information of a timestamp is present.

The Ext Flags field may be a set of flag fields of detailed fields included in the extension field. That is, the corresponding field may indicate a configuration of the extension field. In some embodiments, like the aforementioned Ext flag field, the corresponding field may indicate whether the extension field is present. The Extension field may include various information items of information related to a timeline mapped according to a value of the corresponding field.

The other fields having the same names are the same as in the above description.

FIG. 143 is a diagram illustrating an extension part of an LCT packet structure including Suggested Presentation Delay (SPD) according to another embodiment of the present invention.

The present invention proposes EXT_TIME_MAP as a new header extension structure of a header extension part of the ALC/LCT packet structure. The new header extension structure may be included in a header extension field of the ALC/LCT packet and used as a portion of a content transport protocol packet header, or the like.

The EXT_TIME_MAP may transmit metadata including the aforementioned timeline component AU or timeline reference information AU to one transport object. This is because mapping information between two timelines needs to be transmitted to a receiver when the transport object needs to be synchronized with another timeline. Through the EXT_TIME_MAP, the corresponding structure may be inserted into the extension part of the header to transmit required information without transmission of a separate transport object. When presentation time of a payload of a corresponding packet may be mapped to GPS time and so on using the transmitted information.

The EXT_TIME_MAP may further include an OTS flag field, an OTS format field, an OTS version field, a Location flag field, an Original timestamp field, an Location field, and so on.

The TS format field is the same as in the above description but in some embodiments, the corresponding field may indicate that a timestamp is GPS time format.

The OTS Flag field may be a flag indicating whether an original timestamp field is present in the extension part of the corresponding packet header. In some embodiments, when a value of the corresponding field is 1, the original timestamp field may be present, and when the value is 0, the timestamp field may not be present. In some embodiments, the meaning of the value of the corresponding field may be changed.

The OTS format field may indicate format of the original timestamp field. In some embodiments, the corresponding field may indicate various timestamp formats. For example, a value of the corresponding field is 0x01, the timestamp may have media time format, when the value is 0x02, the timestamp may have NTP format, when the value is 0x03, the timestamp may have normal playing time format, when the value is 0x04, the timestamp may have SMPTE time code format, and when the value is 0x05, the timestamp may have 90 KHz-based timestamp format. When the value of the corresponding field is 0x00 or 0x06 to 0x0F, the timestamp may be reserved for future use.

The OTS version field may indicate the version or configuration of the included original timestamp field. For example, when a value of the corresponding field is 0, the original timestamp field may have a size of 32 bits, and when the value is 1, the original timestamp may have a size of 16 bits.

The Location Flag field may be a flag indicating whether a location field is present in a header part of a corresponding packet header. In some embodiments, when a value of the corresponding field is 1, the location field may be present, and when the value is 0, the location field may not be present. In some embodiments, the meaning of the value of the corresponding field may be changed.

The timestamp field is the same as in the above description. The corresponding field may include a timestamp of a transport object represented by the Original Timestamp field and a timestamp of a timeline to be mapped. The timestamp of the corresponding field may be mapped to a timeline represented by the original timestamp field.

The Original Timestamp field may include timestamp information of a transport object having a mapping relationship with a timestamp of the timestamp field. The timestamp of the corresponding field may be mapped to a timeline represented by the timestamp field. In some embodiments, the corresponding field may have a value obtained by adding suggested presentation delay (SPD) to timing information of current time of a transmitting side, encoding time of corresponding media data, and time in which a first byte of the corresponding media data is decoded.

The location field may include location information of data related to a timeline to be mapped, and so on. For example, when a timestamp is mapped to a timeline of a specific DASH segment, URL information of the DASH segment may be included in the corresponding field.

The other fields having the same names are the same as in the above description.

In order to perform a function of a header or extension part of the header of the aforementioned LCT packet, a presentation time header (EXT_ROUTE_PRESENTATION_TIME) of ROUTE may be used. In some embodiments, in order to perform a function of a header or extension part of the header of the aforementioned LCT packet, an EXT_TIME header of RFC 5651 of IETF "Layered Coding Transport (LCT) Building Block," may also be used.

The header or extension parts of the header of the aforementioned LCT packet may correspond to one embodiment of EXT_ROUTE_PRESENTATION_TIME. In some embodiments, the header or extension parts of the header of the aforementioned LCT packet may correspond to one embodiment of an EXT_TIME header. The header or extension parts of the header of the aforementioned LCT packet may transmit timing related information as described above.

An LCT packet header according to another embodiment of the present invention may represent third, fourth, and fifth octets a 64-bit NTP timestamp. The header of the present embodiment may have an HET field and may also have a fixed length. A value of the header according to the present embodiment may be greater than the SCT. The LCT packet header according to the present embodiment may have a size of total of 4 bytes.

An LCT packet header according to another embodiment of the present invention may have all values of a 64-bit NTP timestamp. The header according to the present embodiment may have an HET field and/or an HEL field. The LCT packet header according to the present embodiment may have a size of total of 12 bytes. Accordingly, the remaining bit number may be reserved for future use.

FIG. 144 is a diagram illustrating a method of transmitting broadcast content according to an embodiment of the present invention.

A method of receiving broadcast content according to an embodiment of the present invention may include generating a first media stream of broadcast content, generating a second media stream of the broadcast content, transmitting the first media stream through a broadcast network, receiving a request for the second media stream, and/or transmitting the second media stream to a receiver through the Internet.

First, the first media stream of the broadcast content may be generated. This procedure may be performed by the first module. Here, the first media stream may be a media stream transmitted through a broadcast network. In the aforementioned embodiment, a media stream transmitted through an internal network may correspond to the first media stream. The first media stream may be formed by continuously arranging a plurality of packets. Among these, at least one packet may include time information. Here, the information is an integrated concept indicating all information items related to time. In some embodiments, the time information may correspond to the aforementioned extension part of the timing related LCT packet header, the timeline reference information AU, timeline component AU, and so on.

The second media stream of the aforementioned broadcast content may be generated. This procedure may be performed by the second module. Here, the second media stream may be a media stream transmitted through the Internet. In the aforementioned embodiment, a media stream transmitted through an external network may correspond to the second media stream. The first module and the second module may be integrated into each other and may operate as one module.

The generated first media stream may be transmitted to a receiving side through a broadcast network. In addition, the generated second media stream may be transmitted to the receiving side through the Internet. The fourth module may receive a request for the second media stream from the receiver and transmit a corresponding media stream to the receiving side according to the request. This request may be performed according to the aforementioned external_media_URL field.

In the method of transmitting broadcast content according to another embodiment of the present invention, packets of the aforementioned first media stream may include an extension header including the aforementioned time information. The extension header may be an extension part of the aforementioned LCT packet header. Here, the aforementioned time information may include timestamp information indicating presentation time of the first media stream. The timestamp information may correspond to the aforementioned timestamp field.

In the method of transmitting broadcast content according to another embodiment of the present invention, the aforementioned extension header may include only a portion of the timestamp. As described above, an extension header according to an embodiment of the present invention may represent third, fourth, and fifth octets a 64-bit NTP timestamp. When the aforementioned extension header includes only a portion of the timestamp, the extension header may include only some octets of the timestamp.

In the method of transmitting broadcast content according to another embodiment of the present invention, the aforementioned extension header may further include timestamp information indicating presentation time of the second media stream. Here, a timestamp indicating presentation time of the second media stream may refer to a timestamp represented by the aforementioned original timestamp field. That is, as described above, the extension header may further include an original timestamp field.

In the method of transmitting broadcast content according to another embodiment of the present invention, the aforementioned extension header may further include information on suggested presentation delay up to consumption time from generating time of the first media stream. Here, the information on the suggested presentation delay may refer to the aforementioned SPD. The extension header may further include Suggested Presentation Delay field. The receiver may add the SPD to the timestamp value and perform synchronization to which the SPD is applied.

In the method of transmitting broadcast content according to another embodiment of the present invention, a timestamp indicating presentation time of the aforementioned first media stream may have a timestamp value to which the SPD is already applied. The timestamp field may include a value obtained by adding the SPD value to the timestamp value. Accordingly, the presentation time to which the SPD is applied may be re presented.

In the method of transmitting broadcast content according to another embodiment of the present invention, the aforementioned packets may include timeline reference information items. Reference information items may include first timeline reference information for configuring a timeline of the first media stream and/or second timeline reference information for configuring a timeline of the second media stream. Each of the timeline reference information items may be used to reconfigure a timeline of each media stream. The timeline references may be mapped to configure a synchronized timeline. The timeline may be used to synchronize media streams transmitted through different networks. Packets having this payload may be timeline reference information AU packetized using the same as general packets. In some embodiments, these packets may be timeline component AU.

In the method of transmitting broadcast content according to another embodiment of the present invention, a payload of the aforementioned packets may further include information on suggested presentation delay. When the suggested presentation delay information may indicate time up to consumption time from generation time of the first media stream and/or the second media stream. The meaning may be changed in some embodiments. As described above, the SPD value may be subtracted from the timeline reference value to reconfigure a timeline to which the SPL) value is applied.

In the method of transmitting broadcast content according to another embodiment of the present invention, the afore-mentioned timeline reference information items may have a timeline reference value to which the SPD value is already applied.

In the method of transmitting broadcast content according to another embodiment of the present invention, the aforementioned first media stream may be a video stream of the aforementioned broadcast content and the second media stream may be an audio stream of the broadcast content.

A method of receiving broadcast content according to an embodiment of the present invention will be described. The method of receiving broadcast content according to an embodiment of the present invention is now shown.

The method of receiving broadcast content according to an embodiment of the present invention may include receiving a first media stream through a broadcast network, receiving a second media stream through the Internet according to a request through URL information, configuring a timeline of the first and second media streams, mapping the configured timelines and performing synchronization of timelines of the two media streams, and/or reproducing corresponding media data at specific time through a timestamp value.

The receiving of the first media stream may be performed by a first receiving module. The receiving of the second media stream through the Internet according to the request through the URL information may be performed by the second receiving module. The configuring of the timeline of the first and second media streams may be performed by a third receiving module. The mapping of the configured timelines and performing of the synchronization of the timelines of the two media streams may be performed by a fourth receiving module. The reproducing of the corresponding media data at specific time through the timestamp value may be performed by a fifth receiving module. Here, the third receiving module and the fourth receiving module may be integrated into each other and may operated as one module.

Each timeline may be reconfigured according to timeline reference information of timeline reference information AU in a media stream. In this case, each timeline may be mapped so as to synchronize the media streams. The SPD information that is transmitted together may be used to reconfigure a timeline to which the SPD is applied. In this case, a SPD value may be subtracted from the timeline reference value to apply the SPD.

In addition, each packet header of the media stream may include timestamp information. The timestamp information may be used to recognize presentation time of each media stream. The SPD information that is transmitted together may be used to acquire a time stamp value to which the SPD is applied. In this case, the SPD value may be added to the timestamp value to acquire presentation time of corresponding media data to which the SPD is applied.

In some embodiments, the aforementioned operations may be omitted or replaced by other operations that perform the same/similar operations.

FIG. 145 is a diagram illustrating an apparatus for transmitting broadcast content according to an embodiment of the present invention.

The apparatus for transmitting broadcast content according to an embodiment of the present invention may include a first module, a second module, a third module, and/or a fourth module.

The modules may be the same as the respective aforementioned modules having the same names. The first module may perform generating of the first media stream of the broadcast content. The second module may perform generating of the second media stream of the broadcast content. The third module may perform transmitting of the first media stream through a broadcast network. The fourth module may perform receiving a request for the second media stream and/or transmitting the second media stream through the Internet.

An apparatus for receiving broadcast content according to an embodiment of the present invention will be described. The apparatus for receiving broadcast content is not shown.

The apparatus for receiving broadcast content according to an embodiment of the present invention may include a first receiving module, a second receiving module, a third receiving module, a fourth receiving module, and/or a fifth receiving module. Each module may be the same as the aforementioned module having the same name.

In some embodiments, the aforementioned modules may be omitted and/or replaced by other modules that perform the same/similar operation.

The aforementioned first receiving module, second receiving module, third receiving module, fourth receiving module, and/or fifth receiving module may be processors for executing consecutive procedures stored in a memory. In addition, the aforementioned first module, second module, third module, fourth module, first receiving module, second receiving module, third receiving module, fourth receiving module, and/or fifth receiving module may be hardware elements positioned inside/outside the apparatus.

The modules or units may be processors for executing consecutive processes stored in a memory (or a storage unit). The steps described in the above-described embodiments may be performed by hardware/processors. The modules/blocks/units described in the above-described embodiments may operate as hardware/processors. The methods proposed by the present invention may be executed as code. This code may be written in a processor-readable storage medium and may be read by the processor provided by an apparatus.

Although the description of the present invention is explained with reference to each of the accompanying drawings for clarity, it is possible to design new embodiment(s) by merging the embodiments shown in the accompanying drawings with each other. In addition, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. In addition, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved an executed according to a distributive system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both of the apparatus and method inventions may be complementarily applicable to each other.

Those skilled in the art will appreciate that various modifications and variations can be made in the present invention without departing from the spirit or scope of the invention described in the appended claims. Accordingly, the present invention are intended to include the modifications and variations of the present invention provided within the appended claims and equivalents thereof.

Both apparatus and method inventions are mentioned in this specification and descriptions of both of the apparatus and method inventions may be complementarily applicable to each other.

MODE FOR INVENTION

Various embodiments have been described in the best mode for carrying out the invention.

INDUSTRIAL APPLICABILITY

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for transmitting a broadcast service, the method comprising:
generating, by a hardware processor in a transmitter, a first media component and a second media component for the broadcast service;
generating, by the hardware processor in the transmitter, signaling data for the broadcast service;
time interleaving, by a time interleaver in the transmitter, the first media component, wherein the first media component is time-interleaved by column-wise writing actual Forward Error Correction (FEC) blocks including the first media component in a Time Interleaving (TI) memory and diagonal-wise reading the first media component in the actual FEC blocks from the TI memory, wherein one or more virtual FEC blocks are skipped during the diagonal-wise reading the written first media component, wherein a number of the one or more virtual FEC blocks is equal to a difference between a number of the actual FEC blocks and a column number of the TI memory, and wherein information for obtaining the column number of the TI memory is signaled in physical layer signaling information;

transmitting, by an antenna in the transmitter, the time-interleaved first media component, the physical layer signaling information and the signaling data through a broadcast network; and transmitting, by a network interface in the transmitter, the second media component to a receiver through a broadband network, wherein the signaling data transmitted through the broadcast network includes first timeline information for specifying a timeline of the first media component transmitted through the broadcast network, second timeline information for specifying a timeline of the second media component transmitted through the broadband network, and uniform resource location information for the second media component.

2. The method according to claim 1, wherein the first media component and the second media component are time-aligned based on the first timeline information and the second timeline information.

3. The method according to claim 1, wherein the first media component is a video component of the broadcast service and the second media component is an audio component of the broadcast service.

4. The method according to claim 1, wherein a header of a Layered Coding Transport (LCT) packet carrying the first media component includes codepoint information for identifying a type of a payload that is carried by the LCT packet, transport object identification information for identifying an object within a transport session to which the payload of the LCT packet belongs, Sender Current Time (SCT) information for providing a sender current time and Expected Residual Time (ERT) information for indicating an expected remaining time for transmission of the object.

5. An apparatus for transmitting a broadcast service, the apparatus comprising:
a hardware processor configured to:
generate a first media component and a second media component for the broadcast service, and
generate signaling data for the broadcast service;
a time interleaver configured to time interleave the first media component, wherein the first media component is time-interleaved by column-wise writing actual Forward Error Correction (FEC) blocks including the first media component in a Time Interleaving (TI) memory and diagonal-wise reading the first media component in the actual FEC blocks from the TI memory, wherein one or more virtual FEC blocks are skipped during the diagonal-wise reading the written first media component, wherein a number of the one or more virtual FEC blocks is equal to a difference between a number of the actual FEC blocks and a column number of the TI memory, and wherein information for obtaining the column number of the TI memory is signaled in physical layer signaling information;
a broadcast transmitter configured to transmit the time-interleaved first media component, the physical layer signaling information and the signaling data through a broadcast network; and
a network interface configured to transmit the second media component to a receiver through a broadband network,
wherein the signaling data transmitted through the broadcast network includes first timeline information for specifying a timeline of the first media component transmitted through the broadcast network, second timeline information for specifying a timeline of the second media component transmitted through the broadband network, and uniform resource location information for the second media component.

6. The apparatus according to claim 5, wherein the first media component and the second media component are time-aligned based on the first timeline information and the second timeline information.

7. The apparatus according to claim 5, wherein the first media component is a video component of the broadcast service, and the second media component is an audio component of the broadcast service.

8. The apparatus according to claim 5, wherein a header of a Layered Coding Transport (LCT) packet carrying the first media component includes codepoint information for identifying a type of a payload that is carried by the LCT packet, transport object identification information for identifying an object within a transport session to which the payload of the LCT packet belongs, Sender Current Time (SCT) information for providing a sender current time and Expected Residual Time (ERT) information for indicating an expected remaining time for transmission of the object.

9. A method for receiving a broadcast service, the method comprising:
receiving, by a broadcast receiver, a first media component for the broadcast service, physical layer signaling information and signaling data for the broadcast service through a broadcast network;
time deinterleaving, by a time deinterleaver, the first media component time-interleaved by a transmitter, wherein the first media component in the transmitter is time-interleaved by column-wise writing actual Forward Error Correction (FEC) blocks including the first media component in a Time Interleaving (TI) memory and diagonal-wise reading the first media component in the actual FEC blocks from the TI memory, wherein one or more virtual FEC blocks are skipped during the diagonal-wise reading the written first media component, wherein a number of the one or more virtual FEC blocks is equal to a difference between a number of the actual FEC blocks and a column number of the TI memory, and wherein information for obtaining the column number of the TI memory is signaled in the physical layer signaling information; and
receiving, by a network interface, a second media component for the broadcast service through a broadband network,
wherein the signaling data received through the broadcast network includes first timeline information for specifying a timeline for the first media component received through the broadcast network, second timeline information for specifying a timeline for the second media component received through the broadband network, and uniform resource location information for the second media component.

10. The method according to claim 9, further comprising:
presenting, by a media processor, the first media component and the second media component.

11. The method according to claim 9, wherein the first media component and the second media component are time-aligned based on the first timeline information and the second timeline information.

12. The method according to claim 9, wherein the first media component is a video component of the broadcast service and the second media component is an audio component of the broadcast service.

13. The method according to claim 9, wherein a header of a Layered Coding Transport (LCT) packet carrying the first media component includes codepoint information for identifying a type of a payload that is carried by the LCT packet, transport object identification information for identifying an object within a transport session to which the payload of the LCT packet belongs, Sender Current Time (SCT) information for providing a sender current time and Expected Residual Time (ERT) information for indicating an expected remaining time for transmission of the object.

14. An apparatus for receiving a broadcast service, the apparatus comprising:
  a broadcast receiver configured to receive a first media component for the broadcast service, physical layer signaling information and signaling data for the broadcast service through a broadcast network;
  a time deinterleaver configured to time deinterleave the first media component time-interleaved by a transmitter, wherein the first media component in the transmitter is time-interleaved by column-wise writing actual Forward Error Correction (FEC) blocks including the first media component in a Time Interleaving (TI) memory and diagonal-wise reading the first media component in the actual FEC blocks from the TI memory, wherein one or more virtual FEC blocks are skipped during the diagonal-wise reading the written first media component, wherein a number of the one or more virtual FEC blocks is equal to a difference between a number of the actual FEC blocks and a column number of the TI memory, and wherein information for obtaining the column number of the TI memory is signaled in the physical layer signaling information; and
  a network interface configured to receive a second media component for the broadcast service through a broadband network,
  wherein the signaling data received through the broadcast network includes first timeline information for specifying a timeline for the first media component received through the broadcast network, second timeline information for specifying a timeline for the second media component received through the broadband network, and uniform resource location information for the second media component.

15. The apparatus according to claim 14, further comprising:
  a media processor configured to present the first media component and the second media component.

16. The apparatus according to claim 14, wherein the first media component and the second media component are time-aligned based on the first timeline information and the second timeline information.

17. The apparatus according to claim 14, wherein the first media component is a video component of the broadcast service and the second media component is an audio component of the broadcast service.

18. The apparatus according to claim 14, wherein a header of a Layered Coding Transport (LCT) packet carrying the first media component includes codepoint information for identifying a type of a payload that is carried by the LCT packet, transport object identification information for identifying an object within a transport session to which the payload of the LCT packet belongs, Sender Current Time (SCT) information for providing a sender current time and Expected Residual Time (ERT) information for indicating an expected remaining time for transmission of the object.

* * * * *